July 7, 1970 G. A. HUGHES ET AL 3,519,714
SYNTHESIS OF GONA-1,3,5(10)-TRIENES
Filed March 15, 1966 2 Sheets-Sheet 1

INVENTORS
GORDON A. HUGHES
HERCHEL SMITH
BY Vito Victor Bellino
ATTORNEY

July 7, 1970

G. A. HUGHES ET AL 3,519,714

SYNTHESIS OF GONA-1,3,5(10)-TRIENES

Filed March 15, 1966

INVENTORS
GORDON A HUGHES
HERCHEL SMITH

BY
ATTORNEY

United States Patent Office 3,519,714
Patented July 7, 1970

3,519,714
SYNTHESIS OF GONA-1,3,5(10)-TRIENES
Gordon Alan Hughes, Haverford, Pa., and Herchel Smith, 500 Chestnut Lane, Wayne, Pa. 19087; said Hughes assignor to said Smith.
Continuation-in-part of application Ser. No. 228,384, Oct. 4, 1962, which is a continuation of applications Ser. No. 57,904, Sept. 23, 1960, Ser. No. 91,341, Feb. 24, 1961, Ser. No. 137,535, Sept. 12, 1961, Ser. No. 195,000, May 15, 1962, and Ser. No. 196,557, May 16, 1962. This application Mar. 15, 1966, Ser. No. 534,353
Int. Cl. A61k 17/06
U.S. Cl. 424—238        22 Claims

ABSTRACT OF THE DISCLOSURE

The total synthesis of novel 13-polycarbon-alkyl compounds having a cycloaliphatic-phenanthrene nucleus in which the B and the C rings are at least partly hydrogenated, and in particular novel 13-polycarbon alkyl gonanes having an aromatic A-ring is described. These compounds have qualitatively varying hormonal effects and in particular estrogenic and anti-lipemic effects. Moreover, they are useful intermediates for the preparation of compounds having estrogenic, anti-lipemic, progestational, anabolic, and androgenic activities.

This application is a continuation-in-part of co-pending application Ser. No. 228,384, filed Oct. 4, 1962; which in turn is a continuation of applications Ser. No. 57,904, filed Sept. 23, 1960; Ser. No. 91,341, filed Feb. 24, 1961; Ser. No. 137,535, filed Sept. 12, 1961; Ser. No. 195,000, filed May 15, 1962; and Ser. No. 196,557, filed May 16, 1962; all abandoned.

This invention relates to compositions of matter classified in the art of chemistry as substituted unsaturated-gonane derivatives, to intermediates therefor, and to processes for making and using such compositions.

In describing the invention, reference will be made in the following specification to the annexed drawings, wherein.

Figure 1:
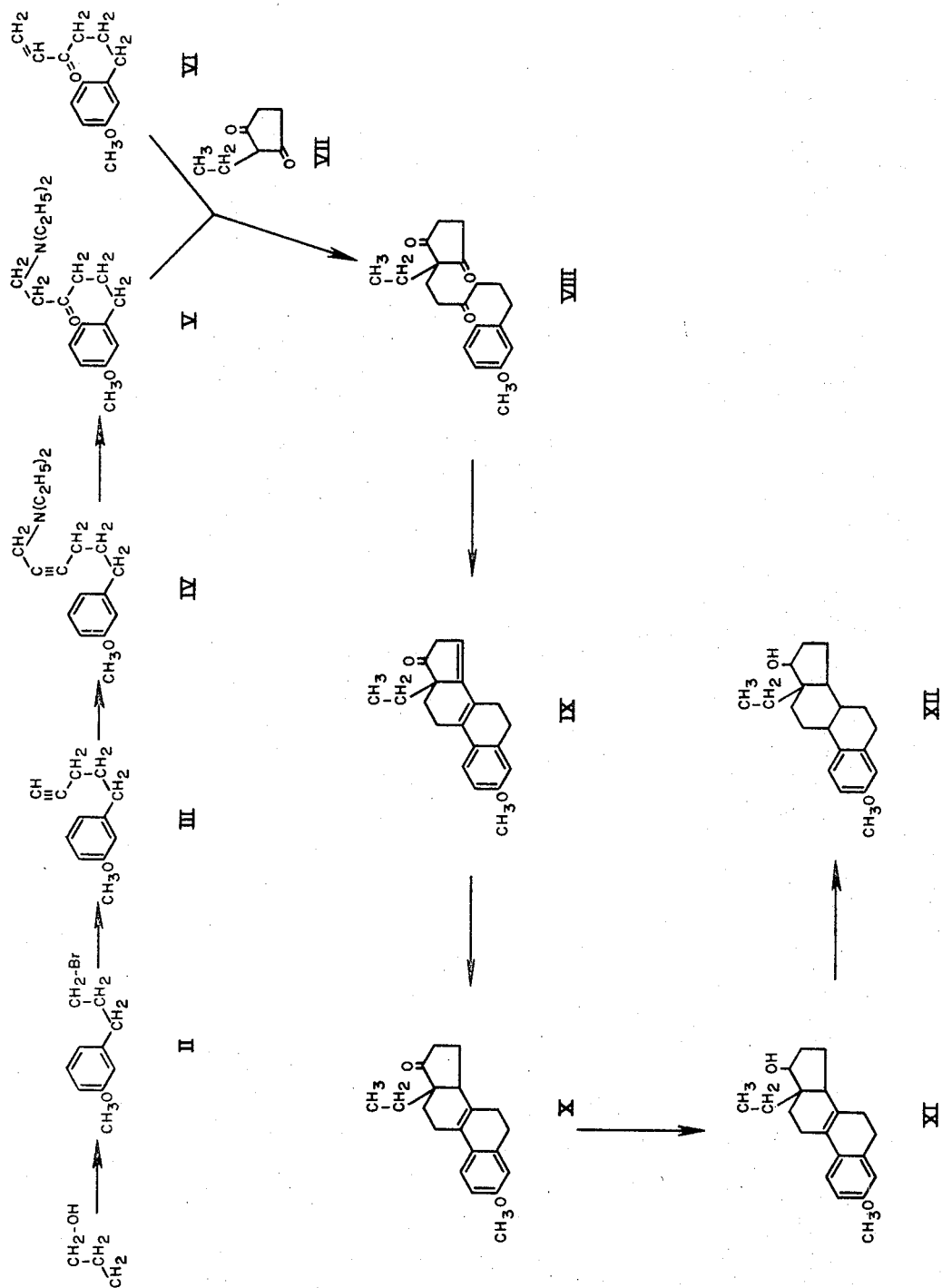
FIG. 1 illustrates schematically the reaction sequence for preparing a 13-alkylgona-1,3,5(10)-triene, specifically 13β-ethyl-3-methoxygona-1,3,5(10)-triene-17β-ol.

The invention sought to be patented, in a principal composition aspect, is described as residing in the concept of a chemical compound having a cycloaliphatic-phenanthrene nucleus in which the B and the C rings are at least partially hydrogenated and having attached thereto in the 13-position a monovalent polycarbon-alkyl radical.

The tangible embodiments of the composition aspect of the invention possess the inherent general physical properties of being white crystalline solids, are substantially insoluble in water and are generally soluble in polar solvents such as dimethylacetamide. Examination of compounds produced according to the hereinafter described process reveals, upon ultraviolet and infrared spectrographic analysis, spectral data supporting the molecular structures herein set forth. The aforementioned physical characteristics, taken together with the nature of the starting materials and the mode of synthesis, confirm the structure of the compositions sought to be patented.

The tangible embodiments of the invention possess the inherent applied use characteristics of exerting qualitatively varying hormonal effects in animals as evidenced by pharmacological evaluation according to standard test procedures. Such tangible embodiments show estrogenic, anti-estrogenic, blood lipid effects, effects upon mineral metabolism and central nervous system effects. This finding indicates their usefulness in the treatment of female hypogonadism, amenorrhea, dysmenorrhea, ovulation block and contraception, functional uterine bleeding, acne, arteriosclerosis, osteoporosis, hormone dependent tumors, infertility and growth inhibition. In particular it has been established that alterations of the natural steroid structure made possible by our discovery result not merely in a change of degree of hormonal activity but, as a result of the separation of types of hormonal activity, alter in an unexpected way its basic nature so that a desirable hormone effect is maximized and an undesirable hormone effect is minimized.

In addition to their inherent applied use characteristics, the intermediate compositions of this invention are useful in practicing the process aspect of the present invention in the making of the principal gonane compositions of the invention according to the sequence of reactions described herein.

The invention sought to be patented, in a principal process of making the compositions aspect is described as residing in the concept of the sequence of reactions including: converting a compound having a 5-phenyl-pent-1-yne nucleus, ring unsubstituted in at least one position ortho to the point of chain attachment, by means of a Mannich type reaction, to its acetylenic amine derivative; hydrating the acetylenic linkage to form a 3-keto compound; reacting such 3-keto substrate compound with a nucleophilic 2-monovalent alkyl-1,3-dioxocyclopentano compound under Michael condensation conditions to attach the cyclopentano compound through its 2-position carbon atom to the 1-position carbon atom of the 3-keto compound; treating the bicyclic triketone formed in the preceding step with an acidic dehydrating agent thereby to effect a double cyclodehydration to form a 1,3,5(10), 8,14-pentadehydro-13-alkylgonane; selectively saturating the 14(15) double bond of said gonane with hydrogen in the presence of a catalyst, and thereafter saturating the 8(9) double bond of the compound resulting from the previous step to obtain a 13-alkylgona-1,3,5(10)-triene.

The invention sought to be patented, in a subgeneric composition aspect, is described as residing in the concept of a chemical compound having gona-1,3,5(10)-triene nucleus and having attached thereto in the 13-position a monovalent polycarbon-alkyl radical.

The tangible embodiments of said subgeneric composition aspect posses the use characteristic of varying hormone effects in animals as evidenced by pharmacological evaluation by standard test procedures.

The invention sought to be patented in a second subgeneric composition aspect is described as residing in the concept of a 16,17-dioxy-genated 13-polycarbon-alkyl-gona-1,3,5(10)-triene.

The tangible embodiments of said subgeneric composition aspect posses the use characteristic of varying hormone effects in animals as evidenced by pharmacological evaluation by standard test procedures.

As used herein the term "oxygenated," when referring to the gonane nucleus or a substituent upon it, means having attached thereto one or more radicals containing oxygen atoms among which are, for purpose of illustration but without limiting the generality of the foregoing, hydroxy, pyranyloxy, epoxy, carbonyl oxygen, acyloxy and ketalised carbonyl oxygen.

The invention sought to be patented in a third subgeneric composition aspect is described as residing in the concept of a 13-polycarbon-alkgona-1,3,5(10)-trien-17-ol, of which a specific embodiment, 13β-ethyl-3-methoxgona-1,3,5(10)-trien-17β-ol, is hereinafter described.

The tangible embodiments of said subgeneric composition aspect possess the use characteristic of exerting varying hormone effects in animals as evidenced by pharmacological evaluation according to standard test procedures.

Figure 2:
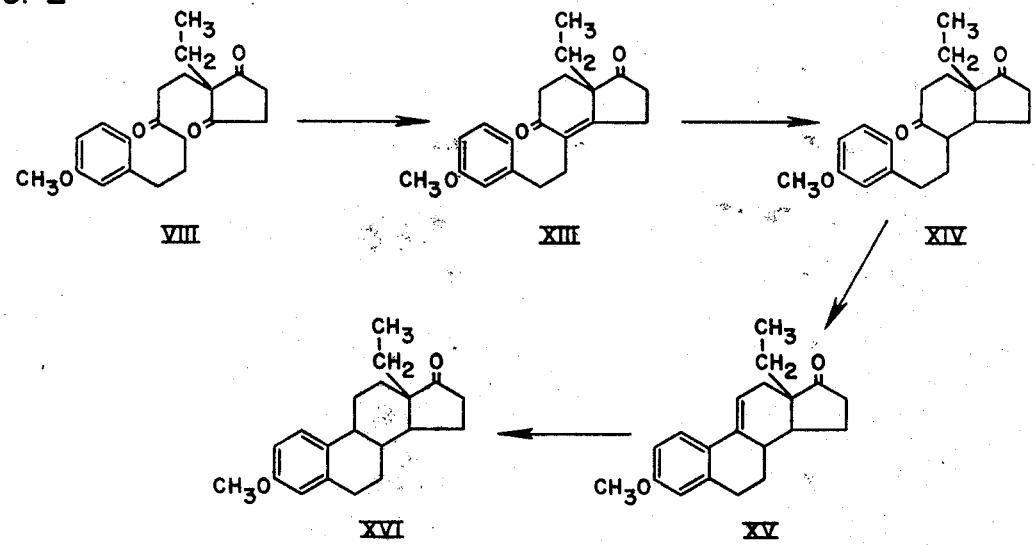
FIG. 2 illustrates schematically the reaction sequence for preparing a 13-alkylgona-1,3,5(10)-triene from a 2-alkyl-2-(6-phenyl-3-oxohexyl)-1,3-cyclopentanedione, specifically 13β-ethyl-3-methoxygona-1,3,5(10)-trien-17-one.

The invention sought to be patented in a second process aspect as illustrated in annexed FIG. 2, is described as residing in the concept of a sequence of reactions to form the gonane structure with the natural configuration of hydrogen atoms at the 8,9 and 14-positions including: treating the bicyclic ketone formed in the Michael reaction of 3-keto substrate compound with a nucleophilic 1,3-dioxopentano compound having at least one hydrogen at the 2-position (VIII) under aldol condensation conditions, i.e., in the presence of a basic catalyst, and if a suitable activating substituent is not present on the aromatic ring, in the presence of an acid catalyst, to form the tricyclic di-ketone (XIII): reducing the C-ring unsaturation to form compound (XIV) (by whatever mechanism the hydrogen at the 8-position (steroid numbering) is introduced, it can on treatment with an acid or base take up the most stable configuration, i.e. the position trans to the ortho newly introduced hydrogen, by equilibrating through keto-enol tautomerism with the adjacent keto; thus when the first is α, having been introduced trans to the 13-substituent by stereospecific means, the 8-carbon will be β so that the natural configuration results): closing the B-ring under acidic conditions at low temperature to form XV: and stereospecifically reducing the 9.11 unsaturation by hydrogenation or by the action of an alkali metal in liquid ammonia to also form the natural α-hydrogen configuration at the 9-position in compound XVI.

Figure 3:
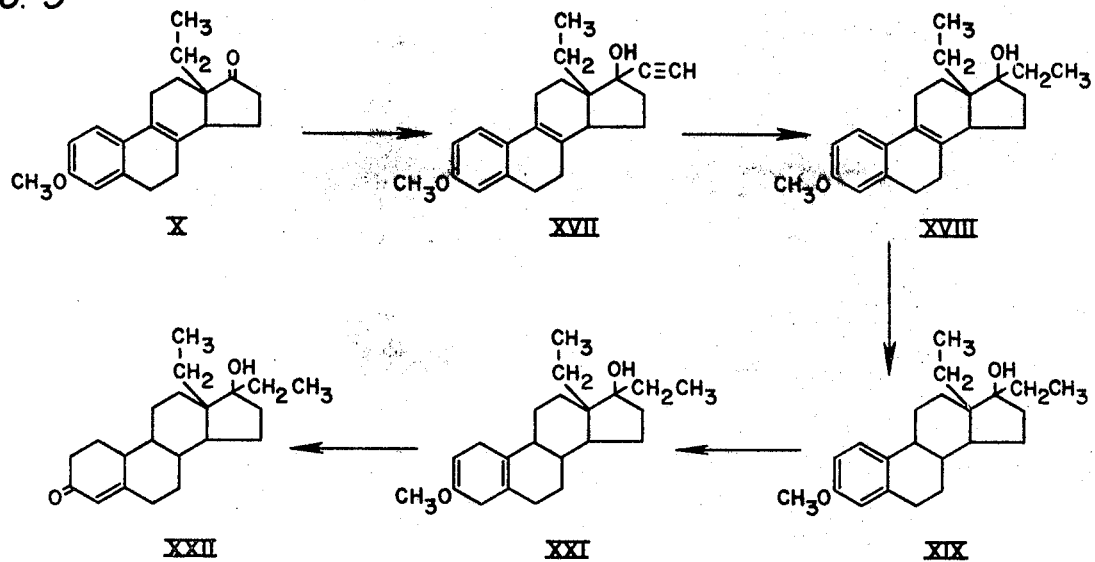
FIG. 3 illustrates schematically the reaction sequence for preparing a 13,17-dialkylgona-1,3,5(10)-trien-17-ol from a 13-alkylgona-1,3,5(10),8-tetraene, specifically 13β,17α-diethyl-3-methoxygona-1,3,5(10)-trien-17β-ol from 13β-ethyl-3-methoxygona-1,3,5(10),8-tetraen-17-one, and using said unsaturated gonane to prepare a 13-alkygon-4-ene, specifically 13β,17α-diethyl-17β-hydroxygon-4-en-3-one.

The invention sought to be patented in a third process aspect, as illustrated in annexed FIG. 3, is described as residing in the concept of a sequence of reactions including: treating a compound with a gona-1,3,5(10),8-tetraen-17-one nucleus, having attached thereto in the 13-position a monovalent polycarbon-alkyl radical (X) with an organo-metallic derivative of a 1-alkyne to obtain a compound with a 17α-alkynylgona-1,3,5(10),8-tetraen-17-ol nucleus having attached thereto in the 13-position a polycarbon-alkyl radical (XVII): selectively saturating the side chain with hydrogen to obtain the corresponding 17α-alkyl compound (XVIII): and thereafter reducing the 8(9) double bond with an alkali metal in liquid ammonia to obtain a compound with a 17α-alkylgona-1,3,5(10)-trien-17β-ol nucleus having attached thereto in the 13-position a monovalent polycarbon-alkyl radical (XIX).

Figure 4:
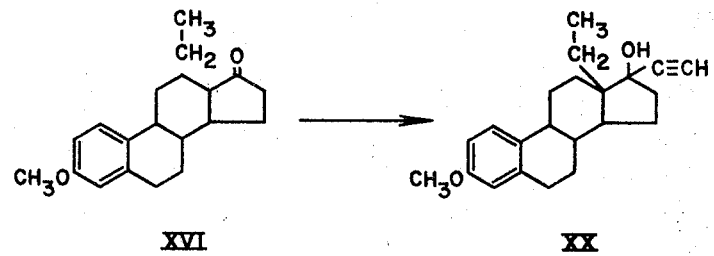
FIG. 4 illustrates schematically the alkynylation of a 13-alkylgona-1,3,5(10)-trien-17-one to prepare a 17-alkynyl-13-alkylgona-1,3,5(10)-trien-17-ol, specifically the conversion of 13β-ethyl-3-methoxygona-1,3,5(10)-trien-17-one to 17α-ethylnyl-13β-ethyl-3-methoxygona-1,3,5(10)-trien-17β-ol.

The invention sought to be patented in a fourth process aspect, as illustrated in annexed FIG. 4, is described as residing in the concept of treating a compound with a gona-1,3,5(10)-trien-17-one nucleus having attached thereto in the 13-position a monovalent polycarbon-alkyl radical (XVI) with an organometallic derivative of a 1-alkyne to obtain a compound with a 17α-alkynylgona-1,3,5(10)-trien-17β-ol nucleus having attached thereto in the 13-position a monovalent polycarbon-alkyl radical (XX).

The manner of making the chemical compounds, which are the starting materials for use in making the compounds of the invention, and for use in the processes of making the invention, are illustrated in co-pending application Ser. No. 228,384, filed Oct. 4, 1962.

The manner and process of making and using the invention will now be generally described so as to enable a person skilled in the art of chemistry to make and use same, as follows:

Referring now to FIG. 1, wherein the compounds are assigned Roman numerals for identification schematically, the sequence of reactions involved in the synthesis of a specific embodiment, namely 13β-ethyl-3-methoxygona-1,3,5(10) - trien - 17β - ol, is illustrated. 3-(m-methoxyphenyl)propanol (I) is heated with phosphorous tribromide in benzene after dropwise addition in the cold to form 3-(m-methoxyphenyl)propyl bromide (II). This halogen compound (II) dissolved in tetrahydrofuran is condensed with sodium acetylide in liquid ammonia to obtain 5-(m-methoxyphenyl)-1-pentyne (III). Compound III is allowed to stand under nitrogen with water, 30% formalin, acetic acid, diethylamine, dioxan and cuprous chloride at 70° C. for about twelve hours whereby there is obtained 1 - diethylamino - 6 - (m-methoxyphenyl)-2-hexyne (IV), which is in turn hydrated in the presence of a mercury salt and sulfuric acid to form 1-diethylamino-6-(m-methoxyphenyl)-3-hexanone (V). The ketamine (V) may eliminate diethylamine on distillation to give the vinyl ketone 6 - (m - methoxyphenyl)-1-hexen-3-one (VI). Either the ketamine (V) or the ketone (VI), or mixtures thereof, is then reacted with 2-ethyl-1,3-cyclopentanedione (VII) under Michael condensation conditions, e.g. refluxing in methanolic potassium hydroxide to form 2 - ethyl-2-[6-(m-methoxyphenyl)-6-oxohexyl]-1,3-cyclopentanedione (VIII). Compound VIII is then cyclodehydrated at the reflux temperature of a solvent, such as benzene, in the presence of a dehydrating acid, such as p-toluene sulfonic acid, to effect simultaneous ring closures to give the tetracyclic compound 13β - ethyl - 3-methoxygona - 1,3,5(10),8,14-pentaen-17-one (IX). The 14-unsaturation of compound IX is then selectively hydrogenated in the presence of a metal catalyst such as 2% palladized calcium carbonate, to form 13β-ethyl-3-methoxygona-1,3,5(10),8-tetraen-17-one (X). Reduction of compound X with sodium borohydride in ethanol gives 13β - ethyl - 3 - methoxygona-1,3,5(10),8-tetraen-17β-ol (XI), which is then converted to 13β-ethyl-3-methoxygona-1,3,5(10)-trien-17β-ol (XII) by alkali metal reduction in liquid ammonia, to provide the normal gonane configuration of 9,8 - 8,14 - 14,13 - exocyclic substituents, namely trans-anti-trans.

Referring now to FIG. 2, wherein the compounds are assigned Roman numerals for identification schematically, the sequence of reactions involved in an alternate process for cyclizing the 2-alkyl-2-(6-phenyl-3-oxohexyl)-1,3-cyclopentanedione to obtain the tetracyclic 13-alkylgona-1,3,5(10)-triene is illustrated. Internal aldol condensation and dehydration of 2-ethyl-2-[6-(m-methoxyphenyl)-3-oxohexyl]-1,3-cyclopentanedione (VIII) forms 8-ethyl-5,6,7,8-tetrahydro-4-m - methoxyphenethylindane-1,5-dione XIII. The newly formed unsaturation of compound XIII is hydrogenated to form 8-ethylhexahydro-4-m-methoxyphenethylindane-1,5 - dione (XIV). B - ring closure of compound XIV proceeds at room temperature under acid conditions to form 13β-ethyl-3-methoxygona-1,3,5(10),9-tetraen-17-one (XV). The unsaturated bond at the 9-position is reduced with alkali metal and liquid ammonia and the product is oxidized to give 13β-ethyl-3-methoxygona-1,3,5(10)-trien-17-one (XVI).

Referring now to FIG. 3, wherein the compounds are assigned Roman numerals for identification schematically, the sequence of reactions involved in the synthesis of a specific embodiment, namely 13β,17α-diethyl-3-methoxygona-1,3,5(10)-trien-17β-ol is illustrated. 13β-ethyl - 3-methoxygona-1,3,5(10),8-tetraen-17-one (X) is reacted with lithium acetylide in dimethylacetamide to form 17α-ethynyl-13β-ethyl-3-methoxygona - 1,3,5(10),8 - tetraen-17β-ol (XVII) which is then selectively hydrogenated in the presence of a catalyst such as palladium on calcium carbonate to form the corresponding 17α-ethyl compound XVIII. Compound XVIII is then reduced with an alkali metal in liquid ammonia to obtain 13β,17α-diethyl-3-methoxygona-1,3,5(10)-trien-17β-ol (XIX).

By alkali metal reduction in liquid ammonia in the presence of a proton donor, such as ethanol (Birch reduction), Compound XIX is converted to 13β,17α-diethyl-gona-2,5(10)-dien-17β-ol (XXI). By hydrolysis in the presence of mineral acid, Compound XXI is then converted to 13β,17α-diethyl-17β-hydroxygon-4-en-3-one (XXII).

Referring to FIG. 4, a third specific embodiment, 17α-ethynyl-13β-ethyl-3-methoxygona-1,3,5(10)-trien-17β - ol is formed by ethynylating 13β-ethyl-3-methoxygona-1,3,5(10)-trien-17-one with lithium acetylide in dimethylacetamide.

While the hereinbefore processes produce novel and steroid-like compounds which have on unnatural substituent at the 13-position, it is apparent that the novel and valuable processes of the invention offer a unique feasible route to the corresponding natural steriods if the nucleophilic compound used in the Michael condensation step is 2-methyl-1,3-cyclopentanedione.

The aromatic ring of the phenylpropanol (FIG. 1, I) used as starting material for the preparation of the compositions and initial preparations of the invention may have one or more substituents, provided, however, at least one position ortho to the position of propanol-chain attachment is unsubstituted so that cyclodehydration to form a cyclic structure can eventually be effectuated. To activate such ortho position for said subsequent ring closure, a para-directing group (referred to electrophilic aromatic substitution) such as hydroxy, acyloxy, alkoxy, amino, alkylamino, or acylamino is a necessary substituent on the aromatic ring. The group may be present initially or may be introduced later but before ring closure, either directly, or by conversion from a meta-directing group such as nitro.

The term "para-directing group" (referring to electrophilic aromatic substitution) as used herein means an activating group as those hereinbefore listed and which activates all positions on the aromatic nucleus. Thus, if the group is para-directing, as defined above, it can be in a position meta to the ortho position to which ring closure is limited by steric considerations, said position being activated even though another position is more highly activated. Ring closure could not occur at the said more highly activated position because of the above-mentioned steric limitations.

After the tetracyclic structure has been formed, substituents can be introduced into the aromatic A-ring which are not limited as above; however, if such substituted compound is to undergo a reduction, the group is preferably one not sensitive to reduction. Substituents on the A-ring can be modified by suitable means, for example an alkyl ether can be converted to a phenolic hydroxyl by heating with pyridine hydrochloride. For the processes of the invention and except for the limitations expressed in this specification, variations of the substituents on the A-ring of the fully formed tetracyclic structures, or on the intermediates leading thereto, are full equivalents of each other.

The carbon atom to which the phenyl group of the starting propanol (I) is attached can be substituted, as, for example, with an alkyl group, such as methyl or ethyl. The 2-carbon atom of the starting phenyl propanol can also be substituted, as, for example, with an alkyl group, such as methyl and ethyl, and, as such, be unchanged throughout the subsequent synthesis. In the tetracyclic structures of the invention these carbon atoms will appear in the 6 and 7-position respectively.

For the processes of the invention and except for the limitations expressed in this specification, variations of the B-ring on the fully formed tetracyclic structures, or on the intermediates leading thereto, are full equivalents of each other.

In the Michael reaction step, the 3-keto substrate compound can be a 6-phenyl-1-hexen-3-one, or alternatively, a 6-phenyl-3-hexanone having attached to the 1-position a group which will eliminate with hydrogen to form a 6-phenyl-1-hexen-3-one under Michael conditions. Thus, a 3-keto compound with a 1-dialkylamino substituent or its quaternary salt, a 1-halo substituent or a 1-hydroxy substituent will react with the nucleophilic compound to form the Michael product. The nucleophilic compound can be a carbocyclic-1,3-dione of varying ring size, as, for example, a five-membered ring, a six-membered ring etc., ultimately forming a corresponding five-membered, a six-membered, etc., D-ring in the tetracyclic structure. The 1,3-cyclodione may also contain a hetero atom at positions other than position 2, thereby to provide a heterocyclic D-ring in the tetracyclic structure. Acyclic nucleophilic compounds can be used in conducting the Michael reaction step and the open-chain of the resulting product thereafter ring-closed to form a cyclic D-ring.

For the processes of the invention, and except for the limitations expressed in this specification, variations of the D-ring on the fully formed tetracyclic structure, or on the intermediates leading thereto, are full equivalents of each other.

When the nucleophilic compound is 2-methyl-1,3-cyclopentanedione, the invention provides a unique total synthesis for natural steroids; the hydrogens at the 8-position, 9-position, and 14-position being β, α, and α, respectively, as in the natural steroids. Thus such valuable therapeutic substances as estrone are made available from easily obtainable and relatively simple and inexpensive starting materials.

Moreover, by varying the group at the 2-position of the nucleophilic Michael condensation reactant, the invention provides a way to produce compounds resembling the natural steroids save at the 13-position. Thus, by varying the substituent at the 2-position of the 1,3-cyclopentanedione, alkyl groups of varying chain length such as, for example, ethyl, isopropyl, cetyl, etc., may be introduced to form the gonane correspondingly substituted at the 13-position. Further, gonanes may be prepared wherein the 13-position is substituted with any organic radical. Thus, but without limiting the generality of the foregoing, an aralkyl, cycloalkylalkyl, or a polycarbon-alkylene bridge bearing a hydroxy-, amino-, or alkylamino-substituent can readily be placed in the 13-position, and from such compounds other variations of the 13-position substituent can be prepared, as haloalkyls from hydroxyalkyls, or quaternary salts, amides, alkenyls, etc. from aminoalkyls.

For the processes of the invention and except for the limitations expressed in this specification, variations at the 13-position of the fully formed tetracyclic structures or on the intermediates leading thereto are the full equivalents of the claimed 13-position polycarbon-alkyl substituents, having physiological activity of the same type.

In any of the intermediate structures or in the tetracyclic structures of the invention wherein the 17-position, or position corresponding thereto in the gonane nucleus, is carbonyl, the carbonyl group can be converted to a group such as hydroxymethylene by lithium aluminum hydride reduction; to acyloxymethylene by esterification of the hydroxymethylene group; to alkoxymethylene by etherification of the hydroxymethylene group; to alkyl-hydroxymethylene by addition of the appropriate organometallic reagent to the carbonyl; or to alkynyl-hydroxymethylene by addition of the appropriate alkali metal acetylide in a suitable insert solvent; all in the known manner. The carbonyl group may also be ketalized or thioketalized by treating with the appropriate alcohol or glycol in a suitable inert solvent under acidic-conditions, as in the presence of an acid such as sulfuric acid, p-toluene sulfonic acid, or boron trifluoride etherate, with heating where necessary, according to the known art.

The 17-carbonyl can also be enol-acylated and the enol-acylate employed to introduce substituents at the 16-position. Thus the enol-acylate can be epoxidised or hydroborated in order to introduce an oxygen atom at the 16-position, and halogenated to introduce a halo substituent at the 16-position.

Saturated or unsaturated alkyl groups can be introduced in the 17-position by reaction of the 17-carbonyl with a suitable organo-metallic reagent, as hereinbefore noted. The carbon atoms of the group attached to the 17-position can be oxygenated, either by introducing the oxygen atoms on to the 17-alkyl group, or by introducing an oxygenated substituent directly on to the 17-carbonyl by means of the appropriate organo-metallic or organo-phosphorus compound (the latter known in the art as Wittig reagents).

Further, a 17-alkylidene group, which can be formed by dehydration a 17-alkylhydroxymethylene compound or by reaction of a 17-carbonyl with triphenylethylphosphonium bromide under basic conditions, can be epoxidised, hydroborated, or hydroxylated with a reagent such as osmium tetroxide, and then, if desired converted to a 17-hydroxyethyl or 17-acetyl group.

A 17-ethynyl substituent can be converted to a carboxyethynyl group by reaction of carbon dioxide on its Grignard derivative, and a 17-carboxymethylene group can be introduced either by reaction of ethoxyacetylene with the 17-carbonyl by means of a Grignard reagent, followed by acid hydrolysis, or by reaction of carbethoxymethylene-triphenylphosphorane or triethylphosphonoacetate with the 17-carbonyl. The resulting 17-carboxymethylene group can be converted to a 17-(1,2-dihydroxyethyl) substituent by reduction and hydroboration.

More of the numerous transformations which can be utilized to introduce oxygenated alkyl groups at the 17-position are exemplified in the examples, and more will readily suggest themselves to those skilled in the art.

The specific reactions involved in the processes of the invention will now be considered, as follows, reference being made to the drawings for typifying compounds:

The vinyl ketones (VI) of the invention are prepared by elimination of dialkylamine from the corresponding dialkylaminoethyl amino-ketones (V), obtained by hydration of the acetylenic linkage in an acetylenic amine (IV). The acetylenic amines (IV) can be themselves prepared by a Mannich reaction from the corresponding acetylene (III) with formaldehyde and a dialkylamine. The hydration can be carried out, for example, in aqueous sulfuric acid with mercuric sulfate as a catalyst. The corresponding quaternary salts, which may also be used in the subsequent Michael condensation, can be obtained by quaternization of the corresponding acetylenic dialkylaminoethyl amine, followed by hydration, or by quaternization of the keto-amine. The vinyl ketones can be prepared from these derivatives by the above elimination reaction. Thus the ketoamine or its quaternary salt can be treated with a base for this purpose, for example, with sodium hydroxide or a sodium alkoxide.

The vinyl ketones (VI) and dialkylamino ketones (V) are condensed with a nucleophilic compound under Michael reaction conditions. Thus the condensation can be carried out by bringing the two reagents together in solution in the presence of a base, for example, pyridine, triethylamine, diethylamine, sodium hydroxide, or sodium methoxide, and heating as required. The nature and amount of base employed in the condensation reaction will depend upon the particular reagents used. Where the vinyl ketone derivative employed is a keto-amine and dialkylamine is eliminated in the reaction, no added base may be required. Where the compound is a 2-alkylcyclopentane-1,3-dione (VII), the compound to be condensed with it is preferably a vinyl ketone, and the dione is used in excess of the molecular equivalent quantity. Suitable solvents are hydrocarbons, such as benzene, and anhydrous alcohols, such as methanol. If the reaction is carried out in benzene under refluxing conditions, water formed in the condensation may be azeotroped out of the reaction mixture with a Dean-Stark type trap.

As hereinbefore noted, monocyclodehydration of the C-ring is accomplished by an internal aldol condensation. The cyclodehydration can therefore be carried out using conditions generally applicable for an aldol condensation, i.e., in the presence of an acid or basic catalyst such as NaOH, p-toluene sulfonic acid, triethylamine benzoate, aluminum tertiary butoxide, and the like, either at room temperature or accompanied by heating if necessary. In most instances, we prefer to carry out the cyclic dehydration at the boiling point of the solvent to permit azeotropic removal of the water formed during the course of the reaction, inasmuch as the aldol reaction is an equilibrium one. Preferred as solvents are the low boiling anhydrous aromatic hydrocarbons, such as benzene and xylene. C-ring closure occurs regardless of the nature of the substitution on the aromatic ring.

The reduction of the 8(14) unsaturation in the tricyclic compounds is carried out by catalytic hydrogenation either at room temperature or above. It is found that when hydrogen and a palladium-on-charcoal catalyst are used, the hydrogen introduced at the carbon 14-position is principally in the configuration trans to the group attached at the 13-position. By whatever mechanism the hydrogen at the 8-position is introduced, it can on treatment with an acid or base take up the most stable configuration, i.e., the position trans to the other newly introduced hydrogen, by equilibrating through keto-enol tautomerism with the adjacent keto group. Thus the second hydrogen atom can be made to take up the β-configuration when the first is α.

The configuration of the hydrogen atom introduced by palladium hydrogenation at the 14-carbon has been independently proved by reducing the keto group of Compound XXIII

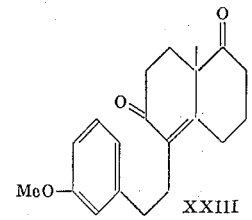

at the 17a-position (steroid enumeration) using sodium borohydride, a method selective for that position while leaving the other keto group untouched, and then reducing the resulting keto-alcohol (XXIV)

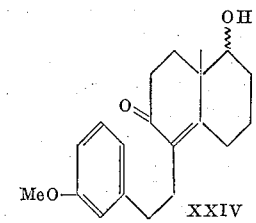

with lithium in liquid ammonia, a method stereospecific for the introduction of a hydrogen at $C_{14}$ trans to the angular substituent at $C_{13}$ in XXV

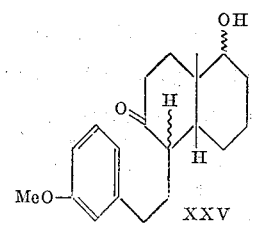

followed by oxidation of the reduced keto-alcohol using chromium trioxide in an organic medium to give a crystalline diketone (XXVI)

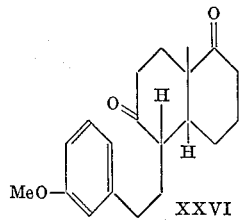

which is converted by methanolic hydrochloric acid to the tetracyclic ketone (XXVII)

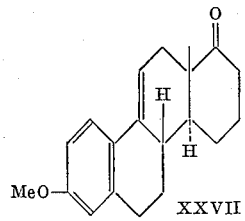

identical to that prepared by hydrogenation of the 8(14) double bond in Compound XXIV followed by acid cyclodehydration, whose structure was determined by reduction of the 9(11) double bond and conversion to the known benzylidene derivative.

The B-ring closure is brought about under acidic conditions. Suitable are strong acids such as sulfuric, hydrochloric, p-toluene sulfonic, etc. in solvents such as benzene, toluene, anhydrous alcohol, etc. The reaction is generally carried out at room tempearture or below since heat may promote the formation of an aromatic B-ring. The preferred treatment is with methanolic hydrochloric acid at room temperature. As hereinbefore noted, it has been found that the ease of B-ring closure of the compounds of the invention to form tetracyclic compounds is affected by the nature of the substituent present on the preformed aromatic A-ring, and that subsequent cyclization is easier to carry out when the preformed aromatic A-ring contains a substituent which activates the position at which cyclization is to occur. Where a compound is to be used directly for B-ring closure, it will in practice be one containing such a substituent. Those substituents which cause subsequent B-ring closure to occur readily are substituents para to the position of ring closure which are groups that in electrophilic aromatic substitution activate an aromatic ring and are predominantly o- and p-directing; for example, the hydroxy or alkoxy group.

The double cyclodehydration is brought about by dissolving a compound typified by Compound VIII in benzene containing a catalytic amount of p-toluene sulfonic acid and boiling the mixture under a Dean-Stark trap until two equivalents of water have been collected, or alternatively, by treating the same triketone with polyphosphoric acid at room temperature or slightly above until ring closure is complete.

The selective hydrogenation of the gona-8,14-dienes typified by Compound IX is carried out by means of 2% palladized calcium carbonate. As hereinbefore noted, surprisingly, the catalytic hydrogenation results in addition of hydrogen to the 14-double bond in such a way as to give the "natural" stereochemical configuration; that is, the hydrogen adds at 14-trans to the alkyl at 13. Selective reduction of the 14-ethylenic linkage is achieved by use of catalyst-solvent combination which shows adequate selectivity, and stopping the hydrogenation when the theoretical amount of hydrogen has reacted. Solvents showing selectivity in this regard are the nonprotonic solvents, that is, hydrocarbons and ethers; benzene, toluene, naphtha, dioxan, dibutyl ether, and diethyl ether are examples of suitable nonprotonic solvents. On the other hand, protonic solvents such as acetic acid and ethanol appear to be largely non-selective.

It has been found that a moderately active Raney nickel catalyst provides good selectivity in a suitable solvent. If a Raney nickel catalyst of low activity is employed, the hydrogenation may be too slow to be useful; on the other hand, a vigorous catalyst shows poor selectivity, and some saturation of the 8,9-ethylenic bond may occur simultaneously with the hydrogenation at the 14,15-position.

If desired, other moderately active hydrogenation catalysts may be used instead of Raney nickel; for example, palladium on barium sulfate or on an alkaline earth metal carbonate or on charcoal have all been found suitable in this selective hydrogenation.

Saturation at the 8- or at the 9(11)-position of the tetracyclic structures must be stereospecific to obtain the natural type of exocyclic substituent configuration as noted supra. Such a sufficiently stereospecific reduction can be in general effected by the action of an alkali metal (sodium, potassium, or lithium) in liquid ammonia to give the normal steroid configuration hydrogen at the respective carbons. Preferably this type of reduction is carried out in the presence of a primary or secondary aromatic amine, for instance aniline, p-toluidine, or diphenylamine, as this can improve the yield of the desired product. The reduction can also be carried out in the presence of a more reactive proton donor: in this instance, the reduction of the ethylenic linkage occurs with a simultaneous reduction of the aromatic ring to give a 1,4-dihydrophenyl group.

The reduction of 9-dehydro compounds can also be effected by catalytic hydrogenation, as this has been discovered to be sufficiently stereospecific for production of the desired trans-anti-trans compounds of normal configuration.

While the tetracyclic compounds in this specification and the appended examples are named to describe the configuration corresponding to that of the natural steroids, it is to be understood that unless otherwise indicated, the product of each of the given manipulative procedures is a racemic mixture which contains said named compound and its enantiomorph. When resolved starting materials are used, by applying the manipulative procedures described herein, the corresponding enantiomorph is obtained. In this specification, all of the tetracyclic compounds have been named according to the steroid numbering system.

Representative formulations embodying specific compositions of this invention follow:

A pharmaceutical tablet for use as an oral anti-atherogenic agent consists of the following ingredients:

|  | Mg. |
|---|---|
| 13β-ethylgona-1,3,5(10)-trien-3,17β-diol | 25 |
| Carboxymethylcellulose (viscosity 400 cps.) | 15 |
| Lactose powder | 25 |
| Redried corn starch | 25 |
| Magnesium stearate powder | 4 |
| Calcium silicate powder, q.s. |  |
|  | 200 |

A capsule for use as an oral anti-atherogenic agent contains, in encapsulating gelatin, the following ingredients:

| 13β-ethyl-3-methoxygona-1,3,5(10)-trien-17β-ol | 25 |
|---|---|
| Finely divided silica lubricant | 5 |
| Magnesium stearate powder | 5 |
| Powdered corn starch | 113 |
| Lactose powder, q.s. |  |
|  | 245 |

Pharmaceutically acceptable carriers can be either solid or liquid. Solid form preparations include powders, tablets, dispersible granules, capsules, cachets, and suppositories. A solid carrier can be one or more substances which may also act as diluents, flavoring agents, solubilizers, lubricants, suspending agents, binders, or tabletdisintegrating agents: it can also be an encapsulating material. In powders the carrier is a finely divided solid which is in admixture with the finely divided compound. In the tablets the compound is mixed with carrier having the necessary binding properties in suitable proportions and compacted in the shape and size desired. The powders and tablets preferably contain from 5 or 10 to 99% of the active ingredient. Suitable solid carriers are magnesium carbonate, magnesium stearate, talc, sugar, lactose, pectin, dextrin, starch, gelatin, tragacanth, methyl cellulose, sodium carboxymethylcellulose, a low melting wax, and cocoa butter. The term "preparation" is intended to include the formulation of the compound with encapsulating material as carried providing a capsule in which the compound (with or without other carriers) is surrounded by carrier, which is thus in association with it. Similarly, cachets are included. Tablets, powders, cachets, and capsules can be used for oral administration.

Liquid form preparations include solutions, suspensions, and emulsions. The compounds are insoluble in water, but can be dissolved in aqueous-organic solvent mixtures that are non-toxic in the amounts used. As an example may be mentioned water-propylene glycol solutions for parenteral injection. Liquid preparations can also be formulated in solution in aqueous polyethylene glycol solutions. Aqueous suspension suitable for oral use can be made by dispensing the finely divided compound in water with viscous material, natural or synthetic gums, resins, etc., for example, gum arabic, ion-exchange resins, methylcellulose, sodium carboxymethylcellulose and other well known suspending agents.

Preferably the pharmaceutical preparation is in unit dosage form. In such form, the preparation is sub-divided in unit doses containing appropriate quantities of the compound: the unit dosage form can be a packaged preparation, the package containing discrete quantities of preparation, for example, packeted powders of vials or ampules. The unit dosage form can be a capsule, cachet, or tablet itself, or it can be the appropriate number of any of these in packaged form. The quantity of compound in a unit dose of preparation may be varied or adjusted from 1 mg. to 100 mg. (generally within the range of 2.5 to 25 mg.) according to the particular application and the potency of the active ingredient.

The claimed compositions having physiological activity can be incorporated into pharmaceutical formulations including sustained-release agents.

The following preparations illustrate the manner of making the chemical compounds which are the starting materials for use in the processes of the invention.

PREPARATION 1

3-m-hydroxyphenylpropan-1-ol

Add m-hydroxyphenylpropionic acid (57 g.) in dry tetrahydrofuran (250 cc.) dropwise into a vigorously stirred suspension of lithium aluminum hydride (20 g.) in tetrahydrofuran (1 liter), at a rate of addition such that gentle refluxing takes place. Reflux the mixture for 6 hours, allow to cool, and stir for 12 hours. Decompose the excess lithium aluminum hydride by careful addition of 50% aqueous ethanol (about 200 cc.), and then add 10% aqueous ethanol (about 200 cc.), and then add 10% aqueous sulphuric acid until the precipitated salts dissolve (ca. 500 cc. acid). Saturate the aqueous layer with salt while stirring, and separate the tetrahydrofuran layer. Wash the resulting aqueous layer with ether ,Evaporate the tetrahydrofuran solution under reduced pressure to remove the solvent, take up the residue in ether, and add the other washings to it. Wash the ether solution with saturated potassium bicarbonate, saturated brine, and finally dry over anhydrous magnesium sulphate. Evaporate the solvent, distill the residue under reduced pressure to obtain a liquid, B.P. 130–2°/0.2 mm., which crystallizes on standing, forming colorless waxy crystals of 3-m-hydroxyphenylpropan-1-ol (40 g.), M.P. ca. 30°.

PREPARATION 2

3-m-hydroxyphenylpropylbromide

Heat and stir the hydroxyphenylpropanol of Preparation 1 (10 g.) with 48% aqueous hydrogen bromide solution (5 cc.) under reflux for 3 hours, then add a further quantity of the aqueous acid (4 cc.) and continue refluxing for 12 hours. Cool, add ether (100 cc.) and wash the ether solution with water, aqueous potassium bicarbonate, and saturated brine. Dry the solution over anhydrous magnesium sulphate, remove the ether and distill to obtain 3-m-hydroxyphenylpropyl bromide (10 g.), B.P. 115–7°/0.25 mm., as a colorless viscous liquid.

PREPARATION 3

Methyl-3-hydroxy-3-(3-methoxyphenyl)butanoate

Add m-methoxy acetophenone (100 g.) in benzene (450 cc.) and methyl bromoacetate (153 g.) dropwise to a mixture of acid washed activated zinc (67 g.), methyl bromoacetate (5 cc.) and a crystal of iodine in benzene (20 cc.) at such a rate that gentle refluxing takes place. After the addition is complete, continue refluxing for 1 hour, cool the mixture and pour onto ice and 10% aqueous sulphuric acid. Separate the benzene layer, wash, dry, evaporate the solvent and distill the residue to give after a forerun of reactants methyl 3-hydroxy-3-(3-methoxyphenyl)butanoate, B.P. 140°/0.65 mm. Hg.

PREPARATION 4

Methyl-3-(3-methoxyphenyl)butanoate

Shake methyl 3 - hydroxy - 3 - (3-methoxyphenyl)butanoate (116 g.) in acetic acid (1 l.) with 10% palladized charcoal (20 g. prehydrogenated) in an atmosphere of hydrogen until uptake of hydrogen virtually ceases (12.5 liters of hydrogen absorbed). Filter off the catalyst, evaporate the solvent and distill the residue to obtain methyl 3-(3-methoxyphenyl)butanoate, B.P. 139–142° at 5 mm· Hg $\mu_D^{26}$ 1.5060, 112.4 g. Infrared absorption peak at 5.75$\mu$.

PREPARATION 5

3-(3-methoxyphenyl)butan-1-ol

Add methyl 3-(3-methoxyphenyl)-butanoate (112 g.) in ether (500 cc.) slowly to a stirred suspension of lithium aluminum hydride (40 g.) in either (500 cc.). Reflux the mixture for 30 minutes, cool and decompose by adding methanol and water. Dissolve the precipitate by adding 10% sulphuric acid, separate the ether layer and extract the aqueous layer with ether. Wash the combined organic extracts with water, dry ($Na_2SO_4$), remove the solvent and distill the residue to obtain 3-(3-methoxyphenyl)butan-1-ol, B.P. 118–121°/0.4 mm. Hg $\mu_D^{21}$ 1.5260. Ultraviolet absorption peaks at 274, 285 m$\mu$ ($\epsilon$ 1800, 1650). Infrared absorption peaks at 3.05, 6.25$\mu$.

PREPARATION 6

3-(3-methoxyphenyl)-n-butyl bromide

Cool 3-(3-methoxyphenyl)butan-1-ol (84 g.) in benzene (125 cc.) to 0° and add a solution of phosphorus tribromide (55 g.) in benzene (100 cc.) dropwise so that the temperature of the mixture does not rise above 5°. Heat the mixture at 60° for 3 hours, cool, pour onto ice, dilute the organic layer with ether and separate it. Wash the organic solution with 3 N aqueous sodium hydroxide, water and dry. Remove the solvent and distill the residue to obtain 3-(3-methoxyphenyl)-n-butyl bromide, 92.8 g., B.P. 100–104°/0.15 mm.

Calculated for $C_{11}H_{15}OBr$ (percent): C, 54.4; H, 6.23; Br, 32.85. Found (percent): C, 54.48; H, 6.37; Br, 32.58.

Infrared absorption peaks at 6.25, 12.66, 11.71$\mu$.

PREPARATION 7

5-m-methoxyphenylpent-1-yne

Add 3-(3-methoxyphenyl)-n-propyl bromide (14 g.) in tetrahydrofuran (15 cc.) with rapid stirring to a solution of sodium acetylide (from 1.84 g. sodium) in liquid ammonia (125 cc.) in a Dewar flask. Continue stirring for 22 hours, then add ammonium chloride (3 g.) and water (50 cc.). Collect the product with ether and wash and dry the ethereal solution. Distill to obtain 5-m-methoxyphenylpent-1-yne (7.1 g., 66%), B.P. 75–78° C./0.06 mm. Hg.

Calculated for $C_{12}H_{14}O$ (percent): C, 82.7; H, 8.1. Found (percent): C, 82.2; H, 7.8.

PREPARATION 8

5-m-hydroxyphenylpent-1-yne

Pass dry acetylene into stirred liquid ammonia (800 cc.) and add portions of sodium (totalling 10.2 g.) piece by piece as the blue color discharges. When the addition of the sodium is complete, continue to pass acetylene into the mixture for 15 minutes. Add dimethylformamide (350 cc.) and allow the ammonia to evaporate. To the suspension of sodium acetylide thus obtained, add dropwise 3-(3-hydroxyphenyl)-m-propyl bromide (33.5 g.), and heat the mixture to 60° and maintain at that temperature for 4 hours. Allow to cool, add ice and dilute sulphuric acid until the aqueous mixture is at pH 6. Extract the mixture with ether (a total of 1000 cc.) and wash the extract with saturated brine, concentrate the washed extract to 300 cc., dry over anhydrous magnesium sulphate, and evaporate off the remaining ether. Azeotrope the product with benzene to ensure no trace of water remains, to obtain as residue a dry oil, crude 5-m-hydroxyphenylpent-1-yne (about 20 g.).

PREPARATION 9

5-m-acetoxyphenylpent-1-yne

Mix 5-m-hydroxyphenylpent-1-yne (about 20 g.) with pyridine (70 cc.) and acetic anhydride (30 cc.) and allow the homogeneous mixture to stand for 12 hours at room temperature. Remove excess acetic anhydride by successive additions of 95% aqueous ethanol (20 cc.) and evaporation of the ethyl acetate formed. Remove the remaining solvent and water present by adding benzene and evaporating on a water bath, to obtain a brown oil which on distillation gives 5-m-acetoxyphenylpent-1-yne as a pale yellow mobile liquid (24.2 g.), B.P. 104–8°/0.1 mm.

PREPARATION 10

5-(3-methoxyphenyl)hex-1-yne

Add sodium (11.5 g.) slowly in small pieces to a stirred solution of liquid ammonia (750 cc.) through which a rapid stream of acetylene is passing at such a rate that no blue color is formed. Add 3-(3-methoxyphenyl)-n-butyl bromide (84 g.) in tetrahydrofuran rapidly to the well-stirred mixture, and after 22 hours decompose the mixture with water, collect the product with ether, wash and dry the ethereal solution and remove solvent by evaporation. Distill the residue to obtain 5-(3-methoxyphenyl)-hex-1-yne, 56.6 g., B.P. 84–95°/0.55–0.35 mm. Hg.

Calculated for $C_{13}H_{16}O$ (percent): C, 83.00; H, 8.57. Found (percent): C, 82.79; H, 8.32.

Infrared absorption peaks at 3.06, 4.75, 6.25$\mu$.

PREPARATION 11

1-diethylamino-6-m-methoxyphenylhex-2-yne

Allow 5-m-methoxyphenylpent-1-yne (8 g.) to stand for 12 hours at 70° C. under nitrogen with water (2.5 cc.), trioxan (0.5 g.), 30% Formalin (5.5 g.), diethylamine (4 g.), acetic acid (2.75 g.), dioxan (25 cc.) and cuprous chloride (0.13 g.). Make the cooled solution alkaline with 10% aqueous sodium hydroxide and extract with ether; then extract the ether extract with 10% hydrochloric acid; wash the acid extract with ether, make alkaline with 10% aqueous sodium hydroxide, extract with ether, and then wash and dry the ether extract. Distill to obtain 1-diethylamino-6-m-methoxyphenylhex-2-yne (10.6 g., 88%), B.P. 130–131° C./0.1 mm.

Calculated for $C_{17}H_{25}N$ (percent): C, 78.7; H, 9.7. Found (percent): C, 78.9; H, 9.6.

PREPARATION 12

1-diethylamino-6-m-acetoxyphenylhex-2-yne

Add 5-m-acetoxyphenylpent-1-yne (9.5 g.) to a mixture of trioxan (0.5 g.), 40% Formalin (5.5 g.), diethylamine (4 g.), acetic acid (2.75 g.) dioxan (25 cc.) and cuprous chloride (0.13 g.), at room temperature. Heat the mixture thus obtained to 70°, to obtain a clear green solution, and maintain under nitrogen at that temperature for 12 hours. Cool and add ice, pour the product into ice-cold saturated potassium bicarbonate and the extract mixture with ether. Wash and dry, evaporate the extracts under reduced pressure and distill to obtain 1-diethylamino-6-m-acetoxyphenylhex-2-yne (9.9 g.), B.P. 152–4°/0.1 mm., as a pale yellow mobile liquid.

PREPARATION 13

1-diethylamino-6-(3-methoxyphenyl)-hept-2-yne

Heat a mixture of 5-(3-methoxyphenyl)-hex-1-yne (56.6 g.), water (17.5 cc.), 40% Formalin (38.5 cc.), diethylamine (40 cc.), acetic acid (19 cc.), dioxan (175 cc.) and cuprous chloride (1. g.) at 70° for 16 hours in an atmosphere of nitrogen. Make the cooled solution alkaline with 10% aqueous sodium hydroxide and extract twice with ether. Wash the ether extracts with water, filter and extract with 4 N hydrochloric acid (3 × 350 cc.). Make the acid extracts alkaline with 10% aqueous sodium hydroxide, extract with ether and wash the organic solution with water, brine and dry. Evaporate the solvent and distill the residue to obtain 1-diethylamino-6-(3-methoxyphenyl)-hept-2-yne, 79.5 g., B.P. 135–140°/0.2 mm. Hg $\mu_D^{25}$ 1.5116.

Calculated for $C_{18}H_{27}ON$ (percent): C, 79.07; H, 9.95. Found (percent): C, 78.99; H, 9.67.

PREPARATION 14

1-diethylamino-6-m-methoxyphenylhexan-3-one and 6-m-methoxyphenylhex-1-en-3-one Add mercuric sulphate (0.45 g.) to a swirled solution of 1-diethylamino-6-m-methoxyphenylhex-2-yne (8.5 g.) in concentrated sulphuric acid (2.5 cc.) and water (25 cc.). Keep the solution under nitrogen at 75° C. for 1 hour, then cool, make basic with 10% aqueous sodium hydroxide, and filter through glass wool to remove mercuric oxide. Extract product with ether and wash and dry the ethereal solution. Remove the solvent to obtain the crude ketoamine 1 - diethylamino - 6-m-methoxyphenylhexan-3-one, infrared absorption peak at 1710$\mu$. Distill under reduced pressure with partial elimination of diethylamine, to obtain a mixture of the ketoamine 1-diethylamino - 6 - m - methoxyphenylhexan-3-one and the vinyl ketone 6-m-methoxyphenylhex-1-en-3-one, (7.1 g., ca. 76%), B.P. 140–145° C./0.1 mm.; infrared absorption peaks at 5.85 and 5.95$\mu$, the ketoamine predominating.

Distil a second portion of the crude ketoamine 1-diethylamino-6-m - methoxyphenylhexan-3-one very slowly over a period of 30 minutes through a Vigreux fractionating column 10 cm. high and 1 in. diameter under reduced pressure to eliminate most of the diethylamine. Dissolve the 6-m-methoxyphenylhex-1-en-3-one obtained (B.P. 114–6° C./0.7 mm.) in ether and wash the ether solution with dilute hydrochloric acid, followed by aqueous sodium bicarbonate and water. Dry and evaporate. Distil the residue to give the pure vinyl ketone as a colorless liquid, B.P. 76° C./0.3 mm.

Calculated for $C_{13}H_{16}O_2$ (percent): C, 76.4; H, 7.9. Found (percent): C, 76.3; H, 8.0.

Mix a third portion of the crude undistilled 1-diethylamino - 6 - m - methoxyphenylhexan - 3 - one (3 g.) with methyl iodide (3 g.). An exothermic reaction soon develops. After 12 hours wash the mixture with ether to remove unchanged reactants and subject to reduced pressure (15 min.) to remove ether remaining: the residue is the crude methiodide of the ketoamine (4.6 g.). Infrared absorption peak at $5.85\mu$.

PREPARATION 15

1-diethylamino-6-m-hydroxyphenylhexan-3-one

Add mercuric sulphate (0.27 g.) rapidly with swirling to a solution of 1-diethylamino-6-m-acetoxyphenylhex-2-yne (3.1 g.) in 10% aqueous sulphuric acid (15 cc.), and heat the resulting green solution at 75° under nitrogen for 1½ hours. After cooling, filter to remove mercuric sulphate and add solid potassium bicarbonate until the product has pH 8.8. Extract the solution with ether. Wash the ether extracts with brine made alkaline to pH 8.8, and dry over anhydrous magnesium sulphate. Evaporate the ether at room temperature to obtain a residue of crude 1 - diethylamino-6-m-hydroxyphenylhexan-3-one as a viscous brown oil (2.4 g.), showing infrared absorption at $5.85\mu$ indicating the presence of a keto group, together with the characteristic band of a phenolic hydroxy group and the complete absence of a band at $5.68\mu$ corresponding to a phenolic acetate group.

PREPARATION 16

1-diethylamino-6-m-acetoxyphenylhexan-3-one and 6-m-acetoxyphenylhex-1-en-3-one

Acetylate the crude 1-diethylamino-6-m-hydroxyphenylhexan-3-one (2.4 g.) by adding pyridine (7 cc.) and acetic anhydride (3 cc.) and allow the mixture to stand overnight at room temperature. Work up the mixture as in the acetylation stage described in the preparation of 5-m-acetoxyphenylpent-1-yne above, to obtain crude 1-diethylamino-6-m-acetoxyphenylhexan-3-one as a viscous brown oil (2.7 g.).

Infrared absorption peaks at $5.68\mu$ with a shoulder at $5.85\mu$ and no appreciable phenolic absorption.

Distil in a Hickman stil at 0.1 mm., with partial elimination of diethylamine, and collect a colorless mobile liquid, B.P. 160–70°/0.1 mm., which is a mixture (1.8 g.) of the ketoamine and 6-m-acetoxyphenylhex-1-en-3-one.

Infrared absorption peaks at 5.68, 5.88, $5.95\mu$, the nature of the absorption indicating a predominance of the vinyl ketone in the mixture.

PREPARATION 17

1-diethylamino-6-(m-methoxyphenyl)heptan-3-one and 6-(m-methoxyphenyl)hept-1-en-3-one Dissolve 1 - diethylamino-6-(m-methoxyphenyl)hept-2-yne (13.6 g.) in 10% aqueous sulphuric acid (40 cc.) and stir with mercuric sulphate (0.69 g.) for 2 hours at 70°. Filter the cooled solution, make basic with 10% aqueous water and brine, and dry ($Na_2SO_4$). Evarporate the solvent and distil the residue to obtain 1-diethylamino-6-(m-methoxyphenyl)heptan-3-one which has partially eliminated to 6-(m-methoxyphenyl)hept-1-en-3-one during the distillation, B.P. 145°/12 mm. Hg. Infrared absorption peaks at $5.95\mu$.

PREPARATION 18

1 - diethylamino - 6 - (m - methoxyphenyl) - 5 - methylhexan - 3 - one and 5 - methyl - 6 - (m - methoxyphenyl)hex-1-en-3-one Add mercuric sulphate (0.45 g.) to a stirred solution of 1 - diethylamino-5-methyl-6-(m-methoxyphenyl)hex-2-yne (8 g.) in concentrated sulfuric acid (2.5 cc.) and water (25 cc.) and heat the mixture at 70° for 1½ hours. Filter the cooled solution, make basic with 10% aqueous sodium hydroxide and extract with ether. Wash and dry the ethereal solution and evaporate to leave as residue crude 1-diethylamino-6-(m-methoxyphenyl)-5-methylhexan-3-one; infrared absorption peaks at $5.85\mu$. Slowly distil at 0.1 mm. Hg to obtain 5-methyl-6-(m-methoxyphenyl)hex - 1 - en - 3 - one; infrared absorption peaks at $5.85\mu$.

PREPARATION 19

6-(m-methoxyphenyl)hex-1-en-3-one

Add mercuric sulphate (1.12 g.) to a swirled solution of 1-diethylamino-6-(m-methoxyphenyl)hex2-yne (2.5 g.) in concentrated sulphuric acid (6.25 g.) and water (62 cc.). Maintain the solution at 75° C. for 2 hours, then cool, filter, make basic and extract with ether. After the solvent has been removed, distil the residue slowly over a period of 30 minutes through a Vigreux fractionating column of height 10 cm. and diameter 1 cm. under reduced pressure, to obtain the crude vinyl ketone (14.5 g., B.P. 115–23° C./0.05 mm.) containing a very small amount of ketoamine To obtain the pure vinyl ketone, dissolve the distillate (5.2 g.) in ether, wash the solution with dilute hydrochloric acid, followed by water and sodium bicarbonate solution, dry, and evaporate the ether and redistil the residue. The pure vinyl ketone, 6-(m-methoxyphenyl)hex-1-en-3-one (B.P. 116.8° C./0.5 mm.), shows infrared absorption peak at $5.97\mu$.

Calculated for $C_{13}H_{10}O_2$ (percent): C, 76.4; H, 7.9. Found (percent): C, 76.3; H, 8.0.

PREPARATION 20

2-ethylcyclopentane-1,3-dione

Dissolve 2-ethylcyclopentane-1,3,4-trione hydrate (30 g., M.P. 65–69°, Koenigs and Hopmann, Ber., 1921, 54, 1343) in ethanol (200 cc.) and water (100 cc.). To this solution add dropwise during 1 hour a solution of semicarbazide hydrochloride (21 g.) and sodium acetate (28.2 g.) in water 200 cc.) with vigorous stirring throughout. Filter off the semicarbazone precipitated, wash with methanol, and purify by stirring in refluxing methanol; filter to obtain a pale cream powder, M.P. 179–182°.

Dissolve the semicarbazone (34 g.) in a solution of potassium hydroxide (34 g.) in dry ethylene glycol at 130°, and heat the mixture to 160° for 1 hour, followed by 30 minutes at 180°. Distil the glycol at 0.01 mm., dissolve the residual solid in water (150 cc.) and make the solution acid to Congo red with hydrochloric acid. Cool to 0° overnight and filter. Recrystallize the residue from water to obtain 2-ethylcyclopentane-1,3-dione, (10 g.), M.P. 180° with sublimation

PREPARATION 21

2-(6-m-methoxyphenyl-3-oxohexyl)-2-methylcyclopentane-1,3-dione

Reflux a mixture (6 g.) of 1-diethylamino-6-m-methoxyphenylhexan-3-one and 6-m-methoxyphenylhex-1-en-3-one with 2-methylcyclopentane-1,3-dione (2.8 g.) in 0.12% dry methanolic potassium hydroxide solution (20 cc.) for 12 hours. Remove most of the methanol under reduced pressure and add a mixture (50 cc.) of equal volumes of benzene and ether; wash the solution with water, alkali and hydrochloric acid, and dry. Evaporate the solvent to obtain the adduct, the triketone 2-(6-m-methoxyphenyl - 3 - oxohexyl) - 2-methylcyclopentane-1,3-dione (6.7 g.), a viscous brown gum.

PREPARATION 22

2-(6-m-methoxyphenyl-3-oxohexyl)-2-ethylcyclopentane-1,3-dione

Reflux a mixture (5.25 g.) of 1-diethylamino-6-m-methoxyphenylhexan-3-one and 6-m-methoxyphenylhex-1-en-3-one with 2-ethylcyclopentane-1,3-dione, (3.3 g.) in dry 0.12% methanolic solution of potassium hydroxide for 18 hours. Filter the resulting solution, evaporate to dryness and dissolve the residue in ether. Wash the ether solution with alkali, hydrochloric acid, and water, dry and evaporate to obtain a residue the triketone 2-(6-m-methoxyphenyl - 3 - oxohexyl)-2-ethylcyclopentane-1,3-dione, (7.1 g.) as a gum.

PREPARATION 23

2-(6-m-methoxyphenyl-3-oxoheptyl)-2-ethylcyclopentane-1,3-dione

Reflux a mixture of 6-(m-methoxyphenyl)hept-1-en-3-one and 1-diethylamino-6-(m-methoxyphenyl)heptan-3-one (10 g., obtained by slow distillation of the latter substance) with 2-ethylcyclopentane-1,3-dione (7 g.) in 0.12% methanolic potassium hydroxide solution (40 cc.) for 15 hours. Remove most of the methanol under reduced pressure and add a mixture of equal volumes of ether and benzene (50 cc.). Wash the solution with 5% aqueous sodium hydroxide, water, 10% hydrochloric acid, and brine, and dry. Evaporate the solvent to leave as residue the triketone adduct 2-(6-m-methoxyphenyl-3-oxoheptyl)-2-ethylcyclopentane-1,3-dione (14 g.); infrared absorption peak at 5.80μ.

PREPARATION 24

2-(6-m-hydroxyphenyl-3-oxohexyl)-2-methylcyclopentane-1,3-dione

Reflux 1-diethylamino-6-m-hydroxyphenylhexan-3-one (0.71 g.) with 2-methylcyclopentane-1,3-dione (0.70 g.) in 0.12% methanolic potassium hydroxide (5 cc.) for 18 hours. Remove the solvent under reduced pressure. Add chloroform (50 cc.) and wash the solution in turn with dilute sulphuric acid, saturated aqueous potassium bicarbonate, and brine, dry and evaporate the solvent. The product, an amber gum, is the adduct 2-(6-m-hydroxyphenyl-3-oxohexyl)-2-methylcyclopentane-1,3 - dione. Infrared absorption peaks at 2.94, 5.71, 5.83, and 5.87μ.

PREPARATION 25

2-(6-m-acetoxyphenyl-3-oxohexyl)-2-methylcyclopentane-1,3-dione

Reflux a mixture of 6-(m-acetoxyphenyl)-1-diethylaminohexan-3-one and 6-(m-acetoxyphenyl)hex-1-en-3-one (1g.), with 2-methyl-cyclopentane-1,3-dione (1.5 g.) in 0.12% methanolic potassium hydroxide (6 cc.) for 18 hours. Remove methanol (2 cc.) under reduced pressure and add chloroform (60 cc.). Wash the solution in turn with dilute sulphuric acid (25 cc.), saturated potassium bicarbonate solution, and brine; dry and evaporate the solvent. The product (0.8 g.) is the adduct 2-(6-m-acetoxyphenyl-3-oxohexyl)-2-methylcyclopentane - 1,3 - dione in admixture with some of the corresponding free phenol; infrared absorption: 2.86 to 3.08 (broad low-intensity band), 5.71, 5.81, 5.85, and 8.26μ.

PREPARATION 26

5,6,7,8-tetrahydro-4-(m-methoxyphenethyl)-8-methylindane-1,5-dione

To 2-(6-m-methoxyphenyl-3-oxohexyl) - 2 - methylcyclopentane-1,3-dione (16.5 g.) in xylene (120 cc.) add benzoic acid (7.1 g.) and triethylamine (5.9 cc.). Reflux the mixture for 6 days using a Dean-Stark water trap, then cool. Add ether and wash the solution, then dry and evaporate. Take up the resulting gum in a mixture of light petroleum and benzene and chromatograph on neutral alumina. Elute with a benzene-ether mixture to obtain the ethylenic diketone 5,6,7,8-tetrahydro-4-(m-methoxyphenethyl)-8-methylindane-1,5 - dione (12.5 g., 59%); ultra-violet absorption peak at 248 mμ (ε 8,500).

PREPARATION 27

5,6,7,8-tetrahydro-4-(m-methoxyphenethyl)-8-methylindane-1,5-dione

Add 5,6,7,8 - tetrahydro - 8 - methylindane - 1,5 - dione (5.5 g.) (Panouse and Sannie, Bull. Soc. Chim. France, 1955, 1036; Boyce and Whitehurst, J. Chem. Soc., 1959, 2022) in benzene (30 cc.) with vigorous stirring to potassium tert-butoxide (from the metal, 1.45 g.) in benzene (150 cc.) under dry nitrogen. Remove the benzene-tert-butanol azetrope using a Fenske fractionating column with variable take-off head. Cool the residual benzene solution of the potassium enolate to room temperature and add m-methoxyphenethyl bromide (8 g.) (Collins and Smith, J. Chem. Soc., 1956, 4308) in benzene (50 cc.) dropwise over 15 minutes, after which stir the mixture for 1 hour, then reflux for a further hour. Work up the product with ether and evaporate the ether extract to obtain a gum. Distil to yield fraction A (5 g.), B.P. 60–150°/0.05 mm. and fraction B (2.1 g.), B.P. 160–90°/0.05 mm. Fraction B is the diketone 5,6,7,8-tetrahydro-4-(m-methoxyphenethyl)-8-methylindane-1,5-dione, a viscous oil containing some impurity; ultraviolet absorption peak at 245 mμ (ε 8,300); infrared absorption peaks at 5.75, 6.02, 6.23, 6.29, 12.82, and 14.33μ.

PREPARATION 28

8-ethyl-5,6,7,8-tetrahydro-4-(m-methoxyphenethyl)-indane-1,5-dione

Reflux 2 - ethyl - 2 - (6 - m - methoxyphenyl - 3 - oxohexyl)cyclopentane-1,3-dione (15 g.) in xylene (120 cc.) with benzoic acid (7.1 g.) and triethylamine (5.9 cc.) using a Dean-Stark water separator for 14 days. Add ether and wash the cooled solution free from benzoic acid with sodium carbonate solution. Dry the solution and evaporate to a brown gum. Distil at 220° (0.01 mm. Hg) to obtain 8 - ethyl - 5,6,7,8 - tetrahydro - 4 - (m - methoxyphenethyl)-indane-1,5-dione as a yellow gum; ultraviolet absorption peak at 247 mμ (ε 8,400); infrared absorption peak at 5.76 and 6.03μ.

PREPARATION 29

5,6,7,8-tetrahydro-4-m-methoxyphenethyl-8-methyl-5-oxoindane-1-ol

To the ethylenic diketone, 5,6,7,8-tetrahydro-4-m-methoxyphenethyl - 8 - methylindane - 1,5 - dione (12.35 g.) in ethanol (500 cc.) at 0° C. add sodium borohydride (1 g.) in ethanol (50 cc.) over 20 minutes. Allow the mixture to warm to room temperature and then stir for 12 minutes. Add a slight excess of acetic acid and evaporate the solvent under reduced pressure. Treat the residue with water (60 cc.) and ether extract. Wash, dry and evaporate the extracts to obtain a glassy residue which crystallizes on cooling and scratching. Recrystallize the ethylenic keto alcohol, 5,6,7,8 - tetrahydro - 4 - m - methoxyphenethyl - 8 - methyl - 5 - oxoindane - 1 - ol (9.4 g.) from a mixture of light petroleum and diisopropyl ether, M.P. 88–90° C.; infrared absorption peaks at 2.94 and 6.02μ.

Calculated for $C_{19}H_{24}O_3$ (percent): C, 76.0; H, 8.05. Found (percent): C, 75.7; H, 8.0.

PREPARATION 30

4-m-methoxyphenethyl-8-ethyl-5-oxo-5,6,7,8-tetrahydroindan-1-ol

Add sodium borohydride (0.4 g. in ethanol (80 cc.)) to the diketone 4 - m - methoxyphenethyl - 8 - ethyl - 5,6,7,8-tetrahydroindane-1,5-dione (3 g.) in ethanol (80 cc.) and allow the mixture to stand at 20° for 10 minutes. Add a slight excess of acetic acid and evaporate the solution almost to dryness under reduced pressure. Add water, extract the mixture with ether and wash the ethereal solution with aqueous sodium carbonate and water and dry. Evaporate the solvent to obtain 4-m-methoxyphenethyl-8-ethyl - 5 - oxo - 5,6,7,8 - tetrahydroindan - 1 - ol; infrared absorption peaks at 2.94 and 6.01μ.

PREPARATION 31

Hexahydro-4-m-methoxyphenethyl-8-methylindane-1,5-dione

Hydrogenate 5,6,7,8 - tetrahydro - 4 - m - methoxyphenethyl - 8 - methyl - indane - 1,5 - dione (0.95 g.) in ethanol (40 cc.) at atmospheric pressure with 10% palladium on charcoal catalyst (0.2 g.); the calculated amount of hydrogen is taken up in 10 hours. Filter and remove solvent to obtain a colorless gum (0.88 g.), ultraviolet absorption peaks at 277, and 270 m$\mu$ ($\epsilon$ 1600, 1700) as the crude saturated diketone, hexahydro-4-m-methoxyphenethyl-8-methylindane-1,5-dione.

PREPARATION 32

Hexahydro-4-m-methoxyphenethyl-8-methyl-5-oxoindan-1-ol

Dissolve 5,6,7,8 - tetrahydro - 4 - m - methoxyphenethyl-8-methyl-5-oxoindan-1-ol in ethanol (30 cc.) and add 10% palladium on charcoal catalyst (0.3 g.). Shake the mixture in hydrogen at atmospheric pressure, the theoretical amount of hydrogen being taken up in 8 hours. Filter off the catalyst and remove the solvent under reduced pressure, to obtain a gum, ultraviolet absorption peaks at 277, 270 m$\mu$ ($\epsilon$ 1500, 1700), consistent with the structure of hexahydro - 4 - m - methoxyphenethyl - 8 - methyl-5-oxoindan-1-ol.

PREPARATION 33

Hexahydro-4-m-methoxyphenethyl-8-methylindan-1,5-dione

Dissolve the saturated keto-alcohol of the previous example (0.815 g.) in pyridine (25 cc.), cool in ice and add recrystallized chromium trioxide (0.815 g.) gradually with stirring under nitrogen. Allow the mixture to stand at room temperature for 20 hours, then dilute with ethyl acetate (20 cc.). Filter the brown mixture through a short alumina column wetted with ethyl acetate and remove the solvent from the filtrate, to obtain as gummy residue crude hexahydro - 4 - m - methoxyphenethyl - 8 - methylindane-1,5-dione (0.77 g.); infrared absorption peaks at 5.75 and 5.85$\mu$.

PREPARATION 34

4-m-methoxyphenethyl-8-ethyl-trans-hexahydroindane-1,5-dione

Dissolve 4-m-methoxyphenethyl-8-ethyl-5,6,7,8-tetrahydroidane-1,5-dione (2 g.) in ethanol (50 cc.) containing 10% palladized charcoal (0.6 g.) and shake in an atmosphere of hydrogen for 12 hours, when hydrogen uptake almost ceases. Remove the catalyst by filteration and evaporate the solvent to a gum which is dissolved in a little benzene and filtered through a short column of alumina. Evaporate the solvent to obtain a gum consisting of steroisomers of the diketone 4-methoxyphenethyl-8-ethyl-trans - hexahydroindane - 1,5 - dione; infrared absorption peaks at 5.75 and 5.85$\mu$.

PREPARATION 35

4-m-methoxyphenethyl-8-ethyl-5-oxo-trans-hexahydroindan-1-ol

Hydrogenate 4-m - methoxyphenethyl - 8 - ethyl-5-oxo-5,6,7,8-tetrahydroindan-1-ol (2 g.) as for the preparation of the corresponding 8-methyl compound to obtain 4-m-methoxyphenethyl-8-ethyl-5-oxo-trans - hexahydroindan-1-ol as a gum.

PREPARATION 36

4-m-methoxyphenethyl-8-ethyl-trans-hexahydro-indane-1,5-dione

Dissolve 4-m-methoxyphenethyl-8-ethyl - 5 - oxo-trans-hexahydroindan-1-ol (1 g.) in pyridine (30 cc.) and add chromium trioxide (1.6 g) carefully with stirring under nitrogen. Allow the mixture to stand at room temperature for 24 hours, add ethyl acetate (20 cc.), and filter the mixture through a short column of alumina with ethyl acetate. Remove the solvent to obtain 4-m-methoxyphenethyl-8-ethyl-trans-hexahydroindane - 1,5 - dione as a gum; infrared absorption peaks at 5.75, and 5.85$\mu$.

PREPARATION 37

13$\beta$-methyl-3-methoxygona-1,3,5(10),8,14-pentaen-17-one

Dissolve the triketone 2-(6-m-methoxyphenyl-3-oxohexyl)-2-methylcyclopentane-1,3-dione (6.7 g.), in dry benzene (100 cc.) containing anhydrous toluene-p-sulphonic acid (2.4 g.). Reflux the mixture using a Dean-Stark water separator until the equivalent of two molecular proportions of water (0.99 cc.) is collected (30 min.), indicating a double cyclodehydration. Cool and wash to remove acid, and dry. Evaporate the dried solution to obtain a red gum. Distil the gum under reduced pressure (bath temp. 210°, 0.5 mm.). Recrystallize the solidified distillate from methanol, giving 13$\beta$-methyl-3-methoxygona-1,3,5(10),8,14-pentaen-17-one (3.9 g.), M.P. 115–6°; ultraviolet absorption peak at 313 m$\mu$ ($\epsilon$ 35,100). The light absorption is in agreement with the structure assigned.

Calculated for $C_{19}H_{20}O_2$ (percent): C, 81.4; H, 7.2. Found (percent): C, 81.1; H, 7.0.

PREPARATION 38

13$\beta$-ethyl-3-methoxygona-1,3,5(10),8,14-pentaen-17-one

Reflux the triketone 2-ethyl-2-(6-m-methoxyphenyl-3-oxo-hexyl)cyclopentane-1,3-dione (7.1 g.), in benzene (150 cc.) and toluene-p-sulphonic acid (2 g.) until the theoretical amount of water (0.72 cc.) for double cyclodehydration has been collected in a Dean-Stark separator. Wash the cooled reaction mixture after removal of solvent under reduced pressure, B.P. ca. 220°/0.01 mm., to obtain an almost colorless glass (5.7 g.). Crystallize the glass from methanol containing a little ethyl acetate to obtain pure 13$\beta$ - ethyl - 3 - methoxygona-1,3,5(10),8,14-pentaen-17-one (3.7 g.), M.P. 77–80°; ultraviolet absorption peak at 311 m$\mu$ ($\epsilon$ 28,000).

Calculated for $C_{20}H_{22}O_2$ (percent): C, 81.6; H, 7.5. Found (percent): C, 81.3; H, 7.3.

PREPARATION 39

13$\beta$-ethyl-3-methoxy-6-methylgona-1,3,5(10),8,14-pentaen-17-one

Reflux 2-(6 - m - methoxyphenyl-3-oxoheptyl)-2-ethylcyclopentane-1,3-dione (14 g.) with anhydrous toluene-p-sulphonic acid (4 g.) in benzene (50 cc.) with continuous water separation for 20 minutes. Wash the cooled solution with water, dry, and evaporate the solvent. Distil the residual red gum to obtain 13$\beta$-ethyl-3-methoxy-6-methylgona-1,3,5(10),8,14 - pentaen-17-one as a gum; ultraviolet absorption peak at 315 m$\mu$ ($\epsilon$ 21,000); infrared absorption peak at 5.75 m$\mu$.

PREPARATION 40

13$\beta$-methyl-3-hydroxygona-1,3,5(10),8,14-pentaen-17-one

Reflux 2-(6-m-hydroxyphenyl-3-oxohexyl) - 2 - methyl-cyclopentane-1,3-dione (0.5 g.), (the product of Michael condensation of 2-methylcyclopentane-1,3-dione with 6-m - hydroxyphenyl - 1 - diethylaminohexan-3-one) for 50 minutes in benzene (30 cc.) containing toluene-p-sulphonic acid (0.3 g.) using a Dean-Stark trap. Add ether (80 cc.) to the cooled product and filter off the resulting insoluble material. Wash the ethereal solution in turn with water, saturated aqueous potassium bicarbonate, and brine, and dry. The product is a deep green gum which one takes up in a small quantity of ether; precipitate the insoluble impurities by the addition of light petroleum and filter off. Evaporate the resulting solution to obtain a crystalline residue, which one takes up in a mixture of benzene (10 cc.) and ether (2 cc.); adsorb the solution on an activated fuller's earth (10 g.). Elute with benzene to obtain 13$\beta$-methyl-3-hydroxygona- 1,3,5(10),8,14-pentaen-17-one (0.19 g), M.P. 225° (decomp.).

Calculated for $C_{18}H_{18}O_2$ (percent): C, 812.2; H, 6.8. Found (percent): C, 80.7; H, 7.0.

PREPARATION 41

13β-ethyl-3-hydroxygona-1,3,5(10),8,14-pentaen-17-one

Reflux 2-(6 - m - hydroxyphenyl-3-oxohexyl)-2-ethylcyclopentaen-1,3-dione (2.6 g.) for 30 minutes in benzene (70 cc.) containing toluene-p-sulphonic acid (0.38 g.), and collect the water evolved in the cyclodehydration in a Dean-Stark separator. Work up to obtain a green gum which one dissolves in benzene (30 cc.); adsorb the benzene solution on a column of activated fuller's earth, and elute with benzene to obtain crude 13β-ethyl-3-hydroxygona-1,3,5(10),8,14-pentaen-17-one (0.75 g.), as pale yellow crystals, M.P. 153–6°; ultraviolet absorption peak at 313.5 m$\mu$ ($\epsilon$ 30,300); infrared absorption peaks at 3.99$\mu$ and 5.81$\mu$.

PREPARATION 42

13β-methyl-3-methoxygona-1,3,5(10),8-tetraen-17-one

Shake 13β - methyl - 3 - methoxygona - 1,3,5(10),8,14-pentaen-17-one (1 g.) in benzene (35 cc.) with a 10% palladium on barium sulphate catalyst (0.3 g.) in the presence of hydrogen at atmospheric pressure until 90 cc. hydrogen has been absorbed. By the end of this period (1½ hours) the rate of hydrogenation will have slowed down. Filter the mixture and evaporate the solvent to obtain a gum which solidifies; recrystallize from ethanol to obtain the title product (0.68 g.), M.P. 110–120°; ultraviolet absorption peak at 278 m$\mu$ ($\epsilon$ 13,200).

PREPARATION 43

13β-ethyl-3-methoxygona-1,3,5(10),8-tetraen-17-one

Dissolve 13β - ethyl - 3 - methoxygona - 1,3,5(10),8,14-pentaen-17-one (2 g.) in dioxan (50 cc.) containing Raney nickel (ca. 0.5 g.) of moderate activity and shake with hydrogen until 160 cc., the amount corresponding to one molecular proportion has been absorbed. Recrystallize the isolated product from methanol to obtain the title product (1.2 g.), M.P. 110–125°; ultraviolet absorption peak at 280 m$\mu$ ($\epsilon$ 13,200).

PREPARATION 44

13β-methyl-3-hydroxygona-1,3,5(10),8-tetraen-17-one

Hydrogenate 13β-methyl-3-acetoxygona-1,3,5(10)8,14-pentaen-17-one (0.05 g.), obtained by the acetylation of 13β-methyl - 3 - hydroxygona - 1,3,5(10),8,14-pentaen-17-one using pyridine and acetic anhydride in benzene (15 cc.) at atmospheric pressure using a 10% palladized charcoal catalyst (0.025 g.). Hydrogenation slows down markedly after the requisite quantity of hydrogen for monohydrogenation has been absorbed. Remove the catalyst by filtration and evaporate the solvent to obtain as residue the crude title product.

Immediately take the product up in methanol (4 cc.), add 3 N sodium hydroxide solution (1 cc.) and shake the mixture for 20 minutes. Acidify and extract with ether to obtain a product which one dissolves in benzene and passes through a column of activated fuller's earth. Evaporate the resulting solution and recrystallize the residue from methanol to obtain the title product, M.P. 225–7°; ultraviolet absorption peak at 278 m$\mu$ ($\epsilon$ 15,300).

PREPARATION 45

13β-methyl-3-hydroxygona-1,3,5(10),8-tetraen-17-one

Shake 13β - methyl - 3 - hydrozygona - 1,3,5(10),8,14-pentaen-17-one (0.05 g.) in benzene (25 cc.) in hydrogen at atmospheric pressure using a 10% palladized charcoal catalyst (0.025 g.). Hydrogenation becomes very slow when 1.1 moles hydrogen has been absorbed. Filter and evaporate to obtain the title product (0.035 g.), recrystallize from methanol to get pale blue crystals, M.P. 225–8°, melting to a red liquid; ultraviolet absorption peak at 280 m$\mu$ ($\epsilon$ 12,000).

PREPARATION 46

13β-ethyl-3-hydroxygona-1,3,5(10),8-tetraen-17-one

Hydrogenate 13β-ethyl-3-hydroxygona - 1,3,5(10),8,14-pentaen-17-one (0.5 g.) in benzene (25 cc.) at atmospheric pressure using a 10% palladized charcoal catalyst (0.025 g.). After the absorption of 1.1 molar equivalents of hydrogen, hydrogenation becomes very slow; remove the catalyst by filtration and evaporate the filtrate to obtain the title product which crystallizes from methanol in colorless plates (0.35 g.), M.P. 235–9°; ultraviolet absorption peak at 280.5 m$\mu$ ($\epsilon$ 15,500).

PREPARATION 47

13β-ethyl-3-acetoxygona-1,3,5(10),8-tetraen-17-one

Hydrogenate 13β-ethyl-3-acetoxygona - 1,3,5(10),8,14-pentaen-17-one (1.8 g.) dissolved in benzene (25 ml.) at atmospheric pressure in the presence of 10% palladized charcoal (100 mg.). After 1.1 molar equivalents of hydrogen has been absorbed (ca. 12 hr.) filter off the catalyst, evaporate the filtrate under reduced pressure and recrystallize the residue from ethanol. Filter the red product through "Florisil" (60 g.) with benzene-petraleum (3:1), remove the solvent and recrystallize the product from ethanol to obtain the title product, M.P. 132.5–134.5°; ultraviolet absorption peak at 277 m$\mu$ ($\epsilon$ 12,800).

PREPARATION 48

13β-methyl-3-methoxygona-1,3,5(10),8-tetraen-17β-ol

Add sodium borohydride (0.5 g.) in ethanol (60 cc.) with stirring to 13-methyl-3-methoxygona-1,3,5(10),8-tetraen-17-one (2.0 g.) in ethanol (150 cc.) at 14–15°. Leave the mixture at room temperature for 1 hour, acidify with glacial acetic acid and evaporate to dryness under reduced pressure. Treat the residue with water, ether-extract and wash and dry. Evaporate the extracts. Recrystallize the residue from a mixture of methanol (15 cc.) and water (3 cc.) to obtain the title product (0.90 g.), M.P. 110–2°. A sample sublimes at 110°/10$^{-4}$ mm. and has an ultraviolet absorption peak at 277 m$\mu$ ($\epsilon$ 14,500).

PREPARATION 49

13β-ethyl-3-methoxygona-1,3,5(10),8-tetraen-17β-ol

Add 13β-ethyl-3-methoxygona- 1,3,5(10),8-tetraen-17-one (16.8 g.) to a solution of sodium borohydride (6 g.) in methanol (500 cc.); swirl the mixture which boils spontaneously. When all the material has been added and the reaction has subsided, add acetic acid (15 cc.). Reduce the mixture in volume by evaporation of most of the solvent, add water and extract the product with ether. Evaporate the washed and dried extracts to obtain crude crystalline product (16.8 g.), M.P. 102–5° on recrystallization from acetonitrile.

PREPARATION 50

13β-ethyl-3-methoxy-17α-ethynylgona-1,3,5(10),8-tetraen-17β-ol

To a stirred suspension of lithium acetylide (42.4 g.) in a mixture of dioxan (240 cc.), ethylenediamine (10 cc.), and dimethylacetamide (250 cc.) add a solution of 13β-ethyl-3-methoxygona - 1,3,5(10),8 - tetraen-17-one (66.6 g.) in dimethylacetamide (450 cc.) in an atmosphere of acetylene. Continue stirring for an additional 20 hours (under acetylene). Pour the reaction mixture into crushed ice (1.5 kg.) and extract with four 200 cc. portions of benzene. Wash the combined extracts with sulfuric acid and water and dry. Evaporate the solvent to obtain a crude oil which one dissolves in methanol (450 cc.) and treats with charcoal (6.5 g.). After concentrating the filtrate to 300 cc. add water (45 cc.) and cool to obtain the title compound (62.4 g., 86%). Recrystallization from methanol furnishes an analytical sample, M.P. 101–103°; ultraviolet absorption peak at 278 mμ ($\epsilon$ 16,100); infrared absorption peaks at 2.79, 3.04, 3.53, 4.81μ.

Calculated (percent) for $C_{22}H_{26}O_2$: C, 82.3; H, 8.3. Found (percent): C, 82.0; H. 8.1.

PREPARATION 51

13β,17α-diethyl-3-methoxygona-1,3,5(10),8-tetraen-17β-ol

Shake 13β-ethyl-3-methoxy-17α-ethynylgona-1,3,5(10), 8-tetraen-17β-ol (1.9 g.) in benzene (100 cc.) with hydrogen at atmospheric pressure in the presence of a prereduced 2% palladium on calcium carbonate catalyst (0.6 g.) until no more hydrogen is absorbed. Hydrogenation ceases when the requisite amount of hydrogen for selective saturation of the ethynyl group has been absorbed. Filter and evaporate the solvent to obtain a crystalline residue which one recrystallizes from methanol, to obtain the title product (1.5 g.), M.P. 139–140°; ultraviolet absorption peak at 276 mμ ($\epsilon$ 15,500); infrared absorption peak at 2.79μ.

PREPARATION 52

13β-methyl-3-methoxygona-1,3,5(10),9-tetraen-17-one

Allow the diketone 4-(2-m-methoxyphenylethyl)-8-methyl-transhexahydroindan-1,5-dione (0.77 g.) in methanol (25 cc.) and concentrated hydrochloric acid (4 cc.) to stand overnight at 0° C. Treat the mixture with water (50 cc.) and extract with a mixture of ether and benzene. Evaporate the washed and dried extracts to leave a gum which crystallizes (0.65 g.). Recrystallize from a mixture of ethyl acetate and ethanol to obtain 13β-methyl-3-methoxygona - 1,3,5(10),9 - tetraen-17-one, M.P. 144–148° C.

PREPARATION 53

13β-ethyl-3-methoxygona-1,3,5(10),9-tetraen-17-one

Allow the diketone 4-(2-m-methoxyphenylethyl)-8-ethyl-transhexahydroindan-1,5-dione (0.8 g.) in methanol (25 cc.) and concentrated hydrochloric acid (4 cc.) to stand 15 hours at 0° C. Filter the precipitate and recrystallize from methanol to give 13β-ethyl-3-methoxygona-1,3,5(10),9-tetraen-17-one; ultraviolet absorption peak at 264 mμ ($\epsilon$ 18,000); infrared absorption peak at 5.78μ.

PREPARATION 54

13β-ethyl-3-methoxygona-1,3,5(10),9-tetraen-17β-ol

Reflux 13β - ethyl-3-methoxygona-1,3,5(10),9-tetraen-17-one (0.5 g.) and sodium borohydride (0.2 g.) in ethanol (20 cc.) for 30 minutes. Add excess acetic acid and evaporate the solution almost to dryness under reduced pressure. Add water and collect the product in ether. Wash, dry, and evaporate the ethereal solution and recrystallize the residue from methanol to obtain 13β-ethyl-3-methoxygona - 1,3,5(10),9 - tetraen-17β-ol; ultraviolet absorption peak at 265 mμ ($\epsilon$ 14,800).

PREPARATION 55

13β-ethyl-3-methoxygona-1,3,5(10),9-tetraen-17β-ol

Reflux 13β - ethyl-3-methoxygona-1,3,5(10),8-tetraene-17β-ol (0.5 g.) in ethanol (15 cc.) and concentrated hydrochloric acid (3 cc.) for 2 hours. Dilute the cooled solution with water and collect the product in ether. Wash, dry and evaporate the ethereal solution and recrystallize the residue from methanol to obtain 13β-ethyl-3 - methoxygona - 1,3,5(10),9-tetraen-17β-ol; ultraviolet absorption peaks at 265 mμ ($\epsilon$ 15,000).

PREPARATION 56

13β-ethyl-3-methoxygona-1,3,5(10),9-tetraen-17-one

Treat 13β - ethyl-3-methoxy-17,17-ethylenedioxygona-1,3,5(10),8-tetraene (0.5 g.) exactly as described in the previous example to obtain 13β - ethyl - 3-methoxygona-1,3,5(10),9-tetraen-17-one; ultraviolet absorption peak at 266 mμ ($\epsilon$ 15,000); infrared absorption peaks at 5.78μ.

PREPARATION 57

13β-ethyl-3-hydroxygona-1,3,5(10),9-tetraen-17-one

Dissolve 13β-ethyl-3-hydroxygona-1,3,5(10),8-tetraen-17-one in warm methanol (125 ml.) and treat with concentrated hydrochloric acid (25 cc.). Heat the solution under reflux for 45 minutes, cool and keep at 0° for 1 hour; then filter the solid and wash with cold methanol. Dry the product in vacuo to obtain 13β-ethyl-3-hydroxygona-1,3,5(10),9-tetraen-17-one, M.P. 265°; ultraviolet absorption peak at 266 mμ ($\epsilon$ 15,400).

PREPARATION 58

13β - ethyl - 3 - methoxy - 17α-ethynylgona-1,3,5(10),9-tetraene-17β-ol

Add lithium acetylide (3.5 g.) in dioxane (10 cc.) ethylenediamine (10 cc.), and dimethylacetamide (20 cc.) to 13β-ethyl-3-methoxygona-1,3,5(10),9-tetraene-17-one (3.5 g.) in dimethylacetamide (100 cc.) with stirring in an atmosphere of acetylene. Stir the mixture for 16 hours at room temperature then pour over crushed ice and extract with ether. Evaporate the washed and dried extracts to a residue and chromatograph on Florex to obtain a product which on recrystallization from methanol-water and then from ethyl acetate-hexane gives 13β-ethyl - 3-methoxy-17α-ethynylgona-1,3,5(10),9-tetraene-17β-ol, M.P. 110–112°; ultraviolet absorption peaks at 263 mμ ($\epsilon$ 20,400); infrared absorption peaks at 2.80 and 3.05μ.

PREPARATION 59

13β,17α - diethyl - 3 - methoxygona-1,3,5(10),9-tetraen-17β-ol

Add 13β-ethyl-3-methoxy-17α-ethynylgona-1,3,5(10),9-tetraen-17β-ol (1 g.) in benzene (15 cc.) to 2% prereduced palladium on calcium carbonate catalyst (300 mg.) in benzene (10 cc.) and shake the mixture in an atmosphere of hydrogen until 2 molecular equivalents of hydrogen (170 cc.) has been adsorbed. Filter the catalyst and evaporate the solvent to obtain 13β,17α - diethyl - 3-methoxygona-1,3,5(10),9-tetraen-17β-ol and recrystallize from methanol, M.P. 112–117°; ultraviolet absorption peak at 265 mμ ($\epsilon$ 16,100).

EXAMPLE 1

D - homo - 13β - methyl-3-methoxygona-1,3,5(10)-trien-17a,β-ol

Add D - homo-13β-methyl-3-methoxygona-1,3,5(10),9-tetraen-17a-one (0.5 g.) in tetrahydrofuran (35 cc.) to a stirred solution of potassium (0.35 g.) in liquid ammonia (125 cc.). After 5 minutes add more potassium (0.35 g.) and after a further 30 minutes add ammonium chloride (2 g.) to discharge the blue color. Add water (75 cc.), collect the product with ether, evaporate the solvent and recrystallize from methanol to obtain D - homo - 13β-methyl - 3 - methoxygona-1,3,5(10)-trien-17a,β-ol, M.P. 98–99°. Sublime to obtain the compound, M.P. 138–140°.

Calculated for $C_{20}H_{28}O_2$ (percent): C, 80.10; H, 9.41. Found (percent): C, 80.2; H, 9.21.

This compound has estrogenic activity, lowers the blood lipid level, and is useful as an intermediate for preparing compounds which have hormonal activity.

EXAMPLE 2

D - homo - 13β - methyl-3-methoxygona-1,3,5(10)-trien-17a-one

Prepare a solution of 8 N chromic acid in aqueous sulphuric acid by dissolving chromium trioxide (26.72 g.) in concentrated sulphuric acid (23 cc.) and then diluting with water to 100 cc. Add the solution (0.3 cc.) dropwise to D - homo-13β-methyl-3-methoxygona-1,3,5(10)-trien-17a,β-ol (100 mg.) in acetone (30 cc.). After 30 seconds add water (50 cc.) and extract the mixture with ether-benzene. Evaporate the washed and dried extracts and recrystallize the residue from ethanol to obtain D-homo-13β - methyl-3-methoxygona-1,3,5(10)-trien-17a-one (69 mg., 69%), M.P. 153–5° C.; infrared absorption spectrum (measured in carbon disulphide solution) is identical with that of D - homo - 13β-methyl-3-methoxygona-1,3,5(10)-trien-17a-one prepared from natural estrone methyl ether by the method of Goldberg and Studer, (Helv. Chim. Acta. 1941, 24, 478, 295E). Prepare the benzylidene derivative by refluxing the ketone with benzaldehyde and sodium methoxide in methanol, M.P. 145–6° C., proving its identity with the product described by Johnson et al., (J. Amer. Chem. Soc., 1952, 74, 2832) as having M.P. 146–7° C.

Calculated for $C_{20}H_{26}O_2$ (percent): C, 80.5; H, 8.8. Found (percent): C, 80.3; H, 8.7.

This compound has estrogenic activity, lowers the blood lipid level, and is useful as an intermediate for preparing compounds which have hormonal activity.

EXAMPLE 3

D-homo - 13β - methyl-3-methoxygona - 1,3,5(10)-trien-17a-one

Add D-homo-13β-methyl-3-methoxygona - 1,3,5(10),8-tetraen-17a-one (0.1 g.) in tetrahydrofuran (10 cc.) to liquid ammonia (50 cc.) and add potassium (0.15 g.) to the mixture. Stir for 1 hour and then treat with solid ammonium chloride (2 g.). Add water (50 cc.) and ether-extract the product and work up the extract to give crude D-homo - 13β - methyl-3-methoxygona-1,3,5(10)-trien-17aβ-ol. Dissolve this ether in acetone (20 cc.) and add 8 N chromic acid (0.1 cc.) followed after 2 minutes by a little ethanol. Reduce the solution in bulk by evaporating solvent, add water, extract the mixture with ether-benzene mixture, and wash, dry and evaporate the extracts. Crystallize the gummy product, wash it with a little ether and recrystallize from ethanol. Dissolve the product in benzene, chromatograph on an alumina column. Elute with benzene, evaporate and recrystallize from ethanol to obtain D-homo-13β-methyl-3-methoxygona-1,3,5(10)-trien-17a-one, M.P. 153–5°.

This compound has estrongenic activity, lowers the blood lipid level, and is useful as an intermediate for preparing compounds which have hormonal activity.

EXAMPLE 4

13β-methyl-3-methoxygona-1,3,5(10)-trien-17β-ol

Add sodium (2.2 g.) portionwise with stirring to 13β-methyl - 3 - methoxygona-1,3,5(10),8-tetraen-17β-ol (2.2 g.) dissolved in a mixture of liquid ammonia (150 cc.), tetrahydrofuran (40 cc.) and aniline (15 cc.). After 20 minutes discharge the blue color with ammonium chloride, add water and extract with ether. Wash, dry and evaporate the ethereal solution and recrystallize the residue from hexane to obtain the title compound (1.8 g.), M.P. 129–131°. Recrystallize from ethyl acetate to obtain material M.P. 132–133°.

Calcd. for $C_{19}H_{26}O_2$ (percent): C, 79.7; H, 9.15. Found (percent): C, 79.5; H, 9.0.

This compound has estrogenic activity, lowers the blood lipid level, and is useful as an intermediate for preparing compounds which have hormonal activity.

EXAMPLE 5

13β-methyl-3-methoxygona-1,3,5(10)-trien-17β-ol

Add 13β - methyl-3-methoxygona-1,3,5(10),8-tetraen-17-one (M.P. 110–120°, 0.25 g.) dissolved in tetrahydrofuran (15 cc.) to a solution of potassium (0.1 g.) in liquid ammonia (70 cc.). Add further potassium (0.3 g.) to the stirred solution during 5 minutes and then stir the solution for 1 hour. Add ammonium chloride (2 g.), followed when the blue color has been discharged, by water (50 cc.). Extract the mixture with ether and evaporate the washed and dried extracts to a gum to obtain 13β-methyl-3-methoxygona-1,3,5(10)-trien-17β-ol.

This compound has estrogenic activity, lowers the blood lipid level, and is useful as an intermediate for preparing compounds which have hormonal activity.

EXAMPLE 6

13β-methyl-3-methoxygona-1,3,5(10)-trien-17-one

Dissolve 13β - methyl-3-methoxygona-1,3,5(10)-trien-17β-ol in acetone (30 cc.) and add 8 N chronic acid (0.3 cc.) drop by drop to the swirled solution, followed after a 1 minute interval by methanol (5 cc.). Remove most of the solvent under reduced pressure, add water (50 cc.) and extract the product with a mixture of equal volumes of ether and benzene. Evaporate the washed and dried extracts and crystallize the residue from ethanol to obtain 13β - methyl-3-methoxygona-1,3,5(10)-trien-17-one (0.114 g.), M.P. 137–142°. Purify further by recrystallization to obtain the pure compound, M.P. 143–4°, whose infrared spectrum is identical with that of 13β-methyl-3-methoxygona-1,3,5(10)-trien-17-one obtained from natural estrone.

To obtain 13β-isobutyl-3-methoxygona-1,3,5(10)-trien-17-one treat 13β-isobutyl-3-methoxygona-1,3,5(10)-trien-17β-ol with chromic acid and acetone according to the manipulative procedure described above.

To obtain 13β-cetyl-3-methoxygona-1,3,5(10)-trien-17-one, treat 13β-cetyl-3-methoxygona-1,3,5(10)-trien-17β-ol with chromic acid and acetone according to the manipulative procedure described above.

To obtain 13β,6 - dimethyl-3-methoxygona-1,3,5(10)-trien - 17 - one treat 13β,6 - dimethyl - 3 - methoxygona-1,3,5(10)-trien-17β-ol with chromic acid and acetone according to the manipulative procedure described above.

To obtain 13β,7 - dimethyl-3-methoxygona-1,3,5(10)-trien - 17 - one treat 13β,7 - dimethyl - 3 - methoxygona-1,3,5(10)-trien-17β-ol with chromic acid in acetone according to the manipulative procedure described above.

To obtain 13β - ethyl - 2,3-dimethoxygona-1,3,5(10)-trien-17-one treat 13β-ethyl-2,3-dimethoxygona-1,3,5(10)-trien-17β-ol with chromic acid and acetone according to the manipulative procedure described above.

To obtain 13β - ethyl - 1,3-dimethoxygona-1,3,5(10)-trien - 17-one treat 13β-ethyl-1,3,5(10)-trien-17β-ol with chromic acid and acetone according to the manipulative procedure described above.

To obtain 13β-methyl-3-acetoxygona-1,3,5(10)-trien-17 - one treat 13β-methyl-3-acetoxygona-1,3,5(10)-trien-17β-ol with chromic acid and acetone according to the manipulative procedure described above.

To obtain 13β - (3 - oxopropyl) - 3 - methoxygona-1,3,5(10) - trien - 17-one treat 13β-(3-hydroxypropyl)-3-methoxygona-1,3,5(10)-trien-17β-ol with chromic acid and acetone according to the manipulative procedure described above.

To obtain 13β - ethyl-3-ethoxygona-1,3,5(10)-trien-17-one treat 13β-ethyl-3-ethoxygona-1,3,5(10)-trien-17β-ol with chromic acid and acetone according to the manipulative procedure described above.

To obtain 13β - isobutyl - 3-pentyloxygona-1,3,5(10)-trien - 17 - one treat 13β - isobutyl - 3 - pentyloxygona-1,3,5(10)-trien-17β-ol with chromic acid and acetone according to the manipulative procedure described above.

To obtain 13β-(3-oxopropyl)-3-cyclopentyloxygona-1,3,5(10)-trien-17-one treat 13b-(3-hydroxypropyl)-3-cyclopentyloxygona-1,3,5(10)-trien-17β-ol with chromic acid and acetone according to the manipulative procedure described above.

To obtain 13β-phenethyl-3-hydroxygona-1,3,5(10)-trien - 17 - one treat 13β-phenethylgona-1,3,5(10)-trien-3,17β-diol with chromic acid in acetone according to the manipulative procedure described above.

To obtain 13β-(2-diethylaminoethyl)-2,3-dimethoxygona-1,3,5(10)-trien-17-one treat 13β-(2-diethylaminoethyl)-2,3-dimethoxygona-1,3·5(10)-trien - 17β - ol with chromic acid and acetone according to the manipulative procedure described above.

To obtain 13β-(3-dimethylaminopropyl)-1,3-dimethoxy-6-methylgona-1,3,5(10)-trien-17-one treat 13β-(3-dimethylaminopropyl)-1,3-dimethoxy-6-methylgona - 1,3,5 (10)-trien-17β-ol with chromic acid and acetone according to the manipulative procedure described above.

To obtain 13β-n-butyl-1,3-diethoxy-6-ethylgona-1,3,5 (10)-trien-17-one treat 13β-n-butyl-1,3-diethoxy-6-ethylgona-1,3,5(10)-trien-17β-ol with chromic acid and acetone according to the manipulative procedure described above.

To obtain 13β-n-propyl-2-ethoxy-3-methoxygona-1,3,5 (10)-trien-17-one treat 13β-n-propyl-2-ethoxy-3-methoxygona-1,3,5(10)-trien-17β-ol with chromic acid and acetone according to the manipulative procedure described above.

To obtain 13β-ethyl-3-benzyloxygona-1,3,5(10)-trien-17-one treat 13β-ethyl-3-benzyloxygona-1,3,5(10)-trien-17β-ol with chromic acid and acetone according to the manipulative procedure described above.

To obtain 13β-phenethyl-3-propoxygona-1,3,5(10)-trien-17-one treat 13β-phenethyl-3-propoxygona-1,3,5(10)-trien-17β-ol with chromic acid and acetone according to the manipulative procedure described above.

These compounds have estrogenic activity, lower the blood lipid level, and are useful as intermediates in the preparation of the hormonal compounds of the invention.

EXAMPLE 7

13β-methyl-3-methoxygona-1,3,5(10)-trien-17-one

Dissolve 13β-methyl - 3 - methoxygona-1,3,5(10)-trien-17β-ol (0.085 g.) in acetone (25 cc.) and add 8 N chromic acid solution (0.5 cc.). After 3 minutes add ethanol to decompose excess chromic acid, followed by water (100 cc.). Extract with a mixture of ether and benzene, wash and dry the extracts and remove the solvent to obtain a gum which crystallizes (0.07 g.). Recrystallize from methanol to obtain 13β-methyl-3-methoxygona-1,3,5(10)-trien-17-one, M.P. 138–141° C.

Calc'd for $C_{19}H_{24}O_2$ (percent): C, 80.2; H, 8.5. Found (percent): C, 80.0; H, 8.2.

This compound has estrogenic activity, lowers the blood lipid level, and is useful as an intermediate for preparing compounds which have hormonal activity.

EXAMPLE 8

D-homo-13β-ethyl-3-methoxygona-1,3,5(10)-trien-17aβ-ol

Add D-homo-13β-ethyl-3-methoxygona-1,3,5(10), 8-tetraen-17aβ-ol (20 g.) in tetrahydrofuran (525 cc.) to liquid ammonia (1500 cc.) and aniline (250 cc.) and add lithium (5 g.) in pieces. After stirring for 1½ hours discharge the blue color by the addition of sodium nitrate followed by water and isolate the product with ether. Recrystallize the product from methanol to obtain D-homo-13β-ethyl-3-methoxygona-1,3,5(10)-trien-17aβ-ol (15 g.), M.P. 103–105° after previous softening; ultraviolet absorption peak at 280 mμ (ε 2,800); infrared absorption peaks at 2.96 and 6.23μ.

This compound has estrogenic activity, lowers the blood lipid level, and is useful as an intermediate for preparing the hormonal compounds of this invention.

EXAMPLE 9

D-homo-13β-ethyl-3-methoxygona-1,3,5(10)-triene-17a-one

Add 8 N chromic acid (0.5 cc.) to a swirled solution of D - homo - 13β-ethyl-3-methoxygona-1,3,5(10)-trien-17aβ-ol (0.3 g.) in acetone (75 cc.) containing anhydrous magnesium sulphate. After 30 seconds add isopropyl alcohol (2 cc.) and evaporate the mixture to dryness. Add water and extract the mixture with ether. Chromatograph the product on activated alumina to afford D-homo-13β-ethyl-3-methoxygona-1,3,5(10)-trien-17a-one; ultraviolet absorption peak at 278 mμ (ε 1900); infrared absorption peak at 5.85μ.

This compound possesses estrogenic and blood lipid lowering activity and is useful as an intermediate for preparing the hormonal compounds of this invention.

EXAMPLE 10

13β-ethyl-3-methoxygona-1,3,5(10)-trien-17β-ol

Dissolve 13β-ethyl-3-methoxygona-1,3,5(10), 8-tetraen-17-one in 100 ml. of tetrahydrofuran and add this solution with stirring to a solution of 0.6 g. of potassium in 150 ml. of liquid ammonia. After stirring the mixture for one hour, add an excess of ammonia chloride and work up the product. Dissolve the gummy product in benzene and chromatograph on activated alumina; elute with ether to obtain 13β-ethyl-3-methoxygona-1,3,5(10)-trien-17β-ol; M.P. 131–134° C.; ultraviolet absorption peak at 275 mμ (ε 3,700).

This compound possesses estrogenic and blood lipid lowering activity and is useful as an intermediate for preparing the hormonal compounds of this invention.

EXAMPLE 11

13β-ethyl-3-methoxygona-1,3,5(10)-trien-17-one one (1.0 g.) in 1-methoxypropan-2-ol (100 cc.) to liquid ammonia (150 cc.), followed by lithium metal (2.0 g.) in small pieces during 20 minutes with stirring. Discharge the blue color immediately after completion of the metal addition; add water and filter the solid and recrystallize from methanol to obtain 13β - ethyl-3-methoxygona-2,5 (10)-dien-17β-ol (0.3 g.); no selective ultraviolet absorption beyond 220 mμ; infrared absorption peaks at 3.08, 5.92, 6.01μ.

To this product (0.3 g.) in acetone (100 cc.) add 8 N chromic acid (0.6 cc.), followed after 1 minute by methanol (2 cc.). Remove the solvent, add water, and work up the product with ether to obtain as residue a crude crystalline material (0.3 g.). Recrystallize from methanol to obtain 13β-ethyl-3-methoxygona-1,3,5(10)-trien-17-one identical with the material otherwise obtained.

This compound possesses estrogenic and blood lipid lowering activity and is useful as an intermediate for preparing the hormonal compounds of this invention.

EXAMPLE 12

13β-ethyl-3-methoxygona-1,3,5(10)-trien-17-one

Add an aqueous 8 N solution of chromic acid (0.5 cc.) to a swirled solution of 13β-ethyl-3-methoxygona-1,3, 5(10)-trien-17β-ol (0.3 g.) in acetone (75 cc.). After 30 seconds add methanol (2 cc.) to remove excess oxidizing agent. Remove most of the solvent under reduced pressure, add water (100 cc.) to the residue, and ether extract the aqueous mixture.

Work up and chromatograph the semi-solid material on activated alumina (30 g.) to obtain 13β-ethyl-3-methoxygona - 1,3,5(10) - trien - 17 - one (0.3 g.) as hexagonal plates, M.P. 122–214° C. or as isomorphous tablets, M.P. 109–111° C. When a mixture of the two forms is melted rapidly, some melting occurs at 111° C.; this is followed by resolidification and final melting at 124° C.

This compound possesses estrogenic and blood lipid lowering activities and is useful as an intermediate for preparing the hormonal compounds of this invention.

EXAMPLE 13

13β-n-propyl-3-methoxygona-1,3,5(10)-trien-17β-ol

Add 13β - n - propyl - 3 - methoxygona - 1,3,5(10),8-tetraen-17β-ol (3.1 g.) dissolved in a mixture of tetrahydrofuran (10 cc.) and freshly distilled aniline (60 cc.) to liquid ammonia (160 cc.) and add lithium metal (1.5 g.) in small pieces. Stir the reaction mixture for 3 hours, then quench with solid ammonium chloride (12.5 g.) and take up in water. Ether-extract the product and evaporate the washed and dried extracts to obtain a semisolid residue of crude 13β - n - propyl - 3 - methoxygona - 1,3,5(10)-trien-17β-ol (3.1 g.); ultraviolet absorption peak at 279 mμ (ε 1,800).

Dissolve the crude material in ether (75 cc.), add heptane (30 cc.) and distill off the ether, filter the small amount of brown flocculent precipitate, and finally cool the filtrate to precipitate the purified product as an off-white solid (2.3 g.), M.P. 141–143° C.

This compound possesses estrogenic and blood lipid lowering activity and is useful as an intermediate for preparing the hormonal compounds of this invention.

EXAMPLE 14

13β-n-propyl-3-methoxygona-1,3,5(10)-trien-17-one

To 13β - n - propyl - 3 - methoxygona - 1,3,5(10)-trien-17β-ol (2.5 g.) in acetone (100 cc.) add anhydrous magnesium sulphate (3 g.); stir the mixture at room temperature while adding 8 N chromic acid (3.0 cc.). The temperature of the reaction mixture rises spontaneously to about 34°, then returns slowly to room temperature; stir the mixture for a total of 20 minutes, then treat with isopropanol (5 cc.) and sodium bicarbonate (5 g.), and stir for a further 10 minutes. Filter the reaction mixture and wash the insoluble material with methylene dichloride; combine and evaporate the filtrate and washings to obtain a solid yellow residue. Dissolve this residue in ether (100 cc.) and wash the solution with water, dry and evaporate. Recrystallize the crude product (2.5 g.), M.P. 108–118° C. from methanol to obtain 13β-n-propyl-3-methoxygona - 1,3,5(10) - trien - 17 - one (2.03 g.), M.P. 120–122° C.; ultraviolet absorption peak at 278.5 mμ (ε 1,900).

Calculated for $C_{21}H_{28}O_3$ (percent): C, 80.7; H, 9.0. Found (percent): C, 80.65; H, 9.0.

This compound possesses estrogenic and blood lipid lowering activity and is useful as an intermediate for preparing the hormonal compounds of this invention.

EXAMPLE 15

13β-isopropyl-3-methoxygona-1,3,5(10)-trien-17β-ol

Add 13β - isopropyl - 3 - methoxygona - 1,3,5(10),8-tetraen-17-one (1.6 g.) in tetrahydrofuran (50 cc.) to liquid ammonia (150 cc.). Add potassium (4.5 g.) in portions and stir the mixture for 2 hours, and then add ammonium acetate to destroy excess metal, followed by water. Work up with ether to obtain a yellow gum. Dissolve the gum in benzene and chromatograph on activated alumina; elute with benzene containing a small proportion of ether to obtain a fraction which yields 13β-isopropyl-3-methoxygona-1,3,5(10)-trien-17β-ol (0.92 g.) as a colorless uncrystallizable gum, ultraviolet absorption peak at 285 mμ (ε 2,000).

This compound possesses estrogenic and blood lipid lowering activity and is useful as an intermediate for preparing the hormonal compounds of this invention.

EXAMPLE 16

13β-isopropyl-3-methoxygona-1,3,5(10)-trien-17-one

Add 8 N chromic acid (1.5 cc.) to a swirled solution of 13β - isopropyl - 3 - methoxygona - 1,3,5(10) - trien-17β-ol (0.9 g.) in acetone (100 cc.) and after 1 minute add methanol (5 cc.) and remove most of the solvent by evaporation. Add water and work up the product with ether to obtain a yellow gum (0.85 g.). Chromatograph on activated alumina to yield a colorless uncrystallizable gum showing infrared absorption consistent with the structure of 13β-isopropyl-3-methoxygona-1,3,5(10)-trien-17-one.

This compound possesses estrogenic and blood lipid lowering activity and is useful as an intermediate for preparing the hormonal compounds of this invention.

EXAMPLE 17

13β-n-butyl-3-methoxygona-1,3,5(10)-trien-17β-ol

To 13 - n - butyl - 3 - methoxygona - 1,3,5(10),8-tetraen-17β-ol (0.8 g.) in aniline (20 cc.) and tetrahydrofuran (10 cc.) add liquid ammonia (100 cc.), followed by sodium (0.8 g.) in small pieces during 5 minutes while stirring the mixture. After a further 15 minutes stirring, discharge the blue color with solid ammonium chloride. Work up the product with ether in the usual way, and evaporate the resulting ether solution to leave as residue as a gum; take this up in hot methanol (10 cc.), filter a little insoluble material and allow the solution to stand for 12 hours at 0° C. Crystals of 13-n-butyl-3-methoxygona-1,3,5(10)-trien-17β-ol are deposited and filtered off (0.6 g.), M.P. 123–125° C. after previous softening and a little melting at 60–70° C.; ultraviolet absorption peak at 278 mμ (ε 2,100); infrared absorption peaks at 2.86–2.97 (broad band), 6.21, 7.94, 9.62μ.

This compound possesses estrogenic and blood lipid lowering activities and is useful as an intermediate for preparing the hormonal compounds of this invention.

EXAMPLE 18

13-n-butyl-3-methoxygona-1,3,5(10)-trien-17-one

To a solution of 13-n-butyl-3-methoxygona-1,3,5(10)-trien-17β-ol (0.34 g.) in acetone (50 cc.) containing anhydrous magnesium sulphate (1 g.) add 8 N aqueous chromic acid solution, dropwise, until the solution has a permanent yellowish color. Add isopropanol (10 cc.) and remove most of the acetone present under reduced pressure; add water and work up with ether in the usual way to obtain, on recrystallization from ethanol 13β-n-butyl-3-methoxygona - 1,3,5(10) - trien - 17 - one (0.27 g.), M.P. 97–99° C., in the form of fine needles or flat rods; infrared absorption peaks at 5.78, 8.07, 9.66μ.

This compound possesses estrogenic and blood lipid lowering activity and is useful as an intermediate for preparing the hormonal compounds of this invention.

EXAMPLE 19

13β-isobutyl-3-methoxygona-1,3,5(10)-trien-17β-ol

Add a solution of 13β-isobutyl-3-methoxy-1,3,5(10), 8-tetraen-17β-ol (17.0 g.) in dry tetrahydrofuran (125 cc.; distilled) slowly to a mixture of liquid ammonia (680 cc., distilled), aniline (85 cc., distilled) and tetrahydrofuran (125 cc.) with stirring. Then add lithium (7.9 g.) in small portions. After the addition of lithium is completed, stir the blue mixture for another 3 hours. Discharge the blue color by the cautious addition of ammonium chloride followed by warm (50°) water. Extract the crude product with benzene. Wash the extracts with water, hydrochloric acid, (20%) sodium bicarbonate, water and dry. Evaporate the solvent in vacuo to obtain a gum which on crystallization from ether-petroleum ether gives 13β - isobutyl-3-methoxygona - 1,3,5(10)-trien-17β-ol (13.0 g.; 76%); M.P. 103–104° C.; ultraviolet absorption peak at 2.78 mμ (ε 1,975); infrared absorption peak at 2.83μ.

This compound possesses estrogenic and blood lipid lowering activity and is useful as an intermediate for preparing the hormonal compounds of this invention.

EXAMPLE 20

13β-ethyl-3-hydroxygona-1,3,5(10)-trien-17-one

Fuse 13β-ethyl-3-methoxygone - 1,3,5(10) - trien - 17-one (0.5 g.) and pyridine hydrochloride (5 g.) together under nitrogen for 40 minutes. Take up the cooled melt in methanol (10 cc.), pour into water (100 cc.) and work up by means of ether to obtain a solid. Recrystallize from 95% aqueous ethanol to obtain crystalline 13β-ethyl-3-hydroxygona-1,3,5(10)-trien-17-one; M.P. 232–233° C., which shows a change of crystalline form between 190° C. and 200° C.

This compound possesses estrogenic and blood lipid lowering activity and is useful as an intermediate for preparing the hormonal compounds of this invention.

EXAMPLE 21

13β-ethyl-3-methoxygona-1,3,5(10)-trien-17β-ol

To 13β-ethyl-3-methoxygona-1,3,5(10), 8-tetraen-17β-ol (16.8 g.) dissolved in a mixture of aniline (150 cc.) and tetrahydrofuran (50 cc.) add liquid ammonia (400 cc.). Add lithium metal (6.0 g.) gradually in small pieces during 10 minutes, and stir the blue suspension obtained. After 2 hours, add ammonium chloride (50 g.) to the reaction mixture until a clear solution is obtained; then add water (600 cc.) and ether-extract the mixture. Evaporate the washed and dried extracts to obtain as residue a crystalline solid. Recrystallize from hexane (300 cc.), to obtain 13β-ethyl-3-methoxygona-1,3,5(10)-trien-17β-ol (14 g.), M.P. 126–30°.

This compound possesses estrogenic and blood lipid lowering activity and is useful in an intermediate for preparing the hormonal compounds of this invention.

To obtain 13β-cetyl-3-methoxygona - 1,3,5(10) - trien-17β-ol treat 13β-cetyl - 3 - methoxygona - 1,3,5(10),8-tetraen-17β-ol with lithium and aniline in liquid ammonia according to the manipulative procedure described above.

To obtain 7,13β-dimethyl-3,methoxygona - 1,3,5(10)-trien-17β-ol treat 7,13β-dimethyl-3-methoxygona - 1,3,5 (10), 8-tetraen-17β-ol with lithium and aniline in liquid ammonia according to the manipulative procedure described above.

To obtain 13β-ethyl-2,3-dimethoxygona - 1,3,5(10)-trien-17β-ol treat 13β-ethyl-2,3-dimethoxygone - 1,3,5 (10),8-tetraen-17β-ol with lithium and aniline in liquid ammonia according to the manipulative procedure described above.

To obtain 13β-ethyl-1,3-dimethoxygona - 1,3,5(10)-trien-17β-ol treat 13β-ethyl-1,3-dimethoxygona-1,3,5(10), 8-tetraen-17β-ol with lithium and aniline in liquid ammonia according to the manipulative procedure described above.

To prepare 13β-ethyl-3-ethoxygona - 1,3,5(10)-trien-17β-ol treat 13β-ethyl-3-ethoxygona - 1,3,5(10),8-tetraen-17β-ol with lithium and aniline in liquid ammonia according to the manipulative procedure described above.

To prepare 13β-phenethyl-3-propoxygona - 1,3,5(10)-trien-17β-ol treat 13β-phenethyl-3-propoxygona - 1,3,5 (10,8-tetraen-17β-ol with lithium and aniline in liquid ammonia according to the manipulative procedure described above.

To prepare 13β-isobutyl-3-pentyloxygona - 1,3,5(10)-trien-17β-ol treat 13β-isobutyl-3-pentyloxygona - 1,3,5 (10),8-tetraen-17β-ol with lithium and aniline in liquid ammonia according to the manipulative procedure described above.

To prepare 13β-(3-hydroxypropyl - 3 - cyclopentyloxygona-1,3,5(10)-trien-17β-ol treat 13β-(3-hydroxypropyl)-3-cyclopentyloxygona-1,3,5(10),8-tetraen - 17β - ol with lithium and aniline in liquid ammonia according to the manipulative procedure described above.

To obtain 13β-(3-dimethylaminopropyl) - 3 - methoxygona-1,3,5(10),8-trien-17β-ol treat 13β - (3 - dimethylaminopropyl)-3-methoxygona - 1,3,5(10),8 - tetraen-17β-ol with lithium and aniline in liquid ammonia according to the manipulative procedure described above.

These compounds possess estrogenic and blood lipid lowering activity and are useful as intermediates for preparing the hormonal compounds of this invention.

EXAMPLE 22

13β-ethylgona-1,3,5(10)-trien-3,17β-diol

Heat 13β-ethyl-3-hydroxygona - 1,3,5(10) -trien-17-one (0.32. g.) with sodium borohydride (0.13 g.) in ethanol (25 cc.) under reflux for 20 minutes. Cool the reaction mixture, acidify with glacial acetic acid and evaporate to dryness. Take up the residue in ether (50 cc.) and water, and wash and dry the separated ethereal layer. Evaporate the solvent to obtain the crude product (0.33 g.), and recrystallize from aqueous methanol and subsequently from anhydrous methanol to obtain 13β-ethylgona-1, 3,5(10)-trien-3,17β-diol (0.14 g.) as shining white needles, M.P. 190–3°; infrared absorption peaks at 2.86–3.23 (broad band), 9.48, 9.71μ with no band due to ketone absorption.

This compound possesses estrogenic and blood lipid lowering activity and is useful as an intermediate for preparing the hormonal compounds of this invention.

EXAMPLE 23

13β-n-propyl-3-hydroxygona-1,3,5(10)-trien-17-one

Shake 13-n-propyl-3-hydroxygona - 1,3,5(10),9(11)-tetraen-17-one (0.17 g.) in ethanol (30 cc.) with hydrogen at atmospheric pressure in the presence of a 30% palladized charcoal catalyst (0.09 g.) until hydrogenation ceases (8 hours). Filter and evaporate the solution to obtain a colorless crystalline solid. Recrystallize from ethanol, to obtain 13β-n-propyl-3-hydroxygona - 1,3,5(10)-trien-17-one (0.083 g.), M.P. 206–12°; ultraviolet absorption peak at 281 mμ (ε 2050); infrared absorption peaks at 3.06, 5.85, 6.21, 8.21μ.

This compound possesses estrogenic and blood lipid lowering activity and is useful as an intermediate for preparing the hormonal compounds of this invention.

EXAMPLE 24

13β-n-propyl-3-hydroxygona-1,3,5(10)-trien-17-one

Fuse 13β - n - propyl - 3 - methoxygona - 1,3,5(10)-trien-17-one (0.5 g.) and pyridine hydrochloride (10.7 g.) together under nitrogen for 1 hour at 205–19°. Two phases are present during the first 50 minutes, after which the mixture becomes a homogeneous. Mix the cooled product with ether (50 cc.) and water; separate the ether phase and ether extract the aqueous phase; wash the combined extracts with acid to remove pyridine, dry and evaporate. Recrystallize the residue (0.48 g.), M.P. 211–20°, from methanol, to obtain 13β-n-propyl-3-hydroxygona-1,3,5-(10)-trien-17-one (0.24 g.), M.P. 221–3°.

This compound possesses estrogenic and blood lipid lowering activity and is useful as an intermediate for preparing the hormonal compounds of this invention.

EXAMPLE 25

13β-n-propylgona-1,3,5(10)-trien-3,17β-diol

Gently reflux 13β-n-propyl-3-hydroxygona-1,3,5(10)-trien-17-one (0.17 g.) in ethanol (20 cc.) and sodium borohydride (0.09 g.) for 15 minutes. Add acetic acid (0.3 cc.) to the cooled solution and remove the solvent under reduced pressure; add ether (50 cc.) and water (25 cc.) and separate, wash and dry the ether layer. Evaporate to a gum which crystallizes on addition of methylene dichloride. Recrystallize from a mixture of ethyl acetate and light petroleum to obtain 13β-n-propyl-gona-1,3,5(10)-trien-3,17β-diol (0.10 g.), M.P. 183–6°, ultraviolet absorption peak at 281 mμ (ε 2,000); infrared absorption peaks at 2.92, 3.06, 6.19, 6.32, 9.62μ.

This compound possesses estrogenic and blood lipid lowering activity and is useful as an intermediate for preparing the hormonal compounds of this invention.

EXAMPLE 26

13β-n-butyl-3-hydroxygona-1,3,5(10)-trien-17-one

Heat 13β - n - butyl-3-methoxygona-1,3,5(10)-trien-17-one (0.2 g.) with pyridine hydrochloride at 210° (3 g.) in an atmosphere of nitrogen for 40 minutes. Dissolve the cooled product in aqueous methanol, add more water and extract the mixture with ether. Evaporate the washed and dried ether extracts to a gum which partially crystallizes. Take up the material in a mixture of equal volumes of benzene and ether (20 cc.) and extract with Claisen alkali; acidify the aqueous extract with hydrochloric acid and reextract with ether. Work up the ether extracts to obtain on evaporation a crystalline residue; recrystallize from a mixture of light petroleum and ethyl acetate to obtain 13β-n-butyl-3-hydroxygona-1,3,5(10)-trien-17-one (0.045 g.), M.P. 174–6°; infrared absorption peaks at 2.99, 3.05 (broad band), 5.83μ.

This compound possesses estrogenic and blood lipid lowering activity and is useful as an intermediate for preparing the hormonal compounds of this invention.

EXAMPLE 27

13β-n-butyl-3-methoxygona-1,3,5(10)-trien-17-one

Shake 13β - n - butyl - 3 - methoxygona-1,3,5(10),9-tetraen-17-one (0.065 g.) in ethanol (8 cc.) and benzene (2 cc.) in an atmosphere of hydrogen with a 10% palladized charcoal catalyst (0.05 g.) until hydrogen uptake ceases. Filter the catalyst and evaporate the solvent to obtain a gum, which readily crystallizes on seeding with the product of another example. Recrystallize the material from a ethanol to obtain 13β-n-butyl-3-methoxygona-1,3,5(10)-trien-17-one.

This compound possesses estrogenic and blood lipid lowering activity and is useful as an intermediate for preparing the hormonal compounds of this invention.

EXAMPLE 28

13β-n-propyl-3-hydroxy-1,3,5(10)-trien-17-one

Reflux 13β - n - propyl - 3 - methoxy - 17,17 - ethylene dioxygona-1,3,5(10)-triene (0.50 g.) in piperidine (3.5 cc.) with sodamide (1.0 g.) under nitrogen for 5 hours. Cool, and pour the reaction mixture onto crushed ice, acidify the resulting solution with 2 N sulphuric acid and extract the mixture with ether. Wash the ether extracts with water and then extract with Claisen alkali (potassium hydroxide, 35 g.; water, 25 cc.; and methanol, 100 cc.). Acidify the alkaline extracts with 2 N sulphuric acid, reextract with ether, and evaporate the washed and dried ether solution of product. Recrystallize the yellow residue obtained from aqueous methanol, to obtain 13β-n-propyl-3-hydroxygona-1,3,5(10)-trien-17-one (0.3 g.), M.P. 209–12°.

This compound possesses estrogenic and blood lipid lowering activity and is useful as an intermediate for preparing the hormonal compounds of this invention.

EXAMPLE 29

13β-n-propyl-3-methoxygona-1,3,5(10)-trien-17-one

Wash the ether solution remaining after extraction of the solution in the previous example with Claisen alkali with water, dry and evaporate. Recrystallize the residue (0.3 g.) from methanol, to obtain 13β-n-propyl-3-methoxygona - 1,3,5(10) - trien - 17 - one (0.2 g.), M.P. 115–8°; ultraviolet absorption peak at 278–80 mμ (ε 1900).

This compound possesses estrogenic and blood lipid lowering activity and is useful as an intermediate for preparing the hormonal compounds of this invention.

EXAMPLE 30

13β,17α-diethyl-3-methoxygona-1,3,5(10)-trien-17β-ol

Shake 13β - ethyl - 3 - methoxy - 17α - ethylgona-1,3,5(10),9-tetraen-17β-ol (0.3 g.) in ethanol (10 cc.) with 10% palladized charcoal (0.3 g.) in an atmosphere of hydrogen until uptake ceases [(25 cc.) absorbed]. Filter the catalyst and remove the solvent and recrystallize the residue from ethanol to obtain 13β,17α-diethyl-3-methoxygona-1,3,5(10)-trien-17β-ol (0.11 g.), M.P. 160–161° C.

This compound has estrogenic activity, and is useful as an intermediate for preparing the hormonal compounds of this invention.

EXAMPLE 31

13β-ethyl-3,17β-dimethoxygona-1,3,5(10)-triene

Add diazomethane (from 2.05 g. N-nitrosomethylurea) in methylene chloride (40 cc.) with stirring to 13β-ethyl - 3 - methoxygona-1,3,5(10)-trien-17β-ol (1 g.) in methylene chloride (50 cc.) containing 2 drops of boron trifluoride etherate. After stirring for 5 minutes filter the mixture and wash the filtrate with sodium bicarbonate, water and brine, and then dry. Recrystallize the product twice from methanol to obtain 13β - ethyl - 3,17β - dimethoxygona-1,3,5(10)-triene (.65 g.), M.P. 100–101°.

Calc'd for $C_{21}H_{30}O_2$ (percent): C, 80.2; H, 9.6. Found (percent): C, 80.5; H, 9.6.

This compound has estrogenic activity, lowers the blood lipid level, and is useful as an intermediate for preparing the hormonal compounds of this invention.

EXAMPLE 32

113β-n-propyl-3,17β-dimethoxygona-1,3,5(10)-triene

Methylate 13β-n-propyl - 3 - methoxygona - 1,3,5(10)-trien-17β-ol (1 g.) in methylene chloride (50 cc.) with diazomethane as previously described. Recrystallize the product from ethanol (30 cc.) to obtain 13β-n-propyl-3,17β-dimethoxygona-1,3,5(10)-triene (0.6 g.), M.P. 138°; untraviolet absorption peak at 278 mμ (ε 2,300).

Calc'd for $C_{22}H_{32}O_2$ (percent): C, 80.4; H, 9.8. Found: C, 80.2; H, 9.8.

This compound has estrogenic acivity, lowers the blood lipid level, and is useful as an intermediate for preparing the hormonal compounds of this invention.

EXAMPLE 33

113β-ethyl-3-methoxy-17β-acetoxygona-1,3,5(10)-triene

Add 13β-ethyl-3-methoxygona-1,3,5(10)-trien-17β - ol (1. g.) in pyridine (4 cc.) to acetic anhydride (2 g.) in benzene (4 cc.) and allow the mixture to stand at room temperature for 18 hours. Add water and extract the mixture with ether. Wash, dry and evaporate the ethereal solution to obtain as residue and recrystallize from methanol to afford 13β-ethyl-3-methoxy-17β-acetoxygona-1,3,5(10)-triene, 0.8 g., M.P. 130–1°; ultraviolet absorption peak at 278 mμ (ε 2,000), 286 mμ (ε 1800).

This compound has estrogenic acivity, lowers the blood lipid level, and is useful as an intermediate for preparing the hormonal compounds of this invention.

To obtain 13β - ethyl - 3-methoxy-17β-propionoxygona-1,3,5(10)-triene, treat 13β - ethyl-3-methoxygona - 1,3,5 (10)-trien-17β-ol with propionic anhydride and pyridine according to the manipulative procedure described above.

To obtain 13β - ethyl-2,3-dimethoxy-17β-acetoxygona-1,3,5(10) - triene, treat 13β-ethyl-2,3-dimethoxygona-1,3,5(10)-trien-17β-ol with acetic anhydride in pyridine according to the manipulative procedure described above.

To obtain 13β-ethyl - 1,3 - dimethoxy-17β-propionoxy gona-1,3,5(10)-triene, treat 13β-ethyl-1,3-dimethoxygona-1,3,5(10)-trien-17β-ol with propionic anhydride in pyridine according to the procedure described above.

To obtain 13β-ethyl-3-etoxy - 17β - acetoxygona-1,3,5 (10)-triene, treat 13β-ethyl-3-ethoxygona-1,3,5(10)-trien-17β-ol with acetic anhydride in pyridine according to the manipulative procedure described above.

To obtain 13β-phenethyl-3-propoxy-17β - propionoxygona-1,3,5(10)-triene, treat 13β - phenethyl-3-propoxygona-1,3,5(10)-trien-17β-ol with propionic anhydride and pyridine according to the manipulative procedure described above.

To obtain 13β-isobutyl-3-pentyloxy-17β-acetoxygona-1,3,5(10)-triene, treat 13β-isobutyl-3-penthyloxygona-1,3, 5(10)-trien-17β-ol with acetic anhydride and pyridine according to the manipulative procedure described above.

To obtain 13β-(3-propionoxypropyl)-3-cyclopentyloxy-17β-propionoxygona-1,3,5(10) - triene, treat 13β-(3-hydroxypropyl)-3-cyclopentyloxygona - 1,3,5(10) - trien- 17β-ol with propionic anhydride in pyridine according to the manipulative procedure described above.

To obtain 13β - (3-dimethylaminopropyl)-3-methoxy-17β-acetoxygona-1,3,5(10)-triene, treat 13β-(3-dimethylaminopropyl)-3-methoxygona-1,3,5(10)-trien-17β-ol with acetic anhydride in pyridine according to the manipulative procedure described above.

To obtain 13β-ethyl-2,3-diethoxy-17β-acetoxygona-1,3,5(10)-triene, treat 13β-ethyl-2,3-diethoxygona-1,3,5(10)-trien-17β-ol with acetic anhydride according to the manipulative procedures described above.

To obtain 13β-ethyl-1,3-diethoxy-17β-propionoxygona-1,3,5(10)-triene, treat 13β-ethyl-1,3-dimethoxygona-1,3,5(10-trien-17β-ol with propionyl chloride according to the manipulative procedures described above.

To obtain 13β - propyl-3-ethoxy-17β-acetoxygona-1,3,5-(10)-triene, treat 13β-propyl-3-ethoxygona - 1,3,5(10)-trien-17β-ol with acetic anhydride according to the manipulative procedures described above.

To obtain 13β-phenethyl-3-pentoxy - 17β-propionoxygona-1,3,5(10)-triene, treat 13β-phenethyl-3-pentoxygona-1,3,5(10)-trien-17β-ol with propionyl chloride according to the manipulative procedures described above.

To obtain 13β-isobutyl-3-butoxy-17β-acetoxygona-1,3,5(10)-triene, treat 13β-isobutyl-3-butoxygona-1,3,5(10)-trien-17β-ol with acetic anhydride according to the manipulative procedures described above.

To obtain 13β-(3-diethylaminopropyl)-3-methoxy-17β-acetoxygona-1,3,5(10)-triene, treat 13β-(3-diethylaminopropyl)-3-methoxygona-1,3,5(10)-trien-17β-ol with acetic anhydride according to the manipulative procedures described above.

These compounds have estrogenic activity, lower the blood lipid level, and are useful as intermediates in the preparation of the hormonal compounds of this invention.

EXAMPLE 34

13β-ethyl-3-methoxy-17,17-diethoxygona-1,3,5(10)-triene

Heat 13β - ethyl-3-methoxygona-1,3,5(10)-trien-17-one (1 g.) in ethanol, ethyl orthoformate (1 cc.) and concentrated sulphuric acid (1 drop) at 40° for 30 minutes. Add ethyl orthoformate (0.5 cc.) and heat the mixture at 55° for a further 30 minutes. Dilute the cooled solution with saturated aqueous sodium bicarbonate and collect the product in ether. Wash, dry and evaporate the ethereal solution, take up the residue in a little benzene and filter through a column of alumina (50 g.) with hexane-benzene (4:1). Evaporate the solvent to obtain 13β-ethyl-3-methoxy-17,17-diethoxygona-1,3,5(10)-triene.

This compound has estrogenic activity, lowers the blood lipid level, and is useful as an intermeditae for preparing the hormonal compounds of this invention.

EXAMPLE 35

13β-ethyl-3-methoxy-17,17-ethylenedioxygona-1,3,5(10)-triene

Reflux 13β-ethyl-3-methoxygona-1,3,5(10) - triene-17-one (3 g.) with toluene-p-sulphonic acid (0.3 g.), dry toluene (105 cc.) and ethylene glycol (3 cc.) for 19 hours. Distill off toluene (65 cc.) over 1½ hours, cool the residue, dilute with ether (35 cc.), wash with water, saturated aqueous sodium hydrogen carbonate, brine, and dry (MgSO₄). Remove the solvent under reduced pressure, dissolve the residue in benzene (20 cc.) and filter through alumina (50 g.) with hexane-benzene (4:1). Remove the solvent and recrystallize the product from ethanol to obtain 13β-ethyl-3-methoxy-17,17-ethylenedioxygona - 1,3,5 (10)-triene (2.4 g.), 69%, M.P. 90–92°; ultraviolet absorption peak at 278 mμ (ε 2,200); infrared absorption peak at 3.4, 6.2, 6.35, 6.69μ.

This compound has estrogenic activity, lowers the blood lipid level, and is useful as an intermediate for preparing the hormonal compounds of this invention.

EXAMPLE 36

13β-ethyl-3-methoxy-17,17-propylenedioxygona-1,3,5(10)-triene

Reflux 13β-ethyl - 3 - methoxygona-1,3,5(10),8,14-pentaen-17-one (2 g.) in benzene (75 cc.) and propane-1,3-diol (1 cc.) with toluene-p-sulphonic acid (200 mg.) for 16 hours. Dilute the cooled solution with ether, wash, dry, and evaporate and filter the residue through Florisil (100 g.) with hexane-benzene (4:1). Evaporate the solvent to obtain 13β-ethyl-3-methoxy-17,17-propylenedioxygona-1,3,5(10),8,14-pentaene; ultraviolet absorption peak at 312 mμ (ε 27,500). Shake this product (0.7 g.) in benzene (50 cc.) with prehydrogenated 2% palladium on calcium carbonate (0.4 g.) in an atmosphere of hydrogen until absorption of hydrogen almost ceases (uptake 50 cc.). Filter the catalyst and evaporate the solvent and obtain 13β - ethyl-3-methoxy-17,17-propylenedioxygona-1,3,5(10),8-tetraene; ultraviolet absorption peak at 278 mμ (ε 14,700). Add this product (0.4 g.) in tetrahydrofuran (10 cc.) to liquid ammonia (50 cc.) and stir for 10 minutes, and then decompose by the addition of solid ammonium chloride. Add water and take up the product in ether. Wash the ethereal solution with ice-cold 10% hydrochloric acid to remove the aniline, then immediately with water, saturated aqueous sodium bicarbonate, brine, and dry. Remove the solvent by evaporation to obtain 13β-ethyl-3-methoxy - 17,17 - propylenedioxygona-1,3,5(10)-triene; ultraviolet absorption peak at 278 mμ (ε 2,000), 286 mμ (ε 1,750).

This compound has estrogenic and blood lipid lowering activity and is useful as an intermediate for preparing the hormonal compounds of this invention.

EXAMPLE 37

13β-ethyl-3-methoxy-17,17-ethylenedioxygona-1,3,5(10)-triene

Reflux 13β-ethyl - 3 - methoxygona-1,3,5(10)-triene-17-one (3 g.) in dry toluene (105 cc.) with toluene-p-sulphonic acid (300 mg.) and ethylene glycol (3 cc.) for 19 hours. Distill the solvent (65 cc.) over a period of 1½ hours. Cool the residue, dilute with ether, wash, dry, and evaporate and dissolve the residue in benzene (20 cc.) and filter through a column of alumina with hexane-benzene (4:1). Evaporate the eluates and recrystallize the residue to obtain the title compound (2.5 g.), M.P. 88–89° C.; ultraviolet absorption peak at 278 mμ (ε 2,200); infrared absorption peak at 3.4, 6.2μ, and 6.35μ.

This compound has estrogenic and blood lipid lowering activity and is useful as an intermediate for preparing the hormonal compounds of this invention.

To obtain 13β-isopropyl - 3 - methoxy-17,17-ethylenedioxygona-1,3,5(10)-triene treat 13β-isopropyl-3-methoxygona-1,3,5(10)-trien-17-one with ethyleneglycol according to the manipulative procedure described abope.

To obtain 13β-cetyl - 3 - methoxy-17,17-ethylenedioxygona-1,3,5(10)-triene treat 13β-cetyl - 3 - methoxygona-1,3,5(10)-trien-17-one with ethyleneglycol according to the manipulative procedure described above.

To obtain 13β-isobutyl-3-pentoxy-17,17-ethylenedioxygona-1,3,5(10)-triene treat 13β-isobutyl-3-pentoxygona-1,3,5(10)-trien-17-one with ethyleneglycol according to the manipulative procedure described above.

To obtain 7,13β-dimethyl-3-methoxy-17,17-ethylenedioxygona-1,3,5(10)-triene treat 7,13β-dimethyl-3-methoxygona-1,3,5(10)-trien-17-one with ethyleneglycol according to the manipulative procedure described above.

To obtain 13β-methyl-17,17-ethylenedioxygona-1,3,5 (10)-trien-3-ol treat 13β-methylgona-1,3,5(10)-trien-3-ol-17-one with ethyleneglycol according to the manipulative procedure described above.

To obtain 13β-ethyl - 2,3 - dimethoxy-17,17-ethylenedioxygona-1,3,5(10)-triene treat 13β-ethyl-2,3-dimethoxygona-1,3,5(10)-trien-17-one with ethyleneglycol according to the manipulative procedure described above.

These compounds have estrogenic and blood lipid lowering activities and are useful as intermediates in the preparation of the hormonal compounds of this invention.

EXAMPLE 38

13β-ethyl-3-methoxy-17,17-propylenedioxygona-1,3,5(10)-triene

Reflux 13β-ethyl-3-methoxygona-1,3,5(10)-trien-17-one (2 g.) in benzene (75 cc.) and propane-1,3-diol (1 cc.) with toluene-p-sulphonic acid (200 mg.) for 16 hours. Dilute the cooled solution with ether, wash, dry and evaporate and filter the residue through alumina (80 g.) with hexane-benzene (4:1). Evaporate the solvent to obtain 13β-ethyl - 3 - methoxy - 17,17 - propylenedioxygona-1,3,5(10)-triene; ultraviolet absorption peak at 278 m$\mu$ ($\epsilon$ 2,000), 286 m$\mu$ ($\epsilon$ 1,800).

This compound has estrogenic activity, lowers the blood lipid level, and is useful as an intermediate for preparing the hormonal compounds of this invention.

To obtain 13β-isopropyl-3-methoxy-17,17-ethylenedioxygona-1,3,5(10)-trien-17-one with excess ethylene glycol in benzene in the presence of toluene-p-sulphonic acid according to the manipulative procedure described above.

To obtain 13-β-cetyl - 3 - methoxy-17,17-ethylenedioxygona-1,3,5(10)-triene treat 13β-cetyl-3-methoxygona-1,3,5(10)-trien-17-one with ethylene glycol in benzene in the presence of toluene-p-sulphonic acid according to the manipulative procedure described above.

To obtain 13β - ethyl-2,3-dimethoxy-17,17-ethylenedioxygona-1,3,5(10)-triene treat 13β-ethyl-2,3-dimethoxygona-1,3,5(10)-trien-17-one with ethylene glycol and toluene-p-sulphonic acid in benzene according to the manipulative procedure described above.

To prepare 13β-isobutyl-3-pentyloxy-17,17-ethylenedioxygona-1,3,5(10)-triene treat 13β-isobutyl-3-pentyloxygona-1,3,5(10)-trien-17-one with ethylene glycol and toluene-p-sulphonic acid in benzene according to the manipulative procedure described above.

These compounds have estrogenic activity, lower the blood lipid level, and are useful as intermediates in the preparation of the hormonal compounds of the invention.

EXAMPLE 39

13β-n-propyl-3-methoxy-17,17-ethylenedioxygona-1,3,5(10)-triene

Add 13β-n-propyl-3-methoxy-17,17-ethylenedioxygona-1,3,5(10),8-tetraene (0.90 g.) in aniline (20 cc.) to liquid ammonia (50 cc.) to the clear solution obtained add in small pieces lithium metal (0.12 g.) with stirring. Keep the solution for 2 hours, retaining the ammonia by the use of an acetone-solid carbon dioxide cooled condenser. Add ammonium chloride (5 g.) followed by water (100 cc.); work up the product in the usual way with ether, to obtain a residue which is steam-distilled to remove aniline completely. Take up the residue in ether and evaporate the dried ethereal solution to an oil. Crystallize from light petroleum to obtain 13β-n-propyl-3-methoxy-17,17-ethylenedioxygona - 1,3,5(10) - triene (0.4 g.), M.P. 113–4°; ultraviolet absorption peak at 279 m$\mu$ ($\epsilon$ 2,000).

This compound has estrogenic activity, lowers the blood lipid level, and is useful as an intermediate for preparing the hormonal compounds of this invention.

EXAMPLE 40

D-homo-13β-methyl-3-methoxy-17aα-ethynylgona-1,3,5 (10)-triene-17aβ-ol

Add D - homo - 13β-methyl-3-methoxygona-1,3,5(10)-trien-17a-one (0.6 g.) in dimethylacetamide (5 cc.) to a stirred suspension of lithium acetylide (0.5 g.) in dioxane (2.5 cc.)-ethylenediamine (0.1 cc.)-dimethylacetamide (2.5 cc.) in an atmosphere of acetylene. After stirring for 20 hours pour the mixture onto crushed ice (15 g.) and extract with benzene. Evaporate the washed and dried extracts to obtain a residue. Take up in benzene and chromatograph on alumina to obtain D-homo-3-methoxy-13β-methyl-17aα-ethynylgona-1,3,5(10)-trien-17aβ-ol; infrared absorption peaks at 2.90, 3.03$\mu$.

This compound has estrogenic activity, and is useful as an intermediate for preparing compounds which have hormonal activity.

EXAMPLE 41

D-homo-13β-methyl-3-methoxy-17aα-ethylgona-1,3,5 (10)-trien-17aβ-ol

Hydrogenate D-homo-13β-methyl-3-methoxy-17aα-ethynylgona-1,3,5(10)-trien-17aβ-ol (0.5 g.) in dry dioxane (20 cc.) at atmospheric pressure over a 5% palladized charcoal catalyst until uptake of hydrogen ceases. Filter and remove the solvent to obtain D-homo-13β-methyl-3-methoxy-17aα-ethylgona-1,3,5(10)-trien-17aβ-ol; infrared absorption peak at 2.87$\mu$.

This compound has estrogenic activity and is useful as an intermediate for preparing compounds which have hormonal activity.

To obtain D-homo-13β,17aα-diethyl-3-methoxygona-1,3,5(10)-trien-17aβ-ol hydrogenate D-homo-13β-ethyl-3-methoxy - 17aα - ethynylgona - 1,3,5(10)-trien-17aβ-ol according to the manipulative procedure described above.

This compound has estrogenic activity, and is useful as an intermediate for preparing the hormonal compounds of this invention.

EXAMPLE 42

13β-ethyl-3-methoxy-17α-methylgona-1,3,5(10)-trien-17β-ol

Add slowly with stirring to a solution 13β-ethyl-3-methoxygona-1,3,5(10)-trien-17-one (1.0 g.) in benzene (50 cc.) an ether solution of methyl magnesium bromide (from magnesium, 0.9 g.) under nitrogen. Reflux the mixture for 4 hours and pour onto ice, acidify with hydrochloric acid. Separate the aqueous layer and ether extract. Wash, dry and evaporate the combined organic solutions and take up the residue in benzene (20 cc.) and chromatograph on neutral alumina; elute with benzene, and then with benzene containing a little chloroform to obtain a crystalline product and then rechromatograph on alumina; recrystallize the product from methanol to obtain 13β - ethyl - 3-methoxy-17α-methylgona-1,3,5(10)-trien-17β-ol; (0.9 g.), M.P. 142–5°; ultraviolet absorption peak at 279 m$\mu$ ($\epsilon$1,950); infrared absorption peak at 2.88$\mu$.

Calc'd for $C_{21}H_{30}O_2$ (percent): C, 80.2; H, 9.6. Found (percent): C, 80.5; H, 9.4.

This compound has estrogenic activity, and is useful as an intermediate for preparing the hormonal compounds of this invention.

To obtain 13β-n-butyl-3-methoxy-17α-methylgona-1,3,5(10)-trien-17β-ol treat 13β-in-butyl-3-methoxygona-1,3,5(10)-trien-17-one with excess methyl magnesium bromide according to the manipulative procedure described above.

To obtain 13β - cetyl-3-methoxy-17α-methylgona-1,3,5 (10) - trien - 17β-ol treat 13β-cetyl-3-methoxygona-1,3,5 (10)-trien-17-one with excess methyl magnesium bromide according to the manipulative procedure described above.

To obtain 13β,6,17α - trimethyl - 3 - methoxygona-1,3,5 (10)-trien-17β-ol treat 13β,6-dimethyl-3-methoxygona-1, 3,5(10)-trien-17-one with excess methyl magnesium bromide according to the manipulative procedure described above.

To obtain 13β,7,17α - trimethyl - 3 - methoxygona-1,3,5 (10)-trien-17β-ol treat 13β,7-dimethyl-3-methoxygona-1, 3,5(10)-trien-17-one with excess methyl magnesium bromide according to the manipulative procedure described above.

To obtain 13β-ethyl-2,3-dimethoxy-17α-methylgona-1, 3,5(10)-trien-17β-ol treat 13β-ethyl-2,3-dimethoxygona-1, 3,5(10)-trien-17-one with excess methyl magnesium bromide according to the manipulative procedure described above.

To obtain 13β - ethyl - 3 - ethoxy-17α-methylgona-1,3,5 (10)-trien-17β-ol treat 13β-ethyl-3-ethoxygona-1,3,5(10)-trien-17β-one with excess methyl magnesium bromide according to the manipulative procedure described above.

To obtain 13β-phenethyl-3-propoxy-17α-methylgona-1, 3,5(10)-trien-17β-ol treat 13β-phenethyl-3-propoxygona-1,3,5(10)-trien-17-one with excess methyl magnesium bromide according to the manipulative procedure described above.

To obtain 13β - (3 - hydroxypropyl)-3-cyclopentyloxy-17α - methylgona - 1,3,5(10)-trien-17β-ol treat 13β-(3-hydroxypropyl) - 3 - cyclopentyloxygona-1,3,5(10)-trien-17-one with excess methyl magnesium bromide according to the manipulative procedure described above.

To obtain 13β - (2 - diethylaminoethyl)-2,3-dimethoxy-17α - methylgona - 1,3,5(10)-trien-17α-ol treat 13β-(2-diethylaminoethyl - 2,3 - dimethoxygona-1,3,5(10)-trien-17-one with excess methyl magnesium bromide according to the manipulative procedure described above.

These compounds have estrogenic activity, and are useful as intermediates in the preparation of the hormonal compounds of this invention.

EXAMPLE 43

13β-n-propyl-3-methoxy-17α-methylgona-1,3,5(10)-triene-17β-ol

Add to a solution of 13β-n-propyl-3-methoxygona-1,3,5(10)-trien-17-one (2.14 g.) in benzene (60 cc.) slowly with stirring a 3N solution of methyl magnesium bromide in ether (25 cc.) under nitrogen. The mixture is refluxed for 44 hours, until the unreacted ketone content is negligible. Isolate by standard procedure and crystallize from methanol to obtain 13β-n-propyl-3-methoxy-17α-methylgona-1,3,5(10)-trien-17β-ol (1.76 g.), M.P. 131–134° C.; ultraviolet absorption peak at 278 m$\mu$ ($\epsilon$ 2,300); infrared absorption peak at 2.87$\mu$.

This compound possesses estrogenic activity and is useful in the preparation of the hormonal compounds of this invention.

To obtain 13β-n-butyl-3-methoxy-17α-ethynylgona-1,3,5(10)-trien-17β-ol treat 13β-n-butyl-3-methoxygona-1,3,5(10)-trien-17-one with excess lithium acetylide according to the manipulative procedure described above.

EXAMPLE 44

13β-ethyl-3-methoxy-17α-ethynylogona-1,3,5(10)-triene-17β-ol

Prepare a suspension of lithium aluminum acetylide by passing a dry stream of acetylene slowly through a saturated solution of lithium aluminum hydride (40 g.) in tetrahydrofuran (500 cc.) over a period of 18 hours. Add to a portion of this suspension (15 cc.) 13β-ethyl-3-methoxygona-1,3,5(10)-trien-17-one (0.60 g.). Shake the mixture for 5 minutes and then allow to stand for 20 hours at room temperature. Pour the product into ice-cold 10% sulphuric acid (100 cc.) containing crushed ice and extract the mixture with ether; wash, dry and evaporate the ethereal extracts to give a crystalline residue, take it up in benzene (10 cc.) and adsorb on alumina (60 g.). Elute with a mixture of benzene and light petroleum gradually increasing in benzene content to 100% benzene to obtain unchanged starting material (0.166 g.); elute further with benzene containing 10% of ether and finally with a mixture of equal volumes of benzene and ether to obtain 13β-ethyl-3-methoxy - 17α - ethynylgona-1,3,5(10)-triene-17β-ol; (0.410 g.), M.P. 148–53°; infrared absorption peaks at 2.90$\mu$ (a broad band due to hydroxyl) and 3.03$\mu$ (a methine group), with absence of ketonic absorption.

This compound has estrogenic activity, and is useful as an intermediate for preparing the hormonal compounds of this invention.

EXAMPLE 45

13β,17α-diethyl-3-methoxygona-1,3,5(10)-triene-17β-ol

Shake 13β-ethyl-3-methoxy-17α-ethynylgona-1,3,5(10)-trien-17β-ol (0.50 g.) in dry dioxane (10 cc.) in hydrogen at atmospheric pressure in the presence of a 5% palladized charcoal catalyst (0.05 g.) until uptake of hydrogen ceases. Filter and remove the solvent to obtain crystalline 13β,17α-diethyl-3-methoxygona-1,3,5(10)-trien-17β-ol; (0.495 g.), M.P. 145–9°; infrared absorption peak at 2.87$\mu$.

This compound possesses estrogenic activity, lowers the blood lipid level, and is useful as an intermediate for preparing the hormonal compounds of this invention.

To obtain 13β-n-butyl-3-methoxy-17α-ethylgona-1,3,5(10)-trien-17β-ol, hydrogenate 13β-n-butyl-3-methoxy-17α-ethynylgona-1,3,5(10)trien-17β-ol according to the manipulative procedure described above.

To obtain 13β-cetyl-3-methoxy-17α-ethylgona-1,3,5(10)-trien-17β-ol, hydrogenate 13β-cetyl-3-methoxy-17α-ethynylgona-1,3,5(10)-trien-17β-ol according to the manipulative procedure described above.

To obtain 13β,6-dimethyl-3-methoxy - 17α - ethylgona-1,3,5(10) - trien - 17β - ol, hydrogenate 13β,6-dimethyl-3-methoxy-17α-ethynylgona-1,3,5(10)-trien-17β-ol according to the manipulative procedure described above.

To obtain 13β,7-dimethyl-3-methoxy-17α-ethylgona-1,3, 5(10) - trien - 17β - ol, hydrogenate 13β,7 - dimethyl-3-methoxy-17α-ethynylgona-1,3,5(10)-trien-17β-ol according to the manipulative procedure described above.

To obtain 13β,17α-diethyl-2,3-dimethoxygona-1,3,5(10)-trien-17β-ol, hydrogenate 13β-ethyl - 2,3 - dimethoxy-17α-ethynylgona-1,3,5(10)-trien-17β-ol according to the manipulative procedure described above.

To obtain 13β,17α-diethyl-3-ethoxygona-1,3,5(10)-trien-17β-ol, hydrogenate 13β-ethyl-3-ethoxy-17α-ethynylgona-1,3,5(10)-trien-17β-ol, according to the manipulative procedure described above.

To obtain 13β-phenethyl-3-propoxy-17α-ethylgona-1,3,5 (10)-trien-17β-ol, hydrogenate 13β-phenethyl-3-propoxy-17α-ethynylgona-1,3,5(10)-trien-17β-ol according to the manipulative procedure described above.

To obtain 13β-(3-hydroxypropyl)-3-cyclopentyloxy-17α-ethylgona-1,3,5(10)-trien-17β-ol, hydrogenate 13β-(3-hydroxypropyl)-3-cyclopentyloxy - 17α - ethynylgona - 1,3,5 (10)-trien-17β-ol according to the manipulative procedure described above.

To obtain 13β-(2-diethylaminoethyl) - 2,3 - dimethoxy-17α-ethylgona-1,3,5(10)-trien-17β-ol, hydrogenate 13β-(2-diethylaminoethyl)-17α-ethynylgona-1,3,5(10)-trien - 17β-ol according to the manipulative procedure described above.

These compounds have estrogenic activity and are useful as intermediates in the preparation of the hormonal compounds of this invention.

EXAMPLE 46

13β,17α-diethyl-3-methoxygona-1,3,5(10)-triene-17β-ol

Add liquid ammonia (400 cc.) to 13β,17α-diethyl-3-methoxygona-1,3,5(10),8-tetraen-17β-ol (13.3 g.) in aniline (200 cc.), followed by lithium (5.0 g.) in small pieces with stirring; after stirring for 1 hour add an excess of ammonium chloride followed by water, and the extract mixture with ether. Wash the ether evtracts with water, then with 10% sulphuric acid to remove aniline completely, then again with water, followed by sodium bicarbonate solution, and finally dry. Evaporate to a crystalline residue and recrystallize from methanol to obtain 13β,17α-diethyl-3-methoxygona-1,3,5(10)-trien-17β-ol (11.1 g.), M.P. 152–5°; ultraviolet absorption peaks at 289 m$\mu$ ($\epsilon$ 1,660), 285–8 m$\mu$ ($\epsilon$ 1,480); infrared absorption peak at 2.90$\mu$.

This compound has estrogenic activity and is useful as an intermediate for preparing the hormonal compounds of this invention.

EXAMPLE 47

13β-ethyl-17α-allyl-3-methoxygona-1,3,5(10)-triene-17β-ol

Add 13β-ethyl-3-methoxygona-1,3,5(10)-trien - 17 - one (0.895 g.) in a mixture of ether (40 cc.) and allyl bromide (2.9 cc.) to magnesium (0.362 g.) in allyl bromide (0.15 cc.); reflux the mixture gently for 3½ hours, cool to 5°, and add 10% ammonium chloride solution (100 cc.) gradually. Separate the ether layer, wash, dry and evaporate; recrystallize the residue from hexane to obtain 13β-ethyl-17α-allyl-3-methoxygona - 1,3,5(10) - trien - 17β-ol (0.845 g.), M.P. 126–8°; ultraviolet absorption peak at 278.5 mμ (ε 2,000); infrared absorption peaks at 10.9, 11.0μ.

This compound has estrogenic activity and is useful as an intermediate for preparing the hormonal compounds of this invention.

EXAMPLE 48

13β-ethyl-3-methoxy-17α-n-propylgona-1,3,5(10)-triene-17β-ol

Hydrogenate 13β-ethyl-3-methoxy-17α-allylgona - 1,3,5(10)-trien-17β-ol (0.87 g.) in ethanol (90 cc.) at atmospheric pressure in the presence of a 5% palladized charcoal catalyst until uptake of hydrogen ceases. Filter and evaporate the solvent to obtain a residue and crystallize from hexane to obtain 13β-ethyl-3-methoxy-17α-n-propylgona-1,3,5(10)-triene-17β-ol (0.745 g.), M.P. 123–125° C.; ultraviolet absorption peak at 279 mμ (ε 1,950).

This compound possesses estrogenic activity and is useful as an intermediate for preparing the hormonal compounds of this invention.

EXAMPLE 49

13β-n-propyl-3-methoxy-17α-ethynylgona-1,3,5(10)-triene-17β-ol

Add 13β-n-propyl-3-methoxygona - 1,3,5(10)-trien-17-one (19.4 g.) in dimethylacetamide (300 cc.) with stirring in a slow stream of acetylene to lithium acetylide (26.7 g.) in dioxane (332 cc.) and ethylenediamine (18 cc.); continue stirring at room temperature for 66 hours and then pour the reaction mixture into ice-water (3 l.). Extract the product with ether and evaporate the washed and dried extracts to a residue and then purify by chromatography in benzene on neutral alumina; elute with benzene to obtain crystalline material and then recrystallize from a mixture of acetone and hexane to obtain the title compound; (11.0 g.), M.P. 125–130°; ultraviolet absorption peak at 280 mμ (ε 1,900).

This compound has estrogenic activity, and is useful as an intermediate in the preparation of the hormonal compounds of this invention.

To obtain 13β-cetyl-3-methoxy-17α-ethynylgona-1,3,5(10)-trien-17β-ol treat 13β - cetyl-3-methoxygona-1,3,5(10)-trien-17-one with excess lithium acetylide according to the manipulative procedure described above.

To obtain 6,13β-dimethyl-3-methoxy-17α-ethynylgona-1,3,5(10)-trien-17β-ol treat 6,13β - dimethyl-3-methoxygona-1,3,5(10)-triene-17-one with excess lithium acetylide according to the manipulative procedure described above.

To obtain 7,13β-dimethyl - 3-methoxy - 17α-ethynylgona - 1,3,5(10)-triene - 17β-ol treat 7,13b-dimethyl-3-methoxygona - 1,3,5(10)-triene-17-one with excess lithium acetylide according to the manipulative procedure described above.

To obtain 13β-ethyl-3-ethoxy - 17α-ethynylgona-1,3,5 (10)-triene - 17β-ol treat 13β-ethyl - 3-ethoxygona-1,3,5 (10)-triene-17-one with excess lithium acetylide according to the manipulative procedure described above.

To obtain 13β-phenethyl-3-propoxy - 17α-ethynylgona-1,3,5(10)-trien-17β-ol treat 13β-phenethyl - 3-propoxygona - 1,3,5(10)-triene-17-one with excess lithium acetylide according to the manipulative procedure described above.

To obtain 13β-(3-hydroxypropyl) - 3-cyclopentyloxy-17α-ethynylgona - 1,3,5(10)-trien-17β-ol treat 13β-(3-hydroxypropyl) - 3-cyclopentyloxygona-1,3,5(10)-trien-17-one with excess lithium acetylide according to the manipulative procedure described above.

To obtain 13β-(2-diethylaminoethyl) - 2,3-dimethoxy-17α-ethynylgona - 1,3,5(10)-trien-17β-ol treat 13β-(2-diethylaminoethyl) - 2,3-dimethoxygona - 1,3,5(10)-trien-17-one with excess lithium acetylide according to the manipulative procedure described above.

These compounds possess estrogenic activity and are useful as intermediates for preparing the hormonal compounds of this invention.

EXAMPLE 50

13β-ethyl-2,3-dimethoxy-17α-propynylgona-1,3,5(10)-trien-17β-ol

Pass excess propyne through a solution of ethyl magnesium bromide (from ethyl bromide (11. g.) and magnesium (3 g.)) in tetrahydrofuran (150 cc.) and then add 13β-ethyl - 2,3-dimethoxygona-1,3,5(10)-trien-17-one (1 g.) in tetrahydrofuran (20 cc.). Reflux the mixture for 20 hours, cool, and decompose by carefully adding saturated aqueous ammonium chloride (200 cc.) followed by ether-benzene (1:1, 200 cc.). Separate the organic layer, wash, dry, evaporate and chromatograph on Florisil to obtain the title compound.

This compound possesses estrogenic activity and is useful as an intermediate for preparing the hormonal compounds of this invention.

EXAMPLE 51

13β-n-propyl-3-methoxy-17α-ethylgona-1,3,5(10)-triene-17β-ol

Add lithium (2.0 g.) in small pieces to 13β-n-propyl-3-methoxy-17α-ethylgona - 1,3,5(10),8-tetraene - 17β-ol (1.22 g.) in a mixture of liquid ammonia (120 cc.) and aniline (65 cc.) with stirring. After discharge of the blue color, add an excess of ammonium chloride, followed by water, and extract the mixture with ether. Wash the ether extracts in turn with water, 10% sulphuric acid, and water, dry and evaporate. Obtain a crystalline residue and recrystallize from aqueous acetonitrile, to obtain the title compound (0.9 g.), M.P. 94–5°; infrared absorption peak at 2.97μ.

This compound has estrogenic activity, and is useful as an intermediate for preparing the hormonal compounds of this invention.

EXAMPLE 52

13β-n-propyl-3methoxy-17α-allylgona-1,3,5(10)-trien 17β-ol

Reflux magnesium (.97 g.) with allyl bromide (0.57 g.) in ether (about 50 cc.) and then add dropwise 13β-n-propyl - 3-methoxygona - 1,3,5-(10)-triene-17-one (2.5 g.) in ether (100 cc.) and allyl bromide (10.8 g.) (30 minutes). Stir the mixture and reflux for a further 4 hours and then add ether (30 cc.). Add the cooled mixture to aqueous ammonium chloride and extract the product with ether. Evaporate the washed and dried extracts to a gum and recrystallize from methanol to obtain the title compound (2.5 g.); ultraviolet absorption peak at 280 mμ (ε 2,000); infrared absorption peaks at 2.83, 6.10, 11.1μ.

Calculated for $C_{24}H_{34}O_2$ (percent): C, 81.3; H, 9.1. Found (percent): C, 81.0; H, 9.1.

This compound has estrogenic activity, and is useful as an intermediate for preparing the hormonal compounds of this invention.

EXAMPLE 53

13β,17α-di-n-propyl-3-methoxygona-1,3,5(10)-trien-17α-ol

Hydrogenate 13β-n-propyl-3-methoxy - 17α-allylgona-1,3,5(10)-trien-17β-ol (2.34 g.) in ethanol (50 cc.) at atmospheric pressure using a 5% palladized charcoal catalyst (1 g.). Recrystallize the product from methanol to obtain the title compound, M.P. 85–94°; ultraviolet absorption peak at 280 mµ (ε 1,700); infrared absorption peak at 2.90µ.

This compound has estrogenic activity, and is useful as an intermediate for preparing the hormonal compounds of this invention.

EXAMPLE 54

13β-n-butyl-3-methoxy-17α-ethylgona-1,3,5(10)-trien-17β-ol

Add lithium (1.5 g.) in small pieces, with stirring to 13β-n-butyl - 3-methoxy - 17α-ethylgona - 1,3,5(10),8-tetraen-17-ol (2.2 g.) in a mixture of liquid ammonia (110 cc.) and aniline (70 cc.); after stirring for 2 hours, add an excess of ammonium chloride, followed by water. Work up the product to obtain a red gum and crystallize from methanol; boil the crystalline material with methanol (20 cc.) and then allow the mixture to stand at room temperature for 15 hours. Filter to obtain the crude title compound (1.57 g.), contaminated with a small amount of starting material, M.P. 70–85°; ultraviolet absorption peak at 278 mµ (ε 3,300); infrared absorption peak at 3.07µ.

This compound has estrogenic activity, and is useful as an intermediate for preparing the hormonal compounds of this invention.

EXAMPLE 55

13β-ethyl-3-methoxy-17α-ethynyl-17β-acetoxygona-1,3,5(10)-triene

Shake 13β - ethyl - 3 - methoxy - 17β - ethynylgona-1,3,5(10) - triene - 17β - ol (1.1 g.) with acetic anhydride (10 cc.) for 5 minutes. Add toluene-p-sulphonic acid (0.3 g.) and shake the solution until homogeneous. After 12 hours, decompose the reaction mixture by stirring with water (30 cc.) containing a few drops of pyridine for 30 minutes. Extract the mixture with ether and wash the ethereal solution with water, 2 N aqueous sodium hydroxide, water, dilute hydrochloric acid, brine, and dry. Evaporate the solvent and dissolve the crystalline product in benzene (ca. 5 cc.) and filter through a short column of alumina (ca. 10 g.). Evaporate the solvent and recrystallize the product from methanol-ethyl acetate to obtain the title compound, M.P. 178–182°; infrared absorption peak at 3.03, 5.78µ.

This compound has estrogenic activity, and is useful as an intermediate for preparing the hormonal compounds of this invention.

EXAMPLE 56

13β-ethyl-3-methoxy-17α-dibromoacetyl-17β-acetoxygona-1,3,5(10)-triene

Dissolve 13β - ethyl - 3 - methoxy - 17α - ethynyl - 17β-acetoxygona - 1,3,5(10 - triene (0.6 g.) in tertiary butanol (25 cc.) and water (0.4 cc.) and add N-bromoacetamide (0.55 g.). Allow the mixture to stand for 15 hours then add water (10 cc.), cool to 0° and allow to stand for 3 hours. Filter the precipitated product, wash with aqueous methanol and dry to obtain the title product (0.72 g.), M.P. 85–92°.

This compound is useful as an intermediate for preparing the hormonal compounds of this invention.

EXAMPLE 57

13β-ethyl-3-methoxy-17α-acetyl-17β-acetoxygona-1,3,5(10)-triene

Heat 13β - ethyl - 3 - methoxy - 17α - dibromoacetyl-17β - acetoxygona - 1,3,5(10) - triene (0.7 g.) in acetic acid (27 cc.) and water (2.7 cc.) with sodium acetate (0.7 g.) and zinc dust (0.99 g.) at 100° for 15 minutes with stirring. Filter the mixture, add water to the filtrate and filter the precipitated product. Dry the residue and recrystallize from ethyl acetate-methanol to obtain the title product (0.25 g.), M.P. 144–8°; infrared absorption peaks at 5.8, 5.9µ.

This compound is useful as an intermediate for preparing the hormonal compounds of this invention.

EXAMPLE 58

17,17-ethylenedioxy-3-methoxy-13β-methylgona-1,3,5(10)-triene

Reflux 3 - methoxy - 13β - methylgona - 1,3,5(10),8-tetraen - 17 - one (1.4 g.) in benzene (70 cc.) and ethylene glycol (1 cc.) with toluene-p-sulfonic acid (0.065 g.) for 16 hours. Wash the cooled solution with sodium bicarbonate solution, water, and dry. Evaporate the organic solution and recrystallize the residue from methanol to obtain a solid (1.24 g.). Dissolve this solid (0.9 g.) in tetrahydrofuran (35 cc.) and aniline (4 cc.) and add the solution to liquid ammonia (100 cc.). To the stirred solution add sodium (0.9 g.) portionwise, and after 15 minutes decompose by adding solid ammonium chloride followed by water. Add benzene-ether (1:1, 75 cc.) and separate the organic layer. Wash, dry and evaporate and filter the residue in benzene (5 cc.) through a column of neutral alumina (20 g.) with benzene-hexane (3:7). Recrystallize the product from ethanol to obtain the title compound (0.82 g.), M.P. 128–130°.

Calculated for $C_{21}H_{28}O_3$ (percent): C, 76.8; H, 8.6. Found (percent): C, 76.5; H, 8.59.

This compound has estrogenic activity, lowers the blood lipid level, and is useful as an intermediate for preparing compounds which have hormonal activity.

EXAMPLE 59

17β-bromoacetoxy-13β-methyl-3-methoxgona-1,3,5(10)-triene

Dissolve 3 - methoxy - 13β - methylgona - 1,3,5(10)-trien - 17 - ol (2.12 g.) in benzene (10 cc.) and pyridine (1.2 cc.). Cool and add dropwise, with stirring, a solution of bromoacetyl bromide (2.59 g.) in benzene (7 cc.). Allow to stand overnight at room temperature. Pour into water and extract with benzene-ether (1:1) (20 cc. ×5). Combine the extracts, wash successively with dilute hydrochloric acid, water and brine, dry ($Na_2SO_4$), and evaporate the solvents and crystallize the residue from hexane to obtain the title compound (1.65 g.), M.P. 123–5°; infrared absorption peaks (KBr) at 5.69, 6.22, and 6.33µ.

Calculated for $C_{21}H_{37}O_3Br$ (percent): C, 61.91; H, 6.68; Br, 19.62. Found (percent): C, 62.20; H, 6.55; Br, 19.00.

This compound is useful as an intermediate for preparing compounds which have hormonal activity.

EXAMPLE 60

13β-methylgona-1,3,5(10)-trien-3,17β-diol

Suspend 13β-methyl-3-hydroxygona-1,3,5(10)-trien-17-one (4.0 g.) in methanol (250 cc.), add 10% aqueous sodium hydroxide (3.5 cc.) and sodium borohydride (3.5 g.). After reflux has ceased, stir for 1 hour and add water (400 cc.). Filter and dry the precipitated solid and recrystallize from aqueous ethanol to obtain the title compound as a hydrate (3.5 g.), M.P. 155–160°. Dissolve the compound in ethyl acetate-benzene and remove the solvent and then recrystallize the residue from ethyl acetate-hexane to obtain the title compound (1.65 g.) M.P. 195–6°; infrared absorption peaks at 2.88, 3.12, 6.19, 6.58µ.

Calculated for $C_{18}H_{24}O_2$ (percent): C, 79.37; H, 8.88. Found (percent): C, 79.14; H, 8.8.

This compound has estrogenic activity, lowers the blood lipid level, and is useful as an intermediate for preparing compounds which have hormonal activity.

EXAMPLE 61

3-benzyloxy-13$\beta$-ethylgona-1,3,5(10)-trien-17-one

Dissolve 13$\beta$ - ethylgona - 1,3,5(10) - trien - 3 - ol-17-one (500 mg.) and benzyl bromide (1 cc.) in ethanol (25 cc.). Add potassium carbonate (1.13 g.) and heat under reflux for 4 hours. Add water (6 cc.), cool the mixture in ice, and filter. Recrystallize from aqueous ethanol to obtain the title compound (437 mg.), M.P. 116–117.5°; ultraviolet absorption peaks at 277 m$\mu$ ($\epsilon$ 2270) and 284.5 m$\mu$ ($\epsilon$ 2080). Recrystallize to obtain a product with M.P. 125.5–128°.

Calculated for $C_{26}H_{30}O$ (percent): C, 83.38; H, 8.07. Found (percent): C, 83.21; H, 7.95.

This compound has estrogenic activity and is useful as an intermediate for preparing compounds which have hormonal activity.

EXAMPLE 62

3-benzyloxy-13$\beta$-ethylgona-1,3,5(10)-trien-17$\beta$-ol

Dissolve 3-benzyloxy-13$\beta$-ethylgona - 1,3,5(10) - trien-17-one (7.0 g.) and sodium borohydride (2.5 g.) in ethanol (120 cc.). Heat the solution under reflux for 2 hours. Evaporate to dryness under reduced pressure, add water and ether to the residue, and acidify with dilute hydrochloric acid. Separate the ethereal layer, wash successively with aqueous potassium bicarbonate and brine, dry (MgSO$_4$) and evaporate to dryness. Recrystallize from ethanol to obtain the title compound (5.8 g., 83%), M.P. 123–124°.

This compound has estrogenic activity and is useful as an intermediate for preparing compounds which have hormonal activity.

EXAMPLE 63

3-benzyloxy-13$\beta$-ethylgona-1,3,5(10)-trien-17$\beta$-ol

Dissolve sodium (0.2 g.) in ethanol (20 cc.) and add 13$\beta$ - ethylgona - 1,3,5(10) - trien - 3,17$\beta$-diol (1.74 g.). Heat under reflux for 15 min. Cool, add benzyl bromide (5 cc.) and heat again under reflux for 5 hours. Add water and extract the product with ether (2× 50 cc.). Combine the ethereal extracts, wash successively with 2 N sodium hydroxide, water, and brine, dry (MgSO$_4$) and evaporate the solvent to obtain a brown gum. Elute from a Florisil column with benzene. Crystallize the eluate from methanol to obtain the title compound (0.25 g.), M.P. 120.5–121°; ultraviolet absorption peaks at 277 m$\mu$ ($\epsilon$ 2150) and 288.5$\mu$ $\epsilon$ 1920).

Calculated for $C_{26}H_{32}O_2$ (percent): C, 82.93; H, 8.57. Found (percent): C, 82.89; H, 8.34.

This compound has estrogenic activity and is useful as an intermediate for preparing compounds which have hormonal activity.

EXAMPLE 64

17,17-ethylenedioxy-13$\beta$-ethylgona-1,3,5(10)-trien-3-ol

Reflux 13$\beta$-ethylgona - 1,3,5(10) - trien - 3-ol-17-one (309 mg.), toluene-p-sulfonic acid (22 mg.), redistilled ethylene glycol (2.0 cc.) and toluene (30 cc.) under reflux, with stirring, for 7 days. Cool, add water, and separate the toluene layer. Wash successively with saturated potassium bicarbonate and brine. Remove the water (MgSO$_4$) and evaporate to dryness. Recrystallize from aqueous methanol to obtain the title compound (150 mg.), M.P. 173–5°. Recrystallize twice more from aqueous methanol to obtain 121 mg., M.P. 181.3–5°; ultraviolet absorption peaks at 279 m$\mu$ ($\epsilon$ 2100) and 284 m$\mu$ ($\epsilon$ 1930) (shoulder).

Calculated for $C_{21}H_{28}O_3$ (percent): C, 76.79; H, 8.59. Found (percent): C, 76.57; H, 8.56.

This compound has estrogenic activity, lowers the blood lipid level, and is useful as an intermediate for preparing compounds which have hormonal activity.

EXAMPLE 65

3-acetoxy-17,17-ethylenedioxy-13$\beta$-ethylgona-1,3,5(10)-triene

Dissolve 17,17 - ethylenedioxy - 13$\beta$ - ethylgona - 1,3,5 (10)-trien-3-ol (460 mg.) in pyridine (3 cc.) and acetic anhydride (2 cc.). Keep the solution at room temperature for 16 hours, then evaporate to dryness under reduced pressure. Take up the residue twice in ethanol and evaporate to dryness, and recrystallize the resulting solid twice from ethanol to obtain the title compound (243 mg.), M.P. 89–90°; ultraviolet absorption peaks at 267 m$\mu$ ($\epsilon$ 755) and 274.5 m$\mu$ ($\epsilon$ 720).

Calculated for $C_{23}H_{30}O_4$ (percent): C, 74.56; H, 8.16. Found (percent): C, 74.32; H, 8.10.

This compound has estrogenic activity, lowers the blood lipid level, and is useful as an intermediate for preparing compounds which have hormonal activity.

EXAMPLE 66

3-benzyloxy-17,17-ethylenedioxy-13$\beta$-ethylgona-1,3,5(10)-triene

Reflux benzene (25 cc.), ethylene glycol (10 cc.) and toluene-p-sulfonic acid monohydrate (30 mg.) under a Dean-Stark head for 30 minutes. Add 3 - benzyloxy-13$\beta$-ethylgona-1,3,5(10)-trien-17-one (80 mg.) and stir the mixture under reflux for 70 hours. Cool, add water, and separate the benzene layer. Wash successively with saturated potassium bicarbonate and brine. Dry (MgSO$_4$) and evaporate to dryness. Recrystallize from aqueous methanol to obtain the title compound (60.7 mg., 68%), M.P. 110–111°; ultraviolet absorption peaks at 277 m$\mu$ ($\epsilon$ 1680) and 285.5 m$\mu$ ($\epsilon$ 1510).

Calculated for $C_{28}H_{32}O_3$ (percent): C, 80.34; H, 8.19. Found (percent): C, 80.10; H, 8.16.

This compound has estrogenic activity, lowers the blood lipid level, and is useful as an intermediate for preparing compounds which have hormonal activity.

EXAMPLE 67

3-acetoxy-13$\beta$-ethylgona-1,3,5(10)-trien-17-one

Heat 13$\beta$-ethylgona-1,3,5(10) - trien - 3 - ol - 17 - one (0.898 g.) with pyridine (5.0 cc.) and acetic anhydride (3.0 cc.) at 100° for 90 minutes. Remove the solvents under reduced pressure, dissolve the residue in ethanol and evaporate to dryness to obtain the title compound (1.072 g.) M.P. 164–167°. Recrystallize from ethanol to obtain a pure sample M.P. 172.5–173.5°.

Calculated for $C_{21}H_{26}O_3$ (percent): C, 77.27; H, 8.03. Found (percent): C, 76.94; H, 7.90.

This compound has estrogenic activity and is useful as an intermediate for preparing compounds which have hormonal activity.

EXAMPLE 68

17,17-ethylenedioxy-13$\beta$-ethylgona-1,3,5(10)-trien-3-ol

Dissolve 3 - benzyloxy - 17,17 - ethylenedioxy - 13$\beta$-ethylgona-1,3,5(10)-triene (0.734 g.) in ethanol (300 cc.) containing 10% palladised charcoal (0.5 g.) and hydrogenate at atmospheric pressure until hydrogen uptake ceases (75 cc. absorbed). Filter the catalyst, evaporate the solvent and recrystallize the residue from aqueous methanol to obtain the title compound (0.408 g.) M.P. 172–174°.

This compound has estrogenic activity, lowers the blood lipid level, and is useful as an intermediate for preparing compounds which have hormonal activity.

EXAMPLE 69

3-cyclopentyloxy-13β-ethylgona-1,3,5(10)trien-17-one

Dissolve 13β - ethylgona - 1,3,5(10) - trien - 3 - ol - 17-one (0.8 g.) and bromocyclopentane (1.8 cc.) in ethanol (40 cc.). Add potassium carbonate and heat under reflux for 7 hours. Cool, add water (20 cc.), and extract with ether. Wash the ethereal extract successively with aqueous 2 N sodium hydroxide, water, and brine. Dry (MgSO$_4$) and evaporate to obtain a red gum. Partially crystallize by allowing to stand under methanol for several days and recrystallize the resulting solid twice from methanol to obtain the title compound as colorless prisms (0.155 g.), M.P. 129.5–130.5°; ultraviolet absorption peaks at 278 mμ ε 2090) and 286.5 mμ (ε 1880).

Calculated for C$_{24}$H$_{32}$O$_2$ (percent): C, 81.77; H, 9.15. Found (percent): C, 81.60; H, 9.02.

This compound has estrogenic activity and is useful as an intermediate for preparing compounds which have hormonal activity.

EXAMPLE 70

3-cyclopentyloxy-13β-ethylgona-1,3,5(10)-trien-17β-ol

Treat 3 - cyclopentyloxy-13β-ethylgona-1,3,5(10)-trien 17-one (2.2 g.) with sodium borohydride (1.1 g.) in ethanol (100 cc.) and heat the mixture under reflux for 2 hours. Evaporate to dryness under reduced pressure. Add water and ether to the residue and acidify with dilute hydrochloric acid. Separate the ethereal layer, wash successively with aqueous potassium bicarbonate and brine, dry (MgSO$_4$) and evaporate to dryness. Recrystallize from ethanol to obtain the title compound (1.83 g.), M.P. 110–111°. Recrystallize further to obtain a product with M.P. 111–112°; ultraviolet absorption peaks at 279 mμ (ε 2020) and 287 mμ (ε 1770).

Calculated for C$_{24}$H$_{33}$O$_2$ (percent): C, 81.31; H, 9.67. Found (percent): C, 81.07; H, 9.77.

This compound has estrogenic activity and is useful as an intermediate for preparing compounds which have hormonal activity.

EXAMPLE 71

3-allyloxy-13β-ethylgona-1,3,5(10)-trien-17-one

Dissolve allyl bromide (0.5 cc.), 13β-ethylgona-1,3,5 (10)-trien-3-ol-17-one (1.02 g.), and sodium ethoxide (from sodium, 102 mg.) in ethanol (10 cc.) and heat the mixture under reflux for 22 hours. Evaporate to dryness under reduced pressure and extract the residue into diisopropyl ether, wash successively with water and brine, dry (MgSO$_4$), and evaporate, to obtain a red gum (1.1 g.). Crystallize three times from methanol (once with charcoal) to obtain the title compound as pale pink needles (416 mg.), M.P. 92.5–94°; ultraviolet absorption peaks at 277 mμ (ε 2470) and 285 mμ (ε 2210).

Calculated for C$_{22}$H$_{28}$O$_2$ (percent): C, 81.44; H, 8.70. Found (percent): C, 81.58; H, 8.57.

This compound has estrogenic activity, lowers the blood lipid level, and is useful as an intermediate for preparing compounds which have hormonal activity.

EXAMPLE 72

13β-ethyl-3-propoxygona-1,3,5(10)-trien-17-one

Dissolve 3 - allyloxy-13β-ethylgona-1,3,5(10)-trien-17-one (196 mg.) in ethanol (15 cc.) containing 10% palladized charcoal (100 mg.) and hydrogenate at atmospheric pressure until hydrogen uptake ceases (1.26 moles). Filter the catalyst, evaporate the solvent, and recrystallize from methanol to obtain the title compound as fine white needles (145 mg.), M.P. 93.5°; ultraviolet absorption peaks at 277.5 mμ (ε 2230) and 285.5 mμ (ε 1945).

Calculated for C$_{22}$H$_{30}$O$_2$ (percent): C, 80.93; H, 9.26. Found (percent): C, 80.62; H, 9.06.

This compound has estrogenic activity and is useful as an intermediate for preparing compounds which have hormonal activity.

EXAMPLE 73

3-ethoxy-13β-ethylgona-1,3,5(10)-trien-17-one

Mix 13β-ethylgona-1,3,5(10)-trien-3-ol-17-one (805 mg.), ethyl iodide (5 cc.), and potassium carbonate (400 mg.) in ethanol (40 cc.) and reflux the mixture for 16 hours. Evaporate to dryness, take up in ether-ethyl acetate, and wash successively with 2 N sodium hydroxide, water, and brine. Remove the water (MgSO$_4$), and evaporate to dryness. Recrystallize the residue twice from methanol to obtain the title compound as fine white needles (300 mg.), M.P. 168.5–170°; ultraviolet absorption peaks at 278 mμ (ε 2150) and 285 mμ (ε 1870).

Calculated for C$_{21}$H$_{28}$O$_2$ (percent): C, 80.73; H, 9.03. Found (percent): C, 80.31; H, 8.81.

This compound has estrogenic activity, lowers the blood lipid level, and is useful as an intermediate for preparing compounds which have hormonal activity.

EXAMPLE 74

3-ethoxy-13β-ethylgona-1,3,5(10)-trien-17β-ol

Disoslve 3 - ethoxy-13β-ethylgona-1,3,5(10)-trien-17-one (1.6 g.) and sodium borohydride (714 mg.) in ethanol (50 cc.) and heat the mixture under reflux for 1.5 hours. Evaporate most of the solvent, add water, and extract with ether. Wash, dry and evaporate the ethereal solution and recrystallize the residue from ethanol to obtain the title compound (1.44 g.), M.P. 112–114°; ultraviolet absorption peaks at 277.5 mμ (ε 2220) and 285.5 mμ (ε 1915).

Calculated for C$_{21}$H$_{30}$O$_2$ (percent): C, 80.21; H, 9.62. Found (percent): C, 80.30; H, 9.46.

This compound has estrogenic activity, lowers the blood lipid level, and is useful as an intermediate for preparing compounds which have hormonal activity.

EXAMPLE 75

17β-acetoxy-13β-ethylgona-1,3,5(10)-triene

Heat 13β-ethylgona-1,3,5(10)-trien-17β-ol (400 mg.) at 100° for 1 hour with acetic anhydride (1 cc.) and pyridine (2 cc.). Pour into water, extract with ether, wash the ethereal extract with water, dry (MgSO$_4$), and evaporate the solvent. Recrystallize the residue from methanol to obtain the title compound (366 mg.), M.P. 112–113°; ultraviolet absorption peaks at 272.5 mμ (log 2.71), 265 mμ (log 2.71), and 259 mμ (log 2.58) (shoulder).

Calculated for C$_{21}$H$_{28}$O$_2$ (percent): C, 80.73; H, 9.03. Found (percent): C, 80.55; H, 8.96.

This compound is useful as an intermediate for preparing compounds which have hormonal activity.

EXAMPLE 76

13β-ethyl-3-heptoxygona-1,3,5(10)-trien-17-one

Dissolve 13β-ethylgona - 1,3,5(10) - trien-3-ol-17-one (2.0 g.) and sodium ethoxide (from sodium 222 mg.) in ethanol (30 cc.) and add n-heptyl bromide (5 cc.). Heat the mixture under reflux for 16 hours. Evaporate to dryness, take up the residue in ethyl acetate, and wash successively with water, 2 N sodium hydroxide, water, and brine. Remove water (MgSO$_4$) and evaporate to dryness. Recrystallize from ethanol containing charcoal to obtain the title compound as pale pink needles. (1.15 g.), M.P. 105–107°. Recrystallize twice to obtain a product with M.P. 107.5–108°; ultraviolet absorption peaks at 274.5 mμ (ε 2220) and 282.5 mμ (ε 1985).

Calculated for C$_{26}$H$_{38}$O$_2$ (percent): C, 81.62; H, 10.01. Found (percent): C, 81.47; H, 9.75.

This compound has estrogenic activity and is useful as an intermediate for preparing compounds which have hormonal activity.

EXAMPLE 77

13β-ethyl-3-heptoxygona-1,3,5(10)-trien-17β-ol

Dissolve 13β - ethyl - 3-heptoxygona-1,3,5(10)-trien-17-one (708 mg.) and sodium borohydride (250 mg.) in ethanol (10 cc.) and heat under reflux for 1.5 hours. Add water to the cooled solution and extract with ether. Wash, dry and evaporate the ethereal solution and recrystallize the residue from ethanol to obtain the title compound (619 mg.), M.P. 99.5–101°; ultraviolet absorption peaks at 278 mμ (ε 2150) and 286 mμ (ε 1900).

Calculated for $C_{26}H_{40}O_2$ (percent): C, 81.20; H, 10.48. Found (percent): C, 81.33; H, 10.20.

This compound has estrogenic activity and is useful as an intermediate for preparing compounds which have hormonal activity.

EXAMPLE 78

3-p-nitrobenzyloxy-13β-ethylgona-1,3,5(10)-trien-17-one

Dissolve 13β - ethylgona - 1,3,5(10) - trien-3-ol-17-one (3 g.) and n-nitrobenzyl bromide (7.5 g.) in ethanol 150 cc.). Add potassium carbonate (6.8 g.) and heat under reflux for 4 hours. Add water (125 cc.) and cool the mixture in ice. Filter off the resulting pale yellow solid. Recrystallize from aqueous tetrahydrofuran to obtain the title compound (4.3 g.) M.P. 214.8° dec.; ultraviolet absorption peak at 270 mμ (ε 12,900).

Calculated for $C_{26}H_{29}NO_4$ (percent): C, 74.44; H, 6.97; N, 3.34. Found (percent): C, 74.34; H, 7.14; N, 3.20.

This compocnd has estrogenic activity and is useful as an intermediate for preparing compounds which have hormonal activity.

EXAMPLE 79

3-p-nitrobenzyloxy-13β-ethylgona-1,3,5(10)-trien-17β-ol

Dissolve 3 - nitrobenzyloxy - 13β - ethylgona - 1,3,5(10)-trien-17-one (4.3 g.) in tetrahydrofuran (250 cc.). Add a solution of sodium borohydride (1.6 g.) in tetrahydrofuran (60 cc.) and water (60 cc.). Thoroughly shake the mixture and then allow it to stand at room temperature for 2 days. Evaporate the tetrahydrofuran under reduced pressure and add dilute hydrochloric acid to the residue. Extract with ethyl acetate, combine the extracts, wash successively with water and brine, dry (MgSO$_4$) and evaporate to dryness. Recrystallize the residue from aqueous tetrahydrofuran to obtain the title compound (2.8 g.) M.P. 214–217°; ultraviolet absorption peak at 270 mμ (ε 12,400).

Calculated for $C_{26}H_{31}NO_4$ (percent): C, 74.08; H, 7.41; N, 3.32. Found (percent): C, 73.83; H, 7.76; N, 3.51.

This compound has estrogenic activity and is useful as an intermediate for preparing compounds which have hormonal activity.

EXAMPLE 80

13β-ethylgona-1,3,5(10)-trien-17β-ol

Dissolve 13β - ethylgona - 1,3,5(10) - trien - 3 - ol-17-one (3.65 g.) in tetrahydrofuran (98 cc.) and add carbon tetrachloride (36.5 cc.) to the solution. Cool to 5° and add, dropwise, redistilled diethyl phosphite (5.8 g.), then triethylamine (5.1 g.). Stir the reaction mixture at room temperature for 2 days. Wash successively with 3 N hydrochloric acid (90 cc.), 5% sodium hydroxide (3× 90 cc.), and water. Dry (MgSO$_4$) and evaporate to obtain the crude diethyl phosphate as an amber syrup. Dissolve in dry ether (90 cc.) and redistilled liquid ammonia (180 cc.). At once add, while stirring, small pieces of lithium (360 mg.), followed after 15 minutes by ethanol (10 cc.). Allow the ammonia to evaporate overnight. Add water and extract with ether. Wash the ethereal extract successively with 5% sodium hydroxide and water. Dry (MgSO$_4$) and evaporate to a colorless gum (2.6 g.). Elute from a column of Florisil with a mixture of light petroleum-benzene (1:1). Recrystallize from ether-light petroleum to obtain the title compound (0.9 g.), M.P. 112–114°; ultraviolet absorption peaks at 272.5 mμ (ε 501), 265 mμ (ε 503), and 257.5 mμ (ε 479).

Calculated for $C_{19}H_{26}O$ (percent): C, 84.39; H, 9.69. Found (percent): C, 84.37; H, 9.87.

This compound has estrogenic activity, lowers the blood lipid level, and is useful as an intermediate for preparing compounds which have hormonal activity.

EXAMPLE 81

13β-ethylgona-1,3,5(10)-trien-17-one

Dissolve 13β-ethylgona-1,3,5(10) - trien - 17β-ol (650 mg.) in purified acetone (52 cc.) and add, during 2 minutes, with stirring, a prepared solution (0.9 cc.) of chromic anhydride (6.6 g.) and concentrated sulfuric acid (5.4 cc.) diluted with water to 25 cc. Continue stirring 1 minute, then add solid sodium bisulfite to destroy the excess oxidizing agent. Add a saturated solution of sodium bicarbonate. Separate the acetone layer, remove water (MgSO$_4$), and evaporate to dryness, leaving a solid white residue. Recrystallize from acetone-methanol to obtain the title compound (339 mg.), M.P. 123.5–125.5°; ultraviolet absorption peaks at 272.5 mμ (ε 503) and 265 mμ (ε 501).

Calculated for $C_{19}H_{24}O$ (percent): C, 85.02; H, 8.33. Found (percent): C, 84.83; H, 8.49.

This compound has estrogenic activity, lowers the blood lipid level, and is useful as an intermediate for preparing compounds which have hormonal activity.

EXAMPLE 82

3,17β-diallyloxy-13β-ethylgona-1,3,5(10)-triene

Dissolve 13β - ethylgona - 1,3,5(10) - trien - 3;17β-diol (2.06 g.) and sodium hydride (2.0 g.) in dry xylene. Heat under reflux in an atmosphere of nitrogen, with stirring, for 2 hours. Add allyl bromide (10 cc.) and continue to reflux, with stirring, for a further 16 hours. Cool, pour into ice-water, acidify with dilute hydrochloric acid, and extract with benzene. Wash the extract with saturated potassium bicarbonate, remove water (MgSO$_4$), and evaporate to dryness in vacuo. Elute the product from a column of Grade I neutral alumina with petrol, then from a column of Florisil with benzene, to obtain the title compound as a colorless viscous oil (463 mg.); ultraviolet absorption peaks at 277 mμ (ε 1630) and 285 mμ (ε 1470).

Calculated for $C_{25}H_{34}O_2$ (percent): C, 81.92; H, 9.35. Found (percent): C, 82.28; H, 9.24.

This compound has estrogenic activity, lowers the blood lipid level, and is useful as an intermediate for preparing compounds which have hormonal activity.

EXAMPLE 83

3,17β-diethoxy-13β-ethylgona-1,3,5(10)-triene

Dissolve 13β - ethylgona 1,3,5(10) - trien - 3,17β-diol (1.33 g.) and sodium hydride (50° suspension in oil 13 g.) in dry xylene (20 cc.). Heat under reflux in an atmosphere of nitrogen, with stirring, for 2 hours. Add ethyl iodide (6 cc.) and continue to reflux, with stirring, for a further 16 hours. Cool, pour into ice-water, acidify with dilute hydrochloric acid, and extract with benzene. Wash the extract with saturated potassium bicarbonate, remove water (MgSO$_4$), and evaporate to dryness in vacuo, leaving a pale amber viscous oil, a mixture of mono- and dialkylated products. Elute from a column of Grade I neutral alumina (60 g.) successively with benzene and 2% ether-benzene. Crystallize the resulting gum (0.5 g.) from methanol to obtain the title compound, M.P. 82–86°.

Calculated for $C_{23}H_{34}O_2$ (percent): C, 80.65; H, 10.01. Found (percent): C, 80.75; H, 9.84.

This compound has estrogenic activity and is useful as an intermediate for preparing compounds which have hormonal activity.

EXAMPLE 84

17β-ethoxy-13β-ethyl-3-methoxygona-1,3,5(10)-triene

Suspend 13β-ethyl-3-methoxygona-1,3,5(10)-trien-17β-ol (5.0 g.) and sodium hydride (3.83 g. of 50% in oil) in xylene (100 cc.) and reflux for 1.5 hours under nitrogen. Add ethyl iodide (14.5 cc.) into the reaction mixture over a period of 4.5 hours, while stirring. Continue refluxing overnight. Pour the reaction mixture onto ice, acidify with 2 N hydrochloric acid, and extract with benzene. Wash the organic layer with saturated sodium bicarbonate solution, dry (MgSO₄), and evaporate the solvent. Chromatograph on alumina (neutral Grade I). Elute with benzene and evaporate to dryness. Recrystallize from methanol-water to obtain the title compound (3.0 g.), M.P. 73–76°.

Calculated for $C_{22}H_{32}O_2$ (percent): C, 80.44; H, 9.83. Found (percent): C, 80.49; H, 9.83.

The compound has estrogenic activity and is useful as an intermediate for preparing compounds which have hormonal activity.

EXAMPLE 85

17β-allyloxy-13β-ethyl-3-methoxygona-1,3,5(10)-triene

Suspend 13β-ethyl-3-methoxygona-1,3,5(10)-trien-17β-ol (5.0 g.) and sodium hydride (3.83 g. of 50% in oil) in xylene (100 cc.) and reflux for 1.5 hours under nitrogen. Add allyl iodide (14.5 cc.) into the reaction mixture over a period of 4.5 hours, while stirring. Continue refluxing overnight. Pour the reaction mixture over ice, acidify with 2 N hydrochloric acid, and extract with benzene. Wash the organic layer with saturated sodium bicarbonate solution, dry (MgSO₄), and evaporate the solvent. Chromatograph on alumina (neutral Grade I). Elute with benzene and evaporate to dryness. Recrystallize from methanol-water to obtain the title compound (3.0 g.).

This compound has estrogenic activity and is useful as an intermediate for preparing compounds which have hormonal activity.

EXAMPLE 86

13β-ethyl-3-methoxy-17β-propoxygona-1,3,5(10)-triene

Dissolve 17β-allyloxy-13β-ethyl - 3 - methoxygona - 1,3,5(10)-triene (3.0 g.) in benzene (100 cc.) containing 10% palladized charcoal (1.0 g.) and hydrogenate at atmospheric pressure until hydrogen uptake ceases. Filter off the catalyst and evaporate the solvent. Recrystallize from methanol to obtain the title compound (2.3 g.), M.P. 83–84°; ultraviolet absorption peak at 279 mμ (ε 2,010).

Calculated for $C_{23}H_{34}O_2$ (percent): C, 80.65; H, 10.01. Found (percent): C, 80.42; H, 9.80.

This compound has estrogenic activity and is useful as an intermediate for preparing compounds which have hormonal activity.

EXAMPLE 87

3-(2-dimethylaminoethoxy)-13β-ethylgona-1,3,5(10)-trien-17β-ol

Heat 13β-ethylgona-1,3,5(10)-trien-3,17β-diol (0.1 g.) with dimethylaminoethyl chloride (0.075 g.) in 10% aqueous potassium hydroxide (10 cc.) at 100° for 2 hours. Add water to the cooled solution and extract with ether. Wash the ethereal solution with water and extract with dilute hydrochloric acid. Basify the acidic extracts and extract with ether. Wash and dry the ethereal solution and a solution of hydrogen chloride in ether. Filter the precipitate and recrystallize from ethanol-ether to obtain the title compound (0.02 g.), M.P. 240–243° (dec.).

This compound has estrogenic activity, lowers the blood lipid level, and is useful as an intermediate for preparing compounds which have hormonal activity.

EXAMPLE 88

3,17β-bis-(2-diethylaminoethoxy)-13β-ethylgona-1,3,5(10)-triene

Mix 13β-ethylgona-1,3,5(10)-trien-3,17β-diol (2.0 g.) and dry xylene (50 cc.). Heat under reflux under a Dean-Stark head for 1 hour. Add sodium hydride (3.6 g.) and reflux, with stirring, for 2 hours. Add diethylaminoethyl chloride hydrochloride (4.6 g.) and continue to reflux, with stirring, for 16 hours. Cool the reaction mixture, make alkaline with 10% sodium hydroxide, and extract twice with ether (50 cc.×2). Combine the ethereal extracts and extract with 10% acetic acid (250 cc.). Basify the acidic layer with 10% sodium hydroxide and extract the aqueous mixture with ether. Wash the ethereal extracts with water, dry (MgSO₄), and evaporate to dryness in vacuo. Dissolve the residue (a light brown gum) in dry ether. While stirring, pass a slight excess of dry hydrogen chloride into the solution. Wash the resulting white precipitate by decantation with dry ether. Recrystallize from ethanol-ether to obtain the title compound as the dihydrochloride, a hygroscopic white solid (1.9 g.), M.P. 193–199°; ultraviolet absorption peaks at 275 mμ (ε 1,585) and 283 mμ (ε 1,500).

Calculated for $C_{31}H_{54}N_2O_2Cl_2 \cdot 2H_2O$ (percent): C, 62.69; H, 9.84. Found (percent): C, 62.13; H, 9.70.

This compound has estrogenic activity, lowers the blood lipid level, and is useful as an intermediate for preparing compounds which have hormonal activity.

EXAMPLE 89

3,17β-bis-(2-dimethylaminoethoxy)-13β-ethylgona-1,3,5(10)-triene

Mix 13β-ethylgona-1,3,5(10)-trien-3,17β-diol (1.09 g.) and dry xylene (50 cc.), and reflux under a Dean-Stark trap for 1 hour. Add sodium hydride (1.8 g.) and reflux, with stirring, for 2 hours. Add dimethylaminoethyl chloride hydrochloride (2.32 g.) and continue to reflux, with stirring, for 16 hours. Cool the reaction mixture, make alkaline with 10% sodium hydroxide, and extract twice with ether (50 cc.×2). Combine the ethereal extracts and extract with 10% acetic acid (250 cc.). Basify the acidic layer with 10% sodium hydroxide and extract the aqueous mixture with ether. Wash the ethereal extracts with water, dry, and evaporate to dryness in vacuo. Dissolve the residue in dry ether. While stirring, pass a slight excess of dry hydrogen chloride into the solution. Wash the resulting white precipitate by decantation with dry ether. Recrystallize from ethanol-ether to obtain the title compound as the dihydrochloride, a hygroscopic white solid (1.1 g.), M.P. 239–243°; ultraviolet absorption peaks at 275 mμ (ε 1,950) and 283 mμ (ε 1,850).

Calculated for $C_{27}H_{46}N_2O_2Cl_2 \cdot \frac{1}{2}H_2O$ (percent): C, 63.51; H, 9.28; N, 5.49. Found (percent): C, 63.02; H, 9.06; N, 5.75.

This compound has estrogenic activity, lowers the blood lipid level, and is useful as an intermediate for preparing compounds which have hormonal activity.

EXAMPLE 90

2-diethylaminomethyl-13-ethylgona-1,3,5(10)-trien-3-ol-17-one

Dissolve 13-ethylgona-1,3,5(10)-trien-3-ol-17-one (10 g.), diethylamine (50 cc.) and 40% aqueous formaldehyde (30 cc.) in ethanol (250 cc.) and benzene (150 cc.). Heat under reflux for 16 hours. Evaporate under reduced pressure. Dilute the residue with water and extract with ether. Extract the ethereal solution with 10% hydrochloric acid and make alkaline with ammonium hydroxide. Extract again into ether, wash with water, dry (MgSo₄) and evaporate to dryness, leaving a pale brown, semicrystalline material. Recrystallize twice from ethanol (30 cc.)

to obtain the title compound (8.1 g.) M.P. 137–138°; ultraviolet absorption peak at 286 mμ (ε 3020).

Calculated for $C_{24}H_{35}NO_2$ (percent): C, 78.00; H, 9.55; N, 3.79. Found (percent): C, 77.90; H, 9.50; N, 3.82.

To prepare the hydrochloride, dissolve the title compound (100 mg.) in ether (10 cc.) and add ethereal hydrogen chloride. Rapidly filter the resulting hygroscopic precipitate. Recrystallize from ethanol:ether to obtain the hydrochloride, M.P. 200–203° dec.

Calculated for $C_{24}H_{36}NO_2Cl$ (percent): C, 70.99; H, 8.86; Cl, 8.74. Found (percent): C, 70.97; H, 8.99; Cl, 8.83.

This compound has estrogenic activity and is useful as an intermediate for preparing compounds which have hormonal activity.

EXAMPLE 91

13β-ethyl-2-methylgona-1,3,5(10)-trien-3,17β-diol

Reflux a solution of 2-diethylaminomethyl-13β-ethylgona-1,3,5(10)-trien-3-ol-17-one (3.75 g.) and sodium borohydride (2.8 g.) in ethanol (280 cc.) for 3 hours. Evaporate the reaction mixture to dryness, add ether and extract with 2 N hydrochloric acid. Basify the acidic extract with aqueous 10% sodium hydroxide and extract with ether. Wash, dry and evaporate the ethereal extract and reflux the residue (3.0 g.) in ethanol (450 cc.) with Raney nickel (37.5 g.) with stirring for 20 hours. Filter the hot mixture, evaporate the filtrate and recrystallize the residue twice from ethanol to obtain the title compound (0.686 g.), M.P. 223.5–225°; ultraviolet absorption maximum at 282 mμ (ε 3020).

Calculated for $C_{20}H_{28}O_2$ (percent): C, 79.95; H, 9.39. Found (percent): C, 79.93; H, 9.23.

This compound has estrogenic activity and is useful as an intermediate for preparing compounds which have hormonal activity.

EXAMPLE 92

13β-ethyl-3-methoxy-2-methoxymethylgona-1,3,5(10)-trien-17-one

Dissolve 2 - diethylaminomethyl - 13β-ethylgona-1,3,5(10)-trien-3-ol-17-one (1.8 g.) in aqueous 17% potassium hydroxide (18 cc.) and methanol (70 cc.) and to the refluxing solution add dimethyl sulphate (4.4 cc.) dropwise with stirring over 25 minutes. Add more 17% potassium hydroxide (12 cc.) followed by dimethyl sulphate (2.4 cc.) dropwise over 15 minutes. Reflux for 5 hours, dilute the cooled reaction mixture with water (100 cc.) and extract with ethyl acetate (2× 200 cc.). Wash the organic solution repeatedly with dilute acetic acid (100 cc.) until pH 4, then with aqueous potassium bicarbonate (2× 150 cc.), water and brine, and dry. Evaporate to dryness and chromatograph the residue on neutral alumina. Elute with benzene-ether (97:3) to obtain the title compound (0.209 g.) and crystallize from methanol M.P. 103–105°; ultraviolet absorption maximum at 280 mμ (ε 3030).

Calculated for $C_{22}H_{30}O_3$ (percent): C, 77.15; H, 8.83. Found (percent): C, 77.15; H, 8.9.

This compound has estrogenic activity and is useful as an intermediate for preparing compounds which have hormonal activity.

EXAMPLE 93

17β-(1-ethoxycyclopentyloxy)-13β-ethyl-3-methoxygona-1,3,5(10)-triene

Add a trace of p-toluenesulfonic acid (ca. 5 mg.) to a suspension of 13β-ethyl-3-methoxygona-1,3,5(10)-trien-17β-ol (1 g.) in cyclopentanone diethyl acetal (5 cc.) and heat at 100° for 1 hr. Neutralize the cooled solution with pyridine and evaporate to dryness under reduced pressure. Recrystallize the residue from methyl acetate-hexane and then from hexane to obtain the title compound (0.5 g.) M.P. 83–86°; infrared absorption peaks at 6.22, 8.1, 8.98μ.

Calculated for $C_{27}H_{40}O_3$ (percent): C, 78.59; H, 9.77. Found (percent): C, 78.94; H, 9.29.

This compound has estrogenic activity, lowers the blood lipid level, and is useful as an intermediate for preparing compounds which have hormonal activity.

EXAMPLE 94

13β-ethyl-3-methoxy-17β-(tetrahydropyran-2-yloxy)gona-1,3,5(10)-triene

Dissolve 13β-ethyl-3-methoxygona-1,3,5(10)-trien-17β-ol (0.5 g.) in ether (10 cc.) and dihydropyran (10 cc.) and add concentrated hydrochloric acid (2 drops). Stir for 24 hours, then pour into aqueous sodium bicarbonate, separate the organic layer and wash, dry and evaporate. Crystallize the resulting crude gum from hexane to obtain the title compound (0.29 g.), M.P. 133–140°; infrared absorption peaks at 6.20, 6.35, 9.00, 9.45, 9.68, 9.88 and 10.14μ.

Calculated for $C_{25}H_{36}O_3$ (percent): C, 78.08; H, 9.44. Found (percent): C, 77.88; H, 9.54.

This compound has estrogenic activity, lowers the blood lipid level, and is useful as an intermediate for preparing compounds which have hormonal activity.

EXAMPLE 95

17β-(2-dimethylaminoethoxy)-13β-ethyl-3-methoxygona-1,3,5(10)-triene, maleate Stir a suspension of sodium amide (0.86 g.), benzene (15 cc.), and 13β-ethyl-3-methoxygona-1,3,5(10)-trien-17β-ol (3.0 g.) at 70–83° for two hours. After the addition of dimethylaminoethyl chloride hydrochloride (1.58 g.) to the cooled reaction mixture, reflux for 16 hours. Pour the reaction mixture over ice and extract with ether. Basify the aqueous layer with 15% sodium hydroxide solution and collect the material with ether to obtain 1.6 g. of crude product. Treat a solution of 1.6 g. of the crude product in cyclohexane (40 cc.) with petroleum ether (40 cc.), and filter the resulting precipitate and treat the colorless filtrate with a solution of maleic acid (1.0 g.) in acetone (50 cc.) to precipitate the title compound; M.P. 166°.

Found (percent): C, 68.77; H, 8.39; N, 2.94. $C_{28}H_{41}NO_6$ requires (percent): C, 68.96; H, 8.48; H, 2.87.

This compound has estrogenic activity, lowers the blood lipid level, and is useful as an intermediate for preparing compounds which have hormonal activity.

EXAMPLE 96

17β-(2-dimethylaminoethoxy)-13β-ethyl-3-ethoxygona-1,3,5(10)-triene maleate

Stir 3-ethoxy-13β-ethylgona - 1,3,5(10) - trien - 17β - ol (0.987 g.) and sodamide (0.273 g.) in benzene (10 cc.) at 60–70° for 2 hours under nitrogen. Cool, add dimethylaminoethyl chloride hydrochloride (0.49 g.) and heat the mixture under nitrogen at 100° for 16 hours. Pour into water, acidify with dilute hydrochloric acid, wash with ether and make alkaline with 10% sodium hydroxide. Extract twice with ether. Combine the extracts, wash with water, dry (MgSO₄), and evaporate to dryness, to obtain a pale amber gum (0.8 g.). Take up in 1:1 cyclohexane-petroleum (20 ml.), cool in a carbon-dioxide-acetone bath, and allow to warm slowly to room temperature. Filter the resultant gum and discard. Treat the filtrate with maleic acid (0.5 g.) in acetone (25 cc.), allow to stand at room temperature for 30 minutes, and filter. Recrystallize from ethanol to obtain the title compound (0.158 g.), M.P. 179–180.5°; ultraviolet absorption peaks at 277 mμ (ε 2480) and 285.5 mμ (ε 2060).

This compound has estrogenic activity, lowers the blood lipid level, and is useful as an intermediate for preparing compounds which have hormonal activity.

EXAMPLE 97

13β-ethyl-3(2-benzoyl-4-nitrophenoxy)gona-1,
3,5(10)-trien-17β-ol

Add 2-chloro-5-nitrobenzophenone (2.5 g.) to a solution of potassium hydroxide (0.7 g.) and 13β-ethylgona-1, 3,5(10)-trien-3,17β-diol (5.0 g.) in ethanol (100 cc.) and reflux the mixture for 48 hours. Reduce to low volume under reduced pressure at 25° and pour into 1 N sodium hydroxide (200 cc.). Extract the mixture with chloroform, wash the extract with water and dry. Evaporate the solvent and filter the residue through a Florex column with benzene. Evaporate the eluate and triturate the residue with ether and dry to obtain the title compound (2.35 g.), M.P. 103–108°. Dissolve the product in methylene chloride, treat with activated charcoal, filter, replace the solvent with ethyl acetate and dilute with hexane. Filter and dry to obtain the title compound containing ethyl acetate of crystallization (1.95 g.), M.P. 117–120°; infrared absorption peaks at 2.92, 5.75, 6.03μ.

Calculated for $C_{32}H_{33}O_5N.¼CH_3CO_2CH_2.CH_3$ (percent): C, 74.27; H, 6.61; N, 2.62. Found (percent): C, 74.40; H, 7.04; N, 2.6.

This compound is useful as an intermediate for preparing compounds which have hormonal activity.

EXAMPLE 98

17β-(3-benzyloxypropoxy)-13β-ethyl-3-methoxygona-1,
3,5(10)-triene

Reflux a suspension of 13β-ethyl-3-methoxygona-1,3, 5(10)-trien-17β-ol (5.0 g.) and sodium hydride (3.0 g.; 50% in mineral oil) in xylene (100 cc.) for 1 hour. Add 3-benzyloxypropyl chloride (15 cc.) and reflux for a further 5 hours. Cool the reaction mixture, add water and acidify to pH 1 with 2 N hydrochloric acid. Separate, wash, dry and evaporate the organic layer and chromatograph the residue on neutral alumina. Elute with ether to obtain the title compound as a gum.

Calculated for $C_{30}H_{40}O_3$ (percent): C, 80.31; H, 8.99. Found (percent): C, 80.45; H, 8.33.

This compound is useful as an intermediate for preparing compounds which have hormonal activity.

EXAMPLE 99

17β-isobutyloxy-17β-ethyl-3-methoxygona-1,
3,5(10)-triene

Add 1-bromo-2 methylpropane (14.5 g.) over a period of 30 minutes to a suspension of 13β-ethyl-3-methoxygona-1,3,5(10)-trien-17β-ol (5.0 g.) and sodium hydride (3.9 g.; 50% in mineral oil) in refluxing xylene and reflux for 3 hours. Cool to 25° and acidify to pH 1 with 2 N hydrochloric acid. Separate the organic layer, wash with aqueous sodium bicarbonate, water and brine, dry, and evaporate the solvent to obtain the title compound (1.1 g.), M.P. 102–103°.

Calculated for $C_{24}H_{36}O_2$ (percent): C, 80.85; H, 10.18. Found (percent): C, 80.85; H, 10.02.

This compound has estrogenic activity and is useful as an intermediate for preparing compounds which have hormonal activity.

EXAMPLE 100

3,17β-diacetoxy-13β-ethylgona-1,3,5(10)-triene

Heat 13β-ethylgona-1,3,5(10)-trien-3,17β-diol (252 mg.) at 100° for 1 hour with acetic anhydride (1 cc.) and pyridine (1.5 cc.). Pour into water, extract with ether, wash the ethereal extract with water, dry (MgSO₄), and evaporate the solvent. Recrystallize from ethanol to obtain the title compound (250 mg.), M.P. 127–128°. Recrystallize further to obtain a product with M.P. 130–131°; ultraviolet absorption peaks at 274.5 mμ (ε 940) and 267 mμ (ε 938).

Calculated for $C_{23}H_{30}O_4$ (percent): C, 74.56; H, 8.16. Found (percent): C, 74.39; H, 8.14.

This compound has estrogenic activity and is useful as an intermediate for preparing compounds which have hormonal activity.

EXAMPLE 101

13β-ethyl-3-methoxygona-1,3,5(10)-trien-17β-ol,
camphor sulphonate

Add d-camphor sulphonyl chloride (0.5 g.) to 13β-ethyl-3-methoxygona-1,3,5(10)-trien-17β-ol (0.5 g.) in pyridine (5.0 cc.) and allow the mixture to stand at 20° for 24 hours. Pour the mixture into water, extract with ether and wash the ethereal solution with dilute hydrochloric acid, brine and dry. Evaporate the solvent and triturate the residue with ether to obtain the title compound (0.775 g.), M.P, 144–147°. Recrystallize three times from acetone to obtain a sample M.P. 152–155; $[α]_D(CHCl_3)+20.9°$.

Calculated for $C_{30}H_{44}O_5S$ (percent): C, 70.01; H, 8.23; S, 6.22. Found (percent): C, 70.15; H, 8.10; S, 6.4.

This compound is useful as an intermediate for preparing compounds which have hormonal activity.

EXAMPLE 102

13β-ethyl-3-methoxygona-1,3,5(10)-trien-17β-ol,
p-toluenesulfonate

Stir a mixture of 13β-ethyl-3-methoxygona-1,3,5(10)-trien-17β-ol (5.0 g.) and p-toluenesulfonyl chloride (5.0 g.) in pyridine (50 cc.) at 20° for 20 hours. Pour into 5% aqueous potassium carbonate (200 cc.) and stir until the oil solidifies. Filter and air dry the precipitate, then dissolve in methylene chloride, treat with actuated charcoal and filter through "Celite." Boil the filtrate on a steam bath, replacing the methylene chloride with ethyl acetate and allow the solution to crystallize. Filter and dry to obtain the title compound (6.0 g.), M.P. 142–143°; infrared absorption peaks at 6.22, 6.67, 7.39, 8.53μ.

Calculated for $C_{27}H_{34}O_4S$ (percent): C, 71.33; H, 7.54; S, 7.05. Found (percent): C, 71.49; H, 7.75; S, 7.01.

This compound is useful as an intermediate for preparing compounds which have hormonal activity.

EXAMPLE 103

13β-ethyl-3-methoxygona-1,3,5(10)-trien-17β-ol,
hemisuccinate

Reflux 13β-ethyl-3-methoxygona-1,3,5(10)-trien-17β-ol (200 g.) with succinic anhydride (200 g.) in pyridine (1400 cc.) for 6 hours under nitrogen and then stir for a further 66 hours at 25°. Pour the reaction mixture into a mixture of concentrated hydrochloric acid (2000 cc.), water (2000 cc.) and ice (2000 g.). Filter the precipitate dissolve it in chloroform (2000 cc.) and wash the solution with brine and filter. Concentrate the filtrate to ca. 400 cc. and cool to 0°. Filter the crystalline product, wash with ether and dry to obtain 13β-ethyl-3-methoxygona-1,3,5(10)-trien-17β-ol, hemisuccinate (244.7 g.), M.P. 159–161°; infrared absorption peaks at 5.75, 5.85, 6.21, and 6.37μ.

Calculated for $C_{24}H_{32}O_5$ (percent): C, 71.97; H, 8.05. Found (percent): C, 71.74; H. 8.02.

This compound is useful as an intermediate for preparing compounds which have hormonal activity.

EXAMPLE 104

13β-ethyl-3-methoxygona-1,3,5(10)-trien-17β-ol,
hydrogen sulfate, potassium salt Stir a solution of 13β-ethyl-3-methoxygona-1,3,5(10)-trien-17β-ol with sulfur trioxide-pyridine complex (2.0 g.) in pyridine (25 cc.) at 100° for 2 hours. Cool to 20°, add ether and filter the precipitate, dissolve it in a little water and add a solution of potassium bicarbonate (3.0 g.) in water (200 cc.). Stir for 1 hour, evaporate to low volume and filter the precipitate and dry. Dissolve the solid (2.6 g.) in hot methanol, filter and reduce to low volume and allow to crystallize Recrystallize from hot water to obtain the title compound 1.32 g., M.P. 245–247°; infrared absorption peaks at 6.22, 6.67, 8.1μ.

Calculated for $C_{20}H_{27}O_5SK$ (percent): C, 57.38; H, 6.5; S, 7.66; K, 9.34. Found (percent): C, 57.37; H, 6.68; S, 7.2; K, 9.30.

This compound has estrogenic activity and is useful as an intermediate for preparing compounds which have hormonal activity.

EXAMPLE 105

13β-ethylgona-1,3,5(10)-trien-3,17β-diol, bis hydrogen sulphate, potassium salt

Stir a solution of 12β - ethylgona - 1,3,5(10) - trien-3,17β-diol (2.0 g.) and sulfamic acid (2.4 g.) in pyridine (15 cc.) at 90° for 2 hours. Cool to 20°, add 10% aqueous potassium hydroxide (50 cc.) and stir at 20° for 1 hour. Evaporate to dryness, triturate with absolute ethanol and filter. Boil the residue with methanol, treat with activated charcoal, filter and reduce the volume of solution and allow to crystallize. Filter and dry to obtain the title compound as the monohydrate (0.69 g.), M.P. 241–243° (with gas evolution) and 260–262°.

Calculated for $C_{19}H_{24}O_8S_2K_2$ (percent): C, 42.2; H, 4.85; S, 11.86; K, 14.46. Found (percent): C, 42.35; H, 5.07; S, 10.8; K, 14.25.

This compound has estrogenic activity and is useful as an intermediate for preparing compounds which have hormonal activity.

EXAMPLE 106

13β-ethyl-3-hydroxygona-1,3,5(10)-trien-17-one, hydrogen sulfate, potassium salt Heat a solution of 13β - ethyl-3-hydroxy-gona-1,3,5-(10)-trien-17-one and sulfamic acid (2.3 g.) in pyridine (15 ml.) at 90° for 2 hours. After cooling to room temperature, pour the reaction mixture into ether, filter the resulting precipitated pyridinium salt, and dry. Add the solid to a well-stirred mixture of pyridine (10 ml.) and 12% potassium hydroxide (50 ml.). Continue stirring at room temperature for ½ hour. Evaporate the mixture to dryness in a shallow dish on the steam bath, triturate the residue with ethanol (absolute), filter and wash the solid well with ethanol. Dissolve the dry solid in hot methanol, treat with activated charcoal and filter through super cel. Boil the filtrate to low volume and allow to crystallize. Filter the resulting white crystalline product to give 1.3 g. of the title compound, M.P. 225–227°. A second treatment with charcoal in hot methanol followed by filtration through super cel and reduction to low volume gives 0.80 g. of product with no improvement in melting point. This sample is a monohydrate, $\lambda_{max.}^{KBr}$ 2.93($H_2O$), 5.77, 8.0 (broad, sulfate salt) μ.

Calculated for $C_{19}H_{23}O_5K \cdot H_2O$ (percent): C, 54.26; H, 5.99; S, 7.62; K, 9.30. Found (percent): C, 54.45; H, 6.26; S, 6.7 and 6.5; K, 8.9.

This compound has estrogenic activity and is useful as an intermediate for preparing compounds which have hormonal activity.

EXAMPLE 107

13β-n-propyl-3-methoxygona-1,3,5(10)-17β-ol, hydrogen succinate

Reflux 13β - propyl - 3 - methoxygona-1,3,5(10)-trien-17β-ol (20 g.) in pyridine (250 cc.) with succinic anhydride (20 g.) for 18 hours. Pour reaction mixture into an excessive of cold, dilute hydrochloric acid and extract with chloroform. Wash, dry and evaporate to dryness. Recrystallize with ether-hexane to give title compound (16.5 g.); M.P. 141–3°;

I.R.$\lambda_{max.}^{KBr}$ 5.75, 5.84μ.

This compound is useful as an intermediate for preparing compounds which have hormonal activity.

EXAMPLE 108

3-hydroxy-13β-n-propylgona-1,3,5(10)-trien-17-one, 1-menthoxyacetate

React 3-hydroxy-13β-n-propylgona - 1,3,5(10) - trien-17 - one (0.58 g.) with 1-menthoxyacetyl chloride (1.5 cc.) in pyridine (8.0 cc.) and dioxan (12 cc.) for 20 hours. Add water, extract with ether and wash, dry and evaporate the ethereal solution. Chromatograph the residue on Florisil to yield a brown gum. Allow to stand with light petroleum (3.0 cc.) for several days at −10° to induce crystallization and then recrystallize from light petroleum to obtain the title compound (0.61 g.) M.P. 102–103.5°.

Calculated for $C_{32}H_{46}O_4$ (percent): C, 77.69; H, 9.37. Found (percent): C, 77.67; H, 9.21.

This compound is useful as an intermediate for preparing compounds which have hormonal activity.

EXAMPLE 109

13β-ethyl-17β-(2-hydroxyethoxy)-3-methoxygona-1,3,5(10)-triene

Add a solution of aluminum chloride (8.0 g.) in ether (60 cc.) to a 1 M ethereal solution of lithium aluminum hydride (15 cc.). Stir for 20 minutes, then add to a cooled solution of 13β - ethyl-17,17-ethylenedioxy-3-methoxygona - 1,3,5(10)-triene (17.1 g.) in ether (1000 cc.). Stir the reaction mixture and cool in an ice-water bath for 4 hours. Dilute with 2 N $H_2SO_4$ until the solution clears. Separate the ethereal layer, wash with saturated $NaHCO_3$ solution, and evaporate to dryness. Treat the residue with ethanol (200 cc.), concentrated hydrochloric acid (5 cc.), and water (10 cc.). Heat on a steam bath for 30 minutes and then evaporate to dryness. Recrystallize the residue from ethanol to obtain the title compound (8.1 g.), M.P. 131–132°; infrared absorption peak at 2.93μ; ultraviolet absorption peak at 278mμ (ε 2,130).

Calculated for $C_{22}H_{32}O_3$ (percent): C, 76.70; H, 9.36. Found (percent): C, 76.81; H, 9.35.

This compound is useful as an intermediate for preparing compounds which have hormonal activity.

EXAMPLE 110

13β-ethyl-17β-(2-fluoroethoxy)-3-methoxygona-1,3,5(10)-triene

Treat 13β - ethyl - 17β - (2-hydroxyethoxy)-3-methoxygona-1,3,5(10)-triene (3.1 g.) in methylene chloride (60 cc.) with 2-chloro-1,1,2-trifluorotriethylamine and allow to stand for 10 hours. Wash the reaction mixture with ice-water, sodium bicarbonate solution and brine. Evaporate the solvent and dissolve the crude product in a solution of potassium hydroxide (0.5 g.) in water (2.0 cc.) and ethanol (75 cc.). After 20 hours at 20° dilute the reaction mixture with water, acidify with 2 N hydrochloric acid and filter the precipitate. Chromatograph on a column of neutral alumina, eluting with benzene-ether, evaporate the eluate and recrystallize the residue from methanol to obtain the title compound (0.5 g.), M.P. 69–70°.

Calc'd for $C_{22}H_{31}O_2F$ (percent): C, 76.36; H, 9.02. Found (percent): C, 76.44; H, 8.81.

This compound has estrogenic activity and is useful as an intermediate for preparing compounds which have hormonal activity.

EXAMPLE 111

13β-ethyl-17β-(2-hydroxyethoxy)-3-methoxygona-1,3,5 (10)-triene, methanesulfonate Add methanesulfonyl chloride (0.14 cc.) dropwise to 13β - ethyl - 17β-(2-hydroxyethoxy)-3-methoxygona-1,3,5 (10)-triene (0.344 g.) in pyridine (2.0 cc.) cooled to −70°. After 2 hours, allow the reaction mixture to warm to 20°, add ice, water and a little methanol, and filter the precipitate. Recrystallize from methanol to obtain the title compound (0.31 g.) M.P. 104°; ultraviolet absorption maximum 279 mμ (ε 2080).

Calc'd for $C_{23}H_{34}O_5S$ (percent): C, 65.37; H, 8.11; S, 7.60. Found (percent): C, 65.62; H, 8.22; S, 7.85.

This compound is useful as an intermediate for preparing compounds which have hormonal activity.

EXAMPLE 112

13β-ethyl-17β-(2-diethylaminoethoxy)-3-methoxygona-1,3,5(10)-triene

Reflux 13β - ethyl - 17β-(2-hydroxyethoxy)-3-methoxygona-1,3,5(10)-triene, methane sulfonate (2.3 g.) with diethylamine (50 cc.) for 6 hours. Evaporate the solvent, treat the residue with aqueous acetic acid and wash with ether. Basify the aqueous solution with aqueous sodium hydroxide and extract with ether. Wash, dry and evaporate the ethereal solution and recrystallize the residue from aqueous methanol to obtain the title compound M.P. 66–67°.

Calc'd for $C_{26}H_{41}NO_2$ (percent): C, 78.14; H, 10.34; N, 3.51. Found (percent): C, 77.85; H, 10.03; N, 3.52.

This compound has estrogenic activity, lowers the blood lipid level, and is useful as an intermediate for preparing compounds which have hormonal activity.

EXAMPLE 113

17β-ethoxy-3-methoxy-13β-n-propylgona-1,3,5(10)-triene

Reflux a suspension of 17β-hydroxy-13β-n-propyl-3-methoxygona-1,3,5(10)-triene in xylene (100 cc.) with sodium hydride (3.9 g., 50% in oil) for two hours, then add ethyl iodide (14.3 cc.) and continue refluxing for a further 3 hours. Cool the mixture to 25°, add water and acidify to pH 1 with 2 N hydrochloric acid. Separate the organic layer, extract the aqueous with ether and wash the combined organic solution with aqueous sodium bicarbonate, water and brine, and dry. Remove the solvent and chromatograph the residue on neutral alumina eluting with petroleum ether and then with ether. Evaporate the eluate and crystallize the residue from methanol to obtain the title compound (2.9 g.), M.P. 119–121°.

Calc'd for $C_{23}H_{24}O_2$ (percent): C, 80.94; H, 10.29. Found (percent): C, 80.65; H, 10.01.

This compound has estrogenic activity and is useful as an intermediate for preparing compounds which have hormonal activity.

EXAMPLE 114

3-methoxy-13β-n-propyl-D-homogona-1,3,5(10)-trien-17aβ-ol

Reflux 2-n-propylcyclohexane-1,3-dione (36.3 g.) with 6-m-methoxyphenylhex-1-en-3-one (43.2 g.) in benzene (400 cc.) and pyridine (21.2 cc.) for 16 hours. Dilute the cooled solution with ether and wash, dry and evaporate to obtain 2-(6-m-methoxyphenyl-3-oxohexyl)-2-n-propylcyclohexane-1,3-dione (43.0 g.) as a gum. Add this material (43 g.) in benzene (400 cc.) to polyphosphoric acid (250 g.) with stirring at 60° under nitrogen, and after 2 hours cool and add ice-water and extract with ether. Wash, dry and evaporate the organic solution and recrystallize the residue from ethanol to obtain D-homo 13β-n-propyl - 3 - methoxygona-1,3,5(10),8,14-pentaen-17a-one (27.6 g.) M.P. 86–89°. Shake this pentaene (27.6 g.) in tetrahydrofuran (250 cc.) in hydrogen with a prereduced suspension of 2% palladium on calcium carbonate (7.0 g.) until one molecular equivalent of hydrogen has been absorbed. Filter the catalyst, evaporate the solvent and recrystallize the residue from 95% ethanol to obtain D-homo - 3 - methoxy-13β-n-propylgona-1,3,5(10),8-tetraen-17β-ol (25.5 g.) M.P. 146–148°; ultraviolet absorption maximum at 277 mμ (ϵ 16,130).

Calc'd for $C_{22}H_{28}O_2$ (percent): C, 81.4; H, 8.7. Found (percent): C, 81.3; H, 8.6.

Dissolve the foregoing tetraene (16 g.) in tetrahydrofuran (100 cc.) and aniline (100 cc.) and add it to a mixture of liquid ammonia (900 cc.) and tetrahydrofuran (250 cc.). Add lithium (1.0 g.) and stir for 1 hour. Add water, extract with ether and wash, dry and evaporate the ether solution and crystallize the residue from methanol to obtain the title compound 15.4 g., M.P. 122–124°; ultraviolet absorption maximum at 280 mμ (ϵ 1,900).

Calc'd for $C_{22}H_{32}O_2$ (percent): C, 80.4; H, 9.8. Found (percent): C, 80.3; H, 9.9.

This compound has estrogenic activity and is useful as an intermediate for preparing compounds which have hormonal activity.

EXAMPLE 115

13β-n-butyl-3,17β-dimethoxygona-1,3,5(10)-triene

To a solution of 13β-n-butyl-3-methoxygona-1,3,5(10)-trien-17β-ol in methylene chloride (100 cc.) and boron trifluoride etherate (0.1 cc.) add excess diazomethane in methylene chloride. Treat the mixture with a few drops of acetic acid to destroy excess diazomethane. Wash the solution with 10% aqueous sodium hydroxide, dry and evaporate the solvent. Recrystallize the residue from ethanol to obtain the title compound, M.P. 96°.

Calc'd for $C_{23}H_{34}O_2$ (percent): C, 80.65; H, 10.01. Found (percent): C, 80.69; H, 9.91.

This compound is useful as an intermediate for preparing compounds which have hormonal activity.

EXAMPLE 116

3,17β-dimethoxy-13β-isobutylgona-1,3,5(10)-triene

To a solution of 13β - isobutyl - 3-methoxygona-1,3,5(10)-trien-17β-ol (2.0 g.) in methylene chloride (100 cc.) add boron trifluoride etherate (0.1 cc.) and then excess diazomethane in methylene chloride. Add acetic acid to destroy the excess diazomethane, then wash with 10% aqueous sodium hydroxide and dry. Evaporate the solvent and recrystallize the residue from ethanol to obtain the title compound, M.P. 80°.

Calc'd for $C_{23}H_{34}O_2$ (percent): C, 80.65; H, 10.01. Found (percent): C, 80.40; H, 9.79.

This compound is useful as an intermediate for preparing compounds which have hormonal activity.

EXAMPLE 117

17α-ethynyl-3-methoxy-13β-methylgona-1,3,5(10)-trien-17β-ol

Stir 3 - methoxy - 13b - methylgona - 1,3,5(10) - trien-17-one (1.2 g.) in dimethylacetamide (35 cc.) with lithium acetylide-ethylenediamine complex (1 g.) in an atmosphere of acetylene for 15 hours. Pour into ice water and isolate the product with ether. Recrystallize twice from methanol and then from ether to obtain the title compound M.P. 128–129°; ultraviolet absorption peak at 279 mμ (ϵ 2050).

Calculated for $C_{21}H_{26}O_2$ (percent): C, 81.25; H, 8.44. Found (percent): C. 81.14; H, 8.27.

This compound has estrogenic activity and is useful as an intermediate for preparing compounds which have hormonal activity.

EXAMPLE 118

17α-ethyl-3-methoxy-13β-methylgona-1,3,5(10)-trien-17β-ol

Add 17α - ethynyl -3 - methoxy - 13β - methylgona-1,3,5(10-trien-17β-ol (5.5 g.) in ethanol (250 cc.) to prehydrogenated 10% palladium on carbon (1.4 g.) and shake in an atmosphere of hydrogen until uptake ceases. Filter the catalyst, evaporate the solvent and recrystallize the residue from benzene-hexane to obtain the title compound (4.93 g.), M.P. 130–133°. Purify further from the same solvent mixture to obtain material M.P. 140–141°; infrared absorption peak at 2.94μ; ultraviolet absorption maxima at 279 and 287.5 mμ (ϵ 1975 and 1804).

Calculated for $C_{21}H_{30}O_2$ (percent): C, 80.21; H, 9.62. Found (percent): C, 80.47; H, 9.51.

This compound is useful as an intermediate for preparing compounds which have hormonal activity.

EXAMPLE 119

13β-ethyl-17α-ethylnylgona-1,3,5(10)-trien-3,17β-diol

Dissolve 3 - hydroxy - 13β - ethylgona - 1,3,5(10)-trien-17-one (2.0 g.) in tetrahydrofuran (30 cc.) and add the solution dropwise to a solution prepared by passing excess acetylene into suspension of lithium aluminum hydride (2.0 g.) in tetrahydrofuran (60 cc.). Stir for 18 hours, decompose with water and filter. Evaporate the filtrate and recrystallize the residue from methanol to obtain the title compound (0.6 g.) M.P. 184–186°.

Calculated for $C_{21}H_{26}O_2$ (percent): C, 81.25; H, 8.44. Found (percent) C, 80.83; H, 8.12.

This compound has estrogenic activity and is useful as an intermediate for preparing compounds which have hormonal activity.

EXAMPLE 120

13,17α-diethyl-3-methylgona-1,3,5(10)-trien-17β-ol

Add a solution of 13,17α-diethyl-17β-hydroxygon-5(10)-en-3-one (15.8 g.) in pyridine (75 cc.) to a solution of pyridine perbromide hydrobromide (17 g.) in pyridine (75 cc.). Stir for 30 minutes at 20° and then for a further 30 minutes at 100°. Pour the cooled reaction mixture on to ice and hydrochloric acid. Extract with ether, wash, dry and evaporate the ethereal solution and recrystallize the residue from ether-hexane to obtain 13β,17α - diethyl - 17β - hydroxygon - 4,9 - dien-3-one (11.1 g.), M.P. 119–121°.

Dilute 3 M ethereal methyl magnesium bromide (40 cc.) with tetrahydrofuran (50 cc.) at 0° under nitrogen and add 13β,17α-diethyl-17β-hydroxygon-4,9-dien-3-one (5.0 g.) in tretrahydrofuran (50 cc.) dropwise. Stir for 1 hour and then pour the reaction mixture into brine and hydrochloric acid, and extract with ether. Wash, dry and evaporate the solvent and chromatograph the residue on a Florex column (170 g.) eluting with benzene. Evaporate the eluate and recrystallize the residue from methanol to obtain the title compound (0.8 g.), M.P. 127–128°; infrared absorption peak at 3.0μ; ultraviolet absorption maximum at 262 mμ (ε 4,650).

Calculated for $C_{22}H_{32}O$ (percent): C, 84.56; H, 10.32. Found (percent): C, 84.84; H, 10.22.

This compound is useful as an intermediate for preparing compounds which have hormonal activity.

EXAMPLE 121

13β-ethyl-17α-vinyl-3-methoxygona-1,3,5(10)-trien-17β-ol

Shake 13β - ethyl - 17α - ethynyl - 3 - methoxygona-1,3,5(10)-trien-17β-ol (1.1 g.) in pyridine (25 cc.) with prehydrogenated 2% palladium on calcium carbonate (0.3 g.) in a hydrogen atmosphere of hydrogen until one molecular equivalent of hydrogen has been absorbed. Filter the catalyst, evaporate this solvent and triturate the residue with hexane-ether. Chromatograph the product on Florex (40 g.) and recrystallize from methanol to obtain the title compound (0.6 g.), M.P. 100–103°.

Calculated for $C_{22}H_{30}O_2$ (percent): C, 80.93; H, 9.26. Found (percent): C, 80.67; H, 9.37.

This compound is useful as an intermediate for preparing compounds which have hormonal activity.

EXAMPLE 122

13β-ethyl-3-methoxy-17α-(1,2-epoxyethyl)gona-1,3,5(10)-triene-17β-ol

Allow a solution of 13β-ethyl-17α-vinyl-3-methoxygona-1,3,5(10)-trien-17β-ol (3.3 g.) and m-chloroperbenzoic acid (2.5 g.) in chloroform (40 cc.) to stand at 0° for 18 hours and then allow to warm to 20° over 1 hour. Add ether (200 cc.) and wash with water, aqueous sodium bicarbonate, water and dry. Evaporate the solvent and recrystallize the residue from methanol to obtain the title compound (1.4 g.), M.P. 138–141°, raised to 143–147° by further recrystallization.

Calculated for $C_{22}H_{30}O_3$ (percent): C, 76.99; H, 8.57. Found (percent): C, 77.15; H, 8.83.

This compound is useful as an intermediate for preparing compounds which have hormonal activity.

EXAMPLE 123

13β-ethyl-17α-(2,3-epoxypropyl)-3-methoxygona-1,3,5(10)-trien-17β-ol

Treat 13β - ethyl - 17α - allyl - 3 - methoxygona - 1,3,5(10)-trien-17β-ol (1.05 g.) in chloroform (30 cc.) with monoperphthalic acid (1.5 g.) in ether (15 cc.) and allow to stand at 20° for 18 hours. Pour into water, extract with ether and wash the ethereal solution with aqueous sodium bicarbonate, brine and dry. Evaporate the solvent and crystallize the residue from chloroform-ether to obtain the title compound (0.67 g.), M.P. 156–168°, raised to 173–175° by chromatography on neutral alumina and recrystallization from the same solvent mixture.

Calculated for $C_{23}H_{32}O_3$ (percent): C, 77.49; H, 9.05. Found (percent): C, 77.23; H, 9.0.

This compound is useful as an intermediate for preparing compounds which have hormonal activity.

EXAMPLE 124

17α-chloroethynyl-3-methoxy-13β-n-propylgona-1,3,5(10)-trien-17β-ol

Dilute 50 cc. of a solution of 5.53% methyl lithium in ether to 100 cc. with dry ether, cool to 0° and then add 24.2 g. of cis-dichloroethylene in ether (50 cc.) slowly over 1 hour. Add 3-methoxy-13β-propylgona-1,3,5(10)-trien-17-one (1 g.) in ether (50 cc.), reflux for 1 hour, stir overnight and then cool in an acetone-Dry Ice bath. Add saturated aqueous ammonium chloride dropwise, allow the mixture to come to 25° and extract with ether. Wash the ethereal solution until the aqueous washings are neutral, then wash with brine, dry and evaporate the solvent to obtain a gum. Chromatograph on Florex (25 g.), eluting with benzene-petroleum ether. Recrystallize the crystalline fractions from methanol and then aqueous acetonitrile to obtain the title compound (0.3 g.) M.P. 143–144.5°; ultraviolet absorption peak at 280 mμ (ε 18,700).

Calculated for $C_{23}H_{29}O_2Cl$ (percent): C, 74.07; H, 7.84; Cl, 9.51. Found (percent): C, 73.91; H, 7.81; Cl, 9.54.

This compound has estrogenic activity, lowers the blood lipid level, and is useful as an intermediate for preparing compounds which have hormonal activity.

EXAMPLE 125

13-ethyl-17β-hydroxy-17α-(3-diethylamino-1-propynyl)-3-methoxygona-1,3,5(10)-triene Heat a stirred mixture of 13-ethyl - 17α - ethynyl-17β-hydroxy-3-methoxygona - 1,3,5(10)-triene (4.0 g.), dioxane (25 cc.), water (2.2 cc.), formaldehyde (40%) (2.1 g.), diethylamine (2.0 g.), acetic acid (1.4 g.), and cuprous chloride (0.07 g.) under nitrogen at 68–72° for 20 hours. Pour the reaction mixture over ice, make basic with 2 N sodium hydroxide, and extract with ether. Isolate the precipitate obtained on addition of 10% hydrochloric acid to the ether solution. Dissolve in water, and basify the solution with diluted sodium hydroxide and extract the base with ether. Recrystallize from benzene-hexane followed by ethyl acetate-hexane to obtain the title compound; M.P. 126–130°.

This compound has estrogenic activity, lowers the blood lipid level, and is useful as an intermediate for preparing compounds which have hormonal activity.

EXAMPLE 126

17-(3-diethylaminopropyl)-13β-ethyl-3-methoxygona-1,3,5(10)-trien-17β-ol

Hydrogenate 13β-ethyl-17α-(3 - diethylamino-1-propynyl)-3-methoxygona-1,3,5(10) - trien-17β-ol (0.5 g.) in ethanol (50 cc.) and concentrated hydrochloric acid (3 drops) in the presence of 10% palladium on charcoal (0.3 g.) until hydrogen uptake ceases. Filter the catalyst, evaporate the solvent and dissolve the residue in ether. Wash the ethereal solution with aqueous sodium bicarbonate, evaporate and recrystallize the residue from aqueous methanol and aqueous ethanol to obtain the title compound, M.P. 115–117°.

Calculated for $C_{27}H_{43}NO_2$ (percent): C, 78.4; H, 10.48; N, 3.39. Found (percent): C, 78.32; H, 10.25; N, 3.41.

This compound has estrogenic activity, lowers the blood lipid level, and is useful as an intermediate for preparing compounds which have hormonal activity.

EXAMPLE 127

13β-ethyl-3-methoxy-17aα-methyl-D-homogona-1,3,5(10)-trien-17aβ-ol

Reflux 2-ethylcyclohexane-1,3-dione (20.7 g.) with 6-m-methoxyphenylhex - 1 - en-3-one (27.2 g.) in benzene (250 cc.) and pyridine (13.4 cc.) for 16 hours. Wash, dry and evaporate the cooled solution and dissolve the residual 2 - ethyl - 2 - (6-m-methoxyphenyl-3-oxohexyl)-cyclohexane-1,3-dione (32.8 g.) in benzene (400 cc.) and add the solution with stirring to polyphosphoric acid (150 g.) at 60° under nitrogen. Stir for 3 hours, cool and add ice-water. Separate and wash, dry and evaporate the benzene layer and recrystallize the residue from ethanol to obtain 13β - ethyl-D-homo-3-methoxygona-1,3,5(10),8,14-pentaen-17a-one (22.0 g.), M.P. 90–92°.

Shake this tetracyclic ketone (44 g.) in tetrahydrofuran (250 cc.) with a pre-reduced suspension of 2% palladium on calcium carbonate catalyst (16 g.) in tetrahydrofuran (300 cc.) in an atmosphere of hydrogen until one molecular equivalent of hydrogen has been absorbed. Filter the catalyst and evaporate the solvent and crystallize the residue from 95% ethanol to obtain 13β-ethyl-D-homo - 3 - methoxygona - 1,3,5(10),8-tetraen-17a-one (41 g.) M.P. 109–112°.

To this ketone (13.3 g.) in benzene (350 cc.) add an ethereal solution of methyl magnesium bromide (from magnesium, 15 g.) and reflux for 8 hours. Add saturated aqueous ammonium chloride to the cooled reaction mixture, separate, wash, dry and evaporate the ethereal layer and recrystallize the residue from methanol to obtain 13β-ethyl - D - homo - 3 - methoxy - 17aα - methylgona-1,3,5(10),8-tetraen-17aβ-ol (9.2 g.) M.P. 117–123°.

Add this alcohol (9.2 g.) in tetrahydrofuran (70 cc.) and aniline (10 cc.) to liquid ammonia (450 cc.) containing tetrahydrofuran (100 cc.) and aniline (30 cc.). Add lithium (1.5 g.) and stir for 1½ hours. Add ammonium chloride followed by water, extract with ether and was dry and evaporate the ethereal solution. Boil the residue with methanol, cool and filter to obtain the title compound (8.0 g.), M.P. 153–163°, ultraviolet absorption maximum at 280 mμ (ε 1300).

This compound is useful as an intermediate for preparing compounds which have hormonal activity.

EXAMPLE 128

13β,17aα-diethyl-3-methoxy-D-homogona-1,3,5(10)-trien-17aβ-ol

Add 13β - ethyl-D-homo-3-methoxygona - 1,3,5(10),8-tetraen-17a-one (20 g.) in dimethylacetamide (150 cc.) to a suspension of lithium acetylide (20.6 g.) in dimethylacetamide (300 cc.) and stir the reaction mixture in an atmosphere of acetylene for 24 hours. Pour on to ice and water, extract with ether and wash, dry and evaporate the ethereal solution and recrystallize the residue from methanol to obtain 13β - ethyl - 17aα-ethynyl-D-homo-3-methoxygona-1,3,5(10),8-tetraen-7αβ-ol (16.2 g.) M.P. 80–90°. Dissolve this product (16.2 g.) in benzene (150 cc.) and add it to pre-hydrogenated 2% palladium on calcium carbonate (5.0 g.) suspended in benzene (150 cc.) and shake in an atmosphere of hydrogen until uptake ceases. Filter the catalyst, evaporate the solvent and triturate the residue with boiling methanol (200 cc.). Cool and filter to obtain 13β,17α - diethyl - D - homo-3-methoxygona-1,3,5(10),8-tetraen-17aβ-ol (13.0 g.), M.P. 165–170°. Add this compound (13.0 g.) in tetrahydrofuran (100 cc.) and aniline (50 cc.) to liquid ammonia (500 cc.) containing tetrahydrofuran (170 cc.) and aniline (20 cc.) and add lithium (1.0 g.) to the stirred solution. After 1½ hours add ammonium chloride followed by warm water and extract with ether. Wash, dry and evaporate the ethereal extracts and recrystallize the residue from a mixture of ethyl acetate and hexane to obtain the title compound (9.0 g.), M.P. 145–147°; ultraviolet absorption maximum at 280 mμ (ε 1400).

This compound is useful as an intermediate for preparing compounds which have hormonal activity.

EXAMPLE 129

13β-ethyl-17,17-ethylenedioxy-3-methoxy-6-methylgona-1,3,5(10)-triene

Shake 13β - ethyl - 17,17 - ethylenedioxy-3-methoxy-6-methylgona-1,3,5(10),8,14-pentaene (15.3 g.) in benzene 300 cc.) with prereduced 2% palladium on calcium carbonate (5 g.) in an atmosphere of hydrogen until one molecular equivalent of hydrogen has been absorbed (1040 cc.). Filter the catalyst, evaporate the solvent and recrystallize the residue from 95% aqueous ethanol to obtain 13β - ethyl-3-methoxy-6-methyl-17,17-ethylenedioxygona-1,3,5(10),8-tetraene (11.0 g.), M.P. 122–124°.

Add 13β - ethyl - 3-methoxy-17,17-ethylenedioxygona-1,3,5(10),8-tetraene (11.0 g.) in tetrahydrofuran (160 cc.) to liquid ammonia (600 cc.) containing tetrahydrofuran (170 cc.) and aniline (30 cc.). Add lithium (0.6 g.) in small portions, stir for 2 hours then discharge the blue colour by adding a little water and allow the ammonia to evaporate. Add water, extract with ether and wash, dry and evaporate the ethereal extracts. Recrystallize the residue from isopropyl alcohol to obtain the title compound M.P. 130–134°.

This compound is useful as an intermediate for preparing compounds which have hormonal activity.

EXAMPLE 130

13β-ethyl-3-methoxy-6-methylgona-1,3,5(10)-trien-17-one

Suspend 13β - ethyl - 17,17-ethylenedioxy-3-methoxy-6-methylgona-1,3,5(10)-triene (9.0 g.) in methanol (200 cc.) containing concentrated hydrochloric acid (5.0 cc.) and heat the mixture on a steam bath for 15 minutes. Evaporate the solvent under reduced pressure and add ether and aqueous sodium bicarbonate. Wash and dry the ethereal solution, evaporate the solvent and crystallize the residue from methanol to give the title compound (7.3 g.), M.P. 115–123. Recrystallize further to obtain a sample M.P. 123–127°.

Calculated for $C_{21}H_{28}O_2$ (percent): C, 80.7; H, 9.0. Found (percent): C, 80.4; H, 9.0.

This compound has estrogenic activity and is useful as an intermediate for preparing compounds which have hormonal activity.

EXAMPLE 131

13β-ethyl-3-methoxy-6-methylgona-1,3,5(10)-trien-17β-ol

Add sodium borohydride (3.0 g.) to 13β-ethyl-3-methoxy-6-methylgona-1,3,5(10)-trien-17 one (7.0 g.) in methanol (300 cc.). After spontaneous refluxing has subsided acidify with 50% aqueous acetic acid (20 cc.), evaporate most of the solvent and add water and extract with ether. Wash, dry and evaporate most of the ethereal solution and filter the precipitated solid to obtain the title compound (6.8 g.) M.P. 158–160°.

Calculated for $C_{21}H_{30}O_2$ (percent): C, 80.2; H, 9.6. Found (percent): C, 80.1; H, 9.4.

This compound has estrogenic activity and is useful as an intermediate for preparing compounds which have hormonal activity.

EXAMPLE 132

13β-ethyl-17β-acetoxy-3-methoxygona-1,3,5(10)-trien-6-one

Dissolve 17β - acetoxy - 13β - ethyl-3-methoxygona-1,3,5(10)-triene (2.0 g.) in acetic acid (40 cc.) and acetic anhydride (20 cc.) and add sodium dichromate dihydrate (1.7 g.). Stir the solution at 60–70° for 6 hours, cool and pour into water. Extract with ether, wash the organic solution with 5% aqueous sodium hydroxide, dry and evaporate the solvent. Chromatograph the residue on Florex (70 g.) eluting with benzene containing 6% ether to give the title compound (0.15 g.) M.P. 161–163°; infrared absorption peaks at 5.77, 5.96μ; ultraviolet absorption maxima at 256 mμ (ε 7,850).

This compound is useful as an intermediate for preparing compounds which have hormonal activity.

EXAMPLE 133

13β-ethyl-3-methoxy-6-methylgona-1,3,5(10)-trien-6,17β-diol

Treat 17β-acetoxy-13β-ethyl-3-methoxygona-1,3,5(10)-trien-6-one (0.75 g.) in tetrahydrofuran (35 cc.) with 3 molar ethereal methyl magnesium bromide (20 cc.) and allow to stand in an atmosphere of nitrogen for 3 days. Reflux for 1 hour and then pour the cooled reaction mixture into saturated aqueous ammonium chloride. Extract with ether and wash, dry and evaporate the ethereal solution to obtain the title compound as a gum (0.8 g.); infrared absorption peak at 2.96μ.

This compound is useful as an intermediate for preparing compounds which have hormonal activity.

EXAMPLE 134

13β-ethyl-3-methoxy-6β-methylgona-1,3,5(10)-trien-17β-ol

Reflux 13β - ethyl-3-methoxy-6-methylgona-1,3,5(10)-trien-6,17β-diol (0.8 g.) in benzene (50 cc.) containing a crystal of iodine for 7 hours with continuous removal of water. Wash the cooled reaction mixture with aqueous sodium thiosulfate, dry and evaporate the solvent. Filter the residue dissolved in benzene-ether (9:1) through a column of Florex, evaporate the solvent and recrystallize the residue from etherhexane to obtain 13β-ethyl-6-methyl-3-methoxygona-1,3,5(10),6-tetraene-17β - ol (0.425 g.) M.P. 128–130°.

Dissolve this tetraene (0.1 g.) in benzene (10 cc.) and hydrogenate in the presence of 10% palladized charcoal (0.05 g.) at atmospheric pressure. When one molecular equivalent of hydrogen has been absorbed, filter the catalyst, evaporate the solvent and recrystallize from etherhexane to obtain the title compound (0.065 g.) M.P. 158–160°.

Alternatively, add lithium (0.012 g.) to the tetraene (0.25 g.) dissolved in a mixture of tetrahydrofuran (40 cc.), aniline (20 cc.) and liquid ammonia (100 cc.). After 5 minutes add water and isolate the product with ether. Recrystallize from ether to obtain the title compound (0.09 g.), M.P. 152–155°.

This compound has estrogenic activity and is useful as an intermediate for preparing compounds which have hormonal activity.

EXAMPLE 135

17β-acetoxy-3-methoxy-13β-methylgona-1,3,5(10)-trien-6-one

Dissolve 17β-acetoxy-13β-methyl-3-methoxygona-1,3,5 (10)-triene (10 g.) in carbon tetrachloride (300 cc.) and add a solution of tert-butyl chromate in carbon tetrachloride (300 cc.; prepared by the method of Heusler and Wettstein, Helv. Chim. Acta 1952, 35 284) followed by acetic anhydride (150 cc.). Reflux for 3 hours, allow to cool and stir for a further 16 hours. Add water (150 cc.) followed by oxalic acid (80 g.) in small portions. Separate the organic layer and wash with water 5% aqueous sodium hydroxide, 10% hydrochloric acid, saturated sodium bicarbonate and brine, and dry. Evaporate the solvent and triturate the residue with methanol. Recrystallize the solid (1.0 g.) from methanol to obtain the title compound M.P. 185–191°; ultraviolet absorption maximum at 255 Mμ (ε 7,450); infrared absorption peaks at 5.75, 5.95μ.

This compound is useful as an intermediate for preparing compounds which have hormonal activity.

EXAMPLE 136

6,13β-dimethyl-3-methoxygona-1,3,5(10)-trien-6,17β-diol

Dissolve 17β-acetoxy-13β-methyl-3-methoxygona-1,3,5 (10)-trien-6-one (0.8 g.) in tetrahydrofuran (35 cc.) and add 3 molar ethereal methyl magnesium bromide (10 cc.). Reflux for 5 minutes, allow to stand at 20° for 16 hours and then pour into saturated aqueous ammonium chloride. Extract with ether, wash dry and evaporate to obtain the title compound as a crude gum.

This compound is useful as an intermediate for preparing compounds which have hormonal activity.

EXAMPLE 137

6α,13β-dimethyl-3-methoxygona-1,3,5(10)-trien-17β-ol

Reflux the crude epimeric mixture of 6,13β-dimethyl-3-methoxygona-1,3,5(10)-trien-6,17β-diol (0.1 g.) with dry benzene (50 cc.) containing a crystal of iodine for 2 hours. Wash the cooled solution with aqueous sodium thiosulfate and water, dry and evaporate to obtain a solid residue of 6,13β-dimethyl-3-methoxygona-1,3,5(10),6-tetraen - 17β-ol. Dissolve this solid (0.07 g.) in tetrahydrofuran (50 cc.) and add the solution to liquid ammonia (100 cc.) and aniline (1.0 cc.). Add enough lithium metal (ca. 10 mg.) to give a permanent blue colour, stir for 1 hour and then discharge the color by adding a little acetone. Add 5% aqueous acetic acid followed by water and extract with ether. Wash, dry and evaporate the ethereal solution to obtain the title compound M.P. 150–160°; ultraviolet absorption maximum at 286 mμ (ε 2100).

This compound has estrogenic activity and is useful as an intermediate for preparing compounds which have hormonal activity.

EXAMPLE 138

2,3-dimethyl-13β-methylgona-1,3,5(10)-trien-17β-ol

Dissolve 2,3-dimethoxy-13β-methylgona-1,3,5(10),8,14-pentaen-17-one (2.0 g.) in benzene (50 cc.) and add the solution to prehydrogenated 2% palladised calcium carbonate (0.5 g.) in benzene (5.0 cc.). Shake the mixture in an atmosphere of hydrogen until one mole equivalent (156 cc.) has been absorbed. Filter the catalyst, evaporate the solvent and recrystallize the residue from methanol to obtain 2,3-dimethoxy-13-methylgona-1,3,5(10),8-tetraen-17-one (1.55 g.), M.P. 155–159°. Recrystallize further to obtain material (1.1 g.) M.P. 158–162°; ultraviolet peaks at 224, 287 and 306 mμ (ε 20, 400, 10,000, 9,400).

Calculated for $C_{20}H_{24}O_3$ (percent): C, 76.89; H, 7.74. Found (percent): C, 76.58; H, 7.68.

Suspend 2,3 - dimethoxy - 13β-methylgona-1,3,5(10,8-tetraen-17-one (10 g.) in methanol (400 cc.) and add sodium borohydride (2.5 g.). The mixture boils spontaneously. After 1 hour add acetic acid (5.0 cc.) followed by water and extract with ether. Wash, dry and evaporate the ethereal solution and recrystallize the residue from methanol to obtain 2,3-dimethoxy-13β-methylgona-1,3,5 (10),8-tetraen-17β-ol (9.0 g.), M.P. 178–181°; ultraviolet absorption peaks at 282 and 305 mμ (ε 10,760 and 9,240).

Calculated for $C_{20}H_{26}O_3$ (percent): C, 76.40; H, 8.34. Found (percent): C, 76.21; H, 8.13.

Add 2,3-dimethoxy-13β-methylgona-1,3,5(10),8 - tetraen-17β-ol (2.0 g.) in tetrahydrofuran (150 cc.) to a stirred mixture of distilled liquid ammonia (250 cc.) and aniline (12 cc.) and add enough lithium to impart a permanent blue color to the solution (ca. 0.2 g.). Stir for 1 hour, discharge the blue color by adding a little acetone and remove the ammonia by adding dilute acetic acid followed by warm water. Extract with ether and wash, dry and evaporate the organic solution. Recrystallize the residue from methanol to obtain the title compound (1.1 g.), M.P. 154–158°; ultraviolet absorption peak at 287 mμ (ε 3,800); infrared absorption maxima at 2.85, 6.21μ.

Calculated for $C_{20}H_{28}O_3$ (percent): C, 75.91; H, 8.91. Found (percent): C, 75.76; H, 8.96.

This compound has estrogenic activity, lowers the blood lipid level, and is useful as an intermediate for preparing compounds which have hormonal activity.

EXAMPLE 139

2,3-dimethoxy-13β-methylgona-1,3,5(10)-trien-17-one

Add 8 N chromic acid (1.0 cc.) dropwise to a solution of 2,3-dimethoxy-13β-methylgona-1,3,5(10)-trien-17β-ol (1.0 g.) in acetone (500 cc.). After 10 minutes add isopropanol (5.0 cc.) and evaporate to dryness. Dissolve the residue in ether, wash with aqueous sodium bicarbonate, water and dry. Evaporate the solvent and recrystallize the residue from methanol to obtain the title compound (0.5 g.) M.P. 140–144°; ultraviolet absorption maxima at 282–289 mμ (ε 3,250); infrared absorption peaks at 5.76, 6.23μ.

Calculated for $C_{20}H_{26}O_3$ (percent): C, 76.4; H, 8.34. Found (percent): C, 76.20; H, 8.13.

This compound has estrogenic activity, lowers the blood lipid level, and is useful as an intermediate for preparing compounds which have hormonal activity.

EXAMPLE 140

2,3-dihydroxy-13β-methylgona-1,3,5(10)-trien-17-one

Add 2,3-dimethoxy-13β-methylgona-1,3,5(10)-trien-17-one (0.3 g.) to freshly prepared pyridine hydrochloride (19 g.) and heat to 185–195°. Stir the molten mixture for 30 minutes under nitrogen, cool and dissolve the melt in 3 N hydrochloric acid. Extract with ether and wash, dry and evaporate the ethereal solution and recrystallize the residue from ether to obtain the title compound M.P. 220–230°; ultraviolet absorption peak at 290 mμ (ε 4070); infrared absorption peaks at 3.05, 5.8μ.

This compound has estrogenic activity, lowers the blood lipid level, and is useful as an intermediate for preparing compounds which have hormonal activity.

EXAMPLE 141

13β-ethyl-17-methylene-3-methoxygona-1,3,5(10)-triene

Stir methyl triphenylphosphonium bromide (116 g.) in anhydrous ether (1600 cc.) with 20–22% ethereal phenyl lithium (133 cc.) in an atmosphere of nitrogen at 25° for 2 hours and then add a solution of 13β-ethyl-3-methoxygona-1,3,5(10)-trien-17-one (20 g.) in tetrahydrofuran (200 cc.) and ether (400 cc.) and continue stirring for 5 hours and allow to stand for a further 16 hours. Distill off the ether, simultaneously replacing it with tetrahydrofuran and reflux for 18 hours, then cool and filter. Concentrate the filtrate to a syrup and repeatedly extract with boiling ether-petroleum ether mixture (800 cc.). Add water to the residue and extract with the same solvent mixture. Wash the combined organic extracts with 5% aqueous hydrochloric acid, water, aqueous sodium bicarbonate, water and brine, and dry. Evaporate the residue under reduced pressure and stir the residue with petroleum ether-benzene (4:1; 500 cc.) and filter through a column of neutral alumina (100 g.), eluting with the same solvent mixture. Evaporate the eluates and recrystallize the residue from methanol to obtain the title compound (11.6 g.), M.P. 97–100°.

Calculated for $C_{21}H_{20}O$ (percent): C, 85.08; H, 9.52. Found (percent): C, 85.02; H, 9.68.

This compound is useful as an intermediate for preparing compounds which have hormonal activity.

EXAMPLE 142

13β-ethyl-17β-hydroxymethyl-3-methoxygona-1,3,5(10)-triene

Treat 13β - ethyl - 17 - methylene-3-methoxygona-1,3,5 (10)-triene (11 g.) in tetrahydrofuran (200 cc.) with diborane gas [generated by the slow addition of sodium borohydride (5.0 g.) in diethyleneglycol dimethyl ether (110 cc.) to boron trifluoride etherate (38 cc.) in diethyleneglycol dimethyl ether (110 cc.) over 1½ hours] in an atmosphere of nitrogen. Allow the solution to stand overnight, then cool to 0° and decompose by carefully adding water. Add aqueous 3 N sodium hydroxide (60 cc.) and 30% hydrogen peroxide (60 cc.) and reflux for 30 minutes. Add ether to the cooled reaction mixture and separate the organic layer and wash, dry and evaporate it to small volume. Add a little acetonitrile and evaporate until crystallization begins. Filter and dry to obtain the title compound (10.8 g.) M.P. 111–114°. Purify from eher-petroleum ether to obtain material M.P. 123–125°; infrared absorption peaks at 2.95, 6.2, 6.67, 8.0μ.

Calculated for $C_{21}H_{30}O_2$ (percent): C, 80.21; H, 9.62. Found (percent): C, 80.14; H, 9.40.

This compound is useful as an intermediate for preparing compounds which have hormonal activity.

EXAMPLE 143

13β-ethyl-3-methoxygona-1,3,5(10)-triene, 17β-carboxylic acid

Add 8 N chromic acid (85 cc.) to a stirred solution of 13β - ethyl - 17β - hydroxymethyl-3-methoxygona-1,3,5 (10)-triene (33.5 g.) in acetone (300 cc.) at 0° and then stir the mixture at 25° for 20 minutes. Add excess isopropanol, boil and filter through a pad of sodium sulfate. Shake the residue with water, filter the insoluble material, boil it with 95% ethanol, cool and filter to obtain the title compound (13.1 g.) M.P. 235–240°. Dilute the acetone filtrate with water (60 cc.), concentrate under reduced pressure, dilute further and filter. Wash the residue with water, boil with 95% ethanol, cool and filter to obtain a further 13.65 g. of the title compound M.P. 230–240°. Purify from ethanol to obtain a sample M.P. 238–240°.

Calculated for $C_{21}H_{28}O_3$ (percent): C, 76.79; H, 8.59. Found (percent): C, 76.70; H, 8.46.

This compound is useful as an intermediate for preparing compounds which have hormonal activity.

EXAMPLE 144

17β-chloroformyl-13β-ethyl-3-methoxygona-1,3,5(10)-triene

Neutralize 13β - ethyl-3-methoxygona-1,3,5(10)-triene, 17β-carboxylic acid (0.5 g.) in methanol with aqueous 0.1 N sodium hydroxide (phenolphthalein indicator). Remove the methanol under reduced pressure and lyophilise the resulting aqueous solution to obtain the sodium salt as a fine powder. Dry at 110° under reduced pressure, dissolve the dried material in dry benzene (10 cc.) and add pyridine (4 drops) followed by oxalyl chloride to the stirred suspension at 0° and allow to warm until no furthe evolution of gas is observed. Remove the solvent and excess oxalyl chloride and add small portions of dry benzene to the residue, evaporating the benzene after each addition. Dry the residue to obtain the title compound as an amorphous solid; infrared absorption peaks at 5.62, 5.86μ.

This compound is useful as an intermediate for preparing compounds which have hormonal activity.

EXAMPLE 145

13β-ethyl-17β-diazoacetyl-3-methoxygona-1,3,5(10)-triene

Dissolve 17β - chloroformyl-13β-ethyl-3-methoxygona-1,3,5(10)-triene (0.5 g.; the material from the previous example) in dry benzene (10 cc.) and add it to a stirred ethereal solution of diazomethane at —20° [prepared by adding N-nitrosomethylurea (5.1 g.) to a mixture of 50% aqueous potassium hydroxide (15 cc.) and ether (50 cc.) and drying the ethereal distillate first over potassium hydroxide and then over sodium wire] and stir the mixture for 1 hour at —20° and a further 1½ hours at 0°. Evaporate the solvent at 25° and triturate the residue with ether to obtain the title compound (0.23 g.) M.P. 139–142° (dec.); infrared absorption maxima at 4.78, 6.13, 6.21μ.

This compound is useful as an intermediate for preparing compounds which have hormonal activity.

EXAMPLE 146

13β-ethyl-17β-acetoxyacetyl-3-methoxygona-1,3,5(10)-triene

Heat 17β-diazoacetyl - 13β - ethyl-3-methoxygona-1,3,5(10)-triene (0.22 g.) with glacial acetic acid (15 cc.) at 100° for 30 minutes and then remove the solvent under reduced pressure and dissolve the residue in ether. Wash, dry and evaporate the ethereal solution and recrystallize the residue (0.1 g.) from ether-hexane to obtain the title compound M.P. 135–139°; infrared absorption peaks at 5.70, 5.80μ.

This compound is useful as an intermediate for preparing compounds which have hormonal activity.

EXAMPLE 147

13β-ethyl-17β-(1,2-dihydroxyethyl)-3-methoxygona-1,3,5(10)-triene

Add 13β - ethyl-17β-acetoxyacetyl-3-methoxygona-1,3,5(10)-triene (1.0 g.) to a stirred suspension of lithium aluminum hydride (0.5 g.) in tetrahydrofuran. After 1 hour add water to decompose excess reagent, dilute with ether, dry and filter. Evaporate the filtrate and recrystallize the residue from acetone-hexane to obtain the title compound (0.62 g.) M.P. 155–158°.

This compound is useful as an intermediate for preparing compounds which have hormonal activity.

EXAMPLE 148

17β-acetyl-13β-ethyl-3-methoxygona-1,3,5(10)-triene

Add a solution of 17β-acetoxy-17-acetyl-13β-ethyl-3-methoxygona-1,3,5(10)-triene (5.0 g.) in dioxan (50 cc.) to a solution of calcium (2.5 g.) in liquid ammonia (850 cc.) and stir the mixture for 1 hour. Add methanol (12.5 cc.), stir for a further 30 minutes and then add ammonium chloride (12.5 g.), evaporate the ammonia and add water. Filter the precipitate, dry and recrystallize from ethyl acetate to obtain the title compound (3.2 g.), M.P. 118–121°; infrared absorption peaks at 5.78, 6.45 and 6.66μ.

This compound is useful as an intermediate for preparing compounds which have hormonal activity.

EXAMPLE 149

13β-ethyl-17β-acetoxyacetyl-3-methoxygona-1,3,5(10)-triene

Treat 17β - acetyl-3-methoxy-13β-ethylgona-1,3,5(10)-triene (1.0 g.) in methanol (8.5 cc.) and tetrahydrofuran (8.5 cc.) with calcium oxide (1.8 g.) and azobisisobutyronitrile (0.055 g.) and add iodine (1.1 g.) in tetrahydrofuran (5.5 cc.) and methanol (3.5 cc.) dropwise to the stirred solution. Dilute the mixture with methylene chloride, filter and evaporate. Reflux the residue with acetic acid (5.1 cc.) and triethylamine (7.9 cc.) in acetone (15 cc.) for 45 minutes. Dilute the cooled solution with water, extract with ether and wash dry and evaporate the ethereal solution. Chromatograph the residue on Florex eluting with benzene first to obtain starting material and then the title compound, M.P. 135–138° after crystallization from methanol; infrared absorption peaks at 5.70, 5.80μ.

This compound is useful as an intermediate for preparing compounds which have hormonal activity.

EXAMPLE 150

13β-ethyl-17β-(3-carbethoxy-1,3-dioxopropyl)-3-methoxygona-1,3,5(10)-triene

Add 17β-acetyl-13β-ethyl-3-methoxygona-1,3,5(10)-triene (1.0 g.) to sodium methoxide (0.4 g.) and ethyl oxalate (1.2 g.) in benzene (8.0 cc.). Allow to stand for 16 hours at 20°, then pour into 2 M phosphoric acid and extract with ether wash, dry and evaporate the ethereal solution and recrystallize the residue from methanol-ether to obtain the title compound (0.6 g.), M.P. 103–106°; infrared absorption peaks at 2.95, 5.9, 6.05μ.

This compound is useful as an intermediate for preparing compounds which have hormonal activity.

EXAMPLE 151

13β-ethyl-17β-acetoxyacetyl-3-methoxygona-1,3,5(10)-triene

Treat 13β-ethyl-17β-(3-carbethoxy-1,3-dioxopropyl)-3-methoxygona-1,3,5(10)-triene (0.5 g.) in methanol (10 cc.) containing potassium acetate (0.58 g.) at 0° with iodine (0.4 g.) in methanol (5 cc.). Stir for 4 hours at 0° and then add water and ether. Wash, dry and evaporate the ethereal solution and reflux the residue with acetic acid (2.5 cc.) and triethylamine (4.0 cc.) in acetone (10 cc.) for 45 minutes. Add water to the cooled solution, extract with ether and wash, dry and evaporate the ethereal extract. Filter the residue through a column of Florex with benzene and then recrystallize from methanol to obtain the title compound (0.115 g.), M.P. 145–147°; infrared absorption peaks at 5.70, 5.80μ.

This compound is useful as an intermediate for preparing compounds which have hormonal activity.

EXAMPLE 152

13β-ethyl-17-ethylidene-3-methoxygona-1,3,5(10)-triene

Reflux 13β - ethyl-17α-ethyl-3-methoxygona-1,3,5(10)-triene-17β-ol (10 g.) in pyridine (50 cc.) and phosphorus oxychloride (20 cc.) for 2 hours and then cautiously pour the cooled reaction mixture onto ice. Extract with ether, wash the organic solution with 10% hydrochloric acid, water, aqueous sodium bicarbonate, brine and dry. Evaporate the ethereal solution and recrystallize the residue from ethanol to obtain the title compound (6.5 g.), M.P. 107–8°.

Calculated for $C_{22}H_{30}O$ (percent): C, 85.11; H, 9.74. Found (percent): C, 85.41; H, 9.47.

This compound is useful as an intermediate for preparing compounds which have hormonal activity.

EXAMPLE 153

13β-ethyl-17,20-epoxy-3-methoxy-18,19-dinorpregna-1,3,5(10)-triene

Add a solution of m-chloroperbenzoic acid (1.0 g.) in benzene (10 cc.) to a solution of 13β-ethyl-17-ethylidene-3-methoxygona-1,3,5(10)-triene (1.0 g.) in benzene (10 cc.) during 5 minutes with stirring and continue stirring for 3 hours. Add ether, wash with cold aqueous 5% sodium hydroxide, saturated aqueous sodium bicarbonate and dry. Evaporate the solvent under reduced pressure and recrystallize the residue from methanol to obtain the title compound (0.6 g.), M.P. 118–123°.

Calculated for $C_{22}H_{30}O_2$ (percent): C, 80.94; H, 9.26. Found (percent): C, 80.18; H, 9.41.

This compound is useful as an intermediate for preparing compounds which have hormonal activity.

EXAMPLE 154

13β-ethyl-17β-(1-hydroxyethyl)-3-methoxygona-1,3,5(10)-triene

Dissolve 13β-ethyl-17-ethylidene-3-methoxygona-1,3,5(10)-triene (6.5 g.) in tetrahydrofuran (300 cc.) and treat for 1½ hours with a stream of diborane, generated by adding sodium borohydride (14 g.) in diethyleneglycol dimethyl ether (400 cc.) to boron trifluoride etherate (105 cc.) in diethyleneglycol dimethyl ether (350 cc.). Allow the mixture to stand for 16 hours and then cautiously decompose by adding water. Add a solution of sodium hydroxide (15 g.) in water (120 cc.) and 30% hydrogen peroxide (120 cc.) and reflux the mixture with stirring for 1 hour. Extract with ether and wash the ethereal solution with brine and dry. Evaporate the solvent, crystallize the residue with hexane and recrystallize from acetonitrile to obtain the title compound (2.55 g.), M.P. 117–120°. Recrystallize further to obtain a product, M.P. 125–127°; infrared absorption peak at 2.94μ.

Calculated for $C_{22}H_{32}O_2$ (percent): C, 80.44; H, 9.83. Found (percent): C, 80.42; H, 9.66.

This compound is useful as an intermediate for preparing compounds which have hormonal activity.

EXAMPLE 155

13β-ethyl-17β-acetyl-3-methoxygona-1,3,5(10)-triene

Treat 13β-ethyl-17β-(1-hydroxyethyl)-3-methoxygona-1,3,5(10)-triene (1.0 g.) in acetone (50 cc.) with 8 N chromic acid (1.5 cc.) and allow the mixture to stand at 25° for 30 minutes. Decompose excess reagent with isopropanol and filter the mixture through "Celite." Evaporate the filtrate and crystallize the residue from 95% ethanol to obtain the title compound (0.6 g.), M.P. 118–120°. Purify further to obtain a sample, M.P. 119–121°; infrared absorption peak at 5.98μ.

Calculated for $C_{22}H_{30}O_2$ (percent): C, 80.93; H, 9.26. Found (percent): C, 80.99; H, 8.96.

This compound is useful as an intermediate for preparing compounds which have hormonal activity.

EXAMPLE 156

13β-ethyl-17β-(hydroxymethyleneacetyl)-3-methoxygona-1,3,5(10)-triene

Stir a solution of 17β-acetyl-13β-ethyl-3-methoxygona-1,3,5(10)-triene (0.3 g.) in dry benzene (10 cc.) with ethyl formate (1.0 cc.) and sodium hydride (1 g.; 48% in mineral oil) in an atmosphere of nitrogen for 20 hours. Filter the suspension, wash with benzene and hexane and dry at low temperature under reduced pressure. Shake the residue with 10% hydrochloric acid (40 cc.) and filter the yellowish insoluble material, wash well with water and dry to obtain the title compound; infrared absorption peaks at 3.0 (broad) and 6.3μ (broad).

This compound is useful as an intermediate for preparing compounds which have hormonal activity.

EXAMPLE 157

17α-acetyl-13β-ethyl-3-methoxygona-1,3,5(10)-triene

Stir 17β-acetyl-13β-ethyl-3-methoxygona-1,3,5(10)-triene (0.15 g.) in methanol (20 cc.) with potassium hydroxide (1.34 g.) at 25° for 24 hours in an atmosphere of nitrogen. Dilute the mixture with ether, wash with water and brine and dry. Evaporate the solvent to obtain a gum consisting of the title compound contaminated with 25% starting material (from analysis of proton magnetic resonance spectrum and gas-liquid chromatography).

This compound is useful as an intermediate for preparing compounds which have hormonal activity.

EXAMPLE 158

17-acetyl-13β-ethyl-13β-ethyl-3-methoxygona-1,3,5(10)-triene, ethylene ketal

Reflux 17β-acetyl-13β-ethyl-3-methoxygona-1,3,5(10)-triene (0.7 g.) in toluene (25 cc.) and ethylene glycol (7 cc.) with p-toluenesulfonic acid (0.05 g.) for 18 hours with continuous removal of water. Add ether to the cooled solution and wash with water, aqueous sodium bicarbonate, brine and dry. Remove the solvent to obtain the title compound as a gum, having no carbonyl absorption in the infrared.

This compound is useful as an intermediate for preparing compounds which have hormonal activity.

EXAMPLE 159

13β-ethyl-17β-hydroxy-17-(1-hydroxyethyl)-3-methoxygona-1,3,5(10)-triene

Add 13β-ethyl-17α-acetyl-17-acetoxy-3-methoxygona-1,3,5(10)-triene (1.0 g.) to lithium aluminum hydride (0.5 g.) in ether (50 cc.). After 1 hour cautiously add water and ether and filter. Separate the organic layer, wash, dry and evaporate to obtain the title compound as a gum (0.9 g.); infrared absorption peak at 2.9μ.

This compound is useful as an intermediate for preparing compounds which have hormonal activity.

EXAMPLE 160

17α-ethoxyethynyl-13β-ethyl-3-methoxygona-1,3,5(10)-trien-17β-ol

Add distilled ethoxyacetylene (9.0 g.) to a stirred solution of 3 M ethereal methyl magnesium bromide (32 cc.) and reflux the mixture for 1½ hours. Then add a solution of 13β-ethyl-3-methoxygona-1,3,5(10)-trien-17-one (7.0 g.) in tetrahydrofuran (80 cc.) and reflux the mixture for a further 18 hours. Add aqueous ammonium chloride to the cooled reaction mixture and extract with benzene. Wash the solution with water, dry, and treat the hot solution with charcoal. Filter, remove the solvent under reduced pressure and recrystallize the residue from ether-hexane to obtain the title compound (6.2 g.), M.P. 105–110°, raised to 121–123° by further recrystallization; infrared absorption peaks at 2.86, 4.66μ.

Calculated for $C_{24}H_{32}O_3$ (percent): C, 78.22; H, 8.75. Found (percent): C, 78.45; H, 9.09.

This compound is useful as an intermediate for preparing compounds which have hormonal activity.

EXAMPLE 161

17-(2-oxoethylidene)-13β-ethyl-3-methoxygona-1,3,5(10)-triene

Shake 17α-ethoxyethynyl-13β-ethyl-3-methoxygona-1,3,5(10)-trien-17β-ol (2.0 g.) in pyridine (30 cc.) with a suspension of prehydrogenated 2% palladium on calcium carbonate (0.8 g.) in pyridine (10 cc.) in an atmosphere of hydrogen at 25° until one molecular equivalent of hydrogen has been absorbed. Filter the catalyst and evaporate the filtrate to obtain a gum. Dissolve this gum in tetrahydrofuran (25 cc.) and 10% aqueous hydrochloric acid (5.0 cc.) and allow the solution to stand at 25° for 1½ hours. Dilute with ether, wash with water, aqueous sodium bicarbonate, water and brine, and dry. Evaporate the solvent and crystallize the residue from methanol to obtain the title compound (1.1 g.) M.P. 133–136°. Recrystallize from acetone hexane to obtain the pure title compound, M.P. 136–138°; infrared absorption peaks at 5.98, 6.12μ; ultraviolet absorption maximum at 243μ (ε 19,300).

Calculated for $C_{22}H_{28}O_2$ (percent): C, 81.44; H, 8.70. Found (percent): C, 81.17; H, 8.47.

This compound is useful as an intermediate for preparing compounds which have hormonal activity.

EXAMPLE 162

13β-ethyl-17-(2-hydroxyethylidene)-3-methoxygona-1,3,5(10)-triene

Add 17-(2-oxoethylidene)-13β-ethyl-3-methoxygona-1,3,5(10)-triene (0.8 g.) in tetrahydrofuran (10 cc.) to sodium borohydride (0.8 g.) in methanol (15 cc.) and allow the mixture to stand at 20° for 1½ hours. Add 50% aqueous acetic acid to decompose excess reducing agent and concentrate under reduced pressure and then dilute with water. Filter the precipitate and recrystallize from ethanol to give the title compound (0.6 g.), M.P. 161–162°. Purify further from benzene-hexane to obtain the pure compound M.P. 164–165°.

Calculated for $C_{22}H_{30}O_2$ (percent): C, 80.93; H, 9.26. Found (percent): C, 80.87; H, 9.18.

This compound is useful as an intermediate for preparing compounds which have hormonal activity.

EXAMPLE 163

13β-ethyl-17β-(1,2-dihydroxyethyl)-3-methoxygona-1,3,5(10)-triene

Add concentrated hydrochloric acid (10 drops) to a stirred suspension of 13β-ethyl-17(2-hydroxyethylidene)-3-methoxygona-1,3,5(10)-triene (7.5 g.) in warm redistilled dihydropyran (100 cc.) and stir the mixture at 20° for 48 hours. Pour the mixture into aqueous sodium bicarbonate, extract with ether, and wash, dry and evaporate the ethereal solution. Chromatograph the gummy residue on basic alumina (200 g.), eluting with benzene (ca. 2000 cc.). Evaporate the solvent to obtain 13β - ethyl - 17 - (2-tetrahydropyranyloxyethylidene)-3-methoxygona-1,3,5(10)-triene as a gum. Dissolve this material in tetrahydrofuran (300 cc.) and treat with a stream of diborane for 1½ hours [prepared by slowly adding sodium borohydride (25 g.) in diethyleneglycol dimethyl ether (450 cc.) to boron trifluoride etherate (190 cc.) in diethylene glycol dimethyl ether (450 cc.)]. Allow the mixture to stand for 18 hours and decompose excess reagent by carefully adding a solution of sodium hydroxide (15 g.) in water (120 cc.) followed by 30% hydrogen peroxide (120 cc.) and reflux with vigorous stirring for 1 hour. Dilute the cooled solution with ether, wash with brine and evaporate to obtain a gum. Dissolve this in tetrahydrofuran and treat with 10% hydrochloric acid (20 cc.) at 20° for 18 hours. Dilute with ether, wash with water and brine, and evaporate. Recrystallize the residue from ether and then acetone-hexane to obtain the title compound, (1.7 g.) M.P. 157–159°; infrared absorption peak at 3.05μ.

Calculated for $C_{22}H_{32}O_3$ (percent): C, 76.60; H, 9.36. Found (percent): C, 76.98; H, 9.45.

This compound is useful as an intermediate for preparing compounds which have hormonal activity.

EXAMPLE 164

17-carboxymethylene-13β-ethyl-3-methoxygona-1,3,5(10)-trien-17β-ol

Treat 17β - ethoxyethynyl - 13β - ethyl - 3 - methoxygona-1,3,5(10)-trien-17β-ol (35 g.) in tetrahydrofuran (100 cc.) and methanol (100 cc.) with 10% sulfuric acid (20 cc.) and allow to stand for 1 hour. Add 20% aqueous sodium hydroxide (30 cc.), heat at 100° for 30 minutes, cool and acidify with dilute hydrochloric acid and extract with ether. Wash the ethereal solution with water and brine, dry and evaporate. Triturate the residue with benzene-hexane to obtain a solid (0.8 g.) and recrystallize from ethanol to obtain the title compound M.P. 240–246°; infrared absorption peaks at 5.96, 6.10μ.

Calculated for $C_{22}H_{28}O_3$ (percent): C, 77.61; H, 8.29. Found (percent): C, 77.20; H, 8.52.

This compound is useful as an intermediate for preparing compounds which have hormonal activity.

EXAMPLE 165

13β-ethyl-17-(2-hydroxyethylidene)-3-methoxygona-1,3,5(10)-triene

Reflux 17-carboxymethylene-13β-ethyl-3-methoxygona-1,3,5(10)-triene (0.55 g.) in warm tetrahydrofuran (50 cc.) with lithium aluminum hydride (0.89 g.) in tetrahydrofuran (25 cc.) for 3 hours. Add ethyl acetate to the cooled solution, followed by a little saturated aqueous sodium sulfate. Dry over anhydrous sodium sulfate, filter, evaporate the filtrate and recrystallize the residue from benzene-hexane to obtain the title compound, M.P. 164–165°; infrared absorption maximum at 3.0μ.

This compound is useful as an intermediate for preparing compounds which have hormonal activity.

EXAMPLE 166

17β-acetoxy-16α,17α-epoxy-13β-ethyl-3-methoxygona-1,3,5(10)-triene

Heat 13β - ethyl-3-methoxygona-1,3,5(10)-trien-17-one (16.8 g.) with toluene-p-sulfonic acid (3.0 g.) in isopropenyl acetate (200 cc.) at 100° for 18 hours and then gradually distill the solvent over a period of 6 hours until about 75 cc. remains. Dilute the cooled solution with ether (2 l.) and wash with aqueous potassium bicarbonate and brine. Dry and evaporate the organic solution and recrystallize the residue from ethanol to obtain 17-acetoxy-13β - ethyl - 3 - methoxygona - 1,3,5(10),16-tetraene (9.8 g.), M.P. 128–130°. Recrystallize from ethanol to obtain an analytical sample M.P. 133.5–134.5°.

Calculated for $C_{22}H_{28}O_3$ (percent): C, 77.61; H, 8.29. Found (percent): C, 77.65; H, 8.45.

Treat this acetoxytetraene (9.28 g.) in dry ether (400 cc.) with 1 N ethereal monoperphthalic acid (100 cc.) and allow the mixture to stand at 20° for 5 days. Wash the solution quickly with ice cold aqueous sodium carbonate, then brine and dry. Evaporate the solvent and filter the yellow gummy residue through a column of Florisil (80 g.) with benzene (400 cc.). Evaporate the eluate to obtain the title compound (6.5 g.).

This compound is useful as an intermediate for preparing compounds which have hormonal activity.

EXAMPLE 167

13β-ethyl-3-methoxygona-1,3,5(10)-trien-16α,17β-diol

Add 17β - acetoxy - 16α,17α - epoxy - 13β - ethyl - 3-methoxygona-1,3,5(10)-triene (6.0 g.) in ether (150 cc.) dropwise to a stirred suspension of lithium aluminum hydride (3.0 g.) in ether (50 cc.), stir for 2 hours and then leave at 20° for 18 hours. Decompose excess reagent by adding a mixture of ethyl acetate and ether (1:9) followed by 2 N hydrochloric acid (1 l.). Extract with ethyl acetate and wash the organic solution with brine, dry and concentrate to a volume of 100 cc. Allow the solution to stand, filter the precipitate and dry to obtain the title compound (2.7 g.) M.P. 118.5–192°.

This compound has estrogenic activity, lowers the blood lipid level, and is useful as an intermediate for preparing compounds which have hormonal activity.

EXAMPLE 168

13β-ethyl-3-methoxygona-1,3,5(10)-trien-16α-ol-17-one

Treat 17 - acetoxy - 13β - ethyl - 16α,17α - epoxy - 3-methoxygona-1,3,5(10)-triene (3.6 g.) in methanol (500 cc.) with 6 N sulfuric acid (75 cc.) and stir the mixture at 25° for 4 days. Reduce the solution to a small volume in vacuo, add water and cool the mixture in an ice bath. the title compound (2.98 g.) M.P· 130–138° homogeneous by thin layer chromatography; infrared absorption peaks at 2.95, 3.45, 3.53, 5.76, 6.21, 6.37, 6.67μ.

This compound is useful as an intermediate for preparing compounds which have hormonal activity.

EXAMPLE 169

13β-ethyl-3-methoxygona-1,3,5(10)-trien-16α,17β-diol

Dissolve 13β - ethyl - 3 - methoxygona - 1,3,5(10)-trien-17β-ol-16-one (0.1 g.) in ethanol (20 cc.), treat with sodium borohydride (0.3 g.) and allow the mixture to stand at 25° for 3 hours. Acidify the mixture with acetic acid, add water and extract with ether. Wash the ethereal solution with aqueous sodium bicarbonate, water, and dry. Evaporate the solvent and recrystallize the residue from ethanol to obtain the title product M.P. 186–188°.

This compound has estrogenic activity, lowers the blood lipid level, and is useful as an intermediate for preparing compounds which have hormonal activity.

EXAMPLE 170

13β-ethyl-17,17-ethylenedioxy-3-methoxygona-1,3,5(10)-trien-16α-ol

Reflux 13β - ethyl - 3 - methoxygona - 1,3,5(10)-trien-16α-ol-17-one (3.46 g.) with p-toluenesulphonic acid (0.6 g.) in ethylene glycol (65 cc.) and toluene (120 cc.) for 68 hours with continuous removal of water. Wash the cooled solution with sodium bicarbonate solution, water, dry, and evaporate. Dissolve the residue in benzene (30 cc.) and chromatograph on Florisil (75 g.), eluting with petroleum ether and petroleum ether-benzene mixtures. Combine the later fractions and recrystallize twice from methanol to obtain the title compound (0.54 g.) M.P. 163–165°; infrared absorption peaks at 2.93, 3.52, 6.22, 6.34, 6.66, 8.07μ.

Calculated for $C_{22}H_{30}O_4$ (percent): C, 73.71; H, 8.44. Found (percent): C, 73.86; H, 8.41.

This compound is useful as an intermediate for preparing compounds which have hormonal activity.

EXAMPLE 171

13β-ethyl-17,17-ethylenedioxy-3-methoxygona-1,3,5(10)-trien-16-one

To a mixture of chromium trioxide (0.5 g.) in pyridine (25 cc.) add a solution of 13β-ethyl-17,17-ethylenedioxy-3-methoxygona-1,3,5(10)-trien-16α-ol (1.0 g.) in pyridine (10 cc.) and allow the mixture to stand at 25° for 18 hours. Pour the mixture into water (600 cc.) and extract with ethyl acetate. Wash the organic solution with water, dry and evaporate. Recrystallize the residue twice from methanol to obtain the title compound (0.225 g.) M.P. 158–160°; infrared absorption peaks at 3.48, 5.70, 6.22, 6.37, 6.67μ.

Calculated for $C_{21}H_{26}O_4$ (percent): C, 73.66; H, 7.66. Found (percent): C, 73.56; H, 7.68.

This compound is useful as an intermediate for preparing compounds which have hormonal activity.

EXAMPLE 172

3,17β - diacetoxy - 16α,17α - epoxy - 13β - ethylgona-1,3,5(10) - triene and 3 - acetoxy - 13β - ethylgona-1,3,5(10)-trien-16α-ol-17-one Dissolve 3 - acetoxy - 13β - ethylgona - 1,3,5(10)-trien-17-one (3.31 g.) in isopropenyl acetate (50 cc.), add p-toluenesulfonic acid (0.5 g.) and heat at 100° for 16 hours. Distill off about half of the solvent over 2 hours and then dilute the cooled solution with aqueous potassium carbonate and brine. Dry the organic solution, evaporate the solvent and chromatograph the residual oil (3.54 g.) on Florisil (200 g.), eluting with benzene. Recrystallize the early fractions, consisting of 3,17-diacetoxy-13β-ethylgona-1,3,5(10),16-tetraene, from ethanol at −5° and dry at 60° under high vacuum in the presence of phosphorus pentoxide to obtain the pure product M.P. 89–89.5°.

Calculated for $C_{23}H_{28}O_4$ (percent): C, 74.97; H, 7.66. Found (percent): C, 75.25; H, 7.34.

Dissolve this diacetoxytetraene (1.17 g.) in dry ether (50 cc.) and add a solution of monoperphthalic acid in ether (0.28 molar; 25 cc.). Allow the mixture to stand for 3 days and then wash with ice cold aqueous sodium carbonate and brine. Dry the ethereal solution, evaporate the solvent and chromatograph the residue on Florisil (100 g.). Elute with benzene-ether (97:3; 500 cc.) to obtain a trace of oil and then with benzene-ether (9:1; 800 cc.) to obtain the first title compound as an oil which slowly crystallizes (0.51 g.). Recrystallize from ethanol to obtain the pure compound (0.3 g.) M.P. 170–171.5° raised to 172–173.5° on further recrystallization.

Calculated for $C_{23}H_{28}O_5$ (percent): C, 71.85; H, 7.34. Found (percent): C, 71.95; H, 7.24.

Elute the column further with benzene-ether (1:1; 120 cc.) to obtain a mixture of products and then with benzene-ether (1:1, 740 cc.) ether (300 cc.) and ether-methanol (19:1; 300 cc.) to obtain the second title compound (0.234 g.) M.P. 166–166.5° after recrystallizing from aqueous alcohol and also existing in an isomorphic form M.P. 181.5–183°.

Calculated for $C_{21}H_{26}O_4$ (percent): C, 73.66; H, 7.66. Found (percent): C, 73.36; H, 7.53.

These compounds are useful as intermediates for preparing compounds which have hormonal activity.

EXAMPLE 173

13β-ethylgona-1,3,5(10)-trien-3,16β,17α-triol and 13β-ethylgona-1,3,5(10)-trien-3,16α,17β-triol Treat a solution of 3,17-diacetoxy-13β-ethylgona-1,3, 5(10),16-tetraene (1.6 g.) in dry tetrahydrofuran (40 cc.) with diborane gas, generated by adding a solution of sodium borohydride (1.75 g.) in diethyleneglycol dimethyl ether (30 cc.) to boron trifluoride etherate (13.3 cc.) in diethyleneglycol dimethyl ether (30 cc.) over a period of 45 minutes. Allow the mixture to stand at 20° for 16 hours, cautiously decompose excess reagent with water (15 cc.) and then reflux with aqueous 2 N sodium hydroxide (60 cc.) and 30% hydrogen peroxide (40 cc.) for 30 minutes. Remove the tetrahydrofuran by evaporation under reduced pressure, acidify the aqueous solution with 2 N hydrochloric acid and extract with ethyl acetate. Wash, dry and evaporate the organic solution to obtain a mixture of the title compounds (0.953 g.).

Combine this material with a further 0.528 g. obtained in the manner described above and chromatograph on Florisil (150 g.). Elute with ether (500 cc.) to obtain one title compound (0.88 g.). Recrystallize from aqueous ethanol and dry at 125°/1 mm. for 16 hours to obtain the pure compound M.P. 229–232°.

Calculated for $C_{19}H_{26}O_3$ (percent): C, 75.46; H, 8.67. Found (percent): C, 75.44; H, 9.13.

Elute the column further with ether-methanol (10:1; 950 cc.) to obtain the other title product (0.359 g.) as a white solid.

This compound has estrogenic activity, lowers the blood lipid level, and is useful as an intermediate for preparing compounds which have hormonal activity.

EXAMPLE 174

13β-ethylgona-1,3,5(10)-trien-3,16α-diol-17-one

Dissolve 3,17β - diacetoxy - 16α,17α - epoxy - 13β-ethylgona-1,3,5(10)-triene (0.406 g.) in warm methanol (60 cc.) and acetone (15 cc.), cool to 20° and add 6 N sulfuric acid (12 cc.) with shaking. Allow to stand at 20° for 6 days and then dilute with an equal volume of ethyl acetate. Cool the mixture to 0° and add ice cold aqueous sodium bicarbonate until alkaline. Separate the organic layer, extract the aqueous with ethyl acetate (2× 150 cc.)

and wash, dry and evaporate the combined organic extracts. Recrystallize the residue from ethanol (10 cc.) to obtain the title product (0.258 g.) M.P. 198–200°. Obtain an analytical sample by further recrystallization from the same solvent and dry in vacuo over phosphorus pentoxide, M.P. 200–202°.

Calculated for $C_{19}H_{24}O_3 \cdot 1/2 C_2H_5OH$ (percent): C, 74.27; H, 8.41. Found (percent): C, 73.80; H, 7.95.

This compound is useful as an intermediate for preparing compounds which have hormonal activity.

EXAMPLE 175

3,16α-diacetoxy-13β-ethylgona-1,3,5(10)-trien-17-one

Dissolve 13β - ethylgona - 1,3,5(10)-trien,3,16α-diol-17-one (0.047 g.) in pyridine (1.0 cc.) and acetic anhydride (0.6 cc.) and allow to stand at 20° for 72 hours. Remove the solvents under reduced pressure and recrystallize the residue from ethanol to obtain the title compound (0.054 g.) M.P. 172–173°.

This compound is useful as an intermediate for preparing compounds which have hormonal activity.

EXAMPLE 176

3,16α-diacetoxy-13β-ethylgona-1,3,5(10)-trien-17-one

Dissolve 3-acetoxy-13β-ethylgona-1,3,5(10)-trien-16α-ol-17-one (0.27 g.) in pyridine (2.0 cc.) and acetic anhydride (1.2 cc.) and allow the solution to stand at 20° for 72 hours. Remove the solvents under reduced pressure and recrystallize the residue from ethanol to obtain the title compound (0.238 g.) M.P. 173–174° after drying in vacuo over phosphorus pentoxide.

Calculated for $C_{23}H_{28}O_5$ (percent): C, 71.85; H, 7.34. Found (percent): C, 71.91; H, 7.20.

This compound is useful as an intermediate for preparing compounds which have hormonal activity.

EXAMPLE 177

13β-ethylgona-1,3,5(10)-trien-3,16α,17β-triol

Add 3,17-diacetoxy-16α,17α-epoxy-13β-ethylgona-1,3,5(10)-triene (0.112 g.) in dry ether (14 cc.) and benzene (4.0 cc.) to a solution of lithium aluminum hydride (0.154 g.) in ether (10 cc.), stir at 20° for 3 hours and then allow to stand for 16 hours. Decompose excess reagent by the cautious addition of ethyl acetate (1.0 cc.), add 2 N hydrochloric acid (50 cc.) and extract with ethyl acetate. Wash, dry and evaporate the organic solution and recrystallize the residue from ethanol at 0° to give the solvated title compound (0.082 g.) M.P. 231.5–234°. Exhaustively dry a sample at 80°/1 mm. for 48 hours to obtain material M.P. 258–260°.

Calculated for $C_{19}H_{26}O_3 \cdot C_2H_5OH$ (percent): C, 71.8; H, 9.04. Found (percent): C, 72.16; H, 72.17.

This compound has estrogenic activity, lowers the blood lipid level, and is useful as an intermediate for preparing compounds which have hormonal activity.

EXAMPLE 178

13β-ethylgona-1,3,5(10)-trien-3,16α,17β-triol

Add 3-acetoxy-13β-ethylgona-1,3,5(10)-trien-16α-ol-17-one (1.33 g.) in benzene (50 cc.) and ether (200 cc.) to a stirred suspension of lithium aluminum hydride (2.01 g.) in ether (150 cc.). Stir at 20° for 5 hours and then allow to stand at 20° for 16 hours. Destroy excess reagent by adding ethyl acetate (15 cc.) in ether (150 cc.). Add more ethyl acetate (150 cc.) and shake with 2 N hydrochloric acid (750 cc.). Separate the organic layer, extract the aqueous solution with ethyl acetate (3× 200 cc.) and wash the combined organic solution with brine and dry. Evaporate the solvent and recrystallize twice from ethanol to obtain the title compound (0.6 g.) M.P. 230–232°.

This compound has estrogenic activity, lowers the blood lipid level, and is useful as an intermediate for preparing compounds which have hormonal activity.

EXAMPLE 179

13β-ethyl-16-oximino-3-methoxygona-1,3,5(10)-trien-17-one

Dissolve potassium (1.5 g.) in tert-butanol (60 cc.) and add 13β-ethyl-3-methoxygona-1,3,5(10)-trien-17-one (6.0 g.). Stir for 5 hours, add isoamyl nitrate (4.5 cc.) and stir the mixture for a further 15 hours. Add ice and water, wash the solution with ether and then acidify with acetic acid and extract with ether. Wash the ethereal solution, dry and evaporate the solvent. Recrystallize the residue from ether to obtain the title compound M.P. 208–210°.

This compound is useful as an intermediate for preparing compounds which have hormonal activity.

EXAMPLE 180

13β-ethyl-3-methoxygona-1,3,5(10)-trien-17β-ol-16-one

Stir 13β-ethyl - 16 - oximino-3-methoxygona-1,3,5(10)-trien-17-one (0.3 g.) with acetic acid (10 cc.) and water (0.6 cc.) at 45° until the steroid dissolves. Add zinc dust (0.8 g.) and water (9.4 cc.) and reflux for 1 hour. Cool the mixture, remove the zinc by decantation and wash the zinc with benzene (100 cc.). To the combined aqueous acetic acid-benzene solutions add aqueous 1.5 N sodium hydroxide (80 cc.) and ether (200 cc.). Separate the organic layer and extract the aqueous solution with benzene-ether (1:1). Wash the combined organic solutions with 0.5 N hydrochloric acid, water, 5% aqueous sodium bicarbonate, water and dry. Remove the solvent and crystallize the residue from ether-ethyl acetate to obtain the title compound (0.07 g.).

This compound is useful as an intermediate for preparing compounds which have hormonal activity.

EXAMPLE 181

13β-ethyl-3-methoxy-16α-methylgona-1,3,5(10)-trien-16β,17β-diol

Dissolve 13β-ethyl-3-methoxygona-1,3,5(10)-trien-17β-ol-16-one (0.4 g.) in benzene (20 cc.) and add a solution of 3 molar methyl magnesium bromide in ether (3 cc.). Stir the mixture for 16 hours at 25° and then reflux for 2 hours. Cool the solution, decompose excess reagent by the addition of acetone, and then with saturated aqueous ammonium chloride (30 cc.). Separate the organic layer, wash and dry. Remove the solvent and crystallize the residue from ethyl acetate-ether to obtain the title compound (0.2 g.) M.P. 156–157°; ultraviolet absorption λ max 279 (ε 2100); infrared peaks at 3.1, 3.45, 6.2 and 6.65μ.

Found (percent): C, 76.18; H, 9.14. $C_{21}H_{30}O_{30}$ requires (percent): C, 76.36; H, 9.10.

This compound is useful as an intermediate for preparing compounds which have hormonal activity.

EXAMPLE 182

13β-ethyl-3-methoxygona-1,3,5(10)-trien-[17,16-c]-pyrazole

Add 13β-ethyl - 16 - hydroxymethylene-3-methoxygona-1,3,5(10)-trien-17-one (1.53 g.) to 100% hydrazine hydrate (17.5 cc.) in ethanol (20 cc.). Heat under reflux for 1 hour. Evaporate some of the solvent under reduced pressure and dilute the residue with water. Filter off the resulting crystalline product. Recrystallize from methanol to obtain the title compound (5.7 mg.), M.P. 112–114°; ultraviolet absorption peaks at 222 mμ (ε 15,700), 277 mμ (ε 2060) and 285.5 mμ (ε 1870).

Calculated for $C_{21}H_{26}N_2O \cdot CH_3OH$ (percent): C, 76.29; H, 8.34; N, 8.28. Found (percent): C, 75.96; H, 8.00; N, 8.50.

This compound has estrogenic activity, lowers the blood lipid level, and is useful as an intermediate for preparing compounds which have hormonal activity.

EXAMPLE 183

13β-ethylgona-1,3,5(10)-trien-3-ol-[17,16-c]-pyrazole

Reflux a mixture of 13β-ethylgona-1,3,5(10)-trien-3-ol-17-one (5.0 g.) and sodium methoxy (5.0 g.) in ethyl formate (30 cc.) and dry benzene (50 cc.) for 2 hours. Cool, pour into ice, wash with ether and acidify the aqueous layer with 10% hydrochloric acid and extract with ether. Wash, dry and evaporate the ethereal extract to obtain 16-hydroxymethylene-13β-ethylgona-1,3,5(10)-trien-3-ol-17-one (1.5 g.) as a crude gum. Add crude 16-hydroxymethylene - 13β - ethylgona-1,3,5(10)-trien-3-ol-17-one (1.5 g.) to a solution of 100% hydrazine hydrate (17.5 cc.) and ethanol (20 cc.). Heat under reflux for 1 hour. Evaporate some of the solvent under reduced pressure and dilute the residue with water. Filter off the resulting crystalline product. Recrystallize from ethanol to obtain the title compound (610 mg.), M.P. 227–229°; ultraviolet absorption peaks at 222 mμ (ε 14,250), 279.5 mμ (ε 2030) and 285 mμ (ε 1860) (shoulder).

Calculated for $C_{20}H_{24}N_2O \cdot H_2O$ (percent): C, 75.67; H, 7.94; N, 8.83. Found (percent): C, 75.27; H, 7.63; N, 8.89.

This compound has estrogenic activity, lowers the blood lipid level, and is useful as an intermediate for preparing compounds which have hormonal activity.

EXAMPLE 184

13β-ethyl-16-hydroxymethylene-3-methoxygona-1,3,5(10)-trien-17-one

Stir a solution of 13β-ethyl-3-methoxygona-1,3,5(10)-trien-17-one (5.0 g.) and sodium methoxide (1.7 g.) in benzene (50 cc.) and ethyl formate (30 cc.) at 20° for 1½ hours, and then reflux for 1 hour. Cool, pour onto ice and extract with ether. Neutralize the aqueous layer with concentrated hydrochloric acid and extract with ethyl acetate. Wash and dry the ethyl acetate extract, evaporate under reduced pressure and recrystallize from ethyl acetate to obtain the title compound (1.34 g.), M.P. 83–89°.

Calculated for $C_{21}H_{26}O_3$ (percent): C, 77.27; H, 8.03. Found (percent): C, 77.52; H, 7.92.

This compound is useful as an intermediate for preparing compounds which have hormonal activity.

EXAMPLE 185

13β-ethyl-16,16-difluoro-3-methoxygona-1,3,5(10)-trien-17-one

Dissolve potassium (0.2 g.) in tert-butanol (25 cc.) and add 13β-ethyl-16-hydroxymethylene-3-methoxygona-1,3,5(10)-trien-17-one (0.74 g.) in tert-butanol (25 cc.). Pass a stream of perchloryl fluoride through the solution for 20 minutes, at the same time adding a solution of potassium (0.2 g.) in tert-butanol (20 cc.) dropwise. Evaporate the solvent at 25° under reduced pressure and partition the resulting solid between chloroform and water. Wash the organic layer with water, dry and evaporate under reduced pressure. Chromatograph the gummy residue on a silica gel column eluting with light petroleum containing increasing portions of benzene. Recrystallize the solid fractions from methanol to obtain the title compound (0.18 g.), M.P. 130–133°.

Calculated for $C_{20}H_{24}O_2F_2$ (percent): C, 71.83; H, 7.23; F, 11.37. Found (percent): C, 72.11; H, 7.31; F, 11.6.

This compound has estrogenic activity, lowers the blood lipid level, and is useful as an intermediate for preparing compounds which have hormonal activity.

EXAMPLE 186

16-ethoxalyl-13β-ethyl-3-methoxygona-1,3,5(10)-trien-17-one

Stir a mixture of 13β-ethyl-3-methoxygona-1,3,5(10)-trien-17-one (1.0 g.), sodium methoxide (0.35 g.), diethyl oxalate (0.8 g.) and benzene (20 cc.) at 20° for 18 hours under nitrogen. Dilute the suspension with ice cold water (10 cc.), add methanol (10 cc.) and 5% aqueous potassium hydroxide (45 cc.), separate the organic phase and extract it with 5% aqueous potassium hydroxide. Combine this aqueous extract with the aqueous phase and acidify with 2 N hydrochloric acid. Extract with ether, and wash, dry and evaporate the organic solution. Recrystallize the residue twice from methanol to obtain the title compound (0.14 g.), M.P. 130–136°; infrared absorption peaks at 5.77, 6.01, 6.66μ; ultraviolet absorption peak at 295 mμ (ε 10,200).

Calculated for $C_{24}H_{30}O_5$ (percent): C, 72.33; H, 7.59. Found (percent): C, 72.40; H, 7.30.

This compound is useful as an intermediate for preparing compounds which have hormonal activity.

EXAMPLE 187

13β-ethyl-16-fluoro-3-methoxygona-1,3,5(10)-trien-17-one

Pass perchloryl fluoride into a solution of 16-ethoxalyl-13β-ethyl-3-methoxygona-1,3,5(10)-trien-17-one (0.79 g.) and sodium methoxide (0.16 g.) in methanol (20 cc.) at −15° with stirring for 10 minutes. Evaporate the solution under reduced pressure at 25° and partition the residue between chloroform and water. Separate the organic layer, wash with water and dry, and evaporate the solvent. Dissolve the gummy residue in methanol (20 cc.) containing potassium acetate (1.5 g.) and reflux the solution for 1 hour. Evaporate to dryness and partition the residue between chloroform and water. Wash, dry and evaporate the organic solution and chromatograph the residue on a column of silica gel, eluting with petroleum ether containing increasing proportions of benzene. Recrystallize the solid fractions from methanol to obtain the title compound (0.085 g.), M.P. 139–164°; infrared absorption maximum at 5.69μ; ultraviolet absorption peak at 279 mμ (ε 2,180).

Calculated for $C_{20}H_{25}O_2F$ (percent): C, 75.92; H, 7.97; F, 6.01. Found (percent): C, 75.75; H, 7.96; F, 6.24.

This compound has estrogenic activity, lowers the blood lipid level, and is useful as an intermediate for preparing compounds which have hormonal activity.

EXAMPLE 188

13β-ethyl-3-methoxy-16-methylenegona-1,3,5(10)-trien-17-one

Reflux a solution of 13β-ethyl-3-methoxygona-1,3,5(10)-trien-17-one (6.9 g.), paraformaldehyde (3.5 g.) and diethylamino hydrochloride (12.0 g.) in isoamyl alcohol (60 cc.) for 2 hours, and then evaporate to dryness under reduced pressure and dissolve the residue in chloroform. Wash with 5% hydrochloric acid, water, aqueous saturated sodium bicarbonate, water and dry. Evaporate the solvent and chromatograph the residue on silica gel, eluting the column with petroleum ether containing increasing proportions of benzene. Recrystallize the solid fractions from methanol to give the title compound (0.62 g.) M.P. 150–151°; infrared absorption peaks at 5.8, 6.1μ; ultraviolet absorption maxima at 279 mμ (ε 2,140).

Calculated for $C_{21}H_{26}O_2$ (percent): C, 81.25; H, 8.44. Found (percent): C, 81.23; H, 8.27.

This compound is useful as an intermediate for preparing compounds which have hormonal activity.

EXAMPLE 189

13β - ethyl - 17,17 - ethylenedioxy-3-methoxy-16-methylenegona-1,3,5(10)-triene

Reflux 13β - ethyl - 3 - methoxy - 16 - methylenegona-1,3,5(10)-trien-17-one (0.6 g.) with p-toluenesulfonic acid (0.1 g.) in toluene (100 cc.) with continuous removal of water for 134 hours, adding ethylene glycol (140 cc.) in portions over 130 hours. Wash the cooled solution with saturated aqueous sodium bicarbonate, water, then dry and evaporate the solvent under reduced pressure. Chromatograph the residue on a column of silica gel, eluting with petroleum ether containing increasing proportions of benzene. Recrystallize the solid fractions from methanol to obtain the title compound (0.07 g.), M.P. 103–106°; infrared absorption peaks at 6.20, 6.65μ; ultraviolet absorption maximum at 279 mμ (ε 2,210).

Calculated for $C_{23}H_{30}O_3$ (percent): C, 77.93; H, 8.54. Found (percent): C, 78.06; H, 8.62.

This compound is useful as an intermediate for preparing compounds which have hormonal activity.

EXAMPLE 190

13β - ethyl - 3-methoxy-16β-methylgona-1,3,5(10)-trien 17-one

Add 13β-ethyl-3-methoxy-16-methylenegona-1,3,5(10)-trien-17-one (1.0 g.) in methanol (50 cc.) to prehydrogenated 5% palladium on charcoal catalyst (0.5 g.) in methanol (50 cc.) and hydrogenate until one molecular equivalent (72 cc.) has been absorbed (10 min.) Filter the catalyst, evaporate the solvent and recrystallize the residue from methanol to obtain the title compound (0.42 g.), M.P. 147–149°; infrared absorption peak at 5.8μ; ultraviolet absorption maximum at 279μ (ε, 2,160).

Calculated for $C_{21}H_{28}O_2$ (percent): C, 80.72; H, 9.07. Found (percent): C, 80.53; H, 8.99.

This compound has estrogenic activity, lowers the blood lipid level, and is useful as an intermediate for preparing compounds which have hormonal activity.

EXAMPLE 191

16α - bromo - 13β-ethyl - 17,17-ethylenedioxy-3-methoxy-gona-1,3,5(10)-triene

Add pyridinium bromide perbromide (0.84 g.) to a stirred solution of 13β - ethyl - 17,17 - ethylenedioxy-3-methoxygona-1,3,5(10)-triene (0.65 g.) in tetrahydrofuran (65 cc.). After 2½ hours pour the mixture into 5% aqueous sodium bicarbonate (150 cc.) and extract with chloroform. Wash, dry and evaporate the organic solution and recrystallize from acetonitrile and methanol to give the title compound (0.39 g.), M.P. 145–150°; infrared absorption peak at 6.27, 6.65; ultraviolet absorption maximum at 278 mμ (ε 2,060).

Calculated for $C_{22}H_{29}O_3Br$ (percent): C, 62.71; H, 6.94; Br, 18.97. Found (percent): C, 63.09; H, 6.88; Br, 19.0.

This compound is useful as an intermediate for preparing compounds which have hormonal activity.

EXAMPLE 192

16α - chloro - 13β - ethyl - 3 - methoxygona-1,3,5(10)-trien-17-one

To a solution of 17-acetoxy-13β-ethyl-3-methoxygona-1,3,5(10),16-tetraene (1.5 g.) in carbon tetrachloride (55 cc.) containing anhydrous potassium carbonate (1.6 g.), add at 5–10° with vigorous stirring, a solution of 0.825 M chlorine in carbon tetrachloride (5.5 cc.). After 7 minutes add anhydrous potassium carbonate (1.6 g.), continue stirring at 5–10° for 30 minutes and then add a solution of sodium bisulphite (1.6 g.) in water (40 cc.). Separate the organic layer and wash, dry and evaporate. Recrystallize the residue from methanol and then chromatograph on silica gel, eluting the column with light petroleum containing increasing proportions of benzene. Recrystallize from methanol to obtain the title compound (0.41 g.), M.P. 144–149°; infrared absorption peak at 5.72μ; ultraviolet absorption maximum at 279 mμ (ε 2,160).

This compound has estrogenic activity, lowers the blood lipid level, and is useful as an intermediate for preparing compounds which have hormonal activity.

EXAMPLE 193

16α - bromo - 13β - ethyl - 3 - methoxygona-1,3,5(10)-trien-17-one

Add a solution of bromine (0.55 g.) in carbon tetrachloride (10 cc.) dropwise to a suspension of anhydrous potassium carbonate (0.65 g.) and 17-acetoxy-13β-ethyl-3-methoxygona - 1,3,5(10,16-tetraene (1.0 g.) in carbon tetrachloride (36 cc.) at 0° with stirring over 8 minutes. Pour the mixture into a solution of sodium bisulphite (1.0 g.) in water, separate the organic layer and extract the aqueous layer with chloroform. Wash, dry and evaporate the combined organic solution and recrystallize the residue from methanol to obtain the title compound (0.97 g.) M.P. 158–162°; infrared absorption peak at 5.74μ; ultraviolet absorption maximum 280 mμ (ε 1,650).

This compound has estrogenic activity, lowers the blood lipid level, and is useful as an intermediate for preparing compounds which have hormonal activity.

EXAMPLE 194

13β-ethyl-3-methoxy-17α-hydroxypropargylgona-1,3,5(10)-trien-17β-ol

Reflux a mixture of 3 m methyl magnesium bromide in ether (250 cc.) and tetrahydropyranyloxypropargyl (115 g.) in tetrahydrofuran (100 cc.) for 3 hours, then add 13β-ethyl-3-methoxygona - 1,3,5(10)-17-one (80 g.) in tetrahydrofuran (500 cc.) and reflux for a further 3½ hours. Allow the mixture to stand for 18 hours, then decompose with water and separate the organic layer and dilute with ether. Wash with 5% sulfuric acid, water, dry and evaporate the solvent under reduced pressure. Dissolve the gummy residue in methanol (180 cc.), hydrochloric acid (4.8 cc.) and water (7.2 cc.) and stir at 20° for 1 hour. Add water, filter the precipitate and recrystallize from methanol to obtain the title compound (31.8 g.), M.P. 160–163°; infrared absorption peaks at 3.1, 3.45, 6.2, 6.65μ.

This compound is useful as an intermediate for preparing compounds which have hormonal activity.

EXAMPLE 195

13β-ethyl-17α-(3-hydroxypropyl)-3-methoxygona-1,3,5(10)-trien-17β-ol

Add 13β-ethyl-3-methoxy-17α-hydroxypropargylgona-1,3,5(10)-trien-17β-ol (2.0 g.) in benzene (50 cc.) to prehydrogenated 2% palladium on charcoal (1.0 g.) in benzene (15 cc.) and hydrogenate until uptake stops. Filter the catalyst, evaporate the solvent and recrystallize the residue from methanol to obtain the title compound (1.2 g.), M.P. 166–169°.

This compound is useful as an intermediate for preparing compounds which have hormonal activity.

EXAMPLE 196

13β′-ethyl-4,5-dihydro-3′-methoxyspiro[furan-2(3H)-17′-gona-1′-3′,5′(10′)-triene]

Dissolve 13β-ethyl-17α-(3-hydroxypropyl)-3-methoxygona-1,3,5(10)-trien-17β-ol (30.4 g.) in pyridine (85 cc.) and add p-toluenesulfonyl chloride (20 g.). Stir for 16 hours, add water, filter the precipitate and recrystallize from methanol-ether to obtain the title compound (21.2 g.), M.P. 111–113°; infrared absorption peaks at 6.2, 6.66μ.

This compound is useful as an intermediate for preparing compounds which have hormonal activity.

EXAMPLE 197

13β-ethyl-17-hydroxy-3-methoxygona-1,3,5(10)-triene-17α-propionic acid, γ-lactone Add 8 N chromic acid (8 cc.) to 13β-ethyl-17α-(3-hydroxypropyl)-3-methoxygona-1,3,5(10)-trien- 17β -ol 2.0 g.) in acetone (120 cc.) and stir for 15 minutes. Add isopropanol (20 cc.), filter and evaporate the solvent. Dissolve the residue in benzene-ether and wash, dry and evaporate the organic solution. Recrystallize the residue from methanol to obtain the title compound (1.3 g.), M.P. 173–176°.

This compound is useful as an intermediate for preparing compounds which have hormonal activity.

EXAMPLE 198

13β-ethyl-17α-(3-hydroxypropyl)-3-methoxygona-1,3,5(10)-trien-17β-ol

Dissolve 13β - ethyl - 17 - hydroxy-3-methoxygona-1,3,5(10)-triene-17α-propionic acid, γ-lactone (40 g.) in ether (500 cc.), add lithium aluminum hydride (15 g.) and reflux for 2 hours. Add water to decompose excess reagent, filter and evaporate the filtrate. Recrystallize the residue from ethanol to obtain the title compound (32.4 g.), M.P. 172–175°.

This compound is useful as an intermediate for preparing compounds which have hormonal activity.

EXAMPLE 199

13β-ethyl-17-hydroxy-3-methoxygona-1,3,5(10)-triene-17α-yl-propiolic acid

Add a solution of 13β-ethyl-17α-ethynyl-3-methoxygona-1,3,5(10)-trien-17β-ol (2.0 g.) in tetrahydrofuran (10 cc.) to a refluxing solution of 3 M methyl magnesium bromide in ether (24 cc.) and tetrahydrofuran (30 cc.) and stir the mixture under reflux for 22 hours. Cool to 20° and maintain a slight positive pressure of carbon dioxide over the rapidly stirred solution for 2 hours. Pour the solution into cold 0.5 M sulfuric acid and extract with ether. Extract the ether solution with 10% aqueous sodium carbonate, and acidify with 2 M sulfuric acid. Filter the precipitate and recrystallize from aqueous methanol and then ethyl acetate-hexane to obtain the title compound, M.P. 174–175°.

Calculated for $C_{23}H_{28}O_4$ (percent): C, 74.97; H, 7.66. Found (percent): C, 74.87; H, 7.37.

This compound is useful as an intermediate for preparing compounds which have hormonal activity.

EXAMPLE 200

13β-ethyl-17-hydroxy-3-methoxygona-1,3,5(10)-triene-17α-propionic acid, γ-lactone Hydrogenate 13β-ethyl-17-hydroxy-3-methoxygona-1,3,5(10)-triene-17α-propiolic acid (3.7 g.) in ethanol (100 cc.) containing 10% palladium on carbon catalyst (1.0 g.) at atmospheric pressure until two molecular equivalents of hydrogen have been absorbed. Filter the catalyst, evaporate the solvent and recrystallize the residue from ethyl acetate-hexane to obtain the title compound, M.P. 174–175°.

Calculated for $C_{23}H_{30}O_3$ (percent): C, 77.93; H, 8.53. Found (percent): C, 77.66; H, 8.42.

This compound is useful as an intermediate for preparing compounds which have hormonal activity.

EXAMPLE 201

13β-ethyl-17-hydroxy-3-methoxygona-1,3,5(10)-triene-17α-propionic acid, sodium salt Suspend 13β-ethyl - 17 - hydroxy-3-methoxygona-1,3,5(10)-triene-17α-propionic acid, γ-lactone (2.0 g.) in triethylamine (75 cc.) and water (14 cc.) containing sodium hydroxide (0.4 g.) and reflux for 16 hours. Add water (25 cc.), reflux a further 4 hours and then evaporate under reduced pressure and dry the residue by azeotroping with benzene (3× 175 cc.) and then keeping for 4 hours at 5 mm./Hg. Recrystallize twice from ethanol to obtain the title compound (0.71 g.) as a dihydrate M.P. 135–145°; infrared absorption peaks at 3.05, 3.45μ.

Calculated for $C_{23}H_3NaO_4 \cdot 2H_2O$ (percent): C, 64.16; H, 8.19. Found (percent): C, 64.90; H, 8.07.

This compound is useful as an intermediate for preparing compounds which have hormonal activity.

EXAMPLE 202

13β-n-propyl-17-hydroxy-3-methoxygona-1,3,5(10)-triene-17α-propiolic acid

Add 17α-ethynyl-3-methoxy-13β-propylgona-1,3,5(10)-trien-17β-ol (8.7 g.) in tetrahydrofuran (200 cc.) with stirring to 3 M ethereal methyl magnesium bromide (100 cc.) and reflux the stirred mixture for 22 hours. Cool to 25°, add ether (100 cc.) and benzene (150 cc.) and pour onto crushed solid carbon dioxide (500 g.) and allow to warm to 20° with occasional shaking. Add a solution of concentrated sulfuric acid (12 cc.) in water (88 cc.) slowly and stir for 30 minutes. Dilute with brine (100 cc.) and extract with ether. Extract the ether solution thoroughly with 3.5% aqueous sodium bicarbonate, acidify the aqueous extracts and extract with ether. Wash, dry and evaporate the solvent to obtain the title compound (1.45 g.) M.P. 182–185° (gas evolution). Recycle the neutral material to obtain a total of 5.44 g. of product. Recrystallize a sample from acetone-n-hexane to obtain material M.P. 193–196° (gas evolution); infrared absorption peaks at 2.97; 3.83; 5.91μ; ultraviolet absorption peaks at 279.5 and 287.5 mμ (ε 2080 and 1,860).

This compound is useful as an intermediate for preparing compounds which have hormonal activity.

EXAMPLE 203

13β-n-propyl-17-hydroxy-3-methoxygona-1,3,5(10)-triene-17α-propionic acid, γ-lactone Add 13β - n - propyl-17-hydroxy-3-methoxygona-1,3,5-(10)-triene-17α-propiolic acid (4.3 g.) in ethanol (100 cc.) to pre-reduced 5% palladised charcoal (3.0 g.) in ethanol (50 cc.) and hydrogenate at atmospheric pressure until hydrogen uptake ceases. Filter the catalyst, evaporate the solvent and dry at 25°/1 mm. for 16 hours to obtain the title compound (3.04 g.) M.P. 183–191°, in admixture with a little of the corresponding hydroxy acid.

This compound is useful as an intermediate for preparing compounds which have hormonal activity.

EXAMPLE 204

13β-ethyl-17β-hydroxymethyl-3-methoxygona-1,3,5(10)-trien-11α-ol

Add methyl triphenyl phosphonium bromide (100 g.) to a solution of phenyl lithium [prepared from phenyl bromide 58.5 g. and lithium (5.1 g.)] in ether (1750 cc.) and stir the mixture under nitrogen at 25° for 2 hours. Add 13β-ethyl-3-methoxygona-1,3,5(10),9(11) - tetraene-17-one (17.25 g.) in ether (300 cc.) and tetrahydrofuran (150 cc.) and reflux for 30 minutes. Slowly distill off the ether (2500 cc.), adding dry tetrahydrofuran portionwise during the latter part of the distillation, and then reflux for a further 48 hours. Filter the cooled reaction mixture and evaporate the filtrate to a semi-solid. Extract this residue three times with ether-light petroleum, then take up the remaining residue in water and extract further with the same solvent mixture. Wash the combined extracts with 5% hydrochloric acid, water, aqueous potassium bicarbonate and brine. Evaporate the dried solution and dissolve the residue in benzene-light petroleum (1:4; 500 cc.) and filter the precipitate. Pour the filtrate through neutral alumina (100 g.) and wash the column with benzene-light petroleum (1:4; 500 cc.). Evaporate the eluates and recrystallize the residue from methanol to botain 13β-ethyl-17-methylene - 3 - methoxygona - 1,3,5(10),9(11)-tetraene (10.9 g.) M.P. 92–99°, contaminated with a little starting material. Obtain the pure compound by further recrystallization from methanol M.P. 107.5–108.5.

Calculated for $C_{21}H_{26}O$ (percent): C, 85.66; H, 8.90. Found (percent): C, 85.66; H, 8.69.

To a stirred solution of this compound (3.0 g.) in dry tetrahydrofuran (100 cc.) pass diborane generated by adding a solution of sodium borohydride (1.25 g.) in diethyleneglycol dimethyl ether (30 cc.) to boron trifluoride etherate (10 cc.) in diethyleneglycol dimethyl ether (20 cc.) over 1½ hours, and then heat the solutions at 70° for 1 hour and then leave for 16 hours at 20°. Add water (20 cc.) followed by aqueous 2 N sodium hydroxide (40 cc.) and 100 vol. hydrogen peroxide (30 cc.) and reflux for 45 minutes. Evaporate the tetrahydrofuran under reduced pressure, acidify the cooled residue with dilute hydrochloric acid and extract thoroughly with ethyl acetate. Wash the combined extracts with aqueous potassium bicarbonate, dry and evaporate the solution and recrystallize the residue twice from methanol to obtain the title compound (1.326 g.) M.P. 184–186°; ultraviolet absorption peak at 276 m$\mu$ ($\epsilon$ 1820).

Calculated for $C_{21}H_{30}O_3$ (percent): C, 76.32 H, 9.15. Found (percent): C, 76.23; H, 8.96.

This compound is useful as an intermediate for preparing compounds which have hormonal activity.

EXAMPLE 205

11$\alpha$-acetoxy-17$\beta$-acetoxymethyl-13$\beta$-ethyl-3-methoxygona-1,3,5(10)-triene Heat 13$\beta$-ethyl-17$\beta$-hydroxymethyl - 3 - methoxygona-1,3,5(10)-trien-11$\alpha$-ol (0.2) g.) with acetic anhydride (0.5 cc.) and pyridine (0.5 cc.) for 1 hour. Evaporate the solvents under reduced pressure and recrystallize to residue from ethanol to obtain the title compound M.P. 110–111.5°; ultraviolet absorption peaks at 276 m$\mu$ ($\epsilon$ 1815) and 281 m$\mu$ ($\epsilon$ 1650).

Calculated for $C_{20}H_{28}O_3$ (percent): C, 72.43; H, 8.27. Found (percent): C, 72.73; H, 8.12.

This compound is useful as an intermediate for preparing compounds which have hormonal activity.

EXAMPLE 206

13$\beta$-ethyl-17$\beta$-(1-hydroxyethyl)-3-methoxygona-1,3,5(10)-trien-11$\alpha$-ol Reflux 13$\beta$,17$\alpha$-diethyl - 3 - methoxygona-1,3,5(10), 9(11)-tetraene-17$\beta$-ol (3.3 g.) with phosphoryl chloride (3.0 cc.) in pyridine for 45 minutes. Pour the cooled mixture onto ice (150 g.) and extract with ether. Wash, dry and evaporate the organic solution, dissolve the residue in benzene-light petroleum (1:1) and filter through a column of Florisil. Evaporate the eluate to obtain a gum which slowly crystallizes. Recrystallize a sample from glacial acetic acid to obtain 13$\beta$ - ethyl-17$\beta$-ethylidene-3-methoxygona - 1,3,5(10),9(11) - tetraene (0.451 g.), M.P. 82–83.5°.

Treat this compound (2.0 g.) in tetrahydrofuran (250 cc.) with diborane gas prepared by adding a solution of sodium borohydride (5.2 g.) in diethyleneglycol dimethyl ether (100 cc.) to boron trifluoride etherate (40 cc.) in diethylene glycol dimethyl ether (80 cc.) over 1½ hours. Leave the mixture at 25° for 16 hours, then add water (80 cc.) followed by aqueous 2 N sodium hydroxide (170 cc.) and 30% hydrogen peroxide (120 cc.). Reflux for 30 minutes, remove the tetrahydrofuran under reduced pressure and acidify with dilute hydrochloric acid. Extract the mixture with ether, wash with aqueous sodium bicarbonate, dry, and evaporate under reduced pressure. Chromatograph the residue on Florisil and recrystallize the solid fractions from methanol to obtain the title compound (0.459 g.) M.P. 131–132°.

This compound is useful as an intermediate for preparing compounds which have normal hormonal activity.

EXAMPLE 207

13$\beta$-ethylgona-1,3,5(10)-triene-3,11$\alpha$,16$\alpha$,17$\beta$-tetrol

Heat a mixture of 13$\beta$-ethyl-3-acetoxygona-1,3,5(10), 9(11)-tetraen-17-one (2.04 g.) and p-toluenesulfonic acid (0.6 g.) in isopropenyl acetate (50 cc.) on a steam bath and remove portions (2 × 3 cc.) of solvent by distillation after two and four hours and then maintain the mixture at 100° for 16 hours. Reduce the volume (to about 20 cc.) by slow distillation through a short column over a period of six hours under a pressure of 600 mm. Add ether (70 cc.) to the cooled solution and wash with aqueous potassium bicarbonate, brine and dry. Evaporate the solvent, dissolve the residue in benzene and chromatograph on Florisil (150 g.), eluting with benzene (990 cc.) to obtain a colorless oil (0.23 g.) and then with benzene (2 l.) and benzene-ether (200 cc.; 49:1) to obtain 13$\beta$ - ethylgona-1,3,5(10),9(11),16-pentaene-3,17-diol, diacetate (1.17 g.) M.P. 150–151° after purification from ethanol.

Calculated for $C_{23}H_{26}O_4$ (percent): C, 75.38; H, 7.15. Found (percent): C, 75.41; H, 7.19.

Dissolve this pentaene (3.59 g.) in dry tetrahydrofuran (150 cc.) and through the solution bubble diborane (generated by adding 1.24 g. of sodium borohydride in 30 cc. of diethyleneglycol dimethyl ether to 10 cc. of boron trifluoride etherate in 20 cc. of diethyleneglycol dimethyl ether) over a period of 2 hours and then allow to stand at 20° for 16 hours. Add water (20 cc. cautiously to decompose excess reagent, and then treat the resulting solution with hydrogen peroxide (30 cc.; 100 volume) and aqueous 2 N sodium hydroxide (42 cc.). Reflux for 30 minutes, evaporate the tetrahydrofuran under reduced pressure, and acidify the resulting aqueous solution with concentrated hydrochloric acid (10 cc.). Extract with ethyl acetate and wash the organic solution with aqueous potassium bicarbonate and brine, dry and evaporate the solvent. Triturate the residue with hot acetone, cool and filter to obtain the title compound (1.09 g.) M.P. 249–254° (dec.). Recrystallize from ethanol to raise the melting point to 256–258°.

Calculated for $C_{19}H_{26}O_4$ (percent): C, 71.67; H, 8.23. Found (percent): C, 71.79; H, 8.14.

This compound is useful as an intermediate for preparing compounds which have normal hormonal activity.

EXAMPLE 208

13$\beta$-ethylgona-1,3,5(10)-trien-3,9$\alpha$,16$\alpha$,17$\beta$-tetrol

Chromatograph the material from the mother liquors of the acetone trituration in the previous example (1.1 g.) on Florisil (220 g.), eluting with benzene-methanol (19:1). Rechromatograph the early fractions on Florisil (40 g.), eluting with ether. Triturate the solid with ether (2.0 cc.) to obtain the title compound (0.198 g.). Dissolve a sample (0.05 g.) in methanol (2.0 cc.), add water (2.0 cc.), cool to 0° and seed. Filter the precipitate and dry at 90°/10$^{-3}$ cm.$^{-1}$ for 3 hours to obtain the pure title compound as a hemimethanolate M.P. 154–156° resolidifying and melting at 214.5–215°.

Calculated for $C_{19}H_{26}O_4 \cdot \frac{1}{2}C_2H_5OH$ (percent): C, 70.35; H, 8.56. Found (percent): C, 70.32; H, 8.57.

This compound is useful as an intermediate for preparing compounds which have hormonal activity.

EXAMPLE 209

3-acetoxy-9$\alpha$,11$\alpha$-epoxy-13$\beta$-ethylgona-1,3,5(10)-trien-17-one

Treat 3 - acetoxy - 13$\beta$ - ethylgona - 1,3,5(10),9(11)-tetraen-17-one (0.572 g.) in dry ether (30 cc.) and chloroform (3.0 cc.) with ethereal monoperphthalic acid (6.0 cc.; 0.43 Molar) and allow the mixture to stand at 20° for 2 days. Dilute the mixture with ether and wash with ice cold aqueous sodium carbonate, brine and dry. Evaporate the solvent and crystallize the residue by adding methanol. Recrystallize from ethanol to obtain the title compound (0.422 g.), M.P. 153–170°, contaminated with a little starting material. Recrystallize a sample from ethanol to obtain a pure sample M.P. 171–174°.

Calculated for $C_{21}H_{24}O_4$ (percent): C, 74.09; H, 7.11. Found (percent): C, 74.07; H, 7.12.

This compound is useful as an intermediate for preparing compounds which have hormonal activity.

EXAMPLE 210

3-methoxy - 13β-ethyl - 17β-(2-tetrahydropyranyloxy - 1-hydroxyethyl)gona - 1,3,5(10) - trien - 9α-ol and 3-methoxy - 13β-ethyl - 17β-(2-tetrahydropyranyloxy - 1-hydroxyethyl)gona-1,3,5(10)-trien-11α-ol Add triethylphosphono acetate (40.5 g.) dropwise to a stirred suspension of sodium hydride (9.0 g.; 50% suspension in oil) in 1,2-dimethoxyethane (20 cc.) at 25°. Stir for 1 hour and then add 13β-ethyl-3-methoxygona-1,3,5(10),9(11)-tetraen-17-one (10 g.) and dimethoxyethane (55 cc.) and reflux for 88 hours. Pour the cooled solution into brine (2000 cc.), extract with ether (2× 750 cc.) and wash, dry and evaporate the ethereal solution, finally at 100°/0.2 mm. to obtain a brown gum. Dissolve this in ether and chromatograph on Florisil (700 g.) to obtain 17β-carboxymethylene-3-methoxy-13β-ethylgona - 1,3,5(10),9(11)-tetraene, ethyl ester (3.45 g.) M.P. 92–96° raised to 96–97.5 on purification from light petroleum.

Calculated for $C_{24}H_{30}O_3$ (percent): C, 78.65; H, 8.25. Found (percent): C, 78.58; H, 8.14.

Treat this product (0.144 g.) in ether (20 cc.) with lithium aluminum hydride (0.215 g.) in ether (10 cc.) and reflux for 30 minutes and then leave at 25° for 16 hours. Add ethereal ethyl acetate to decompose excess reagent, dilute with ether (300 cc.) and wash with dilute hydrochloric acid, aqueous potassium bicarbonate and brine, and dry. Evaporate the solvent and crystallize from ethyl acetate-light petroleum to obtain 17β-(2-hydroxyethylidene)-13β-ethyl - 3- methoxygona-1,3,5(10),9(11)-tetraene (0.028 g.) M.P. 136–137° (160–161° when heated slowly). Purify from ethyl acetate-light petroleum to obtain a pure sample M.P. 162–163.5.

Calculated for $C_{22}H_{28}O_2$ (percent): C, 81.44; H, 8.70. Found (percent): C, 81.27; H, 8.51.

Treat a suspension of this compound (0.385 g.) in ether (10 cc.) and dihydropyran (2.0 cc. with concentrated hydrochloric acid (1 drop), stir for 30 minutes and then blow a little hydrogen chloride over the surface of the reaction mixture and stir for a further 2 hours, by which time all the steroid has dissolved. Wash with aqueous sodium carbonate and brine, dry, evaporate the solvent and dry the residue at 100°/0.5 mm. for 2 hours. Chromatograph the gummy product on Florisil (10 g.) eluting with benzene to obtain 13β-ethyl-3-methoxy - 17β-(2-tetrahydropyranyloxyethylidene)gona - 1,3,5(10),9(11)-tetraene (0.415 g.) as a colorless oil.

Dissolve this material (0.415 g.) in tetrahydrofuran (20 cc.) and treat with a stream of diborane generated by adding sodium borohydride (1.6 g.) in diethyleneglycol dimethyl ether (20 cc.) to boron trifluoride etherate (12 cc.) in diethyleneglycol dimethyl ether (25 cc.) over a period of 2 hours. Allow to stand at 25° for 16 hours, decompose excess reagent with water and add 30% hydrogen peroxide (38 cc.) and aqueous sodium hydroxide (40 cc.) and reflux for 30 minutes. Remove the tetrahydrofuran under reduced pressure and extract with ether. Wash the organic solution with brine, dry and evaporate to obtain a mixture of the title compounds (0.346 g.) as an oily solid. Recrystallize from ethyl acetate to obtain a solid (0.059 g.) M.P. 225–232°.

These compounds are useful as intermediates for preparing compounds which have hormonal activity.

EXAMPLE 211

13β-ethylgona-1,3,5(10)-triene-3,11α,17β-triol

Dissolve 3,17β-diacetoxy - 13β-ethylgona - 1,3,5(10),9(11)-tetraene (22.5 g.) in dry tetrahydrofuran (250 cc.) and treat the solution with diborane (produced by adding 6 g. of sodium borohydride in 100 cc. of diethyleneglycol dimethyl ether to 42 cc. of boron trifluoride etherate in 66 cc. of diethylene glycol dimethyl ether) at 20° over a period of 3 hours. Allow the mixture to remain at 20° for 16 hours and then decompose the excess diborane by adding water. Add 30% hydrogen peroxide (144 cc.) and aqueous 2.5 N sodium hydroxide and reflux gently for 30 minutes. Evaporate the tetrahydrofuran under reduced pressure, acidify the residue with hydrochloric acid and extract with ether (2× 600 cc.). Wash the organic solution with aqueous potassium bicarbonate and brine, dry and evaporate the solvent. Triturate the residue (14 g.) with ether (50 cc.), filter and recrystallize from methanol (70 cc.) at −5° to obtain the title compound (2.5 g.), M.P. 165° as a cloudy melt clearing by 175°. Combine the mother liquors from the trituration and recrystallization and evaporate the solvents. Chromatograph the residue (12.2 g.) on 750 g. of Florisil as follows: elute 86 mg. of oil with 500 ml. benzene-methanol (19:1); elute 4.5 g. of 13-ethylgona - 1,3,5(10)-triene-3,9α,17β-triol with 1400 ml. of benzene-methanol (19:1); elute 887 mg. of a mixture of alcohols with 800 ml. of benzene-methanol (19:1); elute the title product with 1600 ml. of benzene-methanol (19:1); and 1 l. of benzene-methanol (9:1). Recrystallize the last fraction as above to obtain 3.25 g. pure title product.

This compound is useful as an intermediate for preparing compounds which have hormonal activity.

EXAMPLE 212

13β-ethyl-3,11α,17β-triacetoxygona-1,3,5(10)-triene

Dissolve 13β-ethylgona-1,3,5(10)-triene-3,11α,17β-triol (0.0494 g.) in pyridine (0.25 cc.) and acetic anhydride (0.25 cc.) and heat the solution at 100° for 1.5 hours. Evaporate the solvents under reduced pressure and recrystallize the residue from ethanol (2.0 cc.) to obtain the title compound (0.046 g.) M.P. 153.5–154.5°.

Calculated for $C_{25}H_{32}O_6$ (percent): C, 70.07; H, 7.35; O, 22.48. Found (percent): C, 69.91; H, 7.60; O, 22.49.

This compound is useful as an intermediate for preparing compounds which have hormonal activity.

EXAMPLE 213

3-benzoyloxy-13β-ethylgona-1,3,5(10)-triene-11α,17β-diol

Dissolve 13β-ethylgona-1,3,5(10)-triene-3,11α,17β-triol (1.1 g.) in aqueous 2.6 N sodium hydroxide (35 cc.) at 10°, add benzoyl chloride (4.0 cc.) and shake the mixture vigorously for 30 minutes. Add ether (10 cc.), shake for a further 5 minutes, separate the organic layer and extract the aqueous layer with ether (70 cc.). Wash, dry and evaporate the combined ethereal extracts to obtain the title compound (1.45 g.), M.P. 184–187.5°. Recrystallize from benzene to obtain a pure sample M.P. 191–192°.

Calculated for $C_{26}H_{30}O_4$ (percent): C, 76.82; H, 7.44. Found (percent): C, 77.17; H, 7.50.

This compound is useful as an intermediate for preparing compounds which have hormonal activity.

EXAMPLE 214

3-benzoyloxy-13β-ethylgona-1,3,5(10)-triene-11,17-dione

Dissolve 3-benzoyloxy-13β-ethylgona-1,3,5(10)-triene-11α,17β-diol (0.43 g.) in acetone (30 cc.) and treat this solution dropwise with 4 N chromic acid in sulfuric acid (Jones reagent half strength) until a permanent brown color remains in the supernatant liquid (1.25 cc. added). Allow the mixture to stand for 1 hour and then add water (50 cc.) and extract with ether. Wash the ethereal solution with aqueous potassium carbonate, brine and dry. Evaporate the solvent and recrystallize the residue from ethanol to obtain the title compound (0.198 g.), M.P. 151.5–155°; ultraviolet absorption peaks at 231 mμ (ε 18,250), 272 mμ (ε 3540) and 281 mμ (ε 2200). Recrystallize from ethanol to obtain an analytical sample M.P. 154.5–155°.

Calculated for $C_{26}H_{26}O_4$ (percent): C, 77.59; H, 6.51. Found (percent): C, 77.25; H, 6.33.

This compound is useful as an intermediate for preparing compounds which have hormonal activity.

EXAMPLE 215

13β-ethyl-3-methoxygona-1,3,5(10)-triene-11,17-dione

Mix a solution of 13-ethyl-3-methoxygona-1,3,5(10)-triene-11α,17β-diol in toluene and cyclohexanone with freshly distilled aluminum isopropoxide and reflux under nitrogen for four hours. Cool and filter off the solid. Wash the filtrate, dry, and evaporate to obtain the title product.

This compound is useful as an intermediate for preparing compounds which have hormonal activity.

EXAMPLE 216

13β-ethyl-3-methoxygona-1,3,5(10)-triene-11β,17β-diol

Dissolve 13β-ethyl-3-methoxygona-1,3,5(10)-triene-11,17-dione in ethanol and reduce with sodium borohydride by refluxing for two hours. Evaporate the solvent in vacuo, add water, acidify with dilute hydrochloric acid, and extract with ether. Wash, dry, and evaporate the ether extracts to obtain the title product.

This compound is useful as an intermediate for preparing compounds which have hormonal activity.

EXAMPLE 217

13β-ethylgona-1,3,5(10)-triene-3,11β,17β-triol

Add sodium borohydride (0.499 g.) to a solution of 13β - ethyl - 3 - benzoyloxygona - 1,3,5(10)-triene-11,17-dione (0.328 g.) in absolute alcohol and reflux for 2 hours. Evaporate the solvent under reduced pressure, add water (50 cc.) to the residue, acidify with dilute hydrochloric acid and extract with ether. Wash the ethereal solution with aqueous potassium carbonate and brine, dry and evaporate the solvent. Recrystallize the residue from ethanol at −5° to obtain the title compound (0.125 g.), M.P. 232–237° (dec.) raised to 237–241° by further recrystallization from ethanol.

Calculated for $C_{19}H_{26}O_3$ (percent): C, 75.46; H, 8.67. Found (percent): C, 75.94; H, 8.94.

This compound is useful as an intermediate for preparing compounds which have hormonal activity.

EXAMPLE 218

13β-ethyl-3-benzoyloxygona-1,3,5(10)-triene-11β,17β-diol

Dissolve 13β-ethylgona-1,3,5(10)-triene-3,11β,17β-triol (0.24 g.) in 2.13 N aqueous sodium hydroxide (13 cc.), add benzoyl chloride (1.0 cc.) and shake vigorously for 15 minutes. Extract successively with ether, benzene and ethyl acetate and wash, dry and evaporate the organic extracts to obtain the title compound (0.18 g.) as a white solid.

This compound is useful as an intermediate for preparing compounds which have hormonal activity.

EXAMPLE 219

11α,17β-diacetoxy-13β-ethyl-3-methoxygona-1,3,5(10)-triene

Dissolve 13β-ethyl-3-methoxygona-1,3,5(10) - triene-11α,17β-diol (0.252 g.) in pyridine (2.0 cc.) and acetic anhydride (2.0 cc.) and heat the solution at 100° for 1½ hours. Evaporate the solvents under reduced pressure and crystallize the residue from ethanol to obtain the title compound (0.239 g.) M.P. 130.5–131.5°.

Calculated for $C_{24}H_{32}O_5$ (percent): C, 71.97; H, 8.05. Found (percent): C, 71.72; H, 7.92.

This compound is useful as an intermediate for preparing compounds which have hormonal activity.

EXAMPLE 220

13β-ethyl-3-methoxygona-1,3,5(10)-triene-11α,17β-diol

Treat a solution of 13β-ethyl-3-methoxygona-1,3,5(10),9(11)-tetraen-17-one (20 g.) in dry tetrahydrofuran (100 cc.) with diborane (generated by adding a solution of 5.0 g. of sodium borohydride in 100 cc. of diethyleneglycol dimethyl ether to 37.5 cc. of boron trifluoride etherate in 115 cc. of diethylene glycol dimethyl ether) over a period of 2 hours. Allow the mixture to stand for 48 hours and then cautiously add water (10 cc.) to decompose excess diborane. Add 30% hydrogen peroxide (115 cc.) and aqueous 2 N sodium hydroxide (165 cc.) and reflux for 30 minutes. Evaporate the tetrahydrofuran under reduced pressure, extract the aqueous solution with ether (600 cc.) and wash, dry and evaporate the ethereal solution to about 80 cc. Allow to stand, filter the precipitate to obtain the title compound (9.7 g.). Recrystallize from ether to obtain an analytical sample, M.P. 165–167°. Another crystalline form melts at 131.5–132°.

Calculated for $C_{20}H_{28}O_3$ (percent): C, 75.91; H, 8.92. Found (percent): C, 75.78; H, 8.63.

This compound is useful as an intermediate for preparing compounds which have hormonal activity.

EXAMPLE 221

13β-ethyl-3,11α,16α,17β-tetraacetoxygona-1,3,5(10)-triene

Dissolve 13β-ethylgona-1,3,5(10)-triene-3,11α,16α,17β-tetrol (0.154 g.) in acetic anhydride (3.0 cc.) and pyridine (3.0 cc.) and heat at 100° for 1½ hours. Evaporate the solvents under reduced pressure to obtain the title compound, M.P. 104°.

Calculated for $C_{27}H_{34}O_8$ (percent): C, 66.65; H, 7.04. Found (percent): C, 66.72; H, 6.98.

This compound is useful as an intermediate for preparing compounds which have hormonal activity.

EXAMPLE 222

13β-ethyl-3,11α,17β-tribenzoyloxygona-1,3,5(10)-triene

Dissolve 13β-ethylgona-1,3,5(10)-triene-3,11α,17β-triol (0.0468 g.) in warm benzoyl chloride (0.1 cc.) and pyridine (0.4 cc.) and allow the mixture to stand for 3 days. Add water (10 cc.), filter and wash the precipitate and recrystallize from a mixture of ethanol-acetone (30 cc., 10:1) to obtain the title compound (0.069 g.) M.P. 243–245°.

Calculated for $C_{40}H_{38}O_6$ (percent): C, 78.15; H, 6.23. Found (percent): C, 78.4; H, 6.17.

This compound is useful as an intermediate for preparing compounds which have hormonal activity.

EXAMPLE 223

13β-methyl-3-methoxy-D-homo-gona-2,5(10)-dien-17aβ-ol

Add 13β-methyl-3-methoxy - D - homo-gona-1,3,5(10)-trien-17aβ-ol (13 g.) in tetrahydrofuran (300 cc.) to liquid ammonia (650 cc.) followed by the addition of lithium (4.3 g.). After stirring for 30 minutes, add absolute ethanol dropwise over a period of 1 hour to discharge the blue color. Precipitate the product with water, filter and dry to give 13β-methyl-3-methoxy-D-homo-gona-2,5(10)-dien-17aβ-ol; M.P. 148–155°; infrared absorption peaks at 2.98μ, 5.88μ and 5.98μ.

This compound has estrogenic activity, lowers the blood lipid level, and is useful as an intermediate for preparing the hormonal compounds of this invention.

EXAMPLE 224

13β-ethyl-3-methoxy-D-homo-gona-2,5(10)-dien-17aβ-ol

Substitute 13β-ethyl-3-methoxy-D-homo-gona-1,3,5(10)-trien-17aβ-ol for 13β-methyl-3-methoxy-D-homo-gona-1,3,5(10)-trien-17aβ-ol to give 13β-ethyl - 3 - methoxy-D-homo-gona-2,5(10)-dien-17aβ-ol; M.P. 135–138°; infrared absorption peaks at 3.03, 5.92, 6.01μ.

This compound has estrogenic activity, lowers the blood lipid level, and is useful as an intermediate for preparing the hormonal compounds of this invention.

EXAMPLE 225

13β-ethyl-3-methoxy-gona-2,5(10)-dien-17β-ol

Add 13β-ethyl-3-methoxy-gona - 1,3,5(10)-trien-17β-ol (0.5 g.) in tetrahydrofuran (50 cc.) to stirred liquid ammonia (150 cc.), followed by lithium foil (0.5 g.) and then add ethanol (6 cc.) during 20 minutes. When the blue color is discharged, add water and work up the product with ether, to yield 13β-ethyl-3-methoxy-gona-2,5(10)-dien-17β-ol as a solid (0.47 g.).

To prepare 13β-ethyl-2,3-dimethoxy-gona-2,5(10)-dien-17β-ol react 13β-ethyl-2,3-dimethoxy-gona-1,3,5(10)-trien-17β-ol in tetrahydrofuran with lithium in liquid ammonia according to the manipulative procedure described above.

To prepare 13β-ethyl-1,3-dimethoxy-gona-1(10),3-dien-17β-ol react 13β-ethyl-1,3-dimethoxy-gona-1,3,5(10)-trien-17β-ol in tetrahydrofuran with lithium in liquid ammonia according to the manipulative procedure described above.

To prepare 13β-ethyl-3-ethoxy-gona-2,5(10)-dien-17β-ol react 13β-ethyl-3-ethoxy-gona-1,3,5(10)-trien-17β-ol in tetrahydrofuran with lithium in liquid ammonia according to the manipulative procedure described above.

To prepare 13β-phenethyl-3-n-propoxy-gona-2,5(10)-dien-17β-ol react 13β-phenethyl-3-n-propoxy-gona-1,3,5(10)-trien-17β-ol in tetrahydrofuran with lithium in liquid ammonia according to the manipulative procedure described above.

To prepare 13β-isobutyl-3-n-pentoxy-gona-2,5(10)-dien-17β-ol react 13β-isobutyl-3-n-pentoxy-gona-1,3,5(10)-trien-17β-ol in tetrahydrofuran with lithium in liquid ammonia according to the manipulative procedure described above.

To prepare 13β-(3-hydroxypropyl)-3-cyclopentoxy-gona-2,5(10)-dien-17β-ol react 13β-(3-hydroxypropyl)-3-cyclopentoxy-gona-1,3,5(10)-trien-17β-ol in tetrahydrofuran with lithium in liquid ammonia according to the manipulative procedure described above.

To prepare 13β-(3-dimethylaminopropyl)-1,3-dimethoxy-gona-1(10),3-dien-17β-ol react 13β-(3-dimethylaminopropyl)-1,3-dimethoxy-gona-1,3,5(10)-trien-17β-ol in tetrahydrofuran with lithium in liquid ammonia according to the manipulative procedure described above.

These compounds have estrogenic activity, lower the blood lipid level, and are useful as intermediates in the preparation of the hormonal compounds of the invention.

EXAMPLE 226

13β-ethyl-3-methoxy-gona-2,5(10)-dien-17β-ol

To 13β-ethyl-3-methoxy-gona-1,3,5(10)-trien-17β-ol (1.0 g.) in 1-methoxypropan-2-ol (100 cc.) add liquid ammonia (200 cc.), followed by lithium metal (1.2 g.) in small pieces with stirring. After discharge of the blue color add an excess of ammonium chloride, followed by water; filter off the crude 13β-ethyl-3-methoxy-gona-2,5(10)-dien-17β-ol and dry, M.P. 98–104°. No selective ultra-violet absorption beyond 220 mµ; infrared absorption peaks at 3.03, 5.92, 6.01µ.

This compound has estrogenic activity, lowers the blood lipid level, and is useful as an intermediate for preparing the hormonal compounds of this invention.

EXAMPLE 227

13β-ethyl-3-methoxy-gona-2,5(10)-dien-17β-ol

Add 13β-ethyl-3-methoxy-gona-1,3,5(10),8-tetraen-17β-ol (1.0 g.) in 1-methoxypropan-2-ol (100 cc.) to liquid ammonia (150 cc.), followed by lithium metal (2.0 g.) in small pieces during 20 minutes with stirring. Discharge the blue color immediately after completion of the metal addition; then add water, filter off the solid and recrystallize from methanol to give 13β-ethyl-3-methoxy-gona-2,5(10)-dien-17β-ol (0.3 g.). No selective ultraviolet absorption beyond 220 mµ; infrared absorption peaks at 3.08, 5.92, 6.01µ.

This compound has estrogenic activity, lowers the blood lipid level, and is useful as an intermediate for preparing the hormonal compounds of this invention.

EXAMPLE 228

13β-n-propyl-3-methoxy-gona-2,5(10)-dien-17β-ol

Dissolve 13β-n-propyl-3-methoxy-gona-1,3,5(10)-gonatrien-17β-ol in a mixture of freshly distilled pyrrole (50 cc.) and liquid ammonia (100 cc.) and then add lithium (1.0 g.) in small pieces as quickly as the production of foam permits. When the blue color is discharged, add excess ammonium chloride, followed by water (100 cc.). Extract the product into ether, wash, dry and evaporate. Recrystallize the residue (0.9 g.), from methanol, to give 13β-n-propyl-3-methoxy-gona-2,5(10)-dien-17β-ol (0.65 g.), M.P. 153–6°; no selective ultraviolet absorption beyond 220 mµ; infrared absorption peaks at 2.91, 5.90, 6.04µ.

This compound has estrogenic activity, lowers the blood lipid level, and is useful as an intermediate for preparing the hormonal compounds of this invention.

EXAMPLE 229

13β-isopropyl-3-methoxy-gona-2,5(10)-dien-17β-ol

Add liquid ammonia (100 cc.) to 13β-isopropyl-3-methoxy-gona-1,3,5(10)-trien-17β-ol (0.5 g.) in tetrahydrofuran (50 cc.) followed by lithium metal (0.5 g.), and stir the solution for 10 minutes. Then add ethanol (6 cc.) dropwise. When the blue color is discharged, add water and extract the product with ether. Evaporate the washed and dried extracts to give crude 13β-isopropyl-3-methoxy-gona-2,5(10)-dien-17β-ol (0.5 g.) as colorless gum.

This compound has estrogenic acitivity, lowers the blood lipid level, and is useful as an intermediate for preparing the hormonal compounds of this invention.

EXAMPLE 230

13β-isopropyl-3-methoxy-gona-2,5(10)-dien-17β-ol

Add a solution of 13β-isopropyl-3-methoxy-gona-1,3,5(10),8-tetraen-17β-ol (0.25 g.) in a mixture of dry ether (10 cc.) and dry tetrahydrofuran (10 cc.) to liquid ammonia (50 cc.) containing dissolved lithium metal (0.125 g.). Then add further lithium (0.125 g.), followed after 5 minutes by dropwise addition of ethanol (5 cc.) over 10 minutes. When the blue color is discharged, add water and extract the product with ether. Evaporate the washed and dried extracts and recrystallize the partially crystalline residue from ethanol to give 13β-isopropyl-3-methoxy-gona-2,5(10)-dien-17β-ol (0.01 g.), M.P. 87–94°; infrared absorption peaks at 2.94, 5.92, 5.99µ.

This compound has estrogenic activity, lowers the blood lipid level, and is useful as an intermediate for preparing the hormonal compounds of this invention.

EXAMPLE 231

13β-n-butyl-3-methoxy-gona-2,5(10)-dien-17β-ol

Add 13β-n-butyl-3-methoxy-gona-1,3,5(10)-trien-17β-ol (0.5 g.) in a mixture of tetrahydrofuran (5 cc.) and ether (15 cc.) dropwise to a stirred solution of lithium (0.5 g.) in liquid ammonia (60 cc.). After 5 minutes beyond completion of addition, add ethanol (8 cc.) dropwise and when the blue color is discharged, add water and extract the mixture with ether. Work up in the usual way to give 13β-n-butyl-3-methoxy-gona-2,5(10)-dien-17β-ol as a crystalline solid, M.P. 135–9°; infrared absorption peaks at 2.97, 6.25, 6.38, and 8.16µ.

This compound has estrogenic activity, lowers the blood lipid level, and is useful as an intermediate for preparing the hormonal compounds of this invention.

EXAMPLE 232

13β-isobutyl-3-methoxy-gona-2,5(10)-dien-17β-ol

To a mixture of distilled liquid ammonia (900 cc.), 1-methoxy-2-propanol (430 cc.), and 13β-isobutyl-3-methoxy-gona-1,3,5(10),8-tetraen-17β-ol add lithium (5.7 g.) in small pieces, little by little, with vigourous stirring; a blue color develops which disappears when the addition of lithium is complete. Continue stirring for an additional 30 minutes. Thereafter, add water (145 cc.) followed by a mixture of glacial acetic acid (145 cc.) and water (145 cc.). Collect the precipitate, wash with water and dry, thus giving 13β-isobutyl-3-methoxy-gona-2,5(10)- dien-17β-ol (4.0 g.; 80%), M.P. 124–127° C. infrared absorption peaks at 5.89, 6.03μ.

This compound has estrogenic activity, lowers the blood lipid level, and is useful as an intermediate for preparing the hormonal compounds of this invention.

EXAMPLE 233

13β-ethyl-3-ethoxy-gona-2,5(10)-dien-17β-ol

Heat under reflux 13β-ethyl-3-hydroxy-gona-1,3,5(10)-trien-17β-ol (1.75 g.) and potassium carbonate (3 g.) for six hours with ethanol (40 cc.) and ethyl iodide (20 cc.) in a nitrogen atmosphere. Then concentrate the solution to half its original volume, add water and take the product up in ether. Wash, dry and evaporate the ethereal solution and recrystallize the residue from hexane to give 13β-ethyl-3-ethoxy-gona - 1,3,5(10) - trien-17β-ol. Add this product (0.5 g.) tetrahydrofuran (50 cc.) to liquid ammonia (100 cc.) and add lithium (0.5 g.). After stirring for 10 minutes add a mixture of ethanol (6 cc.) and tetrahydrofuran (10 cc.) over a period of 20 minutes, and when the blue color is discharged add water and extract the mixture with ether. Wash, dry and evaporate the ethereal solution and recrystallize the residue from ethanol to give 13β-ethyl-3-ethoxy-gona-2,5(10) - dien-17β-ol. No selective ultraviolet absorption beyond 200 mμ.

This compound has estrogenic activity, lowers the blood lipid level, and is useful as an intermediate for preparing the hormonal compounds of this invention.

EXAMPLE 234

13β-ethyl-3,17β-dimethoxygona-2,5(10)-diene

Add 13β - ethyl-3,17β-dimethoxygona-1,3,5(10)-triene (1 g.) in tetrahydrofuran (10 cc.) to a stirred solution of liquid ammonia (35 cc.) and tetrahydrofuran (10 cc.), followed by the addition of lithium (0.7 g.) in pieces. After stirring vigorously for 2 hours add ethanol dropwise until the blue color is discharged. Add water and extract the mixture with ether-benzene. Wash the organic solution with water, aqueous sodium bicarbonate, water and brine and dry ($Na_2SO_4$). Remove the solvent under reduced pressure and triturate the residue with methanol. Filter to obtain crude title product contaminated with some starting material (0.8 g.), M.P. 144–150°; infrared absorption peaks at 5.9, 6μ.

This counpound has estrogenic activity, lowers the blood lipid level, and is useful as an intermediate for preparing the hormonal compounds of this invention.

EXAMPLE 235

13β-ethyl-3-n-propoxy-gona-2,5(10)-dien-17β-ol

Use n-propyl iodide (20 cc.) instead of ethyl iodide and proceed exactly as described for the 3-ethoxy compound to give 13β-ethyl-3-n-propoxy-gona-2,5(10)-dien-17β-ol; no selective ultraviolet absorption beyond 220 mμ.

This compound has estrogenic activity, lowers the blood lipid level, and is useful as an intermediate for preparing the hormonal compounds of this invention.

EXAMPLE 236

13β-methyl-3-methoxy-D-homo-gona-2,5(10)-dien-17a-one

Reflux 13β - methyl - 3 - methoxy - D - homo - gona-2,5(10) dien-17aβ-ol (4 g.) under nitrogen in toluene (130 cc.) containing cyclohexanone (40 cc.) and aluminium isopropylate (1.8 g.) for 3 hours. Cool, add water (40 cc.) followed by anhydrous sodium sulphate (40 g.) and filter the mixture. Evaporate the filtrate to dryness, first at 30°/20 mm. then 50°/0.1 mm. to afford 13β - methyl - 3 - methoxy - D - homo - gona - 2,5(10)-dien-17a-one. Infrared absorption peaks at 5.85, 5.92, 6.01μ.

This compound has estrogenic activity, lowers the blood lipid level, and is useful as an intermediate for preparing the hormonal compounds of this invention.

EXAMPLE 237

13β-ethyl-3-methoxy-D-homo-gona-2,5(10)-dien-17a-one

Reflux 13β - ethyl - 3 methoxy - D - homo - gona-2,5(10)-dien-17aβ-ol (10 g.) with aluminium isopropylate (8 g.) in dry toluene (450 cc.) and dry cyclohexanone (140 cc.) for 4 hours in at atmosphere of nitrogen. Decompose the cooled solution with water (ca. 25 cc.) and dry by the addition of sodium sulphate. Filter the mixture and remove the solvents first at 20 mm. Hg and then at 90°/0.2 mm. Hg. Dry the residue over phosphorus pentoxide in a desiccator to give 13β-ethyl - 3 - methoxy - D - homo - gona - 2,5(10) - dien-17a-one (11.1 g.), M.P. 138–145° C.; infrared absorption peaks at 5.88, 6μ.

This compound has estrogenic activity, lowers the blood lipid level, and is useful as an intermediate for preparing the hormonal compounds of this invention.

EXAMPLE 238

13β-ethyl-3-methoxy-gona-2,5(10)-dien-17-one

Reflux a mixture of 13β-ethyl-3-methoxy-gona-2,5(10)-dien-17β-ol (0.8 g.) aluminium isopropoxide (0.36 g.), toluene (26 cc.) and cyclohexanone (8 cc.) under nitrogen for 3 hours. Allow the solution to cool under nitrogen, add water (5 cc.) and shake the mixture vigorously. Add anhydrous sodium sulphate (5 g.), shake the mixture again, and then allow to stand for 30 minutes. Filter the solution, combine the filtrate with ether-washings of the residue, and evaporate, first at 30°/20 mm., then at 50°/0.1 mm. to leave as a crystalline solid 13β-ethyl-3-methoxy-gona-2,5(10)-dien-17-one; infrared absorption peaks at 5.78, 5.92, 6.01μ, with no absorption due to hydroxyl.

To prepare 13β-n-propyl-3-methoxy-gona-2,5(10)-dien-17-one react 13β-n-propyl-3-methoxy-gona-2,5(10)-dien-17β-ol in toluene wth cyclohexanone and aluminium isopropoxide according to the manipulative procedure described above.

To prepare 13β-isopropyl-3-methoxy-gona-2,5(10)-dien-17-one react 13β-isopropyl-3-methoxy-gona-2,5(10)-dien-17β-ol in toluene with cyclohexanone and aluminium isopropoxide according to the manipulative procedure described above.

To prepare 13β-isobutyl-3-methoxy-gona-2,5(10)-dien-17-one react 13β-isobutyl-3-methoxy-gona-2,5(10)-dien-17β-ol in toluene with cyclohexanone and aluminium isopropoxide according to the manipulative procedure described above.

To prepare 13β-ethyl-3-ethoxy-gona-2,5(10)-dien-17-one react 13β-ethyl-3-methoxy-gona-2,5(10)-dien-17β-ol in toluene with cyclohexanone and aluminium isopropoxide according to manipulative procedure described above.

To prepare 13β-ethyl-3-n-propoxy-gona-2,5(10)-dien-17-one react 13β-ethyl-3-n-propoxy-gona-2,5(10)-dien-17β-ol in toluene with cyclohexanone and aluminium isopropoxide according to the manipulative procedure described above.

To prepare 13β-ethyl-2,3-dimethoxy - gona - 2,5(10)-dien-17-one react 13β-ethyl-2,3-dimethoxy-gona-2,5(10)-dien-17β-ol in toluene with cyclohexanone and aluminium isopropoxide according to the manipulative procedue described above.

To prepare 13β-ethyl-1,3-dimethoxy - gona-1(10),3-dien-17-one react 13β-ethyl-1,3-dimethoxy-gona-1(10),3-dien-17β-ol in toluene with cyclohexanone and aluminium isopropoxide according to the manipulative procedure described above.

To prepare 13β - phenethyl-3-n-propoxy-gona-2,5(10) dien - 17 - one react 13β-phenethyl-3-n-propoxygona-2,5(10)-dien-17β-ol in toluene with cyclohexanone and aluminium isopropoxide according to the manipulative procedure described above.

To prepare 13β-isobutyl-3-n-pentoxy-gona-2,5(10)-dien-17-one react 13β-isobutyl-3-n-pentoxy-gona-2,5(10)-dien-17β-ol in toluene with cyclohexanone and aluminium isopropoxide according to the manipulative procedure described above.

To prepare 13β-(3-hydroxypropyl)-3-cyclopentoxy-gona-2,5(10)-dien-17-one react 13β-(3-hydroxypropyl)-3-cyclopentoxy-gona-2,5(10)-dien-17β-ol in toluene with cyclohexanone and aluminium isopropoxide according to the manipulative procedure described above.

To prepare 13β-(3-dimethylaminopropyl)-1,3 - dimethoxy-gona-1(10),3-dien-17-one react 13β-(3 - dimethylaminopropyl) - 1,3 - dimethoxy - gona - 1(10),3 - dien-17β-ol in toluene with cyclohexanone and aluminium isopropoxide according to the manipulative procedure described above.

These compounds have estrogenic activity and are useful as intermediates in the preparation of the hormonal compounds of this invention.

EXAMPLE 239

13β-n-propyl-3-methoxy-gona-2,5(10)-dien-17-one

Reflux 13β - n - propyl - 3 - methoxy - gona - 2,5(10)-dien-17β-ol (3.0 g.) with aluminium isopropoxide in toluene and cyclohexanone according to the conditions of Oppenauer oxidation. Isolate and recrystallize the product from methanol to give 13β-n-propyl-3-methoxy-gona-2,5(10)-dien-17-one (2.0 g.), M.P. 128–31° C. with softening at 125°.

Calculated for $C_{21}H_{30}O_2$ (percent): C, 80.2; H, 9.6. Found (percent): C, 80.0; H, 9.55.

This compound has estrogenic activity and is useful as an intermediate for preparing the hormonal compounds of this invention.

EXAMPLE 240

13β-n-butyl-3-methoxy-gona-2,5(10)-dien-17-one

Reflux 13β - n - butyl - 3 - methoxy - gona - 2,5(10)-dien-17β-ol (8 g.) in toluene (450 cc.) containing cyclohexanone (120 cc.) and aluminum isopropoxide (5 g.) under nitrogen for 4 hours. Cool, and add water (15 cc.) dropwise, followed by anhydrous sodium sulphate. Filter the mixture, wash the residue with ether and combine the filtrate and washings, dry and evaporate finally at 90°/1.05 mm. to give 13β-n-butyl-3-methoxy-gona-2,5(10)-dien-17-one (6.0 g.), M.P. 124–128° (from methanol); infrared absorption peaks at 5.80, 6.02μ.

This compound has estrogenic activity, and is useful as an intermediate for preparing the hormonal compounds of this invention.

EXAMPLE 241

13β-ethyl-3-methoxy-17,17-ethylenedioxy-gona-2,5(10)-diene

Add lithium (0.5 g.) in small pieces to 13β-ethyl-3-methoxy - 17,17 - ethylenedioxy - gona - 1,3,5(10),8-tetraene (0.5 g.) in a mixture of 1-methoxy propan 2-ol (70 cc.), anhydrous liquid ammonia (120 cc.) and tetrahydrofuran (25 cc.) with continuous stirring. On completion of the reaction allow the ammonia to evaporate; then add water and extract the mixture with benzene. Wash the benzene extracts, dry and evaporate the solvent and crystallize the oily residue from methanol to give 13β - ethyl - 3 - methoxy - 17,17 - ethylenedioxy - gona-2,5(10)-diene (.2 g.); no selective ultra-violet absorption beyond 220 mμ; infrared absorption peaks at 5.90, 6.01μ.

Calculated for $C_{22}H_{32}O_3$ (percent): C, 76.8; H, 9.3. Found (percent): C, 76.8; H, 9.4.

This compound has estrogenic and blood lipid lowering activity and is useful as an intermediate for preparing the hormonal compounds of this invention.

To prepare 13β-ethyl-3-methoxy-17,17-ethylenedioxy-gona-2,5(10)-diene reduce 13β-ethyl-3-methoxy-17,17-ethylenedioxy-gona-1,3,5(10)-triene according to the manipulative procedure described above.

To prepare 13β-n-propyl-3-methoxy-17,17-ethylenedioxy-gona-2,5(10)-diene reduce 13β-n-propyl-3-methoxy-17,17-ethylenedioxy-gona-1,3,5(10)-triene according to the manipulative procedure described above.

To prepare 13β-isopropyl-3-methoxy-17,17-ethylenedioxy-gona-2,5(10)-diene reduce 13β-n-butyl-3-methoxy-17,17-ethylenedioxy-gona-1,3,5(10)-triene according to the manipulative procedure described above.

To prepare 13β-n-butyl-3-methoxy-17,17-ethylenedioxy-gona-2,5(10)-diene reduce 13β-n-butyl-3-methoxy-17,17-ethylenedioxy-gona-1,3,5(10)-triene according to the manipulative procedure described above.

To prepare 13β-isobutyl-3-methoxy-17,17-ethylenedioxy-gona-2,5(10)-diene reduce 13β-isobutyl-3-methoxy-17,17-ethylenedioxy-gona-1,3,5(10)-triene according to the manipulative procedure described above.

To prepare 13β-ethyl-3-ethoxy - 17,17 - ethylenedioxy-gona-2,5(10)-diene reduce 13β-ethyl-3-ethoxy-17,17-ethylenedioxy-gona-1,3,5(10)-triene according to the manipulative procedure described above.

To prepare 13β-ethyl-3-n-propoxy-17,17-ethylenedioxy-gona-2,5(10)-diene reduce 13β-ethyl-3-n-propoxy-17,17-ethylenedioxy-gona-1,3,5(10)-triene according to the manipulative procedure described above.

To prepare 13β-ethyl-2,3-dimethoxy-17,17-ethylenedioxy-gona-2,5(10)-diene reduce 13β-ethyl-2,3-dimethoxy-17,17-ethylenedioxy-gona-1,3,5(10)-triene according to the manipulative procedure described above.

To prepare 13β-ethyl-1,3-dimethoxy-17,17-ethylenedioxy-gona-1(10),3-diene reduce 13β-ethyl-1,3-dimethoxy-17,17-ethylenedioxy-gona-1,3,5(10)-triene according to the manipulative procedure described above.

To prepare 13β-phenethyl-3-n-propoxy-17,17-ethylenedioxy-gona-2,5(10)-diene reduce 13β-phenethyl-3-n-propoxy-17,17-ethylenedioxy-gona-1,3,5(10)triene according to the manipulative procedure described above.

To prepare 13β-(3-hydroxypropyl)-3-cyclopentoxy-17,17-ethylenedioxy-gona-2,5(10)-diene reduce 13β-(3-hydroxypropyl) - 3 - cyclopentoxy - 17,17 - ethylenedioxy-gona-1,3,5(10)-triene according to the manipulative procedure described above.

To prepare 13β-(3-dimethylaminopropyl)-3-methoxy-17,17-ethylenedioxy-gona-2,5(10)-diene reduce 13β-(3-dimethylaminopropyl) - 3 - methoxy - 17,17 - ethylenedioxy-gona-1,3,5(10)-triene according to the manipulative procedure described above.

These compounds have estrogenic activity and are useful as intermediates in the preparation of the hormonal compounds of the invention.

EXAMPLE 242

13β-methyl-3-methoxy-17aα-ethyl-D-homo-gona-2,5(10)-dien-17aβ-ol

Add ethanol (6 cc.) dropwise with stirring to a solution of 13β-methyl-3-methoxy-17aα-ethyl-D-homo-gona-1,3,5(10)-trien-17aβ-ol (0.4 g.) in liquid ammonia (60 cc.), and tetrahydrofuran (15 cc.) containing lithium (0.4 g.). On completion of the reaction add water and extract the mixture with ether. Wash, dry, and evaporate the extracts to give 13β-methyl-3-methoxy-17aα-ethyl-D-homo-gona-2,5(10)-dien-17aβ-ol; infrared absorption peaks at 2.99, 5.90, 6.02μ.

This compound has estrogenic activity and is useful as an intermediate for preparing the hormonal compounds of this invention.

EXAMPLE 243

13β-methyl-3-methoxy-17aα-ethynyl-D-homo-gona-2,5(10)-dien-17aβ-ol

Add a solution of 13β-methyl-3-methoxy-D-homo-gona-2,5(10)-diene-17a-one (6.5 g.) in dimethylacetamide (50 cc.) to a stirred suspension of lithium acetylide (4.25 g.) in dioxane (25 cc.), ethylene diamine (1 cc.), and dimethylacetamide (25 cc.) in an atmosphere of acetylene. After stirring for 20 hours pour the mixture onto crushed ice (150 g.) and extract with benzene. Wash, dry and evaporate the extracts and recrystallize the residue from ethanol to give 13β-methyl-3 - methoxy - 17aα - ethynyl - D - homo - gona - 2,5(10)-dien-17aβ-ol; infrared absorption peaks at 2.88, 3.05, 5.90, 6.01μ.

This compound is useful as an intermediate for preparing the novel compositions of this invention which have hormonal activity.

EXAMPLE 244

13β-ethyl-3-methoxy-17aα-ethynyl-D-homo-gona-2,5(10)-dien-17aβ-ol

Dissolve 13β - ethyl-3-methoxy-D-homo-gona-2,5(10)-dien-17-one (8.8 g.) in dimethylacetamide (70 cc.) and add a suspension of lithium acetylide (10 g.) in ethylenediamine-dioxan (1:1; 60 cc.). Then pass acetylene over the surface of the stirred mixture for 15 hours. Decompose the reaction mixture by pouring onto ice, collect the product in ether and evaporate the washed, dried ether solution to give 13β-ethyl-3-methoxy-17aα-ethynyl-D-homo-gona-2,5(10)-dien-17aβ-ol; M.P. 118–124° (7 g.) 74%. Infrared absorption peaks at 2.85, 3.06, 5.90, 6.0μ.

This compound is useful as an intermediate for preparing the novel compositions of this invention which have hormonal activity.

EXAMPLE 245

13β-ethyl-3-methoxy-17aα-ethyl-D-homo-gona-2,5(10)-dien-17aβ-ol

Add a solution of 13β-ethyl-3-methoxy-17aα-ethyl-D-homo-gona-1,3,5(10)-trien-17aβ-ol (9 g.) in tetrahydrofuran (240 cc.) to a stirred solution of liquid ammonia (500 cc.) and then add lithium (3 g.) in portions. After 30 minutes discharge the blue color by the dropwise addition of ethanol, add water and filter off the precipitated product to give 13β-ethyl-3-methoxy-17aα-ethyl-D-homo-gona-2,5(10)-dien-17aβ-ol (8.7 g.); M.P. 161–166°. Infrared absorption peaks at 2.90, 5.90, 5.99μ.

This compound is useful as an intermediate for preparing the novel compositions of this invention which have hormonal activity.

EXAMPLE 246

13β-ethyl-3-methoxy-17α-methyl-gona-2,5(10)-dien-17β-ol

Add lithium (1.2 g.) in small pieces during 20 minutes, with stirring to 13β-ethyl-3-methoxy-17α-methyl-gona-1,3,5(10)-trien-17β-ol in a mixture of liquid ammonia (200 cc.), 1-methoxy-propan-2-ol (100 cc.) and tetrahydrofuran (250 cc.). On discharge of the blue color, allow the ammonia to evaporate, add excess ammonium sulphate, followed by water, and extract the mixture with benzene. Wash, dry and evaporate the extracts and crystallize the residue from methanol to yield 13β-ethyl-3-methoxy-17α-methyl-gona-2,5(10)-dien-17β-ol (0.59 g.), M.P. 151–5°; no selective ultra-violet absorption beyond 200 mμ; infrared absorption peaks at 2.99, 5.90, 6.04μ.

This compound is useful as an intermediate for preparing the novel compositions of this invention which have hormonal activity.

EXAMPLE 247

13β-ethyl-3-methoxy-17α-ethynyl-gona-2,5(10)-dien-17β-ol

Add a suspension of lithium aluminium acetylide (obtained by passing excess acetylene through a solution of lithium aluminium hydride (2.0 g.) in tetrahydrofuran (25 cc.) with stirring to 13β-ethyl-3-methoxy-gona-2,5(10)-dien-17-one (0.6 g.) in tetrahydrofuran (5 cc.). After standing for 18 hours, add ether (40 cc.), followed by the careful dropwise addition of water until effervescence ceases. Add anhydrous magnesium sulphate (10 g.) and filter the solution and evaporate the filtrate under reduced pressure to give 13β-ethyl-3-methoxy-17α-ethynyl-gona-2,5(10)-dien-17β-ol (0.6 g.). Infrared absorption peaks at 2.80, 3.05, 4.59, 6.00μ.

This compound is useful as an intermediate for preparing the novel compositions of this invention which have hormonal activity.

EXAMPLE 248

13β,17α-diethyl-3-methoxy-gona-2,5(10)-dien-17β-ol

Add a solution of 13β,17α-diethyl-3-methoxy-gona-1,3,5(10)-trien-17β-ol (0.40 g.) in a mixture of ether (10 cc.) and tetrahydrofuran (5 cc.) dropwise during 5 minutes to a stirred solution of lithium (0.40 g.) in liquid ammonia (60 cc.). After a further five minutes, add ethanol (6 cc.) dropwise and when the blue color is discharged, add water and extract the mixture with ether. Wash, dry and evaporate the extracts and recrystallize the residue from ethanol to give 13β,17α-diethyl-3-methoxy-gona-2,5(10)-dien-17β-ol; (0.29 g.), M.P. 168–171°.

This compound is useful as an intermediate for preparing the novel compositions of this invention which have hormonal activity.

EXAMPLE 249

13β,17α-diethyl-3-methoxy-gona-2,5(10)-dien-17β-ol

Add 13β,17α - diethyl - 3 - methoxy - gona - 1,3,5(10)8-tetraen-17β-ol (2.0 g.) in 1-methoxypropan-2-ol (200 cc.) to liquid ammonia (400 cc.) and then add lithium (2.0 g.) in small pieces during 45 minutes with stirring. After discharge of the blue color, allow the ammonia to evaporate, add water (500 cc.) and ether (500 cc.), and separate the organic phase. Combine the organic phase with the ether extracts of the aqueous phase, wash, dry and evaporate and crystallize the residue from methanol to give 13β,17α-diethyl-3-methoxy-gona-2,5(10)-dien-17β-ol (1.0 g.); no selective ultra-violet absorption beyond 220 mμ; infrared absorption peaks at 5.88, 5.99μ.

This compound is useful as an intermediate for preparing the novel compositions of this invention which have hormonal activity.

EXAMPLE 250

13β,17α-diethyl-3-methoxy-gona-2,5(10)-dien-17β-ol

Add lithium (0.5 g.) in small pieces, with stirring, to 13β,17α-diethyl-3-methoxy-gona-1,3,5(10)-trien - 17β - ol (0.5 g.) in a mixture of liquid ammonia (100 cc.) and pyrrole (50 cc.). After discharge of the blue color, add water and extract the mixture with ether. Wash the extracts with water, brine and dry over anhydrous magnesium sulphate. Evaporate the solution under reduced pressure and recrystallize the residue from methanol to give 13β,17α-diethyl-3-methoxy-gona - 2,5(10) - dien - 17β - ol (0.35 g.), M.P. 175–7° (samples of this substance appear to melt within the range 165–77°, it being rather unstable). No selective ultra-violet absorption beyond 220 mμ; infrared absorption peaks at 2.90, 5.90, 6.00μ.

This compound is useful as an intermediate for preparing the novel compositions of this invention which have hormonal activity.

EXAMPLE 251

13β-ethyl-3-methoxy-17α-propynyl-gona-2,5(10)-dien-17β-ol

Add 13β-ethyl-3-methoxy-gona-2,5(10)-dien-17-one (10 g.) to a solution of propynyl magnesium bromide (prepared from magnesium (6 g.) and ethyl bromide (25 g.) in tetrahydrofuran (500 cc.) and propyne). Stir the mixture for 6 hours under reflux, cool and decompose with water (100 cc.). Add "Celite," filter the resultant sludge and wash the residue thoroughly with ether. Separate the organic phase in the filtrate, wash, dry and evaporate. Reflux the product in methanol for 20 minutes, cool and filter to give 13β-ethyl-3-methoxy-17α-propynyl-gona-2,5(10)-dien-17β-ol (9.5 g.), M.P. 158–61° after softening at 144°; infrared absorption peaks at 2.90, 3.08, 4.50, 5.88, 6.00μ; no selective ultra-violet absorption beyond 220 mμ.

This compound is useful as an intermediate for preparing the novel compositions of this invention which have hormonal activity.

EXAMPLE 252

13β-ethyl-3-methoxy-17α-allyl-gona-2,5(10)-dien-17β-ol

Dissolve 13β-ethyl-3-methoxy-gona-2,5(10)-dien-17-one in tetrahydrofuran (100 cc.) and allyl bromide (11.5 g.), and add the solution dropwise to a refluxing suspension of magnesium (1 g.) in allyl bromide (0.6 g.) and tetrahydrofuran (50 cc.). Allow the mixture to reflux for 6 hours, and then add water (100 cc.) to the cooled solution followed by enough "Celite" to make a thick paste. Filter the mixture, wash the residue thoroughly with ether and separate the organic phase from the filtrate, wash, dry and evaporate the ether solution and crystallize the residue from methanol to give 13β-ethyl-3-methoxy-17α-allyl-gona-2,5(10)-dien-17α-ol (3.8 g.); infrared absorption peaks at 3.03, 5.88, 6.01, 6.10μ; no selective ultra-violet absorption beyond 220 mμ.

This compound is useful as an intermediate for preparing the novel compositions of this invention which have hormonal activity.

EXAMPLE 253

13β-ethyl-3-methoxy-17α-n-propyl-gona-2,5(10)-dien-17β-ol

Add lithium (0.75 g.) in small pieces during 10 minutes, with stirring, to 13β-ethyl-3-methoxy-17α-n-propyl-gona-1,3,5(10)-trien-17β-ol (0.74 g.) in a mixture of liquid ammonia (100 cc.) and ether (50 cc.). After stirring for 1 hour, add a further quantity of ether (50 cc.), followed by the dropwise addition of a mixture of ether (25 cc.) and ethanol (20 cc.) during 30 minutes. Allow the ammonia to evaporate, add water and extract the mixture with ether. Wash, dry and evaporate the ethereal extracts and crystallize the brown residue from methanol to yield 13β-ethyl-3-methoxy-17α-n-propyl-gona-2,5(10)-dien-17β-ol (0.575 g.) m.p. 127–33°. No selective ultra-violet absorption beyond 220 mμ. infrared absorption peaks at 3.00, 5.89, 6.01μ.

This compound is useful as an intermediate for preparing the novel compositions of this invention which have hormonal activity.

EXAMPLE 254

13β-ethyl-3-methoxy-17α-(2-isobutenyl)-gona-2,5(10)-dien-17β-ol

Add a suspension of 13β-ethyl-3-methoxy-gona-2,5(10)-dien-17-one (4 g.) in ether (500 cc.) and methallyl chloride (8 g.) to a Grignard solution, prepared from methallyl chloride (8 g.) and magnesium (20 g.) in ether (100 cc.), at such a rate that gentle reflux is maintained. Reflux the mixture for 4 hours and then decompose the cooled solution with water (ca. 100 cc.). Add "Celite," filter the resultant pasty mass and wash the residue thoroughly with ether. Separate the organic phase from the filtrate, wash, dry and evaporate, and recrystallize the residue from methanol to give 13β-ethyl-3 - methoxy - 17α - (2 - isobutenyl) - gona - 2,5(10)-dien-17β-ol (4 g.). Infrared absorption peaks at 2.86, 5.88, 6.01, 6.10μ; no selective ultra-violet absorption beyond 220 mμ.

This compound is useful as an intermediate for preparing the novel compositions of this invention which have hormonal activity.

EXAMPLE 255

13β-n-propyl-3-methoxy-17α-methyl-gona-2,5(10)-dien-17β-ol

Add lithium (1.5 g.) in small pieces, with stirring, to 13β - n - propyl - 3 - methoxy - 17α - methyl - gona - 1,3,5(10)trien-17β-ol (1.76 g.) in a mixture of liquid ammonia (170 cc.) and pyrrole (85 cc.). After 1 hour add an excess of ammonium chloride, followed by water, work up the mixture with ether, and recrystallize the product from methanol to give 13β-n-propyl-3-methoxy-17α-methyl-gona-2,5(10)-dien-17β-ol (1.36 g.), M.P. 157–60°. No aromatic ultra-violet absorption.

This compound is useful as an intermediate for preparing the novel compositions of this invention which have hormonal activity.

EXAMPLE 256

13β-n-propyl-3-methoxy-17α-ethynyl-gona-2,5(10)-dien 17β-ol

Add a solution of 13β-n-propyl-3-methoxy-gona-2,5(10)-dien-17-one (1.74 g.) in dry tetrahydrofuran (25 cc.) slowly to a stirred suspension of acetylene dimagnesium bromide, from magnesium, 0.36 g.) in tetrahydrofuran. After completion of the reaction decompose the Grignard complex with saturated ammonium chloride solution (100 cc.), and work up the product by means of ethyl acetate, purify by chromatography on neutral alumina, and recrystallize from methanol to give 13β-n-propyl - 3 - methoxy - 17α - ethynyl - gona - 2,5(10)-dien-17β-ol (0.33 g.), M.P. 91–6° (decomp.); infrared absorption peaks at 3.77, 3.03, 5.88, 5.99μ (a hydroxyl, a methine group and a dihydro-anisole system).

This compound is useful as an intermediate for preparing the novel compositions of this invention which have hormonal activity.

EXAMPLE 257

13β-n-propyl-3-methoxy-17α-ethyl-gona-2,5(10)-dien-17β-ol

Add lithium (1.0 g.) in small pieces, with stirring to 13β - n - propyl - 3 - methoxy - 17α - ethyl - gona - 1,3,5 (10)-trien-17β-ol (0.90 g.) in a mixture of liquid ammonia (100 cc.) and pyrrole (60 cc.). After 30 minutes, add an excess of ammonium chloride, followed by water (100 cc.), and extract the mixture with ether. Wash the ether extracts with water, then with brine to dry the solution and evaporate under reduced pressure to give a crystalline residue; infrared absorption peaks at 3.06–3.10, 5.91, 6.02μ. Boil this residue with methanol (50 cc.) to leach out impurities and keep at −10° overnight, filter off the product and dry in vacuo over phosphorous pentoxide, as 13β-n-propyl-3-methoxy-17α-ethyl-gona-2,5(10)-dien-17β-ol (0.875 g.), M.P. 114–25°; no selective ultra violet absorption beyond 220 mμ.

This compound is useful as an intermediate for preparing the novel compositions of this invention which have hormonal activity.

EXAMPLE 258

13β-n-propyl-3-methoxy-17α-allyl-gona-2,5(10)-dien-17β-ol

Warm allyl bromide (4.5 cc.) with magnesium turnings (107 g.) in ether (40 cc.) and then add 13β-n-propyl-3-methoxy-gona-2,5(10)-dien-17-one (2 g.) in ether (70 cc.) containing allyl bromide (2.5 cc.) slowly with stirring. Reflux the mixture with stirring for 3 hours, and to the cooled mixture add aqueous sodium potassium tartrate and extract the product with ether. Wash, dry and evaporate the extracts to give a residue which is mainly 13β - n - propyl - 3 - methoxy - 17α - allyl - gona-2,5(10)-dien-17β-ol.

EXAMPLE 259

13β-n-propyl-3-methoxy-17α-propynyl-gona-2,5(10)-dien-17β-ol

Add a solution 13β - n - propyl - 3-methoxy-gona-2,5(10) - dien-17-one (7.5 g.) in tetrahydrofuran (250 cc.) with stirring under nitrogen to propynyl magnesium bromide (from ethyl magnesium bromide 39 g., and propyne in tetrahydrofuran (500 cc.)). Reflux the mixture with stirring for 3 hours, and on cooling add saturated aqueous ammonium chloride (120 cc.) and extract the product obtained from the washed, dry extracts with ether. Dissolve the residue in boiling methanol and store for 18 hours at −10°. Filter off the crystalline deposit to yield 13β - n - propyl-3-methoxy-17α-propynyl-gona-2,5(10)-dien-17β-ol (6.9 g.), M.P. 104–111°.

To prepare 13β - n - propyl - 3 - methyl-17α-methyl-gona-2,5(10)-dien-17β-ol treat 13β - n-propyl-3-methoxy-gona - 2,5(10)-dien-17-one with methyl magnesium bromide according to the manipulative procedure described above.

To prepare 13β - isobutyl-3-methoxy-17α-ethyl-gona-2,5(10) - dien-17β-ol treat 13β - isobutyl - 3 - methoxy-gona-2,5(10)-dien-17-one with ethyl magnesium bromide according to the manipulative procedure described above.

To prepare 13β - isobutyl-3-methoxy - 17α - methyl-gona-2,5(10)-dien-17β-ol treat 13β - isobutyl-3-methoxy-gona-2,5(10)-dien-17-one with methyl magnesium bromide according to the manipulative procedure described above.

To prepare 13β,17α - di - ethyl-3-ethoxy-gona-2,5(10)-dien-17β-ol treat 13β - ethyl-3-ethoxy-gona-2,5(10)-dien-17-one with ethyl magnesium bromide according to the manipulative procedure described above.

To prepare 13β - ethyl-3-n-propoxy-17α-methyl-gona-2,5(10)-dien-17β-ol treat 13β - ethyl-3-n-propoxy-gona-2,5(10)-dien-17-one with methyl magnesium bromide according to the manipulative procedure described above.

To prepare 13β,17α - diethyl - 2,3-dimethmoxy-gona-2,5(10)-dien-17β-ol treat 13β-ethyl-2,3-dimethoxy-gona-2,5(10)-dien-17-one with ethyl magnesium bromide according to the manipulative procedure described above.

To prepare 13β - ethyl - 1,3-dimethoxy-17α-methyl-gona-1(10),3-dien-17β - ol treat 13β-ethyl-1,3-dimethoxy-gona-1(10),3-dien-17-one with methyl magnesium bromide according to the manipulative procedure described above.

To prepare 13β-phenethyl-3-n-propoxy-17α-ethyl-gona-2,5(10)-dien - 17β - ol treat 13β-phenethyl-3-n-propoxy-gona - 2,5(10) - dien-17-one with ethyl magnesium bromide according to the manipulative procedure described above.

To prepare 13β-isobutyl-3-n-pentoxy-17α-methyl-gona-2,5(10)-dien-17β-ol treat 13β-isobutyl-3-n-pentoxy-gona-2,5(10) - dien-17-one with methyl magnesium bromide according to the manipulative procedure described above.

To prepare 13β - (3 - hydroxypropyl)-3-cyclopentoxy-17α - ethyl-gona-2,5(10)-dien-17β-ol treat 13β - (3-hydroxypropyl) - 3 - cyclopentoxy - gona-2,5(10)-dien-17-one with ethyl magnesium bromide according to the manipulative procedure described above.

To prepare 13β - (3 - dimethylaminopropyl)-1,3-dimethoxy - 17α - methyl-gona-1(10),3-dien-17β-ol treat 13β - (3 - dimethylaminopropyl) - 1,3 - dimethoxy-gona-1(10),3-dien - 17-one with methyl magnesium bromide according to the manipulative procedure described above.

These compounds are useful as intermediates for preparing the novel compositions of this invention which have hormonal activity.

EXAMPLE 260

13β,17α-di-n-propyl-3-methoxy-gona-2,5(10)-dien-17β-ol

Add a solution of 13β,17α-di-n-propyl-3-methoxy-gona-1,3,5(10)-triene - 17β-ol in ether (100 cc.) to liquid ammonia (200 cc.) followed, portionwise, by lithium (1.5 g.). Stir the mixture for 1.5 hours and then add ethanol (35 cc.)-ether (35 cc.) dropwise to discharge the blue color. Allow the ammonia to evaporate under nitrogen and then add water and extract the product with ether. Evaporate the washed, dried extracts and recrystallize the residue from ethanol to give 13β,17α-di-n-propyl-3-methoxy-gona-2,5(10)-dien-17β-ol (1.09 g.), M.P. 150–157°; infrared absorption peaks at 2.85, 5.90, 6.00μ.

This compound is useful as an intermediate for preparing the novel compositions of this invention which have hormonal activity.

EXAMPLE 261

13β-n-propyl-3-methoxy-17α-(1-methallyl)-gona-2,5(10)-dien-17β-ol

Add a solution of 13β - n - propyl-3-methoxy-gona-2,5(10)-dien-17-one (3.1 g.) in ether (130 cc.) with stirring under nitrogen to crotyl magnesium bromide (from crotyl bromide, 13.5 g., and magnesium, 9.7 g.) in ether. Reflux the mixture for 4 hours, and leave at room temperature overnight. Add saturated aqueous ammonium chloride (70 cc.) and extract the product with ether. Wash, dry and evaporate the extracts to yield 13β-n - propyl - 3 - methoxy-17α-(1-methallyl)-gona-2,5(10)-dien-17β-ol; infrared absorption peak at 11.0μ.

This compound is useful as an intermediate for preparing the novel compositions of this invention which have hormonal activity.

EXAMPLE 262

13β-n-propyl-3-methoxy-17α-(2-methallyl)-gona-2,5(10)-dien-17β-ol

Employ the method of the previous example but react 13β - n - propyl - 3 - methoxy-gona-2,5(10)-dien-17-one (3.66 g.) with 2-methallyl magnesium chloride (from the metal, 8.76 g. and 2-methallyl chloride, 10.9 g.). Purify the crude product by extraction with boiling methanol to afford a residue of 13β-n-propyl-3-methoxy-17α-(2-methallyl)-gona - 2,5(10)-dien-17β-ol (3.87 g.), M.P. 135–140°; infrared absorption peaks at 2.87, 5.90, 6.00, 6.09μ.

This compound is useful as an intermediate for preparing the novel compositions of this invention which have hormonal activity.

EXAMPLE 263

13β-n-butyl-3-methoxy-17α-ethynyl-gona-2,5(10)-dien-17β-ol

Add a solution of 13β - n - butyl-3-methoxy-gona-2,5(10)-dien-17-one (2 g.) in dimethylacetamide (200 cc.) slowly to a suspension of lithium carbide (2.5 g.) in dimethylacetamide (50 cc.) at 0° in an atmosphere of nitrogen. Stir the mixture at room temperature for 48 hours, cool to 0° and decompose by the dropwise addition of water (100 cc.). Add water and extract with ether to give after removal of the solvent, 13β - n - butyl-3-methoxy-17α-ethynyl - gona-2,5(10)-dien-17β - ol (1.8 g.) as a gum; infrared absorption peaks at 2.95, 3.05, 5.90, 5.99μ.

This compound is useful as an intermediate for preparing the novel compositions of this invention which have hormonal activity.

EXAMPLE 264

13β-n-butyl-3-methoxy-17α-ethyl-gona-2,5(10)-dien-17β-ol

Add lithium (1.5 g.) in small pieces, with stirring to

13β - n - butyl-3-methoxy-17α-ethyl-gona - 1,3,5(10)-trien-17β-ol (1.57 g.) in a mixture of liquid ammonia (250 cc.) and pyrrole (100 cc.). After 2 hours add an excess of ammonium chloride, followed by water, and work up the product by means of ether. Dissolve the crystalline residue so obtained in a boiling mixture of ethanol and ether, charcoal, concentrate the filtrate and cool to give 13β - n - butyl-3-methoxy-17α-ethyl-gona-2,5(10)-dien-17β-ol (1.05 g.), M.P. 121–4° C.; no selective ultraviolet absorption beyond 220 mμ; infrared absorption peaks at 3.08, 5.88, 5.99μ.

This compound is useful as an intermediate for preparing the novel compositions of this invention which have hormonal activity.

EXAMPLE 265

13β-methyl-17αβ-hydroxy-D-homo-gon-5(10)-en-3-one

Add 13β - methyl - 3 - methoxy - D - homo - gona-2,5(10)-dien-17αβ-ol (4 g.) to a solution of oxalic acid dihydrate (5 g.) in water (70 cc.) and methanol (200 cc.) in an atmosphere of nitrogen. Add Isopropanol (40 cc.) and stir the mixture for 1½ hours. Filter the reaction mixture, pour the filtrate into brine and extract with ether. Wash, dry and evaporate the ethereal solution and recrystallize the residue from ethyl acetate to give 13β-methyl-17αβ-hydroxy-D-homo-gon-5(10)-en-3 - one (1.85 g.), M.P. 105–110°. Infrared absorption peaks at 2.98, 5.85μ.

This compound has estrogenic activity and is useful as an intermediate for preparing the hormonal compounds of this invention.

To prepare 13β - ethyl - 2 - methoxy-17β-hydroxy-gon-5(10)-en-3-one treat 13β-ethyl-2,3-dimethoxy-gona-2,5(10-dien-17β-ol with oxalic acid dihydrate according to the manipulative procedure described above.

To prepare 13β - ethyl - 1 - oxo - 17β - hydroxy-gonan-3-one treat 13β-ethyl-1,3-dimethoxy-gona-1(10),3-dien-17β-ol with oxalic acid dihydrate according to the manipulative procedure described above.

To prepare 13β-phenethyl-17β-hydroxy-gon-5(10)-en-3-one treat 13β-phenethyl-3-methoxy-gona-2,5(10)-dien-17β-ol with oxalic acid dihydrate according to the manipulative procedure described above.

To prepare 13β-(3-hydroxypropyl)-17β-hydroxy-gon-5(10)-en-3-one treat 13β-(3-hydroxypropyl)-3-methoxy-gona-2,5(10)-dien-17β-ol with oxalic acid dihydrate according to the manipulative procedure described above.

To prepare 13β-(3-dimethylaminopropyl)-1-oxo-17β-hydroxy-gonan-3-one treat 13β-(3-dimethylaminopropyl)-1,3-dimethoxy-gona-1(10)-3-dien-17β-ol with oxalic acid dihydrate according to the manipulative procedure described above.

These compounds have estrogenic activity and are useful as intermediates in the preparation of the hormonal compounds of the invention.

EXAMPLE 266

13β-ethyl-17αβ-hydroxy-D-homo-gon-5(10)-en-3-one

Hydrolyze 13β-ethyl-3-methoxy-D-homo-gona-2,5(10)-dien-17αβ-ol (5 g.) by the method of the preceding example to 13β-ethyl-17αβ-hydroxy-D-homo-gon-5(10)-en-3-one (3.3 g.), M.P. 110–115° C.; infrared absorption peaks at 2.85, 5.82μ.

This compound has estrogenic activity and is useful as an intermediate for preparing the hormonal compounds of this invention.

EXAMPLE 267

13β-methyl-17β-hydroxy-gon-5(10)-en-3-one

Add a slurry of 13β-methyl-3-methoxy-gona-2,5(10)-dien-17β-ol (27.9 g.) in dioxane (50 cc.) with stirring to a mixture of methanol (2000 cc.) and water (390 cc.) containing oxalic acid dihydrate (37 g.) at room temperature and continue stirring until 10 minutes after a clear solution had been obtained. Add water (5000 cc.) and extract the product with benzene (1 vol.)-ether (1 vol.). Work up in the usual manner and recrystallize the residue from ethyl acetate to give 13β-methyl-17β-hydroxy-gon-5(10)-en-3-one (18.8 g.), M.P. 144–148° C.

Calculated for $C_{19}H_{28}O_2$ (percent): C, 79.1; H, 9.8. Found (percent): C, 79.6; H, 9.6. Infrared absorption peaks at 2.93, 5.86μ; no ultra-violet absorption in the 200–300 mμ region.

This compound has estrogenic activity and is useful as an intermediate for preparing the hormonal compounds of this invention.

EXAMPLE 268

13β-ethyl-17β-hydroxy-gon-5(10)-en-3-one

Stir 13β - ethyl - 3 - methoxy - gona-2,5(10)-dien-17β-ol (0.35 g.) with a mixture of methanol (30 cc.), water (6 cc.) and oxalic acid dihydrate (0.46 g.) at room temperature for 45 minutes. Add water and extract the solution with ether. Wash the ethereal solution with water, saturated aqueous sodium bicarbonate and brine, dry and evaporate. Recrystallize the residue from ethyl acetate to give 13β-ethyl-17β-hydroxy-gon-5(10)-en-3-one, M.P. 147–9°; infrared absorption peaks at 2.93, 5.86μ.

This compound has estrogenic activity and is useful as an intermediate for preparing the hormonal compounds of this invention.

EXAMPLE 269

13β-ethyl-17β-hydroxy-gon-5(10)-en-3-one

Hydrolyze 13β - ethyl-3-n-propoxy-gona-2,5(10)-dien-17β-ol (0.35 g.) exactly as described in the previous example to give 13β-ethyl-17β-hydroxy-gon-5(10)-en-3-one, M.P. 147–9°.

This compound has estrogenic activity and is useful as an intermediate for preparing the hormonal compounds of this invention.

EXAMPLE 270

13β-n-propyl-17β-hydroxy-gon-5(10)-en-3-one

Stir 13β - n-propyl-3-methoxy-gona-2,5(10)-dien-17β-ol (0.350 g.) with a mixture of methanol (30 cc.), water (6 cc.) and oxalic acid dihydrate (0.46 g.) at room temperature and under nitrogen for 50 minutes. A clear solution forms after 30 minutes stirring. Work up the product by means of ether and repeatedly crystallize from ethyl acetate to yield 13β-n-propyl-17β-hydroxy-gon-5(10)-en-3-one; M.P. 127–30°; infrared absorption peaks at 2.89, 5.85μ.

Calculated for $C_{20}H_{30}O_2$ (percent): C, 79.4; H, 10.0. Found (percent): C, 79.3; H, 10.0.

This compound has estrogenic activity and is useful as an intermediate for preparing the hormonal compounds of this invention.

EXAMPLE 271

13β-n-butyl-17β-hydroxy-gon-5(10)-en-3-one

Stir 13β - n - butyl-3-methoxy-gona-2,5(10)-dien-17β-ol (4.6 g.) under nitrogen in methanol (354 cc.) containing water (59 cc.) and oxalic acid dihydrate (5.85 g.) for 45 minutes at room temperature. Filter, add water (885 cc.) and extract the mixture with ether-benzene. Evaporate the washed and dried extracts and recrystallize the residue from ether to give 13β-n-butyl-17β-hydroxy-gon-5(10)-en-3-one, M.P. 104–107°; infrared absorption peak at 5.86μ.

This compound has estrogenic activity and is useful as an intermediate for preparing the hormonal compounds of this invention.

EXAMPLE 272

13β-isopropyl-17β-hydroxy-gon-5(10)-en-3-one

Add 13β-isopropyl-3-methoxy-gona-2,5(10)-dien-17β-ol (0.09 g.) in ethanol (10 cc.) to a solution of oxalic acid dihydrate (0.2 g.) in water (3 cc.). Keep the mixture at 25° for 40 minutes and then add an excess of saturated aqueous sodium bicarbonate solution. Isolate the product with ether and crystallize by cooling and rubbing with ether to give 13β - isopropyl - 17β - gon-5(10)-en-3-one (0.064 g.), M.P. 60–5°; infrared absorption peak at 5.85μ.

This compound has estrogenic activity and is useful as an intermediate for preparing the hormonal compounds of this invention.

EXAMPLE 273

13β-isobutyl-17β-hydroxy-gon-5(10)-en-3-one

To a solution of 13β-isobutyl-3-methoxy-gona-2,5(10)-dien-17β-ol (1.0 g.) in methanol (91 cc.) add oxalic acid dihydrate (1.39 g.) in water (18.1 cc.). Stir the mixture for 2 hours at room temperature, add water and extract with ether. Wash the ethereal extracts with sodium bicarbonate solution and water, dry and evaporate to dryness under reduced pressure to give a gum (0.6 g.). Crystallize the gum from ethyl acetate and thereafter from cyclohexane to furnish analytically pure 13β-isobutyl-17β-hydroxy-gon-5(10)-en-3-one, M.P. 133–135°; infrared absorption peaks at 2.92, 5.85μ.

Calculated for $C_{21}H_{32}O_2$ (percent): C, 79.7; H, 10.1. Found (percent): C, 80.0; H, 10.2.

This compound has estrogenic activity and is useful as an intermediate for preparing the hormonal compounds of this invention.

EXAMPLE 274

13β-ethyl-gon-5(10)-en-3,17-dione

Add 13β-ethyl-3-methoxy-gona-2,5(10-dien-17-one (1.3 g.) with stirring in a slurry in dioxane (6 cc.) to methanol (100 cc.) containing oxalic acid dihydrate (1.9 g.) and water (20 cc.). Continue for 10 minutes after a clear solution is obtained. Add water (500 cc.) and collect the product with ether.

Recrystallize the product from ethyl acetate-ether to obtain 13β-ethyl-gon-5(10)-en-3,17-dione (.9 g.), M.P. 120–126° C. To obtain an analytical specimen recrystallize from the same solvent mixture to M.P. 127–128° C.; infrared absorption peaks at 5.76, 5.85μ; no selective ultraviolet absorption in the 200–300μ region.

Calculated for $C_{19}H_{26}O_2$ (percent): C,79.7; H, 9.15. Found (percent): C, 79.9; H, 9.15.

This compound has estrogenic activity and is useful as an intermediate for preparing the hormonal compounds of this invention.

EXAMPLE 275

13β-methyl-17aα-ethynyl-17aβ-hydroxy-D-homo-gon-5(10)-en-3-one

Add 13β - methyl - 3 - methoxy-17aα-ethynyl-D-homo-gona-2,5(10)-dien-17aβ-ol (0.3 g.) in dioxane (10 cc.) with stirring to methanol (20 cc.) containing oxalic acid dihydrate (0.46 g.) and water (6 cc.). Continue stirring for 2 hours, add water and extract the mixture with ether. Dissolve the product in benzene and chromatograph on Florex to give the title compound; infrared absorption peaks at 2.99, 3.09, 5.86μ.

This compound has estrogenic activity and is useful as an intermediate for preparing the hormonal compounds of this invention.

To prepare 13β - isopropyl - 17α-ethyl-17β-hydroxy-gon-5(10)-en-3-one treat 13β - isopropyl - 17α-ethyl-3-methoxy-gona-2,5(10)-dien-17β-ol with oxalic acid dihydrate according to the manipulative procedure described above.

To prepare 13β-isobutyl-17α-methyl - 17β - hydroxy-gon-5(10)-en-3-one treat 13β - isobutyl - 17α-methyl-3-methoxy - gona-2,5(10)-dien-17β-ol with oxalic acid dihydrate according to the manipulative procedure described above.

To prepare 13β,17α - dimethyl - 17β - hydroxy - gon-5(10)-en-3-one treat 13β,17α-dimethyl - 3 - methoxy-gona-2,5(10)-dien-17β-ol with oxalic acid dihydrate according to the manipulative procedure described above.

To prepare 13β,17α-diethyl-1-oxo - 17β - hydroxy-gon-droxy-gon-5(10)-en-3-one treat 13β,17α - diethyl-2,3-dimethoxy - gona - 2,5(10)-dien-17β-ol with oxalic acid dihydrate according to the manipulative procedure described above.

3-one treat 13β,17α-diethyl-1,3-dimethoxy - gona-1(10), 3-dien - 17β-ol with oxalic acid dihydrate according to the manipulative procedure described above.

To prepare 13β - phenethyl - 17α-ethyl-17β-hydroxy-gon-5(10)-en-3-one treat 13β - phenethyl - 17α-ethyl-3-methoxy-gona-2,5(10) - dien-17β-ol with oxalic acid dihydrate according to the manipulative procedure described above.

To prepare 13β - (3 - hydroxypropyl)-17α-methyl-17β-hydroxy - gon - 5(10) - en-3-one treat 13β-(3-hydroxypropyl)-17α-methyl-3-methoxy - gona - 2,5(10) - dien-17β-ol with oxalic acid dihydrate according to the manipulative procedure described above.

To prepare 13β - (3 - dimethylaminopropyl)-17α-ethyl-17β - hydroxy - 1 - methoxy-gon-5(10)-en-3-one treat 13β - (3 - dimethylaminopropyl)-17α-ethyl - 3 - methoxy-gona-2,5(10)-dien-17β-ol with oxalic acid dihydrate according to the manipulative procedure described above.

These compounds have estrogenic activity and are useful as intermediate for preparing the hormonal compounds of this invention.

EXAMPLE 276

13β-methyl-17aα-ethynyl-17aβ-hydroxy-D-homo-gon-5(10)-en-3-one

Add 13β - methyl-3-methoxy-17aα - ethynyl-D-homo-gona - 2,5(10)-dien-17aβ-ol (0.3 g.) in dioxane (10 cc.) with stirring to methanol (20 cc.) containing oxalic acid dihydrate (0.45 g.) and water (6 cc.). After stirring for 2 hours, add water and extract the mixture with ether. Evaporate the washed and dried extracts to obtain the title compound; infrared absorption peaks at 2.93, 5.90μ.

This compound has estrogenic and progestational activity and is useful as an intermediate for preparing the hormonal compounds of this invention.

EXAMPLE 277

13β-ethyl-17aα-ethynyl-17aβ-hydroxy-D-homo-gon-5(10)-en-3-one

Stir 13β - ethyl - 3 - methoxy-17aα-ethynyl-D-homo-gona-2,5(10)-dien-17aβ-ol (4 g.) with oxalic acid dihydrate (4.5 g.) in water (35 cc.) and methanol (250 cc.) for 30 minutes. Pour the mixture into brine and extract with ether. Evaporate the washed and dried ether extract to dryness and recrystallize the residue from ethyl acetate to obtain the title compound (1.75 g.), M.P. 164–168° C.; infrared absorption peaks at 2.92, 3.06, 5.84μ.

This compound has estrogenic activity and is useful as an intermediate for preparing the hormonal compounds of this invention.

EXAMPLE 278

13β,17aα-diethyl-17aβ-hydroxy-D-homo-gon-5(10)-3-one

Stir 13β,17aα - diethyl - 3 - methoxy-D-homo-gona-2,5(10)-dien - 17aβ-ol (4 g.) with oxalic acid dihydrate (4.5 g.) in water (35 cc.) and methanol (250 cc.) for 2 hours. Pour the filtered solution into brine and extract with ether. Evaporate the washed and dried extracts and recrystallize the residue from ether to obtain the title compound (2.5 g.) M.P. 116–123° C.

This compound has estrogenic activity and is useful as an intermediate for preparing the hormonal compounds of this invention.

EXAMPLE 279

13β-ethyl-17α-ethynyl-17β-hydroxy-gon-5(10)-en-3-one

Add 13β-ethyl-3-methoxy-17α-ethynyl - gona - 2,5(10)-dien-17β-ol (9.6 g.) in methanol (30 cc.) to a solution of oxalic acid dihydrate (0.46 g.) in water (6 cc.). After standing at room temperature for 45 minutes, add ether (60 cc.) and wash, dry and evaporate the ether solution. Dissolve the residual gum in benzene (5 cc.) and chromatograph on an activated fuller's earth (50 g.); elute with light petroleum containing first a small and then a gradually increasing proportion of benzene to obtain first a crystalline byproduct, followed by the desired title compound. Recrystallize from a mixture of light petroleum and ethyl acetate, to yield the pure compound (0.15 g.), M.P. 169–173° C.; infrared absorption peaks at 2.99, 5.86μ.

This compound is useful as an intermediate for preparing the hormonal compounds of this invention.

EXAMPLE 280

13β-17α-diethyl-17β-hydroxy-gon-5(10)-en-3-one

Stir 13β,17α-diethyl-3-methoxy-gona-2,5(10)-dien-17β-ol (5 g.) in methanol (430 cc.) containing water (87 cc.) and oxalic acid dihydrate (6.6 g.) until the solid has completely dissolved. Isolate the product (4.55 g.), M.P. 126–134° C. by means of ether and recrystallize repeatedly from ethyl acetate to obtain the title compound; M.P. 142–143° C.; infrared absorption peaks at 2.90, 5.85μ.

Calculated for $C_{21}H_{32}O_2$ (percent): C, 79.9; H, 10.2. Found (percent): C, 79.6; H, 10.1.

This compound has progestational activity and is useful as an intermediate for preparing the hormonal compounds of this invention.

EXAMPLE 281

13β-ethyl-17α-propynyl-17β-hydroxy-gon-5(10)-en-3-one

Suspend 13β - ethyl - 3 - methoxy-17α-propynyl-gona-2,5(10)-dien-17β-ol (4 g.) in methanol (200 cc.) and water (20 cc.). Add oxalic acid (4 g.) followed by dioxane (100 cc.) and stir the mixture until dissolution is complete and then for a further 20 minutes. Add water and filter the precipitated product, wash with water and dry. Crystallize from an ethyl acetate-hexane mixture to obtain the title compound, M.P. 156–159° C.; infrared absorption peaks at 4.55, 5.83μ; no selective ultra-violet absorption beyond 220 mμ.

This compound has estrogenic activity and is useful as an intermediate for preparing the hormonal compounds of this invention.

EXAMPLE 282

13β-ethyl-17α-(2-propenyl)-17β-hydroxy-gon-5(10)-en-3-one

Suspend 13β-ethyl-3-methoxy-17α-(2-propenyl)-gona-2,5(10)-dien-17β-ol (1.5 g.) in methanol (50 cc.) and water (5 cc.). Add oxalic acid (1 g.) followed by dioxane (20 cc.), and stir the mixture until dissolution is complete and then for a further 20 minutes. Add water gradually and filter the precipitated material, wash with water and dry. Recrystallize from an ethyl acetate-hexane mixture to obtain the title compound (1 g.); infrared absorption peaks at 2.94, 6,21, 6.10μ; no selective ultraviolet absorption beyond 220 mμ.

This compound has estrogenic activity and is useful as an intermediate for preparing the hormonal compounds of this invention.

EXAMPLE 283

13β-ethyl-17α-(2-isobutenyl)-17β-hydroxy-gon-5(10)-en-3-one

Suspend 13β-ethyl-3-methoxy-17α-(2-isobutenyl)-gona-2,5(10)-dien-17β-ol in methanol (50 cc.) and water (5 cc.). Add oxalic acid (1 g.) followed by dioxane (20 cc.), and stir the mixture until dissolution is complete and then for a further 30 minutes. Add water and extract the product with ether. Wash, dry and evaporate the ethereal solution and recrystallize the residue from ethyl acetate-hexane to obtain the title compound; infrared absorption peaks at 2.90, 5.85, 6.10, 11.5μ; no selective ultraviolet absorption beyond 220 mμ.

This compound has estrogenic activity and is useful as an intermediate for preparing the hormonal compounds of this invention.

EXAMPLE 284

13β-n-propyl-17α-methyl-17β-hydroxy-gon-5(10)-en-3-one

To 13β-n-propyl-3-methoxy-17α-methyl-gona-2,5(10)-dien-17β-ol (0.3 g.) in methanol (30 cc.) add a solution of oxalic acid dihydrate (0.46 g.) in water (6 cc.). After stirring at room temperature for 20 minutes, add isopropanol (30 cc.) and continue stirring for 80 minutes; work up the product with ether and recrystallize from a mixture of ether and hexane to obtain the title compound (0.2 g.), M.P. 158–163° C.; infrared absorption peak at 5.90μ; no selective ultraviolet absorption beyond 220 mμ.

This compound has estrogenic activity and is useful as an intermediate for preparing the hormonal compounds of this invention.

EXAMPLE 285

13β-n-propyl-17α-ethynyl-17β-hydroxy-gon-5(10)-en-3-one

To 13β-n-propyl-3-methoxy-17α-ethynyl-gona-2,5(10)-dien-17β-ol (0.24 g.) in methanol (40 cc.) add a solution of oxalic acid dihydrate (0.58 g.) in water (7.6 cc.) and stir the mixture for 90 minutes at room temperature under nitrogen. Add water, work up the product with ether and purify the residue obtained by chromatography on fuller's earth. Crystallize from cyclohexane and then from ethyl acetate to obtain the title compound (0.037 g.), M.P. 182–190° C.; infrared absorption peaks at 2.90, 3.08, 5.84μ.

Calculated for $C_{22}H_{30}O_2$ (percent): C, 80.9; H, 9.3. Found (percent): C, 80.5; H, 8.6.

This compound has estrogenic activity and is useful as an intermediate for preparing the hormonal compounds of this invention.

EXAMPLE 286

13β-n-propyl-17β-hydroxy-17α-propynyl-gon-5(10)-en-3-one

Stir 13β - n - propyl - 3 - methoxy-17α-propynyl-gona-2,5(10)-diene-17β-ol (2.5 g.) for 2 hours in methanol (80 cc.) containing water (10 cc.) oxalic acid dihydrate (1.75 g.) and tetrahydrofuran (60 cc.). Add the mixture to brine and extract the product with ether. Evaporate the washed and dried extracts and recrystallize the residue from ethyl acetate-hexane to afford the title compound, M.P. 147–150° C.

Calculated for $C_{23}H_{32}O_2$ (percent): C, 81.1; H, 9.5. Found (percent): C, 80.8; H, 9.4.

This compound has estrogenic activity and is useful as an intermediate for preparing the hormonal compounds of this invention.

EXAMPLE 287

13β-n-butyl-17α-ethynyl-17β-hydroxy-gon-5(10)-en-3-one

Stir 13β-n-butyl-17α-ethynyl-3-methoxy-gona-2,5(10)-diene-17β-ol (2 g.) in methanol (50 cc.) containing oxalic acid dihydrate (0.9 g) and water (12 cc.) under nitrogen for 2 hours. Pour the mixture into water and extract with ether. Evaporate the washed and dried extracts to a residue, purify by chromatography on Florex and recrystallize from ethyl acetate-hexane to give 13β-n-butyl-17α-ethynyl-17β-hydroxy-gon-5(10)-en-3-one (750 mg.), M.P. 160–164° C.; infrared absorption peaks at 2.87, 3.08, 5.82μ.

This compound has estrogenic activity and is useful as an intermediate for preparing the hormonal compounds of this invention.

EXAMPLE 288

13β-ethyl-3,3-ethylenedioxy-gon-5-en-17β-ol and 13β-ethyl-3,3-ethylenedioxy-gon-5(10)-en-17β-ol Reflux 13β-ethyl-3-methoxy-gona-2,5(10)-diene - 17β-ol (13 g.) in benzene (220 cc.) with ethylene glycol (50 cc.) and toluene-p-sulphonic acid (0.4 g.) for 36 hours, and then add 5% aqueous sodium bicarbonate (100 cc.) to the cooled solution. Separate, wash and dry the organic layer and evaporate to give a gum which crystallizes on standing. Crystallize the product from ether-hexane to give an equilibrium mixture of the title products, M.P. 130–139° C.

Calculated for $C_{21}H_{32}O_3$ (percent): C, 75.86; H, 9.7. Found (percent): C, 75.95; H, 9.48.

The mixture possesses androgenic activity and is useful as an intermediate for preparing the hormonal compounds of this invention.

EXAMPLE 289

13β-ethyl-17,17-ethylenedioxy-gon-5(10)-en-3-one

Add 13β-ethyl-3-methoxy-17,17-ethylenedioxy - gona-2,5(10)-diene (11 g.) in dioxane (45 cc.) with stirring to oxalic acid dihydrate (12 g.) in methanol (800 cc.) containing water (150 cc.). Stir the mixture for 1 hour and work up. Purify the resulting gum by chromatography on Florex and recrystallize from ethyl acetate-hexane to yield 13β-ethyl-17,17-ethylenedioxy-gon-5(10)-en-3-one (2 g.), M.P. 117–123° C.; infrared absorption peaks at 5.80, 9.22, 9.57, 10.8μ.

This compound is useful as an intermediate for preparing the hormonal compounds of this invention.

EXAMPLE 290

13β-ethyl-3,3-ethylenedioxy-gon-5-en-17-one and 13β-ethyl-3,3-ethylenedioxy-gon-5(10)-en-17-one Add chromium trioxide (4.9 g.) portionwise with stirring over 20 minutes to a mixture (4.9 g.) of 13β-ethyl-3,3-ethylenedioxy-gon-5-ene-17β-ol and 13β-ethyl-3,3-ethylenedioxy-gon-5(10)-en-17β-ol in pyridine (70 cc.) at 0° C. under nitrogen. Keep the mixture at room temperature for 17 hours, then dilute with ethyl acetate (300 cc.) and filter through a column of neutral alumina. Dissolve the gum eluted by ethyl acetate in ether and filter. Add hexane to the filtrate and concentrate the solution to give an equilibrium mixture of the title product (total of 3.6 g.); infrared absorption peaks at 5.78, 9.03, 9.24, 9.55, 10.6μ.

Calculated for $C_{21}H_{30}O_2$ (percent): C, 76.3; H, 9.15. Found (percent): C, 76.4; H, 9.15.

This mixture is useful as an intermediate for preparing the hormonal compounds of this invention.

EXAMPLE 291

13β-ethyl-3,3-ethylenedioxy-17α-ethynyl-gon-5 - en - 17β-ol and 13β-ethyl-3,3-ethylenedioxy-17α-ethynyl - gon-5(10)-en-17β-ol Add 13β-ethyl-3,3-ethylenedioxy-gon-5-en-17-one and 13β-ethyl-3,3-ethylenedioxy-gon-5(10)-en-17-one (3.5 g.) (the mixture of the preceding example) in dimethylacetamide (100 cc.) with stirring under nitrogen to lithium acetylide (about 3.5 g.) in ethylenediamine (about 10 cc.)-dioxane (about 10 cc.). Stir the mixture for 5 hours and replace the nitrogen atmosphere by one of acetylene, and then add lithium acetylide (about 3.5 g.) in ethylene diamine (about 10 cc.)-dioxane (about 10 cc.). After 20 hours, pour the mixture onto crushed ice and extract the product with ether. Evaporate the washed and dried extracts and purify the resulting gum by chromatography on a Florex column. Dissolve the product in ethyl acetate and add hexane to precipitate 13β-ethyl-3,3-ethylene-dioxy-17α-ethynyl-gon-5-en-17β-ol and 13β-ethyl-3,3-ethylene-dioxy-17α-ethynyl-gon-5(10) - en - 17β-ol (1.3 g.), M.P. 150–161° C.; infrared absorption peaks at 2.80, 3.05μ.

The mixture has progestational activity and is useful as an intermediate for preparing the hormonal compounds of this invention.

EXAMPLE 292

13β-ethyl-17β-acetoxy-gon-5-en-3β-ol

Add 13β-ethyl-3,17β-di-acetoxy-gona - 3,5 - diene (1.5 g.) in tetrahydrofuran (15 cc.) dropwise over 1 hour to a solution of potassium borohydride (1.5 g.) in water (5 cc.) and methanol (5 cc.) at 40° C. Stir the mixture for 4 hours at 40° C. Acidify the cooled solution with acetic acid, add water and extract the mixture with ether. Wash and dry the ethereal solution and evaporate the solvent to give 13β-ethyl-17β-acetoxy-gon-5-en-3β-ol; infrared absorption peaks at 2.94, 5.81μ.

The compound has estrogenic activity and is useful as an intermediate for preparing the hormonal compounds of this invention.

EXAMPLE 293

13β,17α-di-ethyl-gon-5-en-3,17β-diol

Dissolve 13β,17α-di-ethyl-3-acetoxy-gona - 3,5 - diene-17β-ol (0.45 g.) in methanol (28 cc.) and tetrahydrofuran (13 cc.) and add a solution of sodium borohydride (0.535 g.) in water (1 cc.). After 20 hours at room temperature, add water (70 cc.), filter the precipitate and recrystallize the residue from aqueous methanol to give 13β, 17α-di-ethyl-gon-5-en-3,17β-diol (0.25 g.), M.P. 178–182° C.; ultraviolet absorption—no selective absorption beyond 220 mμ; infrared absorption peaks at 3.0, 6.1, 12.05μ.

The compound possesses progestational activity and is useful for preparing the hormonal compounds of this invention.

EXAMPLE 294

13β,17α-diethyl-3,3-ethylenedioxy-gon-5-en - 17β - ol and 13β,17α-diethyl-3,3-ethylenedioxy-gon-5(10)-en-17β-ol Add 13β-ethyl-3,3-ethylenedioxy-17α-ethynyl - gon - 5-en-17β-ol and 13β-ethyl-3,3-ethylenedioxy-17α - ethynyl-gon-5(10)-en-17β-ol (an equilibrium mixture, 1 g.) in benzene (15 cc.) to a prehydrogenated suspension of palladised calcium carbonate (0.3 g.) in benzene (10 cc.) and shake the mixture in an atmosphere of hydrogen until two molecular equivalents of hydrogen have been absorbed (137 cc.) when uptake practically ceases. Filter the catalyst, evaporate the solvent and recrystallize the residue from methanol to give an equilibrium mixture of 13β,17α-diethyl-3,3-ethylenedioxy - gon - 5-en-17β-ol and 13β,17α-diethyl-3,3-etheylenedioxy - gon - 5(10)-17β-ol (0.35 g.); M.P. 91–97° C.

Calculated for $C_{23}H_{36}O_3$ (percent): C, 76.62; H, 10.07. Found (percent): C, 76.96; H, 9.8.

This mixture possess progestational activity and is useful as an intermediate for preparing the hormonal compounds of this invention.

EXAMPLE 295

13β-methyl-D-homo-17a-hydroxy-gon-4-en-3-one

Add 13β - methyl - D - homo-3-methoxy-gona-2,5(10)-dien-17a-ol (0.7 g.) in dioxane (20 cc.) with stirring to methanol (20 cc.) containing 11 N hydrochloric acid (2.7 cc.) and water (1 cc.). Continue stirring for 2 hours, add water and extract the mixture with ether. Evaporate the washed and dried extracts, dissolve the residue in benzene and chromatograph on Florex to give 13β-methyl-D-homo-17a-hydroxy-gon-4-en-3-one; ultra-violet absorption peak at 242μ (ε 17,000); infrared absorption peaks at 3.03, 5.92, 6.01μ.

This compound has androgenic and anabolic activity and is useful as an intermediate for preparing the hormonal compounds of this invention.

EXAMPLE 296

13β-ethyl-D-homo-17a-hydroxy-gon-4-en-3-one

Substitute 13β-ethyl-D-homo-3-methoxy-gona-2,5(10)-dien-17a-ol for 13β-methyl-D-homo-3-methoxy-gona-2,5(10)-dien-17a-ol to give 13β-ethyl-D-homo-17a-hydroxy-gon-4-en-3-one; ultra-violet absorption peak at 242μ (ε 17,000); infrared absorption peaks at 3.03, 5.92, 6.01μ.

This compound has androgenic and anabolic activity and is useful as an intermediate for preparing the hormonal compounds of this invention.

EXAMPLE 297

13β-ethyl-17β-hydroxy-gon-4-en-3-one

Add 13β - ethyl-3-methoxy-gona-1,3,5(10)-trien-17β-ol (0.5 g.) in 100 ml. of tetrahydrofuran to 150 ml. of liquid ammonia, followed by 0.5 g. of lithium foil, and stir the mixture for 10 minutes. Add ethanol (6 ml.) and tetrahydrofuran (10 ml.) over a period of 20 minutes. After disappearance of the blue color add water, extract the mixture well with ether and evaporate the washed and dried ether extract. Dissolve the crystalline residue in 50 ml. of methanol and reflux for 30 minutes with 30 ml. of 3 N HCl. Remove most of the methanol under reduced pressure, and extract the residue with ether. Chromatograph the ether extract on alumina. Use benzene-ether (1:1) to elute 13β-ethyl-17β-hydroxy-gon-4-en-3-one, M.P. 152–55° C.

Calculated for $C_{19}H_{28}O_2$ (percent): C, 79.1; H, 9.8. Found (percent): C, 79.25; H, 9.65.

This compound has androgenic and anabolic activity and is useful as an intermediate for preparing the hormonal compounds of this invention.

EXAMPLE 298

13β-ethyl-17β-hydroxy-gon-4-en-3-one

Dissolve 13β - ethyl-3-methoxy-gona-2,5(10)-dien-17β-ol (0.47 g.) in hot methanol (25 cc.). Add 3 N hydrochloric acid (15 cc.) and keep the mixture at 70° C. under nitrogen for 1 hour. Add water and work up with ether and chromatograph the resulting gum on activated alumina (40 g.). Elute with ether to give a fraction (0.2 g.) which on recrystallization from light petroleum gives 13β-ethyl-17β-hydroxy-gon-4-en-3-one; M.P. 153–5° C.; ultra-violet absorption peak at 240 mμ (ε 16,300).

Calculated for $C_{19}H_{26}O_2$ (percent): C, 79.1; H, 9.8. Found (percent): C, 79.2; H, 9.7.

This compound has anabolic and androgenic activity and is useful as an intermediate for preparing the hormonal compounds of this invention.

EXAMPLE 299

13β-ethyl-17β-hydroxy-gon-4-en-3-one

Add to 13β-ethyl-3-methoxy-gona-2,5(10)-dien-17β-ol (1.0 g.) in methanol (50 cc.) 3 N hydrochloric acid (20 cc.); shake the mixture for 2 hours, pour into water, and extract the product with ether. Work up in the usual way and take up the resulting gum in benzene and chromatograph on neutral alumina. Elute with ether to give a crystalline material and recrystallize from a mixture of ether and pentane to yield 13β-ethyl-17β-hydroxy-gon-4-en-3-one (0.5 g.), M.P. 144–7° (apparently another polymorphic form of the product of Example 297); ultra-violet absorption peak at 240 mμ (ε 15,500); infrared absorption peaks at 2.94, 6.06, 6.23μ.

This compound has anabolic and androgenic activity and is useful as an intermediate for preparing the hormonal compounds of this invention.

To prepare 13β-cetyl-17β-hydroxy-gon-4-en-3-one treat 13β-cetyl-3-methoxy-gona-2,5(10)-dien-17β-ol with methanolic hydrochloric acid according to the manipulative procedure described above.

To prepare 13β-ethyl-2-methoxy-17β-hydroxy-gon-4-en-3-one treat 13β-ethyl-2,3-dimethoxy-gona-2,5(10)-diene-17β-ol with methanolic hydrochloric acid according to the manipulative procedure described above.

To prepare 13β-phenethyl-17β-hydroxy-gon-4-en-3-one treat 13β-phenethyl-3-methoxy-gona-2,5(10)-diene-17β-ol with methanolic hydrochloric acid according to the manipulative procedure described above.

To prepare 13β-(3-hydroxypropyl)-17β-hydroxy-gon-4-en-3-one treat 13β-(3-hydroxypropyl)-3-methoxy-gona-2,5(10)-diene-17β-ol with methanolic hydrochloric acid according to the manipulative procedure described above.

To prepare 13β-(3-dimethylaminopropyl)-1-oxo-17β-hydroxy-gona-3-one treat 13β-(3-dimethylaminopropyl)-1,3-dimethoxy-gona-1,(10),3-diene-17β-ol with methanolic hydrochloric acid according to the manipulative procedure described above.

These compounds possess androgenic and anabolic activity and are useful as an intermediate for preparing the hormonal compounds of this invention.

EXAMPLE 300

13β-ethyl-17β-hydroxy-gon-4-en-3-one

Stir 13β-ethyl-17β-hydroxy-gon-5(10)-en-3-one (300 mg.) for 2 hours under nitrogen at room temperature with methanol (10 cc.)-11 N hydrochloric acid (0.5 cc.)-water (0.3 cc.). Add sodium bicarbonate (2 g.) and ether (50 cc.), filter the mixture, evaporate the ether and recrystallize the residue from ethyl acetate-ether to give 13β-ethyl-17β-hydroxy - gon - 4 - en-3-one (0.2 g.), M.P. 147–149°; ultraviolet absorption peak at 242 mμ (ε 17,600); infrared absorption peaks at 2.78, 2.90, 6.02, 6.17μ.

This compound has androgenic and anabolic activity and is useful as an intermediate for preparing the hormonal compounds of this invention.

EXAMPLE 301

13β-ethyl-17β-hydroxy-gon-4-en-3-one

Add sodium borohydride (200 mg.) in ethanol (25 cc.) to 13β-ethyl-gon-4-en-3,17-dione (1 g.) in ethanol (50 cc.) at 8°. After 15 minutes add an excess of acetic acid and evaporate the solution to dryness under reduced pressure. Add water, collect the product in ether, and after this work up in the usual manner, recrystallize from a mixture of ether and pentane to obtain 13β-ethyl-17β-hydroxy-gon-4-en-3-one; ultraviolet absorption peak at 240 mμ (ε 15,500); infrared absorption peaks at 2.94, 6.06, 6.23μ.

This compound has androgenic and anabolic activity and is useful as an intermediate for preparing the hormonal compounds of this invention.

EXAMPLE 302

13β-n-propyl-17β-hydroxy-gon-4-en-3-one

Add 3 N hydrochloric acid (1 cc.) to a solution of 13β - n - propyl - 3 - methoxy - gona - 2,5(10) - dien-17β-ol (0.61 g.) in boiling methanol (70 cc.) and cool the mixture immediately and allow to stand for 4½ hours. Pour the product into water (300 cc.) and extract the mixture with ether; work up in the usual way to give as residue an amorphous solid (0.6 g.). Crystallize this solid from a mixture of ether and hexane. Take up the resulting solid in benzene (20 cc.) and chromatograph on a column of neutral alumina. Elute the product with ether and recrystallize from a mixture of ether and hexane to obtain 13β - n-propyl-17β-hydroxy-gon-4-en-3-one (0.08 g.), M.P. 126–7°; ultraviolet absorption peak at 240 mμ (ε 15,000); infrared absorption peaks at 2.92, 6.01, 6.20μ. Evaporation of the mother liquors gives a second, polymorphic, form of the same substance (0.17 g.), M.P. 144–5°, having ultraviolet and infrared spectra identical

113 acid (2.4 cc.) and water (1.6 cc.) and allow the mixture M.P. 144–5°.

This compound has androgenic and anabolic activity and is useful as an intermediate for preparing the hormonal compounds of this invention

EXAMPLE 303

13β-n-propyl-17β-hydroxy-gon-4-en-3-one

By substituting an equivalent amount of 13β-n-propyl-17β-hydroxy-gon-5(10)-en-3-one for 13β-ethyl - 17β-hydroxy-gon-5(10)-en-3-one in Example 300, there is obtained 13β-n-propyl-17β-hydroxy-gon-4-en-3-one; infrared absorption peaks at 2.92, 6.01, 6.20μ; ultraviolet peak at 240 mμ (ε 15,000).

This compound has androgenic and anabolic activity and is useful as an intermediate for preparing the hormonal compounds of this invention.

EXAMPLE 304

13β-isopropyl-17β-hydroxy-gon-4-en-3-one

Dissolve 13β-isopropyl-3-methoxy-gona-2,5(10) -dien-17β-ol in methanol (36 cc.), concentrated hydrochloric acid (2.4 cc.) and water (1.6 cc.) and allow the mixture to stand at room temperature for 2 hours. Add water and collect the product in ether. Wash, dry and evaporate the ethereal solution and chromatograph the residue on alumina (30 g.). Elute with benzene containing 30% ether and evaporate the solvent to obtain 13β-isopropyl-17β-hydroxy-gon-4-en-3-one as a gum; infrared absorption peak at 5.99μ; ultraviolet absorption peak at 240 mμ (ε 12,000).

This compound has progestational activity and is useful as an intermediate for preparing the hormonal compounds of this invention.

EXAMPLE 305

13β-n-butyl-17β-hydroxy-gon-4-en-3-one

Shake 13β-n-butyl-3-methoxy-gona - 2,5(10) - diene-17β-ol (0.49 g.) with concentrated hydrochloric acid (1.2 cc.) in water (0.8 cc.) and methanol (18 cc.) until solution is complete. Allow to stand 2 hours at room temperature, pour the mixture into water and extract the product with ether. Evaporate the washed and dried ether extracts and recrystallize the solid from a mixture of ethyl acetate and ether to obtain the title compound (0.32 g.), M.P. 168–70°; ultraviolet absorption peak at 240 mμ (ε 17,000); infrared absorption peaks at 2.92, 6.01μ.

This compound has androgenic and anabolic activity and is useful as an intermediate for preparing the hormonal compounds of this invention.

EXAMPLE 306

13β-isobutyl-17β-hydroxy-gon-4-en-3-one

Add to a mixture of concentrated hydrochloric acid (4.8 cc.) water (3.2 cc.) and methanol (72 cc.) 13β-isobutyl-3-methoxy-gona-2,5(10)-dien-17β-ol (2.0 g.). Heat the resulting solution on a steambath for 30 minutes with stirring. Cool to room temperature, dilute the solution with water (160 cc.) and extract with ether. Wash the ethereal solution with water, sodium bicarbonate, and water, dry over anhydrous sodium sulfate. Filter and remove the solvent under reduced pressure to give a gum. Recrystallize from ethyl acetate to obtain the title compound (0.8 g., 43%), M.P. 124.0–125.5°; ultraviolet absorption peak at 240 mμ (ε 18,200).

Calculated for $C_{21}H_{32}O_2$ (percent): C, 79.7; H, 10.2. Found (percent): C, 79.5; H, 10.0.

This compound has estrogen antagonistic activity and is useful as an intermediate for preparing the hormonal compounds of this invention.

114

EXAMPLE 307

13β,17α-diethyl-17β-hydroxy-gon-4-en-4-one

Dissolve 13β,17α-diethyl-gon-5-en-3,17β-diol (0.1 g.) in acetone (30 cc.) and add a few pieces of solid carbon dioxide. Add 8 N-chromic acid dropwise until the color of the solution remains reddish orange (3 drops) and then add isopropanol (1 cc.). Shake the mixture for 5 minutes with 10% aqueous sodium hydroxide (50 cc.) and then add benzene (30 cc.) and remove the organic layer. Wash the organic layer thoroughly with brine and dry over ($Na_2SO_4$). Remove the solvent and triturate the residue with ether to give a crystalline precipitate. Recrystallize from ether to obtain the title compound, M.P. 138–142° undepressed on admixture with authentic material.

This compound has anabolic and androgenic activity and is useful as an intermediate for preparing the hormonal compounds of this invention.

EXAMPLE 308

13β-ethyl-17β-methoxy-gon-4-en-3-one

Add 13β-ethyl-3,17β-dimethoxy-gona-2,5(10)-dien (0.8 g.) in tetrahydrofuran (5 cc.) to methanol (72 cc.) in an atmosphere of nitrogen and add a mixture of hydrochloric acid (4.8 cc.) and water (3.2 cc.). Add a further 10 cc. of tetrahydrofuran and after 1 hour dilute the solution with water and extract with ether. Wash, dry and evaporate the ethereal extracts and chromatograph the residue on neutral alumina. Remove the impurities by elution with benzene. Wash the column with ether, evaporate the eluate and recrystallize the residue from hexane to obtain the title compound (0.2 g.), M.P. 117–119°; ultraviolet absorption max. λ240 mμ (ε 15,800); infrared spectrum (KBr disc.) 6.0, 6.2, 8.8, 9.05μ.

This compound has anabolic and androgenic activity and is useful as an intermediate for preparing the hormonal compounds of this invention.

EXAMPLE 309

13β-ethyl-gon-4-en-3,17-dione

Add 13β-ethyl - 3 - methoxy-gona-2,5(10)-dien-17-one (12.9 g.) with stirring under nitrogen to methanol (300 cc.) containing 11 N hydrochloric acid (20 cc.) and water (13 cc.). Stir two hours and add sodium bicarbonate (21 g.) portionwise. Filter the mixture and evaporate the filtrate to dryness. Recrystallize the residue from ethyl acetate (75 cc.) to obtain the title compound (10 g.), M.P. 158–161° C.; ultraviolet absorption peak at 240 mμ (ε 17,800); infrared absorption peaks at 5.78, 6.00, 6.17μ.

Calculated for $C_{19}H_{26}O_2$ (percent): C, 79.76; H, 9.15. Found (percent): C, 80.0; H, 9.0.

This compound is useful as an intermediate for preparing the hormonal compounds of this invention.

EXAMPLE 310

13β-ethyl-gon-4-en-3,17-dione

Add 13β-ethyl-gon-5(10)-en-3,17-dione (1 g.) with stirring under nitrogen to methanol (25 cc.) containing 11 N hydrochloric acid (1.75 cc.) and water (1.1 cc.). Stir for 2 hours, add sodium bicarbonate (1.75 g.) and filter the mixture. Evaporate the filtrate to dryness and recrystallize the residue from ethyl acetate to obtain the title compound; ultraviolet absorption peak at 240 mμ (ε 17,800); infrared absorption peaks at 5.78, 6.00, 6.17μ.

This compound is useful as an intermediate for preparing the hormonal compounds of this invention.

EXAMPLE 311

13β-ethyl-gon-4-en-3,17-dione

Heat 13β-ethyl-3-methoxy-17,17-ethylenedioxy-gona-2,5(10)-diene (0.1 g.) in glacial acetic acid (2.5 cc.) and water (1 cc.) on a steam bath for 20 minutes, bring finally to boiling and allow to cool. Add aqueous sodium bicarbonate to neutralize the solution and ether extract the product. Wash, dry and evaporate the ether extracts to furnish a residue (0.065 g.); crystallize from a mixture of acetone and light petroleum to obtain the title compound (0.01 g.), M.P. 154–5°; ultraviolet absorption peak at 239 mμ (ε 15,000); infrared absorption peaks at 5.75, 5.96μ.

This compound is useful as an intermediate for preparing the hormonal compounds of this invention.

EXAMPLE 312

13β-methyl-D-homo-17aβ-(3-phenylpropionoxy)-gon-4-en-3-one

Add 3-phenylpropionyl chloride (1 cc.) in benzene (3 cc.) to 13β-methyl-D-homo-17aβ-hydroxy-gon-4-en-3-one (1 g.) in pyridine (3.5 cc.) at −20°. Keep the mixture overnight at −10°, add crushed ice and extract with ether-benzene (1:1). Wash the extracts in turn with 2 N aqueous potassium hydroxide, water, 2 N hydrochloric acid, and brine, and dry. Evaporate the solvent to give a residue. Dissolve the residue in benzene and chromatograph on silica gel to obtain the title compound; infrared absorption peaks at 5.80, 5.99μ.

This compound has androgenic and anabolic activity and is useful as an intermediate for preparing the hormonal compounds of this invention.

EXAMPLE 313

13β-ethyl-D-homo-17aβ-(3-phenylpropionoxy)-gon-4-en-3-one

Substitution of 13β-ethyl-D-homo-17aβ-hydroxy-gon-4-en-3-one for 13β-methyl-D-homo-17aβ-hydroxy-gon-4-en-3-one in the preceding example gives the title compound; infrared absorption peaks at 5.78, 5.99μ.

This compound has anabolic and androgenic activity and is useful as an intermediate for preparing the hormonal compounds of this invention.

EXAMPLE 314

13β-ethyl-17β-acetoxy-gon-4-en-3-one

Add acetyl chloride (1 cc.) in benzene (5 cc.) to 13β-ethyl-17β-hydroxy-gon-4-en-3-one (1.5 g.) in pyridine (5 cc.) at −20°. Keep the mixture at −10° for 18 hours, work up and recrystallize the product from methanol to obtain the title compound (0.9 g.); ultraviolet absorption peak at 240 mμ (ε 16,700); infrared absorption peaks at 5.75, 5.99μ.

This compound has anabolic and androgenic activity and is useful as an intermediate for preparing the hormonal compounds of this invention.

To prepare 13β-ethyl-17β-propionoxy-gon-4-en-3-one treat 13β-ethyl-17β-hydroxy-gon-4-en-3-one with propionyl chloride according to the manipulative procedure described above.

To prepare 13β-ethyl-17β-hexanolyoxy-gon-4-en-3-one treat 13β-ethyl-17β-hydroxy-gon-4-en-3-one with hexanoyl chloride according to the manipulative procedure described above.

To prepare 13β-ethyl-17β-heptanoyloxy-gon-4-en-3-one treat 13β-ethyl-17β-hydroxy-gon-4-en-3-one with heptanoyl chloride according to the manipulative procedure described above.

To prepare 13β-ethyl-17β-octanoyloxy-gon-4-en-3-one treat 13β-ethyl-17β-hydroxy-gon-4-en-3-one with octanoyl chloride according to the manipulative procedure described above.

To prepare 13β-ethyl-17β-lauroyloxy-gon-4-en-3-one treat 13β-ethyl-17β-hydroxy-gon-4-en-3-one with lauroyl chloride according to the manipulative procedure described above.

To prepare 13β-ethyl-17β-myristoyloxy-gon-4-en-3-one treat 13β-ethyl-17β-hydroxy-gon-4-en-3-one with myristoyl chloride according to the manipulative procedure described above.

To prepare 13β-ethyl-17β-palmitoyloxy-gon-4-en-3-one treat 13β-ethyl-17β-hydroxy-gon-4-en-3-one with palmitoyl chloride according to the manipulative procedure described above.

To prepare 13β-ethyl-17β-oleoyloxy-gon-4-en - 3 - one treat 13β-ethyl-17β-hydroxy-gon-4-en-3-one with oleoyl chloride according to the manipulative procedure described above.

To prepare 13β-ethyl-17β-cyclohexylacetoxy-gon-4-en-3-one treat 13β-ethyl-17β-hydroxy-gon-4-en-3-one with cyclohexylacetyl chloride according to the manipulative procedure described above.

To prepare 13β-ethyl-17β-2-phenylpropionoxy-gon-4-en-3-one treat 13β-ethyl-17β-hydroxy-gon-4-en-3-one with 2-phenylpropionyl chloride according to the manipulative procedure described above.

These compounds have anabolic and androgenic activity and are useful as intermediates for preparing the hormonal compounds of this invention.

EXAMPLE 315

13β-ethyl-17β-isovaleroyloxy-gon-4-en-3-one

Keep 13β-ethyl-17β-hydroxy-gon-4-en-3-one (6 g.) with isovaleroyl chloride (7.2 g.) in pyridine at room temperature for 20 hours. Add aqueous sodium bicarbonate and extract the product with ether. Wash, dry and evaporate the extracts and purify the residue by chromatography upon neutral alumina. Distill at 200–230°/.01 mm. and crystallize from hexane to obtain the title compound, M.P. 82–89°; ultraviolet absorption peak at 240 mμ (ε 15,650); infrared absorption peaks at 5.76, 5.99, 6.18μ.

Calculated for $C_{24}H_{36}O_3$ (percent): C, 77.4; H, 9.7. Found (percent): C, 77.1; H, 9.7.

This compound has androgenic and anabolic activity and is useful as an intermediate for preparing the hormonal compounds of this invention.

EXAMPLE 316

13β-ethyl-17β-decanoyloxy-gon-4-en-3-one

Add decanoyl chloride (1.9 g.) to 13β-ethyl-17β-hydroxy-gon-4-en-3-one (1.3 g.) in pyridine (12.5 cc.) and allow the mixture to stand at room temperature overnight. Pour the mixture in 2 N hydrochloric acid and extract with ether. Wash, dry and evaporate the extracts and recrystallize the residue from benzene-hexane to give the title compound (1.0 g.), M.P. 97–97.5°; ultraviolet absorption peak at 239 mμ (ε 16,500); infrared absorption peaks at 5.74, 5.99, 6.17μ.

Calculated for $C_{29}H_{46}O_3$ (percent): C, 78.7; H, 10.5. Found (percent): C, 78.7; H, 10.5.

This compound has anabolic and androgenic activity and is useful as an intermediate for preparing the hormonal compounds of this invention.

EXAMPLE 317

13β-ethyl-17β-(undec-10-enoyloxy)-gon-4-en-3-one

Add undec-10-enoyl chloride (2 g.) in benzene (6 cc.) to 13β-ethyl-17β-hydroxy-gon-4-en-3-one (2 g.) in pyridine (6 cc.) at −15°. Keep the mixture at −10° for 17 hours, add to water and extract with benzene. Wash, dry and evaporate the extracts and recrystallize the residue from methanol to obtain the title compound, M.P. 87–88°; ultraviolet absorption peak at 240 mμ (ε 17,000); infrared absorption peaks at 5.79, 6.00, 6.20μ.

Calculated for $C_{30}H_{46}O_3$ (percent): C, 79.2; H, 10.2. Found (percent): C, 79.0; H, 10.0.

This compound has anabolic and androgenic activity and is useful as an intermediate for preparing the hormonal compounds of this invention.

EXAMPLE 318

13β-ethyl-17β-(3-cyclopentylpropionoxy)-gon-4-en-3-one

Add 3-cyclopentylpropionyl chloride (2 g.) in benzene (6 cc.) to 13β-ethyl-17β-hydroxy-gon-4-en-3-one (2 g.) in pyridine (6 cc.) at −15°. Keep the mixture at −10° for 17 hours, work up and recrystallize the product from methanol to give the title compound, M.P. 88–89°; ultraviolet absorption peak at 241 mμ (ε 17,000); infrared absorption peaks at 5.80, 6.00, 6.18μ.

Calculated for $C_{27}H_{39}O_3$ (percent): C, 78.8; H, 9.55. Found (percent): C, 78.5; H, 9.65.

This compound has anabolic and androgenic activity and is useful as an intermediate for preparing the hormonal compounds of this invention.

EXAMPLE 319

13β-ethyl-17β-hemisuccinoyl-gon-4-en-3-one

Reflux 13β-ethyl-17β-hydroxy-gon-4-en-3-one (1.5 g.) with succinic anhydride (1.0 g.) in pyridine (10 cc.) for 2 hours. Cool the mixture and pour into an excess of 4 N hydrochloric acid and extract the mixture with ether-chloroform. Wash the extract with 2 N HCl, dilute with ether and exhaustively extract with aqueous sodium bicarbonate. Acidify the bicarbonate extracts and extract the product with chloroform. Recrystallize it twice from chloroform-ether to obtain the title compound, (0.8 g.), M.P. 179–182°; ultraviolet absorption peak at 239 mμ (ε 15,600); infrared absorption peaks at 5.81, 6.02, 8.13μ.

Calculated for $C_{23}H_{32}O_5$ (percent): C, 71.1; H, 8.3. Found (percent): C, 71.0; H, 8.2.

This compound has anabolic and androgenic activity and is useful as an intermediate for preparing the hormonal compounds of this invention.

EXAMPLE 320

13β-ethyl-17β-benzoyloxy-gon-4-en-3-one

Treat 13β-ethyl-17β-hydroxy-gon-4-en-3-one (2 g.) in pyridine (20 cc.) with benzoyl chloride (3 cc.) in benzene (10 cc.) at −10°. Keep the mixture at that temperature for 18 hours and then pour into 2 N hydrochloric acid (200 cc.). Extract the product with ether and wash, dry and evaporate the extracts. Triturate the residue with a mixture of ether and hexane. Filter the crystalline material obtained and dissolve in benzene and purify by chromatography on neutral alumina. Recrystallize from a mixture of ethyl acetate and hexane to give the title compound, M.P. 141–9°; ultraviolet light absorption peak at 237 mμ (ε 27,300).

Calculated for $C_{26}H_{32}O_3$ (percent): C, 79.55; H, 8.2. Found (percent): C, 79.3; H, 8.0.

This compound has anabolic and androgenic activity and is useful as an intermediate for preparing the hormonal compounds of this invention.

EXAMPLE 321

13β-ethyl-17β-phenylacetoxy-gon-4-en-3-one

Add phenylacetyl chloride (1.5 cc.) in benzene (4.5 cc.) to 13β-ethyl-17β-hydroxy-gon-4-en-3-one (1.5 g.) in pyridine (5 cc.) at −18°. Keep the mixture at −10° for 16 hours, add ice-water and extract the product with ether. Wash, dry and evaporate the extracts to a residue and chromatograph on neutral alumina to obtain a crystalline product and recrystallize from methanol to obtain the title compound, M.P. 143–145°; ultraviolet absorption peak at 240 mμ (ε 16,300); infrared absorption peaks at 5.75, 6.00μ.

This compound has androgenic and anabolic activity and is useful as an intermediate for preparing the hormonal compounds of this invention.

EXAMPLE 322

13β-ethyl-17β-(3-phenylpropionoxy)-gon-4-en-3-one

Add 13β-ethyl-17β-hydroxy-gon-4-en-3-one (0.11 g.) in dry pyridine (0.35 cc.) at −20° to 3-phenylpropionyl chloride (0.11 g.) in benzene (0.3 cc.). Keep this at −10° for 16 hours, add ice-cold water and extract with a mixture of equal volumes of ether and benzene. Wash the extracts in turn with 2 N potassium hydroxide solution, water, 2 N hydrochloric acid solution, and brine, and dry. Evaporate solvent to give a residue and recrystallize from a mixture of ether and ethyl acetate to obtain the title compound (0.10 g.), M.P. 135–40°; infrared absorption peaks at 5.81, 5.99, 8.51, 13.3, 14.3μ, showing no absorption due to hydroxyl.

This compound has anabolic and androgenic activity and is useful as an intermediate for preparing the hormonal compounds of this invention.

EXAMPLE 323

13β-ethyl-17β-nicotinoyloxy-gon-4-en-3-one

Reflux 13β-ethyl-17β-hydroxy-gon-4-en-3-one (1 g.) with nicotinic anhydride (2 g.) in pyridine (20 cc.) for 3 hours. Cool, add water, evaporate the mixture to dryness and extract with benzene. Wash, dry and evaporate the extracts to a residue and recrystallize from methanol to obtain the title compound; ultraviolet absorption peak at 239 mμ (ε 20,000); infrared absorption peaks at 5.81, 6.00, 6.28μ.

Calculated for $C_{25}H_{31}NO_3$ (percent): C, 76.3; H, 7.9; N, 3.6. Found (percent): C, 76.1; H, 7.9; N, 3.7.

This compound has anabolic and androgenic activity and is useful as an intermediate for preparing the hormonal compounds of this invention.

EXAMPLE 324

13β-propyl-17β-benzoyloxy-gon-4-en-3-one

Esterify 13β-propyl-17β-hydroxy-gon-4-en-3-one (2.5 g.) with benzoyl chloride (2.0 g.). Purify the product by chromatography on Florex and recrystallize from ethyl acetate to obtain the title compound, M.P. 198–200°; ultraviolet absorption peak at 240 mμ (ε 25,000); infrared absorption peaks at 5.84, 6.00μ.

This compound is useful as an intermediate for preparing the hormonal compounds of this invention.

EXAMPLE 325

13β-propyl-17β-(3-phenylpropionoxy)-gon-4-en-3-one

Add 3-phenylpropionyl chloride (2.9 g.) in benzene (10 cc.) to 13β-propyl-17β-hydroxy-gon-4-en-3-one (2.5 g.) in pyridine at −10°. Pour the mixture into ice water and extract with benzene-ether. Wash, dry and evaporate the extracts to a gum and purify by chromatography upon Florex. Recrystallize from ethyl acetate-hexane to obtain the title compound, M.P. 104–108°. Ultraviolet absorption peak at 240 mμ (ε 16,000); infrared absorption peaks at 5.76, 6.00μ.

This compound has anabolic and androgenic activity and is useful as an intermediate for preparing the hormonal compounds of this invention.

EXAMPLE 326

13β-butyl-17β-(3-phenylpropionoxy)-gon-4-en-3-one

Cool 13β-butyl-17β-hydroxy-gon-4-en-3-one (0.10 g.) in pyridine (0.3 cc.) to −20° and add 3-phenylpropionyl chloride (0.10 g.) in benzene (0.3 cc.). Stir the mixture at −10° for 16 hours, add ice-cold water, ether (15 cc.) and benzene (15 cc.). Separate the organic layers and wash in turn with 2 N sodium hydroxide solution, water and brine, and dry. Evaporate the solvent to an uncrystallizable gum, and take up in a little benzene and filter through neutral alumina (5 g.), then wash with more benzene. Evaporate the resulting benzene solution to obtain the title compound as a gum (0.85 g.); infrared absorption peaks at 5.78, 5.99, 13.3, 14.3μ, with no absorption due to hydroxyl.

This compound has anabolic and androgenic activity and is useful as an intermediate for preparing the hormonal compounds of this invention.

EXAMPLE 327

13β-isobutyl-17β-(3-phenylpropionoxy)-gon-4-en-3-one

Add 3-phenylpropionyl chloride (.5 g.) in benzene (1.5 cc.) with swirling to 13β-isobutyl-17β-hydroxy-gon-4-en-3-one (.5 g.) in pyridine (2 cc.) at −20°. Store the mixture at −10° for 18 hours, add water and extract the product with ether. Wash, dry and evaporate the extracts to give a residue and recrystallize from methanol to give the title compound, M.P. 101–106°; ultraviolet absorption peak at 240 mμ (ε 15,300); infrared absorption peaks at 5.75, 5.95μ.

This compound is useful as an intermediate for preparing the hormonal compounds of this invention.

EXAMPLE 328

13β-ethyl-3,3-ethylenedithio-gon-4-en-17β-ol

Treat 13β-ethyl-17β-hydroxy-gon-4-en-3-one (0.47 g.) in methanol (5 cc.) and ethanedithiol (0.25 cc.) with boron trifluoride etherate (0.25 cc.). Allow the mixture to stand at room temperature for 15 minutes, cool to 0°, filter the precipitate and wash with cold methanol to obtain the title compound (0.38 g.), M.P. 167–169°.

Calculated for $C_{21}H_{32}OS_2$ (percent): C, 69.2; H, 8.85. Found (percent): C, 69.1; H, 8.9.

This compound is useful as an intermediate for preparing the hormonal compounds of this invention.

EXAMPLE 329

13β-methyl-D-homo-17aα-ethynyl-17aβ-hydroxy-gon-4-en-3-one

Add 13β-methyl-D-homo - 3 - methoxy-17aα-ethynyl-gona-2,5(10)-diene-17aβ-ol (0.7 g.) in dioxane (20 cc.) with stirring to methanol (20 cc.) containing 11 N hydrochloric acid (2.8 cc.) and water (1.6 cc.). Stir at room temperature for 2 hours, add water and extract the mixture with ether. Evaporate the washed and dried extracts to give a residue and dissolve in benzene and chromatograph on Florex to obtain the title compound; infrared absorption peaks at 2.97, 3.03, 6.02μ.

This compound has progestational activity and is useful as an intermediate for preparing the hormonal compounds of this invention.

EXAMPLE 330

13β-methyl-D-homo-17aα-ethyl-17aβ-hydroxy-gon-4-en-3-one

Add 13β - methyl-D-homo-3-methoxy-17aα-ethyl-gona-2,5(10)-diene-17aβ-ol (0.6 g.) in dioxane (20 cc.) with stirring to methanol (20 cc.) containing 11 N hydrochloric acid (2.4 cc.) and water (1.6 cc.). Stir for 2 hours at room temperature, add water and extract the mixture with ether. Wash, dry and evaporate the extracts to give a residue and recrystallize from ethyl acetate to obtain the title compound; ultraviolet absorption peak at 240 mμ (ε 15,000); infrared absorption peaks at 2.86, 6.01μ.

This compound has anabolic and androgenic activity and is useful as an intermediate for preparing the hormonal compounds of this invention.

EXAMPLE 331

13β-ethyl-D-homo-17aα-ethynyl-17β-hydroxy-gon-4-en-3-one

Dissolve 13β - ethyl-D-homo-3-methoxy-17aα-ethynyl-gona-2,5(10)-diene-17aβ-ol (3.5 g.) in methanol (180 cc.) containing hydrochloric acid (12 cc.) and water (8 cc.). After 2 hours at room temperature add water and extract the mixture with ether. Wash, dry and evaporate the organic extract and recrystallize the residue from ethyl acetate to obtain the title compound (1.95 g.), M.P. 171–4°. Ultraviolet absorption peak at 240 mμ (ε 17,400); infrared absorption peaks at 2.99, 3.1, 6.04μ.

Calculated for $C_{22}H_{30}O_2$ (percent): C, 80.94; H, 9.26. Found (percent): C, 80.73; H, 9.35.

This compound has progestational activity and is useful as an intermediate for preparing the hormonal compounds of this invention.

EXAMPLE 332

13β, 17aα-diethyl-17β-hydroxy-D-homo-gon-4-en-3-one

Dissolve 13β,17α-diethyl-3-methoxy - D - homo - gona-2,5(10)-dien-17β-ol (3.5 g.) in methanol (135 cc.) containing water (6 cc.) and hydrochloric acid (9 cc.). Stir the mixture for 1 hour and then pour into brine and extract with ether. Evaporate the washed and dried ether extracts and recrystallize the residue from acetone-hexane to obtain the title compound (2.225 g.), M.P. 153–155°. Ultraviolet absorption peaks at 240 mμ (ε 16,320); infrared absorption peaks at 2.92, 6.03μ.

Calculated for $C_{22}H_{34}O_2$ (percent): C, 79.95; H, 10.36. Found (percent): C, 79.93; H, 10.34.

This compound has anabolic and androgenic activity and is useful as an intermediate for preparing the hormonal compounds of this invention.

EXAMPLE 333

13β-ethyl-17α-methyl-17β-hydroxy-gon-4-en-3-one

Heat a solution of 13β-ethyl-3-methoxy - 17α - methyl-gona-2,5(10)-dien-17β-ol (0.5 g.) in methanol (55 cc.) under nitrogen to boiling and add 3 N hydrochloric acid (0.6 cc.). Allow the solution to cool to room temperature and keep under nitrogen for 3 hours; then add water and extract the mixture with ether. Evaporate the washed and dried extracts and recrystallize the residue from a mixture of ether and hexane, and subsequently from benzene, to yield the title compound as a benzene solvate. Remove the benzene by drying at 100° for 7 hours to obtain the free compound (0.2 g.), M.P. 128–9°. Ultraviolet absorption peak at 240 mμ (ε 16,200). Infrared absorption peaks at 2.95, 6.01μ.

This compound has anabolic and androgenic activity and is useful as an intermediate for preparing the hormonal compounds of this invention.

EXAMPLE 334

13β-ethyl-17α-ethynyl-17β-hydroxy-gon-4-en-3-one

To 13β-ethyl-3-methoxy - 17α - ethynyl - gona-2,5(10)-dien-17β-ol (0.7 g.) in methanol (36 cc.) add water (1.6 cc.) and concentrated hydrochloric acid (2.4 cc.). After standing at room temperature for 2 hours, add ether and evaporate the washed and dried ethereal solution to yield a gum. Dissolve the gum in benzene (5 cc.), and absorb the solution on an activated fuller's earth (50 g.). Elute with light petroleum containing increasing proportions of benzene to yield a crystalline by-product; then elute with benzene containing a small proportion of ether to yield a crystalline product. Recrystallize the latter from ethyl acetate, to yield the title compound (0.11 g.), M.P. 203–6°; infrared absorption peaks at 2.97, 3.03, 6.02μ.

This compound has progestational activity and is useful as an intermediate for preparing the hormonal compounds of this invention.

EXAMPLE 335

13β-ethyl-17α-vinyl-17β-hydroxy-gon-4-en-3-one

Shake 13β - ethyl-17α-ethynyl-17β-hydroxy-gon-4-en-3-one (0.5 g.) in pyridine (20 cc.) containing a 2% palladium-calcium carbonate catalyst (150 mg.) with hydrogen at atmospheric pressure until one molecular equivalent of hydrogen has been absorbed. Recrystallize the product twice from ether-hexane and dry for 4 hours at 65°/.005 mm. to yield the title compound, M.P. 108–111°. (Found (percent): C, 80.4; H, 9.7. $C_{21}H_{30}O_2$ requires (percent): C, 80.2; H, 9.6.) Ultraviolet absorption peak at 240 mμ (ε 15,200); infrared absorption peak at 10.9μ.

This compound has anabolic and androgenic activity and is useful as an intermediate for preparing the hormonal compounds of this invention.

EXAMPLE 336

13β,17α-diethyl-17β-hydroxy-gon-4-en-3-one

Add 13β,17α-diethyl - 3 - methoxy - gona-2,5(10)-dien-17β-ol (0.29 g.) to 15 cc. of a solution prepared by mixing concentrated hydrochloric acid (2.4 cc.), water (1.6 cc.) and methanol (36 cc.). Shake the mixture for 10 minutes, during which time the solid dissolves. After 2 hours pour the solution into water (50 cc.) and extract the mixture with ether. Wash, dry and evaporate the extracts and recrystallize the residue (0.255 g.) from a mixture of ethyl acetate and light petroleum, to yield the title compound (0.196 g.), M.P. 139–41°. Ultraviolet absorption peak at 240 m$\mu$ ($\epsilon$ 15,000). Infrared absorption peaks at 2.86, 6.01$\mu$.

This compound has anabolic and androgenic activity and is useful as an intermediate for preparing the hormonal compounds of this invention.

EXAMPLE 337

13β-ethyl-17α-propynyl-17β-hydroxy-gon-4-en-3-one

Suspend 13β-ethyl - 3 - methoxy - 17α - propynyl-gona-2,5(10)-dien-17β-ol in methanol (36 cc.) and stir with concentrated hydrochloric acid (2.4 cc.), water (1.6 cc.) and dioxane (10 cc.) until dissolution is complete, and then for a further 20 minutes. Presipitate the product by the addition of water, filter, wash and dry. Recrystallize from ethyl acetate-hexane to yield the title compound, M.P. 124–5°; infrared absorption peaks at 3.03, 4.55, 6.02$\mu$. Ultraviolet absorption peaks at 240 m$\mu$ ($\epsilon$ 15,600).

This compound has progestational activity and is useful as an intermediate for preparing the hormonal compounds of this invention.

EXAMPLE 338

13β-ethyl-17α-(2-propenyl)-17β-hydroxy-gon-4-en-3-one

Suspend 13β-ethyl-3-methoxy-17α-(2-propenyl) - gona-2,5(10)-dien-17β-ol in methanol (72 cc.), concentrated hydrochloric acid (4.8 cc.) and water (3.2 cc) in an atmosphere of nitrogen. Add dioxane (20 cc.) and stir the mixture until dissolution is complete, and then for a further 20 minutes. Add water and extract the mixture with ether. Wash the ethereal solution with saturated sodium bicarbonate solution and water, and dry. Evaporate the solvent to obtain the title compound; infrared absorption peaks at 2.94, 6.02, 6.19$\mu$. Ultraviolet absorption peak at 240 m$\mu$ ($\epsilon$ 15,600).

This compound has progestational activity and is useful as an intermediate for preparing the hormonal compounds of this invention.

EXAMPLE 339

13β-ethyl-17α-n-propyl-17β-hydroxy-gon-4-en-3-one

Keep a solution of 13β-ethyl-3-methoxy-17α-n-propyl-gona-2,5(10)-dien-17β-ol (0.53 g.) in a mixture of methanol (22.5 cc.), 12 N hydrochloric acid (1.5 cc.), and water (1.5 cc.) under nitrogen for 2½ hours at room temperature. Then add ice-water (75 cc.), filter off the precipitated solid and dissolve in ether (50 cc.); wash, dry and evaporate the ether solution, to yield a solid residue. Recrystallize the residue repeatedly from ethyl acetate, to obtain the title compound (0.23 g.), M.P. 132–4.5°.

Ultraviolet absorption peak at 240 m$\mu$ ($\epsilon$ 15,900); infrared absorption peaks at 2.92, 6.02, 6.18$\mu$. (Found (percent): C, 79.8; H, 10.2. $C_{22}H_{34}O_2$ requires (percent): C, 79.5; H, 10.4.)

This compound has anabolic and androgenic activity and is useful as an intermediate for preparing the hormonal compounds of this invention.

EXAMPLE 340

13β-ethyl-17α-(2-isobutenyl)-17β-hydroxy-gon-4-en-3-one

Suspend 13β - ethyl-3-methoxy-17α-(2 - isobutenyl)-gona-2,5(10)-dien-17β-ol (1.5 g.) in methanol (36 cc.), concentrated hydrochloric acid (2.4 cc.), water (1.6 cc.) and dioxane (10 cc.). When the material has dissolved, add water, filter the precipitate and again stir with methanol (36 cc.), concentrated hydrochloric acid (2.4 cc.) and water (1.6 cc.) for 20 minutes. Then gradually add water and filter the precipitate; wash with water, dry and crystallize from ethyl acetate-hexane and then from acetonitrile to yield the title compound (2 g.); infrared absorption peaks at 2.90, 6.01, 6.20, 11.3$\mu$; ultraviolet absorption peak at 240 m$\mu$ ($\epsilon$ 16,800).

This compound has estrogen antagonistic activity and is useful as an intermediate for preparing the hormonal compounds of this invention.

EXAMPLE 341

13β-n-propyl-17α-methyl-17β-hydroxy-gon-4-en-3-one

Shake 13β-n-propyl-3-methoxy-17α-methyl - gona - 2, 5(10)-dien-17β-ol (1.0 g.) with 44 cc. of an aqueous methanolic hydrochloric acid solution and stir for 2 hours; then pour the product into water and work up with ether. Purify by chromatography on silica gel (elute with ether), and recrystallize from a mixture of ethyl acetate and hexane to obtain the title compound (0.35 g.), M.P. 134–5.5°; ultraviolet absorption peak at 240 m$\mu$ ($\epsilon$ 18,100); infrared absorption peak at 6.02$\mu$.

This compound has anabolic and androgenic activity and is useful as an intermediate for preparing the hormonal compounds of this invention.

EXAMPLE 342

13β-n-propyl-17α-ethynyl-17β-hydroxy-gon-4-en-3-one

Shake 13β-n-propyl-3-methoxy-17β-ethynyl - gona - 2, 5(10)-dien-17β-ol (0.31 g.) with a solution prepared by mixing concentrated hydrochloric acid (0.81 cc.), water (0.54 cc.) and methanol (12.15 cc.), until the solid dissolves. After addition of water, work up with ether, purify by recrystallization from cyclohexane to obtain the title compound 0.1 g.), M.P. 149–50.5°; ultraviolet absorption peak at 240 m$\mu$ ($\epsilon$ 15,700) infrared absorption peaks at 2.99, 3.60, 6.04, 6.16$\mu$. Found )percent): C, 81.0; H, 9.31. $C_{22}H_{30}O_2$ requires (percent): C, 80.9; H, 9.3.)

This compound has progestational activity and is useful as an intermediate for preparing the hormonal compounds of this invention.

EXAMPLE 343

13β-n-propyl-17α-vinyl-17β-hydroxy-gon-4-en-3-one

Hydrogenate 13β - n-propyl-17α-ethynyl-17β-hydroxy-gon-4-en-3-one (0.5 g.) to yield the title compound (.425 g.), M.P. 94–97°. (Found (percent): C, 81.1; H, 9.9. $C_{22}H_{32}O_2$ requires (percent): C, 80.4; H. 9.8); ultraviolet absorption peak at 240 m$\mu$ ($\epsilon$ 15,600); infrared absorption peak at 10.9$\mu$.

This compound has anabolic and androgenic activity and is useful as an intermediate for preparing the hormonal compounds of this invention.

EXAMPLE 344

13β-n-propyl-17α-ethyl-17β-hydroxy-gon-4-en-3-one

Stir a mixture of 13β-n-propyl-3-methoxy-17α-ethyl-gona-2,5(10)-dien-17β-ol (0.8 g.) in tetrahydrofuran (20 cc.), methanol (50 cc.), 12 N hydrochloric acid (3.3 cc.) and water (2.2 cc.) at room temperature for 2½ hours and then pour into sodium chloride solution; extract the mixture with ether and wash, dry and evaporate the extracts. Dissolve the crystalline residue obtained (0.8 g.) in a mixture (25 cc.) of equal volumes of benzene and hexane and chromatograph on silica gel; elute with a mixture of equal volumes of benzene and chloroform to yield a crystalline material. Recrystallize this product from a mixture of benzene and light petroleum, to give a benzene solvate, M.P. 93–5°; and then recrystallize this material from a mixture of hexane and ethyl acetate to obtain the solvent free product, 13β-n-propyl-17α-ethyl-17β-hydroxygon-4-en-3-one (0.2 g.), M.P. 98–100°; ultraviolet absorption peak at 240 mμ (ε 15,700); infrared absorption peaks at 2.92, 6.02, 6.18μ.

This compound has anabolic and androgenic activity and is useful as an intermediate for preparing the hormonal compounds of this invention.

EXAMPLE 345

13β-n-propyl-17α-propynyl-17β-hydroxy-gon-4-en-3-one

Stir 13β-n-propyl-3-methoxy-17α-propynyl - gona - 2,5 (10)-dien-17β-ol (2.5 g.) under nitrogen with methanol (135 cc.) containing 11 N hydrochloric acid (9 cc.) and water (6 cc.). After two hours add isopropyl alcohol (35 cc.) and continue stirring for a further 30 minutes. Add the mixture to brine and extract the product with ether. Evaporate the washed and dried extracts to a glass, dissolve in benzene and chromatograph on Florex. Elute with benzene containing 5% ether and recrystallize the product so obtained from ethyl acetate-hexane to yield the title compound, M.P. 182–184°.

Calculated for $C_{23}H_{32}O_2$ (percent): C, 81.1; H, 9.5. Found (percent): C, 80.95; H, 9.4.

Ultraviolet absorption peak at 240 mμ (ε 16,700).

This compound has progestational and estrogen antagonistic activity and is useful as an intermediate for preparing the hormonal compounds of this invention.

EXAMPLE 346

13β-n-propyl-17α-allyl-17β-hydroxy-gon-4-en-3-one

Stir 13β-n-propyl-3-methoxy-17α-allyl-gona - 2,5(10)-dien-17β-ol (0.77 g.) under nitrogen in isopropyl alcohol (25 cc.) containing 11 N hydrochloric acid (2.4 cc.) and water (1.6 cc.) for 2.5 hours. Filter the mixture, add to brine and extract the product with ether. Evaporate the washed and dry extracts and purify the residue by chromatography on Florex and by recrystallization from ethyl acetate to obtain the title compound, M.P. 135–137°.

Calculated for $C_{23}H_{34}O_2$ (percent): C, 80.65; H, 10.0. Found (percent): C, 80.4; H, 9.8.

Ultraviolet absorption peak at 241.5 mμ (ε 17,500); infrared absorption peaks at 2.95, 6.02, 6.18μ.

This compound has progestational anabolic and androgenic activity and is useful as an intermediate for preparing the hormonal compounds of this invention.

EXAMPLE 347

13β,17α-di-n-propyl-17β-hydroxy-gon-4-en-3-one

Stir 13β,17β-di-n-propyl-3-methoxy-gona-2,5(10)-dien-17β-ol (1.07 g.) under nitrogen in methanol (50 cc.) containing water (2.5 cc.) and 11 N hydrochloric acid (3.8 cc.) at room temperature for 2 hours. Then add water and extract the product with ether. Evaporate the washed and dry extracts and purify the residue by chromatography on alumina, by repeated recrystallization from ethyl acetate, and by sublimation at 145°/.003 mm. to obtain the title compound, (.34 g.), M.P. 147–49°. Ultraviolet absorption peak at 241.5 mμ (ε 16,600); infrared absorption peaks at 2.91, 6.02, 6.19μ.

This compound has anabolic acid androgenic activity and is useful as an intermediate for preparing the hormonal compounds of this invention.

EXAMPLE 348

13β-n-propyl-17α-(1-methallyl)-17β-hydroxy-gon-4-en-3-one

Stir 13β-n-propyl - 3 - methoxy-17α-(1 - methallyl)-gona-2,5(10)-dien-17β-ol (1.5 g.) under nitrogen with methanol (90 cc.) containing 11 N hydrochloric acid (9 cc.) and water (6 cc.). Add the mixture to brine and extract the product from ether. Evaporate the washed and dry extracts to yield the title compound; ultraviolet adsorption peak at 240 mμ (ε 13,500); infrared absorption peak at 11.0μ.

This compound has progestational activity and is useful as an intermediate for preparing the hormonal compounds of this invention.

EXAMPLE 349

13β-n-propyl-17α-(2-methallyl)-17β-hydroxy-gon-4-en-3-one

Employ the method of Example 347 to hydrolyze 13β-n-propyl-3-methoxy - 17α - (2-methallyl)-gona-2,5(10)-dien-17β-ol. Purify the product by chromatography on Florex and recrystallization from ethyl acetate to afford the title compound, M.P. 141.5–143.5°.

Calculated for $C_{24}H_{36}O_2$ (percent): C, 80.85; H, 10.2. Found (percent): C, 80.8; H, 9.9.

Ultraviolet absorption peak at 241 mμ (ε 16,700); infrared absorption peaks at 2.87; 6.01, 6.18μ.

This compound has progestational activity and is useful as an intermediate for preparing the hormonal compounds of this invention.

EXAMPLE 350

13β-n-butyl-17α-ethynyl-17β-hydroxy-gon-4-en-3-one

Hydrolyze 13β-n-butyl - 3 - methoxy - 17α-ethynyl-gona-2,5(10)-dien-17β-ol (2 g.) by the method of Example 348 and purify the product by chromatography on Florex and by recrystallization from ether-hexane to afford the title compound (.71 g.), M.P. 159–163°.

Calculated for $C_{23}H_{32}O_2$ (percent): C, 81.1; H, 9.5. Found (percent): C, 80.8; H, 9.3.

Ultraviolet absorption peak at 240 mμ (ε 15,900); infrared absorption peaks at 6.00μ.

This compound has progestational activity and is useful as an intermediate for preparing the hormonal compounds of this invention.

EXAMPLE 351

13β-n-butyl-17α-ethyl-17β-hydroxy-gon-4-en-3-one

Keep a solution of 13β - n - butyl-3-methoxy-17α-ethyl-gona-2,5(10)-dien-17β-ol (1.05 g.) in a mixture of tetrahydrofuran (15 cc.), methanol (54 cc.), 12 N hydrochloric acid (3.6 cc.) and water (2.4 cc.) for 2 hours at room temperature and then pour into brine (350 cc.). Work up with ether and dissolve the product, a gum (1.0 g.), in a mixture of light petroleum and benzene (25 cc.) and chromatograph on silica gel. Elute with benzene containing a small proportion of ether to give a crystalline by-product (0.1 g.); subsequently elute with a mixture of ether, benzene and chloroform (in the proportions 5:4:1 by volume) to yield a crystalline product. Recrystallize the latter from hexane, and subsequently from hexane containing a little ethyl acetate to obtain the title compound (0.23), M.P. 78–80°; ultraviolet absorption peak at 240 mμ (ε 14,700); infrared absorption peaks at 2.88, 6.00, 6.18μ.

This compound has anabolic, androgenic and estrogen antagonistic activity and is useful as an intermediate for preparing the hormonal compounds of this invention.

EXAMPLE 352

13β,17α-diethyl-17β-hydroxy-gon-4-en-3-one

Treat 13β,17α - diethyl-17β-hydroxy-gon-5(10)-en-3-one (12.2 g.) with a solution of methanol (442 cc.), water (22 cc.) and concentrated hydrochloric acid (30 cc.) and allow this mixture to stand at room temperature for 2 hours. Precipitate the product by the addition of water, extract the reaction mixture with ether and wash the ethereal solution with 10% aqueous sodium carbonate, brine and dry (MgSO$_4$). Evaporate the solvent and recrystallize the residue from acetonitrile to give the title compound 7.9 g. (64.8%), M.P. 144–5°; infrared absorption 2.92, 6.0, 6.2$\mu$; ultraviolet absorption $\lambda$max. 240 m$\mu$ ($\epsilon$ 15,680).

Found (percent): C, 79.86; H, 10.04; C$_{21}$H$_{32}$O$_3$ requires (percent): C, 79.70; H, 10.1.

This compound has anabolic and androgenic activity and is useful as an intermediate for preparing the hormonal compounds of this invention.

EXAMPLE 353

13$\beta$-ethyl-17$\alpha$-ethynyl-17$\beta$-hydroxy-gon-4-en-3-one

Stir 13$\beta$ - ethyl-17$\alpha$-ethynyl - 17$\beta$-hydroxy-gon-5(10)-en-3-one (0.1 g.) with a mixture of methanol (36 cc.), water (1.6 cc.) and concentrated hydrochloric acid (2.4 cc.) for 1 hour. Add water and extract the mixture with ether. Wash, dry and evaporate the ethereal solution and recrystallize the residue from ether-hexane to obtain the title compound, M.P. 203–6° undepressed on admixture with authenic material. Infrared spectrum 3.05, 3.5, 6.05, 9.4$\mu$.

This compound has progestational activity and is useful as an intermediate for preparing the hormonal compounds of this invention.

EXAMPLE 354

13$\beta$,17$\alpha$-diethyl-17$\beta$-hydroxy-gon-4-en-3-one

Add 13$\beta$-ethyl-17$\alpha$-ethynyl - 17$\beta$ - hydroxy-gon-4-en-3-one (1 g.) in benzene (15 cc.) and ethanol (5 cc.) to a pre-reduced suspension of 2% palladium on calcium carbonate (0.3 g.) in benzene (10 cc.) and shake the mixture in an atmosphere of hydrogen until 163 cc. (2.1 moles) of hydrogen has been absorbed. Filter off the catalyst, evaporate the solvent and shake the product (0.55 g.) in methanol (10 cc.) with a solution of sodium metabisulphite (1.7 g.) in water (8 cc.) for 5 minutes. Add water, extract the mixture with ether; wash, dry and evaporate the ethereal solution and recrystallize the product from acetone to obtain the title compounds (0.4 g.) M.P. 144° undepressed on admixture with authentic material.

Infrared spectrum: 2.9, 6.0, 6.18; ultraviolet spectrum: max. 241 m$\mu$ ($\epsilon$ 17,250).

This compound has anabolic and androgenic activity and is useful as an intermediate for preparing the hormonal compounds of this invention.

EXAMPLE 355

13$\beta$-ethyl-17$\alpha$-ethynyl-17$\beta$-hydroxy-gon-4-en-3-one

Treat 13$\beta$-ethyl-3-ethoxy-17$\alpha$-ethynyl-gona - 3,5-dien-17$\beta$-ol (0.1 g.) with a mixture of methanol (10 cc.) and 50% hydrochloric acid (1 cc.) and allow the mixture to stand at room temperature for 1 hour. Add water, filter off the precipitated product from ethyl acetate-hexane to yield the title compound, identical with authenic material by mixed melting point determination and comparison of infrared spectra.

This compound has progestational activity and is useful as an intermediate for preparing the hormonal compounds of this invention.

EXAMPLE 356

13$\beta$-n-propyl-3-ethoxy-17$\alpha$-ethynyl-gona-3,5-dien-17$\beta$-ol

Dissolve 13$\beta$ - n - propyl - 17$\alpha$ - ethynyl - 17$\beta$ - hydroxy-gon-4-en-3-one (2.5 g.) in dioxane (125 cc.) and treat the solution with ethyl orthoformate (5 cc.) and toluene-p-sulphonic acid (0.15 g.). Stir the mixture for 3 hours and then add pyridine (5 cc.), followed by water (200 cc.). Extract the mixture with ether. Wash, dry and evaporate the ethereal solution and crystallize the residue by trituration with ether. Recrystallize from ether-hexane to obtain the title compound (1.4 g.), M.P. 113–123°; ultraviolet absorption peak at 242 m$\mu$ ($\epsilon$ 15,860); infrared absorption peaks at 2.93, 3.08, 5.75, 6.06, 6.17$\mu$.

This compound has progestational activity and is useful as an intermediate for preparing the hormonal compounds of this invention.

EXAMPLE 357

13$\beta$-ethyl-3,17$\beta$-diacetoxy-gona-3,5-diene

Reflux 13$\beta$-ethyl-17$\beta$-hydroxy-gon-4-en-3-one with pyridine (1.6 cc.) and acetyl chloride (16 cc.) in acetic anhydride (40 cc.) for 2½ hours under nitrogen. Evaporate the solvents under reduced pressure and recrystallize the residue thrice from chloroform-methanol to obtain the title compound, M.P. 151–157°.

Calculated for C$_{23}$H$_{32}$O$_4$ (percent): C, 74.2; H, 8.7. Found (percent): C, 74.2; H, 8.4.

Ultraviolet absorption peak at 236 m$\mu$ ($\epsilon$ 18,800); infrared absorption peaks at 5.75, 5.99, 6.10$\mu$.

This compound has anabolic and androgenic activity and is useful as an intermediate for preparing the hormonal compounds of this invention.

EXAMPLE 358

13$\beta$-ethyl-3-(1-pyrrolidinyl)-gona-3,5-dien-17$\beta$-ol

Reflux 13$\beta$-ethyl-17$\beta$-hydroxy-gon-4-en-3-one (1.9 g.) in benzene (25 cc.) and pyrrolidine (9 g.) for 4 hours under a Dean-Stark trap. Evaporate the solvent under reduced pressure to give as residue the title compound; ultraviolet absorption peak at 280 m$\mu$.

This compound has anabolic and androgenic activity and is useful as an intermediate for preparing the hormonal compounds of this invention.

EXAMPLE 359

13$\beta$,17$\alpha$-di-ethyl-3-acetoxy-gona-3,5-dien-17$\beta$-ol

Dissolve potassium (0.3 g.) in tertiary butanol (40 cc.) in an atmospher of nitrogen and add to the refluxing solution 13$\beta$,17$\alpha$ di ethyl-17$\beta$-hydroxy-gon-4-en-3-one (1 g.) in benzene (30 cc.). Distill off the azeotrope, add more benzene to maintain a constant volume until the temperature of the distilling vapour reaches 80° and then maintain three for 45 minutes. Cool the mixture in ice, and add acetic anhydride (1 cc.), and reflux for 15 minutes. Add saturated aqueous sodium bicarbonate to the cooled reaction mixture, remove the organic layer, wash with water and dry (Na$_2$SO$_4$). Evaporate the solvent and recrystallize the residual from methanol to obtain the title compound (0.45 g.), M.P. 105–111°; ultraviolet absorption max. 235 m$\mu$ ($\epsilon$ 17,850; infrared spectrum 3.1, 5.75, 6.0, 6.1$\mu$.

This compound has anabolic and androgenic activity and is useful as an intermediate for preparing the hormonal compounds of this invention.

EXAMPLE 360

13$\beta$-ethyl-3-ethoxy-17$\alpha$-ethynyl-gona-3,5-dien-17$\beta$-ol

Treat 13$\beta$ - ethyl - 17$\alpha$ - ethynyl - 17$\beta$ - hydroxy - gon-4-en-3-one (2.5 g.) with ethyl orthoformate (5 cc.) and toluene-p-sulphonic acid (0.15 g.) in dioxan at room temperature for 3 hours. Add pyridine and water extract the mixture with ether and wash, dry and evaporate the ethereal solution and recrystallize the residue from ether-hexane to obtain the title compound (1.4 g.), M.P. 113–123°; ultraviolet absorption max. 242 m$\mu$ ($\epsilon$ 15,860); infrared absorption (KBr disc.) 2.93, 3.08, 5.75, 6.06, 6.17$\mu$.

This compound has progestational activity and is useful as an intermediate for preparing the hormonal compounds of this invention.

EXAMPLE 361

13$\beta$,17$\alpha$-di-ethyl-17$\beta$-hydroxy-5$\beta$-gonan-3-one

Dissolve 13$\beta$ - ethyl - 17$\alpha$ - ethynyl - 17$\beta$ - hydroxygon-4-en-3-one (1.5 g.) in ethanol (50 cc.) and shake with 10% palladium on charcoal (0.9 g.) in an atmosphere of hydrogen until uptake of hydrogen ceases. Filter off the catalyst, evaporate the solvent and recrystallize the residue from ether-hexane to afford title compound, M.P. 192–196°.

Calculated for $C_{21}H_{34}O_2$ (percent): C, 79.19; H, 10.76. Found (percent): C, 79.4; H, 10.43.

This compound has estrogen antagonistic activity and is useful as an intermediate for preparing the hormonal compounds of this invention.

EXAMPLE 362

13β-ethyl-17β-acetylgon-4-en-3-one

Add 13β - ethyl - 3 - methoxy - 17α - acetyl - 17β-acetoxy-gona-1,3,5(10)-triene (0.24 g.) in dioxan (5 cc.) to a stirred solution of lithium (0.15 g.) in liquid ammonia (100 cc.), After 30 minutes add methanol (8 cc.) followed by lithium (0.5 g.) in small pieces. Add water, extract with ether and work up to a gum (0.218 g.). Reflux this product with 4 N hydrochloric acid (5 cc.) and methanol (8 cc.) for 15 minutes. Add water, extract with ether, work up and dissolve the resulting gum in acetone (30 cc.) containing anhydrous magnesium sulphate (0.5 g.) and add 8 N chromic acid dropwise with swirling until the solution assumes a permanent yellowish-orange color. Add excess isopropanol and evaporate the solution almost to dryness. Add water, extract with ether, wash, dry and evaporate the organic solution, filter the product through alumina with benzene-ether and recrystallize the product from ethyl acetate to obtain the title product (0.072 g.), M.P. 138–142°; infrared absorption peaks at 5.9, 6μ.

This compound has progestational activity and is useful as an intermediate for preparing the hormonal compounds of this invention.

EXAMPLE 363

13β-ethyl-gon-4-en-17β-ol

Add 13β - ethyl - 3,3 - ethylenedithio - gon - 4 - en-17β-ol in ether (5 cc.) and tetrahydrofuran (2 cc.) to a stirred solution of liquid ammonia (50 cc.) and add sodium (0.5 g.) in pieces and then add ethanol dropwise to discharge the blue color. Add ammonium chloride and water, extract with ether and wash, dry and evaporate the organic silution. Recrystallize the residue from light petroleum, B.P. 60–80°, to obtain 13β-ethyl-gon-4-en-17β-ol, M.P. 118–120°.

This compound has anabolic and androgenic activity and is useful as an intermediate for preparing the hormonal compounds of this invention.

EXAMPLE 364

13β-ethyl-gon-4-en-17-one

Dissolve 13β-ethyl-gon-4-en-17β-ol (0.29 g.) in acetone (40 cc.) and 8 N chromic acid dropwise with stirring until the solution becomes permanently orange and then add isopropanol (3 cc.) and evaporate the solution to small bulk (ca. 5 cc.). Add water and extract the mixture with ether. Wash, dry and evaporate the ethereal solution to obtain 13β-ethyl-gon-4-en-17-one (0.24 g.), M.P. 101–102° C. Purify by recrystallization from methanol to obtain the pure product, M.P. 102.5–103.5 C.

Calculated for $C_{19}H_{28}O$ (percent): C, 83.8; H, 10.4. Found (percent): C, 83.55; H, 10.7.

This compound is useful as an intermediate for preparing the hormonal compounds of this invention.

EXAMPLE 365

13β-ethyl-17α-allyl-gon-4-en-17β-ol

Reflux magnesium (0.36 g) and allyl bromide (0.15 cc.) in dry ether (10 cc.) for 15 minutes and then add 13β-ethyl-gon-4-en-17-one (0.9 g.) in ether (40 cc.) containing allyl bromide (2.9 cc.). Reflux the mixture for 3 hours and treat the cooled solution with aqueous ammonium chloride. Extract the product with ether and wash the ethereal solution with water, brine and dry ($MgSO_4$). Evaporate the solvent and recrystallize the residue from methanol to obtain 13β-ethyl-17α-allyl-gon-4-en-17β-ol (0.97 g.), M.P. 88.5–91° C. Recrystallize further from ether-hexane to obtain the pure product, M.P. 92–94° C.

Calculated for $C_{22}H_{34}O$ (percent): C, 84.0; H, 10.9. Found (percent): C, 84.4; H, 10.9.

This compound has progestational activity and is useful as an intermediate for preparing the hormonal compounds of this invention.

EXAMPLE 366

13β-n-propyl-3,3-ethylenedithio-gon-4-en-17β-ol

Treat 13β-n-propyl-17β-hydroxy-gon-4-en-3-one (6 g.) in acetic acid (15 cc.) with ethane dithiol (1.75 cc.) followed by boron trifluoride etherate (1.75 cc.). Allow the mixture to stand at room temperature for 15 minutes then pour into water and filter. Recrystallize the residue from methanol to obtain the title product (6.05 g.), M.P. 165–166.5°. Recrystallize further to obtain the pure compound, M.P. 167–168.5° C.

Calculated for $C_{22}H_{34}OS_2$ (percent): C, 69.8; H, 9.05; S, 16.9. Found (percent): C, 69.6; H, 8.9; S, 16.5.

This compound is useful as an intermediate for preparing the hormonal compounds of this invention.

EXAMPLE 367

13β-n-propyl-gon-4-en-17β-ol

Add 13β - n - propyl-3,3-ethylenedithio-gon-4-en-17β-ol (5.8 g.) in tetrahydrofuran (40 cc.) and ether (20 cc.) with stirring to a solution of sodium (3 g.) in liquid ammonia (250 cc.). Add more sodium (3 g.) in pieces over 30 minutes followed by the dropwise addition of ethanol to discharge the blue color. Add water, extract with ether and wash, dry and evaporate the organic extracts. Recrystallize the product from ether-hexane to obtain the title product (4.5 g.), M.P. 115–119° C.

This compound has anabolic and androgenic activity and is useful as an intermediate for preparing the hormonal compounds of this invention.

EXAMPLE 368

13β-n-propyl-gon-4-en-17-one

Add 8 N chromic acid dropwise with stirring to a solution of 13β-n-propyl-gon-4-en-17β-ol in acetone (100 cc.) until the solution becomes permanently orange. Add isopropanol (10 cc.) and potassium carbonate (5 g.), filter and evaporate the filtrate to dryness. Filter the residue in benzene-ether (1:1) through neutral alumina (20 g.), evaporate and recrystallize the product from methanol to obtain 13β-n-propyl-gon-4-en-17-one. Recrystallize from ether-hexane to obtain the pure product, M.P. 89–90° C.

Calculated for $C_{20}H_{30}O$ (percent): C, 82.9; H, 10.6. Found (percent): C, 83.9; H, 10.5.

This compound is useful as an intermediate for preparing the hormonal compounds of this invention.

EXAMPLE 369

13β-n-propyl-17α-ethynyl-gon-4-en-17β-ol

Add 13β-n-propyl-gon-4-en-17-one (1.5 g.) in dimethylacetamide (50 cc.) to a stirred suspension of lithium acetylide (40 cc. of a 15% solution in dioxan-triethylamine) and pass a slow stream of acetylene through the stirred solution for 40 hours. Pour the mixture into iced water and extract with ether. Wash and dry the ethereal solution and evaporate to dryness. Recrystallize the product twice from methanol and once from hexane to obtain the title product, M.P. 118–119° C.

Calculated for $C_{22}H_{32}O$ (percent): C, 84.55; H, 10.3. Found (percent): C, 84.8; H, 10.4.

This compound has progestational activity and is useful for preparing the hormonal compounds of this invention.

EXAMPLE 370

13β-n-propyl-17α-allyl-gon-4-en-17β-ol

Reflux magnesium (0.36 g.) and allyl bromide (1.5 cc.) in ether (15 cc.) for 15 minutes and then add a solution of 13β-n-propyl-gon-4-en-17-one in ether (10 cc.) and allyl bromide (2.9 cc.). Reflux for 3 hours and treat the cooled solution with aqueous ammonium chloride. Extract the mixture with ether and wash, dry and evaporate the ethereal solution. Recrystallize the residue from methanol and then from hexane to obtain 13β-n-propyl-17α-allyl-gon-4-en-17β-ol, M.P. 90–92° C.

Calculated for $C_{23}H_{36}O$ (percent): C, 84.1; H, 11.1. Found (percent): C, 84.15; H, 11.1.

This compound has progestational activity and is useful as an intermediate for preparing the hormonal compounds of this invention.

EXAMPLE 371

13β,17α-diethyl-gon-4-en-3,17β-diol

Add 13β,17α-diethyl-17β-hydroxy-gon-4-en-3-one (10 g.) in tetrahydrofuran (100 cc.) and ether (100 cc.) to a stirred suspension of lithium aluminum hydride (5 g.) in ether (1000 cc.). Reflux the mixture for 2 hours, cool and decompose excess reagent by cautiously adding water. Separate the organic phase, wash, dry and evaporate to obtain the title product (10 g.), M.P. 110–122° C.

This compound has anabolic and androgenic activity and is useful as an intermediate for preparing the hormonal compounds of this invention.

EXAMPLE 372

13β,17α-diethyl-3-acetoxy-gon-4-en-17β-ol

Allow 13β,17α-diethyl-gon-4-en-3,17β-diol (3 g.) in pyridine (30 cc.) and acetic anhydride (3 cc.) to stand for 12 hours at 0° C. Evaporate the solvents under reduced pressure at less than 50° C. and crystallize the residue from ether-hexane to obtain the title product (2.43 g.), M.P. 85–100° C.

This compound has anabolic and androgenic activity and is useful as an intermediate for preparing the hormonal compounds of this invention.

EXAMPLE 373

13β,17α-diethyl-gon-4-en-17β-ol

Add 13β,17α-diethyl-3-acetoxy-gon-4-en-17β-ol (1.35 g.) in ether (50 cc.) to a stirred solution of lithium (0.5 g.) in redistilled ethylamine (100 cc.). Stir the mixture for 15 minutes and decompose excess reagent with sodium nitrite. Allow the ethylamine to evaporate and add sodium sulphate (10 g.) and ether (200 cc.). Evaporate the filtered ethereal solution and recrystallize the residue from ether-hexane to give the title product, M.P. 96–112° C. Chromatograph on neutral alumina, eluting with benzene containing 5% ether and recrystallize from ether to obtain the pure compound, M.P. 117.5–118.5° C.

Calculated for $C_{21}H_{34}O$ (percent): C, 83.4; H, 11.3. Found (percent): C, 83.5; H, 11.3.

This compound has anabolic and androgenic activity and is useful as an intermediate for preparing the hormonal compounds of this invention.

The subject matter which applicants regard as their invention is particularly pointed out and distinctly claimed as follows:

1. A chemical compound having a gonane nucleus wherein the A-ring is aromatic and wherein said gonane is saturated in the B- and in the C-ring, said nucleus having attached thereto in the 13-position, a polycarbonalkyl group having two to about sixteen carbon atoms.

2. A chemical compound according to claim 1, in which there is attached in the 17-position a substituent selected from an hydroxyl group, an oxo group, or group convertible thereto by hydrolysis.

3. A chemical compound according to claim 2 in which there is attached an alkoxy group in the 3-position.

4. A chemical compound according to claim 2 in which there is attached an hydroxyl group in the 16-position.

5. A chemical compound according to claim 1, having attached thereto in the 17-position at least two carbon atoms, one or more of which may be oxygenated.

6. A chemical compound according to claim 1, in which there is attached in the 17-position a substituent selected from a methyl group, a carboxylic group, and a hydroxymethyl group.

7. A chemical compound according to claim 1, in which there is attached an alkylidine radical in the 17-position.

8. A chemical compound according to claim 1 wherein the D-ring has a 16(17)-double bond.

9. A process for preparing a compound having a gonane nucleus, wherein the A-ring is aromatic and wherein said nucleus is substituted in the 13-position with an alkyl radical having one to about sixteen carbon atoms, comprising: reducing a compound having a gonane nucleus, wherein the A-ring is aromatic and the 8(9)-position is unsaturated and wherein said nucleus is substituted at the 13-position by an alkyl radical having one to about sixteen carbon atoms, or a compound having a gonane nucleus wherein the A-ring is aromatic and the 9(11)-position is unsaturated and wherein said nucleus is substituted at the 13-position by an alkyl radical having one to about sixteen carbon atoms, with nascent hydrogen.

10. A process for preparing a compound having a gonane nucleus, wherein the A-ring is aromatic and said nucleus is substituted at the 13-position with an alkyl radical having one to about sixteen carbon atoms comprising: (a) treating a 2-(6-phenyl-3-oxohexyl)-1,3-cyclopentanedione wherein the phenyl group has at least one ortho-para directing substituent group and at least one position ortho to the position of chain attachment free of substituent groups, under aldol conditions to form a 4-phenethyl-5,6,7,8-tetrahydroindane-1,5-dione; (b) hydrogenating said tetrahydroindane compound to form a 4-phenethyl-hexahydroindane-1,5-dione; (c) cyclodehydrating under acid conditions said hexahydroindane compound to form a gonane nucleus wherein the A-ring is aromatic and the 9(11)-position is unsaturated and wherein said nucleus is substituted at the 13-position by an alkyl radical having one to about sixteen carbon atoms; and (d) reducing the 9(11)-position unsaturation of said gonane.

11. A process for preparing a compound having a gonane nucleus wherein the A-ring is aromatic and wherein said nucleus is substituted at the 13-position by a polycarbon-alkyl radical having two to about sixteen carbon atoms comprising: hydrogenating a compound having a gonane nucleus substituted at the 13-position by a polycarbon-alkyl radical having two to about sixteen carbon atoms in the presence of a catalyst.

12. A process for preparing a compound having a gonane nucleus, wherein the A-ring is aromatic, the 16 and 17 positions are dioxygenated and wherein said nucleus is substituted at the 13-position with a polycarbon-alkyl radical having two to about sixteen carbon atoms, comprising: oxidizing a 13-polycarbon-alkyl-17-acyloxy-gona-1,3,5(10),16-tetraene by hydroboration followed by mild oxidative hydrolysis to obtain the corresponding gona-1,3,5(10)-triene-16,17-trans-diol.

13. 13β-ethyl-3-methoxy-gona-1,3,5(10)-trien-17β-ol.

14. 13β-ethylgona-1,3,5(10)-triene-3,16α-17β-triol.

15. 13β-ethyl-3-methoxy-gona-1,3,5(10)-trien-17-one.

16. 13β,17α-diethyl-3-methoxygona - 1,3,5(10) - trien-17β-ol.

17. 13β-ethylgona-1,3,5(10)-triene-3,17β-diol.

18. 17 - acetyl - 13β - ethyl-3-methoxygona-1,3,5(10)-triene.

19. 13β-ethyl-17-ethylidene-3-methoxygona-1,3,5(10)-triene.

20. 13β-ethyl-17-(1,2-dihydroxyethyl)-3-methoxygona-1,3,5(10)-triene.

21. A chemical composition for treating amenorrhea comprising the compound of claim 14 and a carrier.

22. A method of treating amenorrhea in mammals which coprises administering a pharmaceutically effective dose of the compound of claim 14.

References Cited

UNITED STATES PATENTS

| 2,712,027 | 6/1955 | Rosenkranz et al. | 260—397.45 |
| 2,759,951 | 8/1956 | Djerassi et al. | 260—397.3 |
| 2,905,676 | 9/1959 | Colton | 260—397.4 |
| 3,002,983 | 10/1961 | Hoffman | 260—397.45 |
| 3,005,835 | 10/1961 | Johns | 260—397.5 |

OTHER REFERENCES

Steroid Drugs, Applezewig (1962) pages 443–452.
Steroid Reactions, Djerassi (1963) page 600.

HENRY A. FRENCH, Primary Examiner

U.S. Cl. X.R.

260—239.5, 239.55, 239.57, 397.1, 397.3, 397.4, 397.45, 397.5, 570.5, 570.8, 590. 618, 650, 668